(12) United States Patent
Tamura

(10) Patent No.: US 12,381,430 B2
(45) Date of Patent: Aug. 5, 2025

(54) ARMATURE AND ROTATING ELECTRIC MACHINE

(71) Applicant: DENSO CORPORATION, Kariya (JP)

(72) Inventor: Akito Tamura, Kariya (JP)

(73) Assignee: DENSO CORPORATION, Kariya (JP)

(*) Notice: Subject to any disclaimer, the term of this patent is extended or adjusted under 35 U.S.C. 154(b) by 775 days.

(21) Appl. No.: 17/410,190

(22) Filed: Aug. 24, 2021

(65) Prior Publication Data

US 2021/0384786 A1 Dec. 9, 2021

Related U.S. Application Data

(63) Continuation of application No. PCT/JP2020/006143, filed on Feb. 17, 2020.

(30) Foreign Application Priority Data

Feb. 25, 2019 (JP) .................................. 2019-032180

(51) Int. Cl.
*H02K 3/28* (2006.01)

(52) U.S. Cl.
CPC ..................................... *H02K 3/28* (2013.01)

(58) Field of Classification Search
CPC ........ H02K 3/28; H02K 1/278; H02K 1/2786; H02K 3/47; H02K 9/19; H02K 11/225; H02K 11/33; H02K 21/12; H02K 1/20
See application file for complete search history.

(56) References Cited

U.S. PATENT DOCUMENTS

| 10,992,202 B2 * | 4/2021 | Lee .......................... H02K 3/04 |
| 2009/0267424 A1 | 10/2009 | Aoki et al. |

(Continued)

FOREIGN PATENT DOCUMENTS

| JP | S51-125503 U | 10/1976 |
| JP | 2000-156951 A | 6/2000 |

(Continued)

OTHER PUBLICATIONS

Apr. 14, 2020 Search Report issued in International Patent Application No. PCT/JP2020/006143.

*Primary Examiner* — Christopher M Koehler
*Assistant Examiner* — Riley Owen Stout
(74) *Attorney, Agent, or Firm* — Oliff PLC

(57) ABSTRACT

An armature includes an armature winding of multiple phases having phase windings, for each phase, that includes a plurality of partial windings, and a base member that includes a circular cylindrical back yoke. The partial winding includes a pair of intermediate conductor portions and crossover portions that connect the intermediate conductor portions in an annular shape. A conductor is wound in multiple layers in the intermediate conductor portions and the crossover portions. An interference prevention portion extends in a radial direction. The intermediate conductor portions are arrayed in a predetermined order in the circumferential direction, by one of the intermediate conductor portions of a first phase being arranged between the intermediate conductor portions of the partial winding of a second phase. The partial windings are assembled to the back yoke in a state in which an insulation layer is interposed between the intermediate conductor portion and the back yoke.

18 Claims, 105 Drawing Sheets

(56) References Cited

U.S. PATENT DOCUMENTS

| | | | |
|---|---|---|---|
| 2013/0062986 A1* | 3/2013 | Takeuchi | H02K 11/215 |
| | | | 29/605 |
| 2019/0363596 A1 | 11/2019 | Takeuchi | |
| 2020/0161939 A1 | 5/2020 | Takahashi et al. | |
| 2020/0162003 A1 | 5/2020 | Takahashi et al. | |

FOREIGN PATENT DOCUMENTS

| | | |
|---|---|---|
| JP | 2014-193047 A | 10/2014 |
| JP | 2016-220393 A | 12/2016 |

\* cited by examiner

FIG.24
(a)
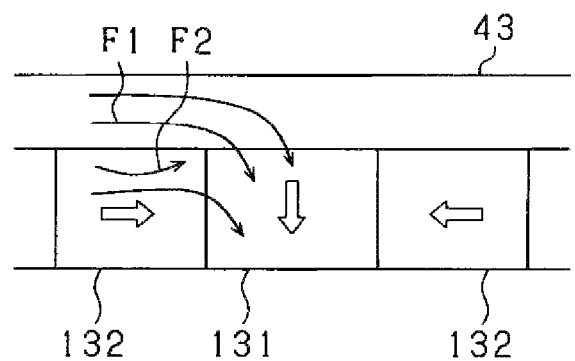
(b)
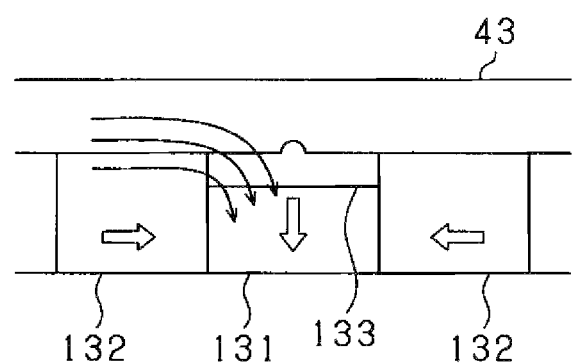

(a)　　　(b)　　　(c)

VEHICLE INNER SIDE ←——→ VEHICLE OUTER SIDE (a) OUTER LAYER (b) INNER LAYER

FIG.62
(a)
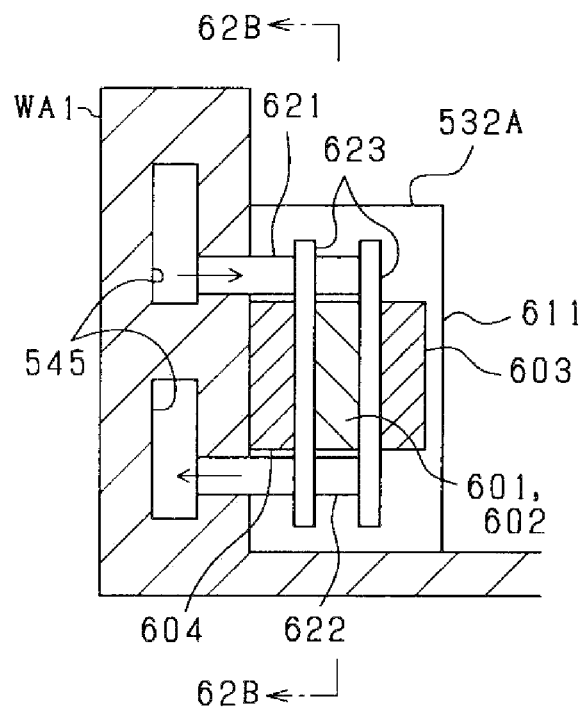
(b)
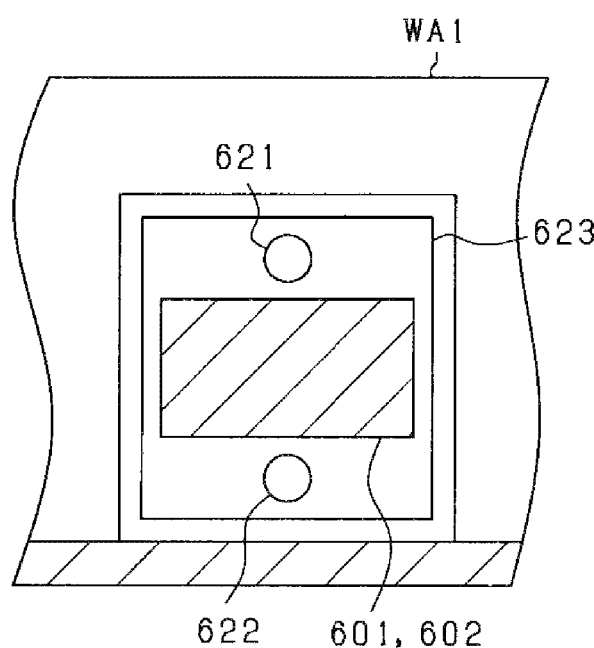
(c)
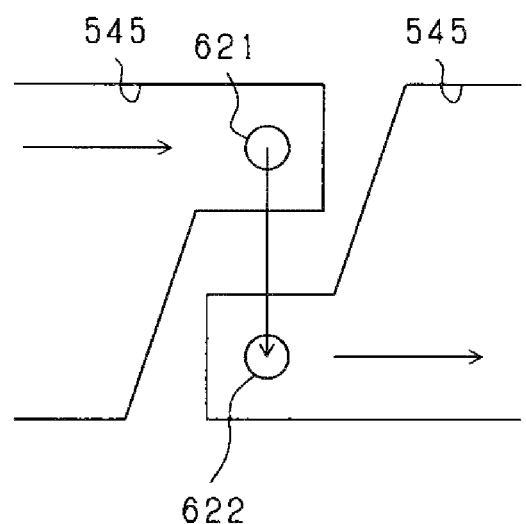

FIG.63
(a)
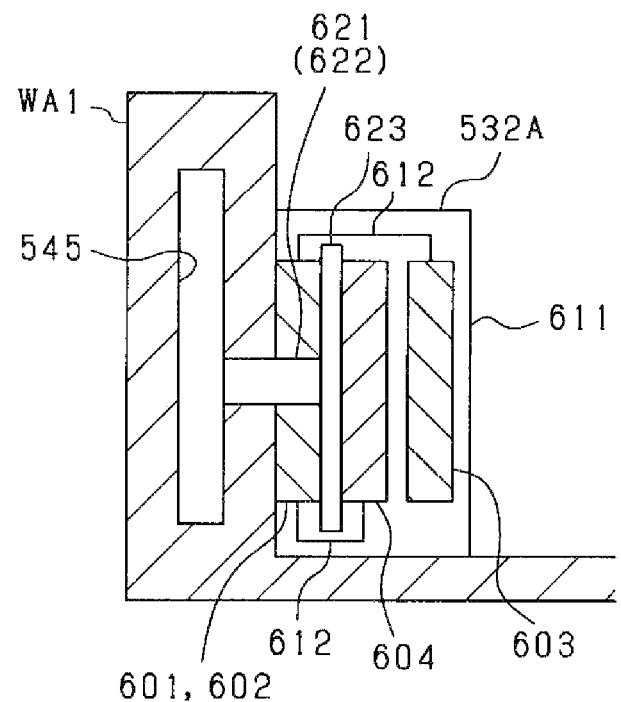
(b)
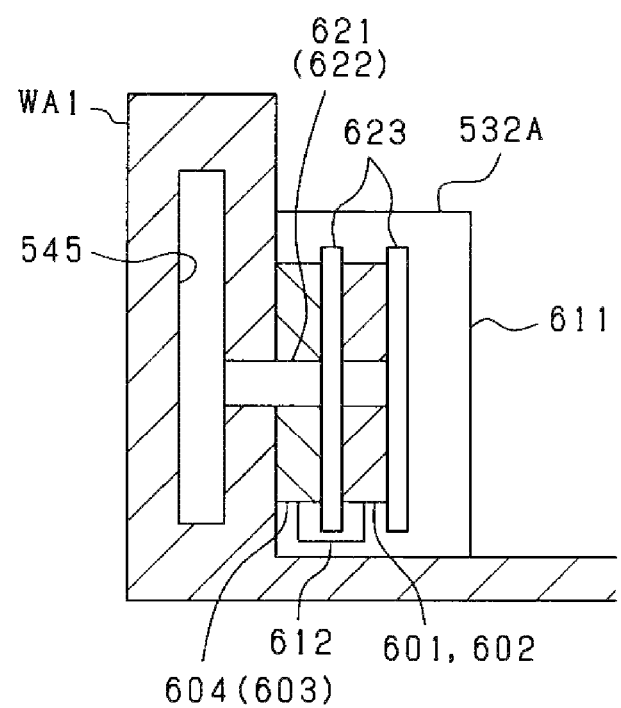

FIG.72
(a)
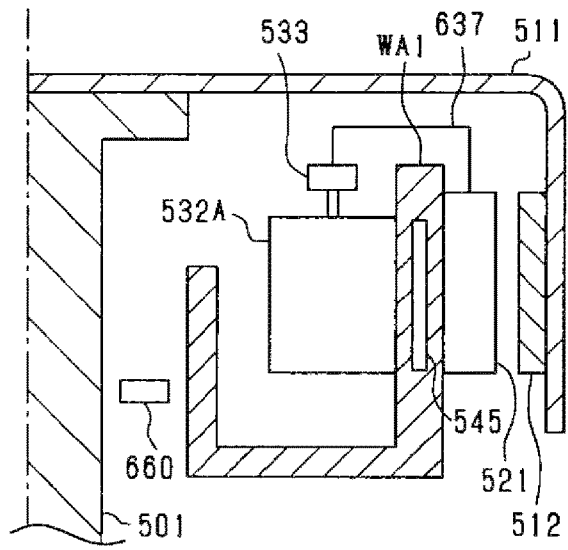
(b)
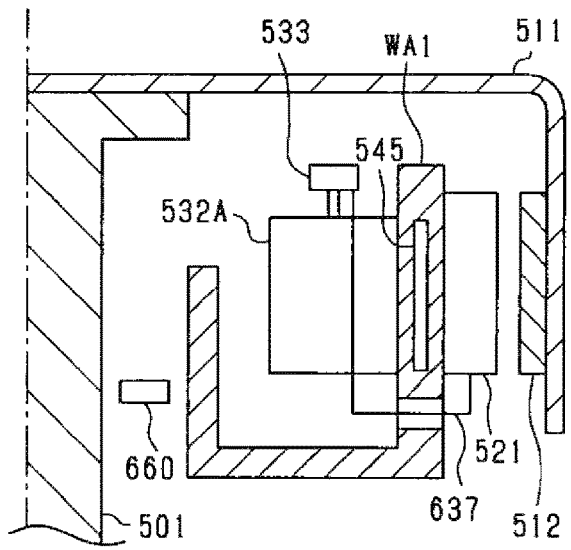
(c)
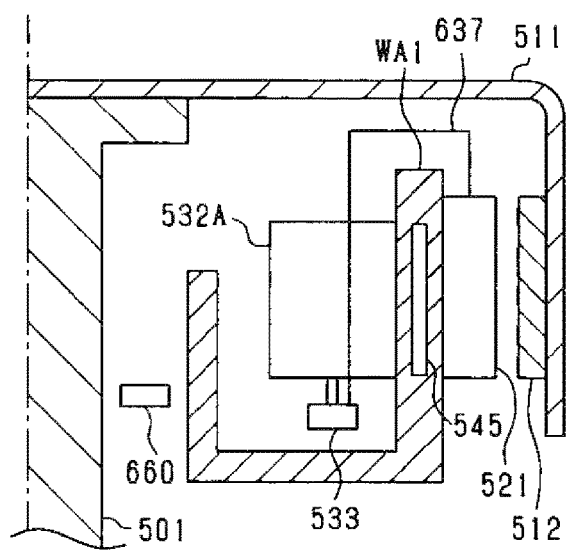
(d)
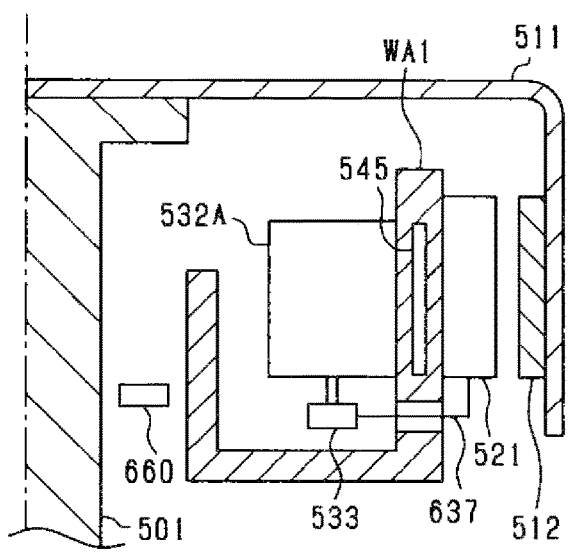

FIG.73
(a)
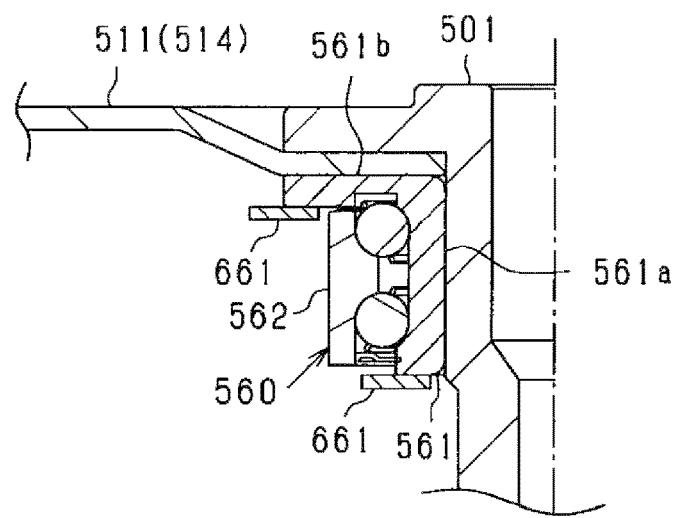
(b)
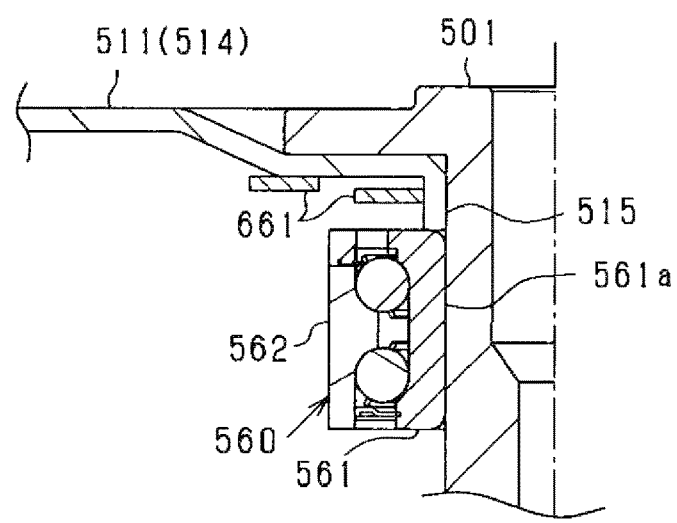
(c)
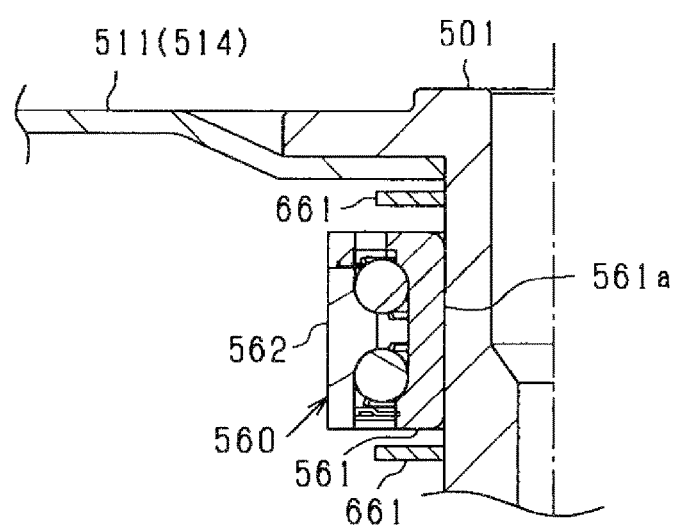

FIG.74
(a)
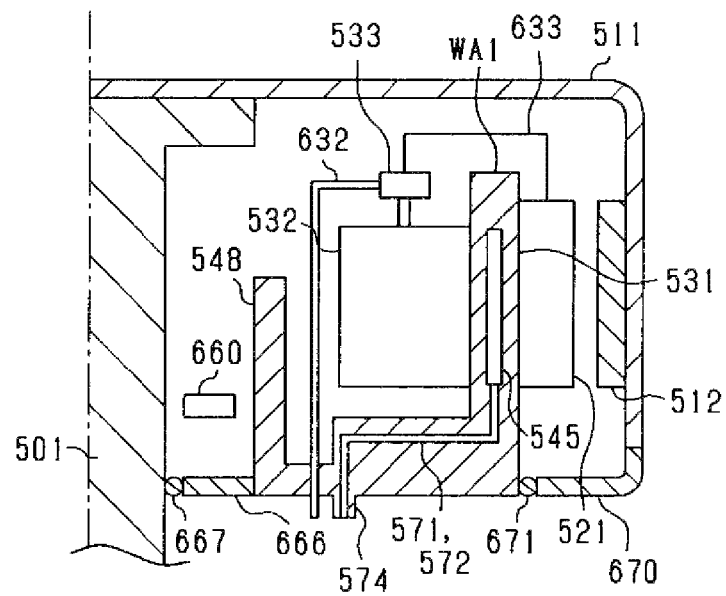
(b)
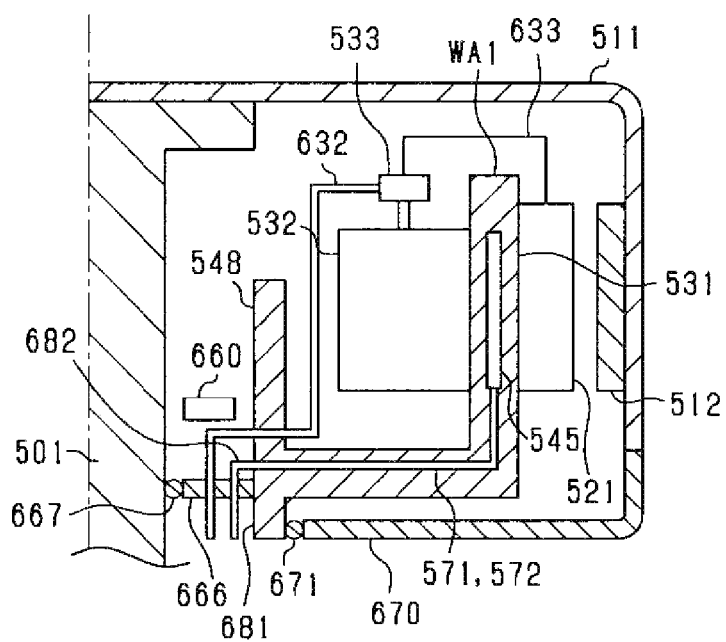

FIG.88
(a)
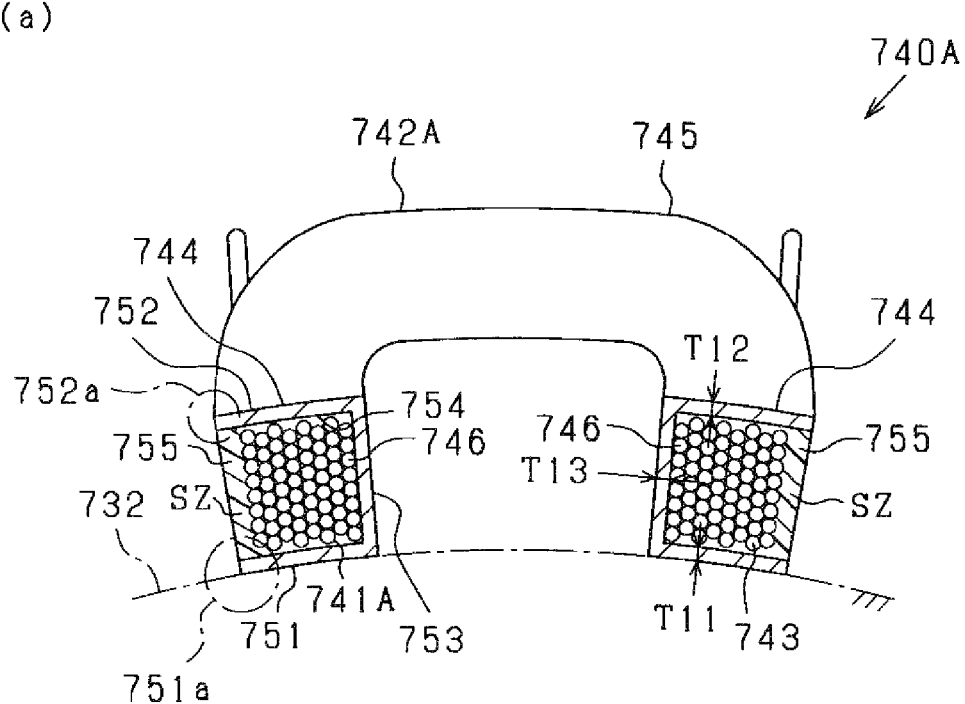
(b)
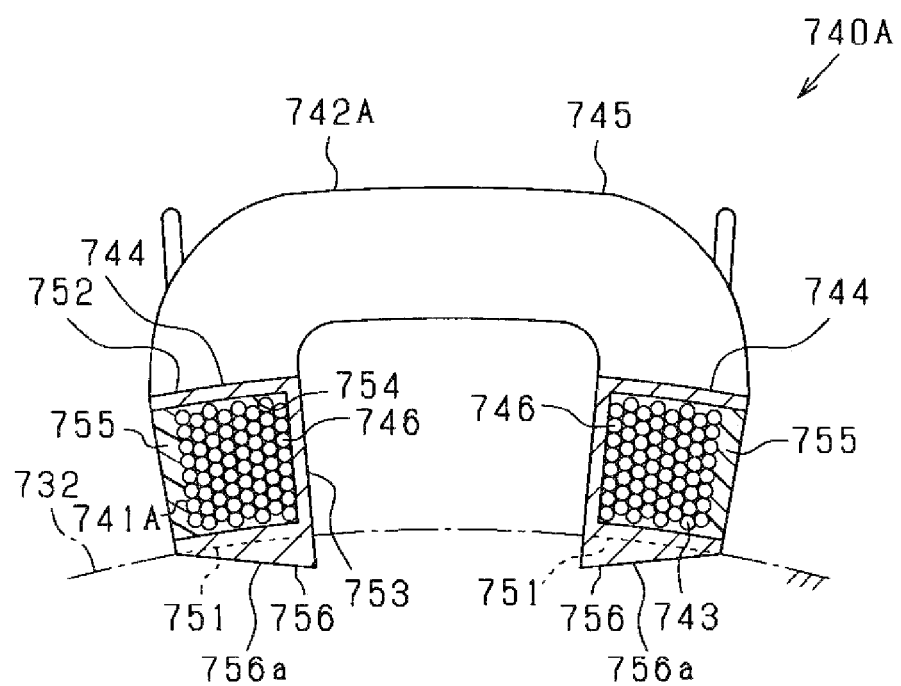

FIG.90
(a)
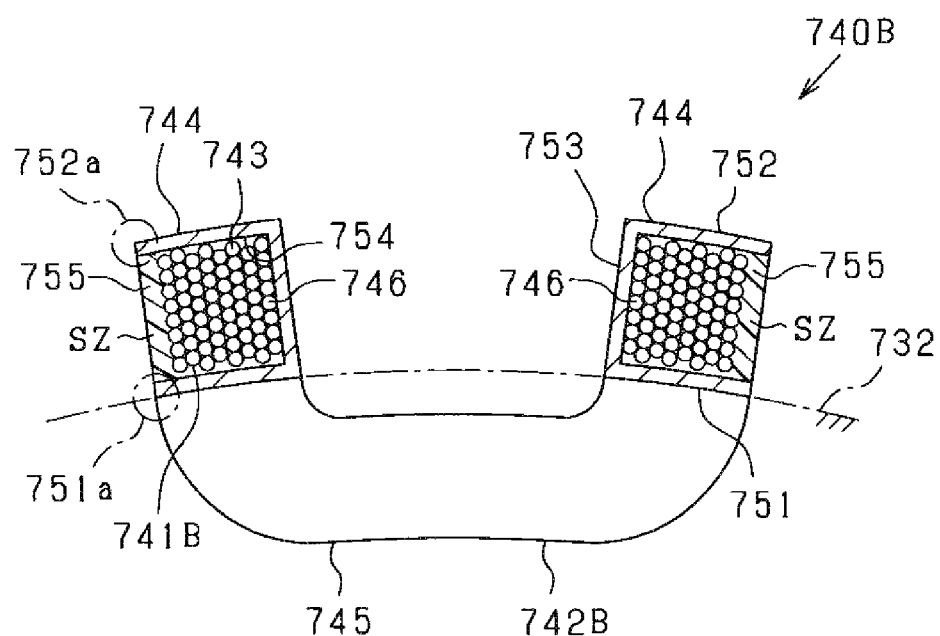
(b)
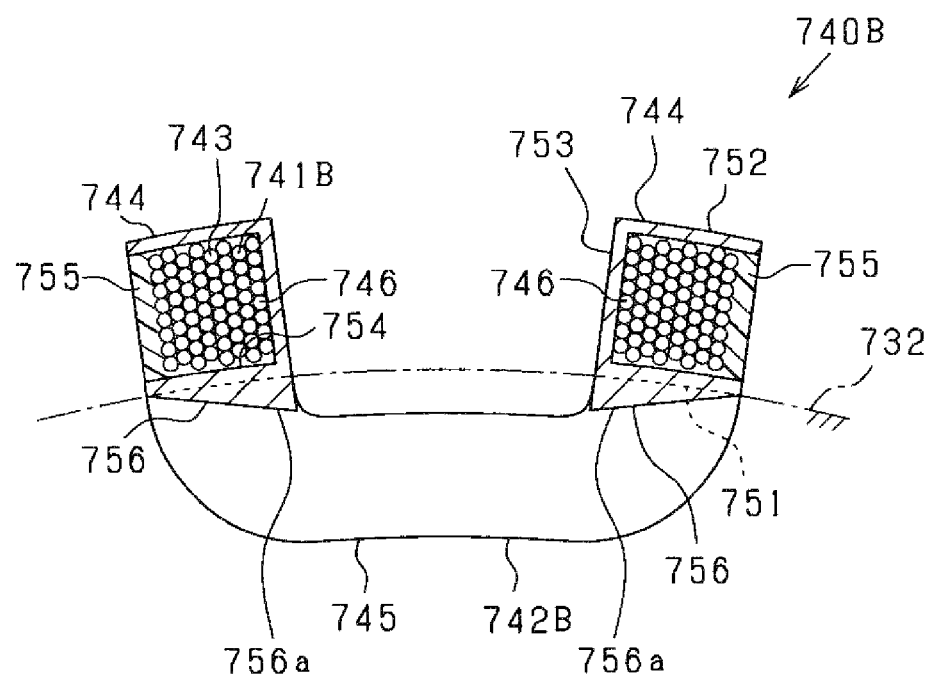

FIG.102
(a)
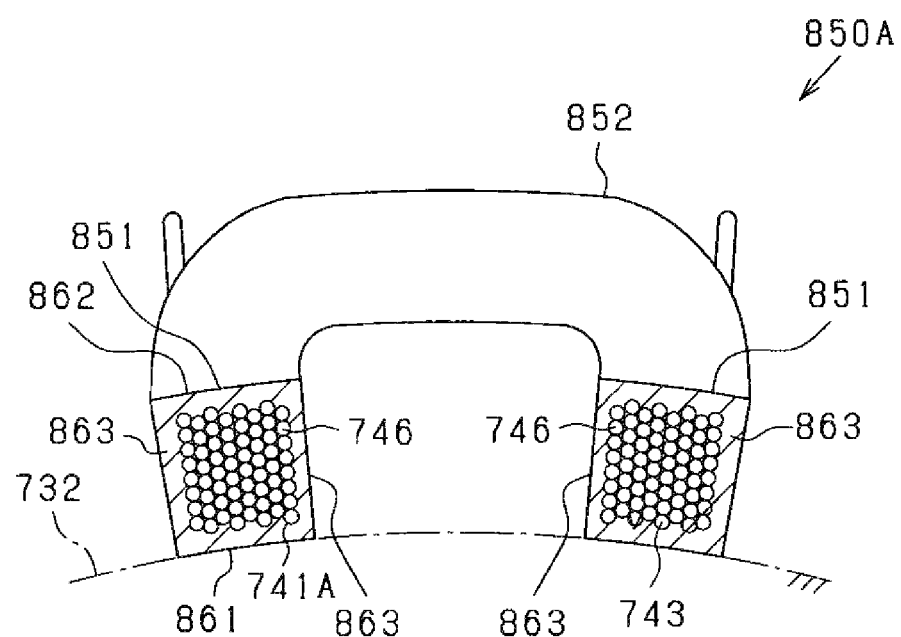
(b)
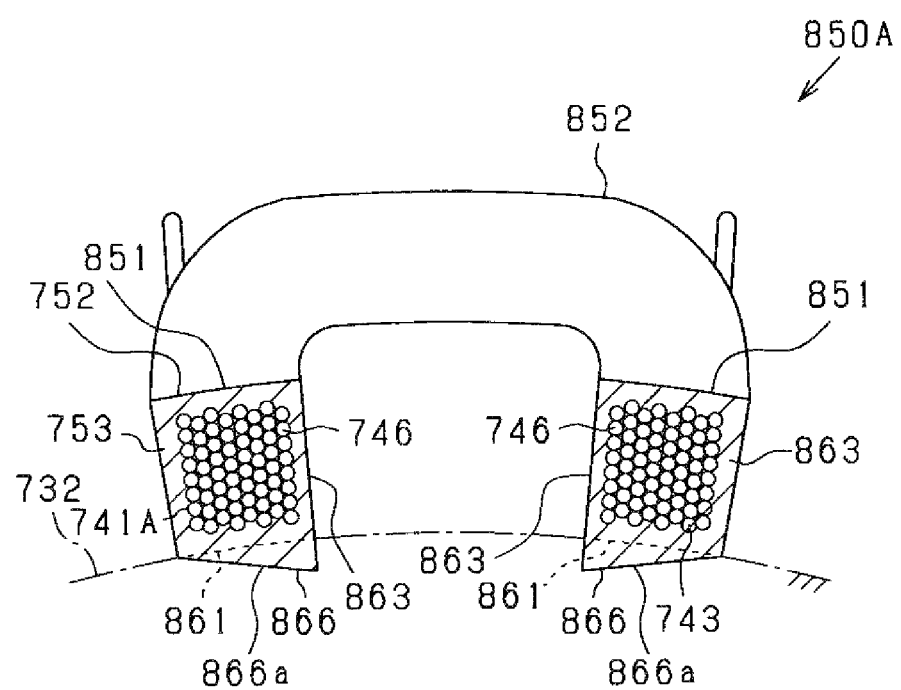

FIG.104
(a)
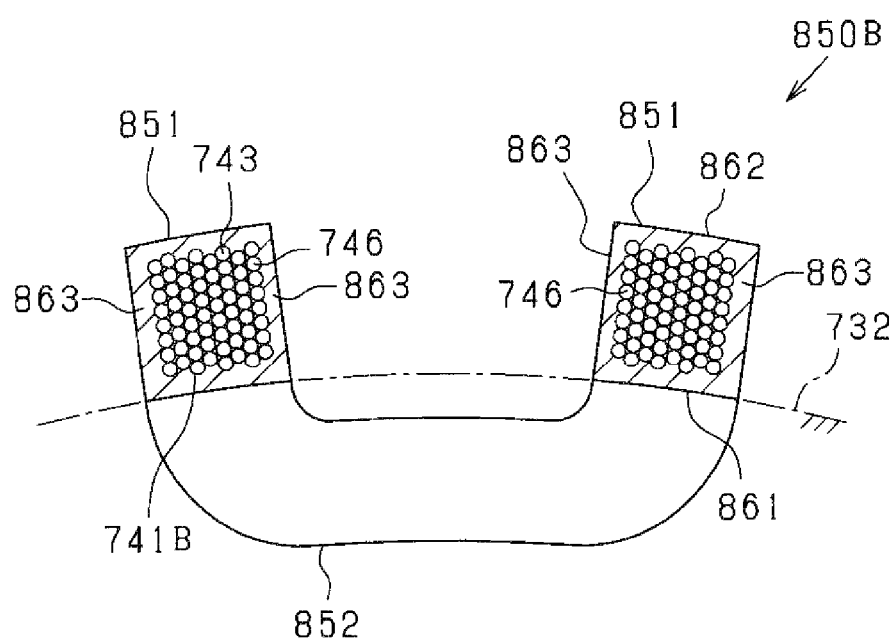
(b)
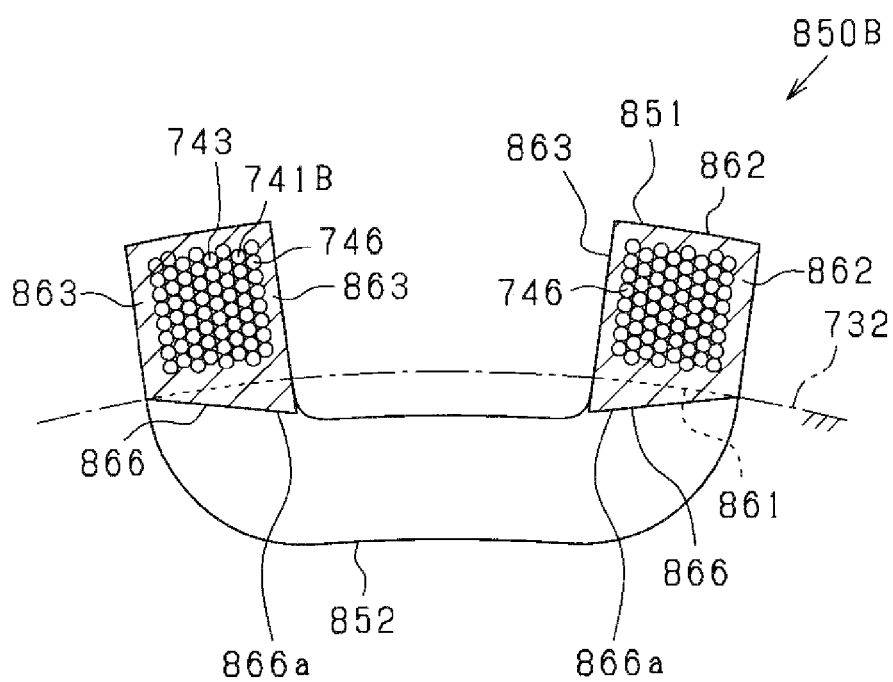

FIG.106
(a) 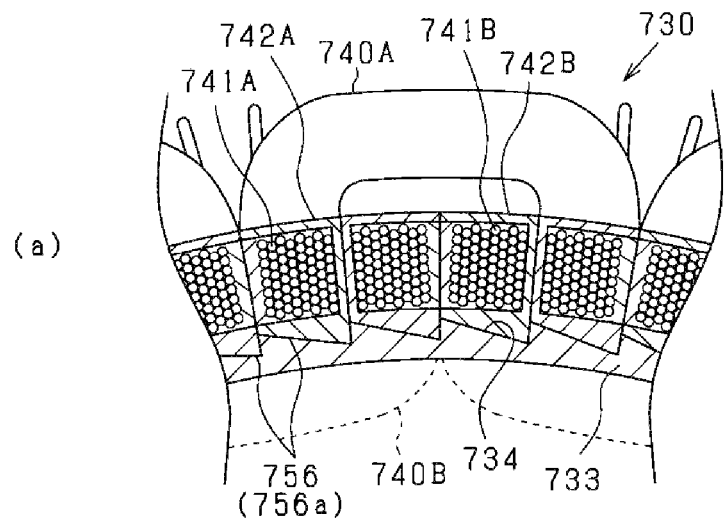
(b) 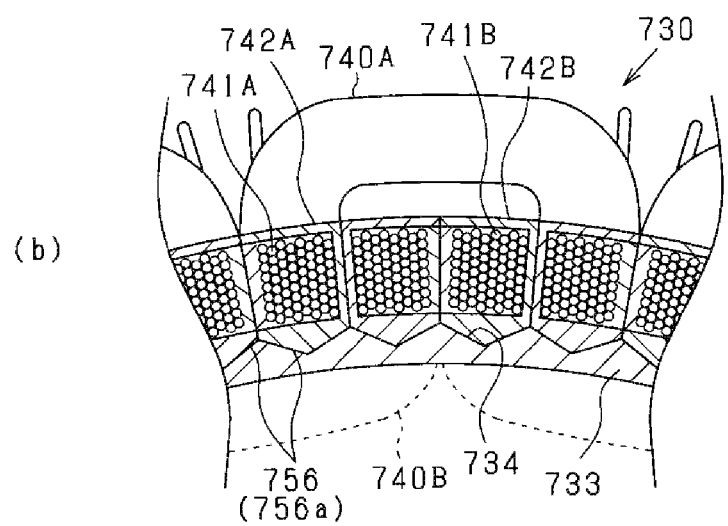
(c) 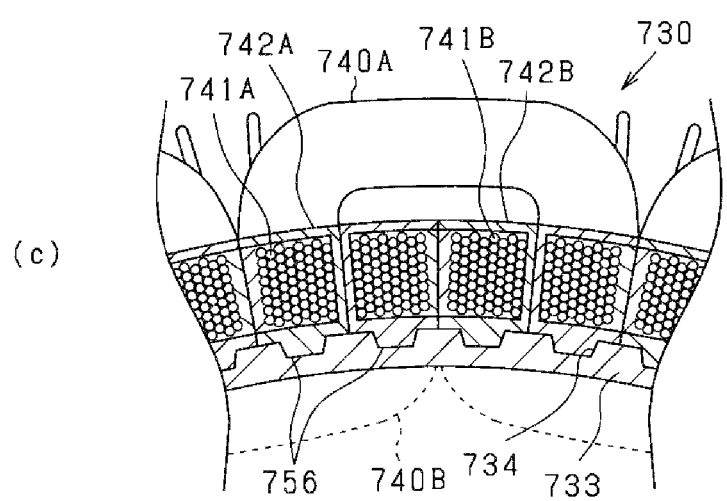

FIG.107
(a)
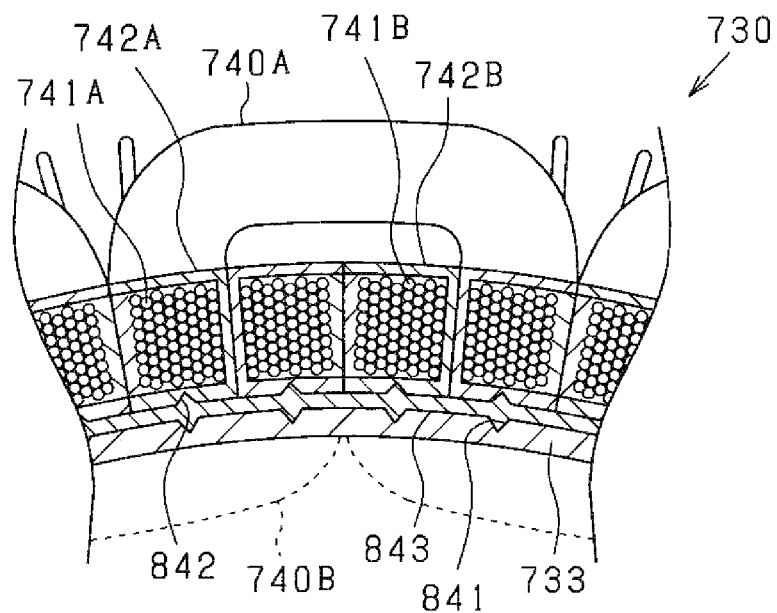
(b)
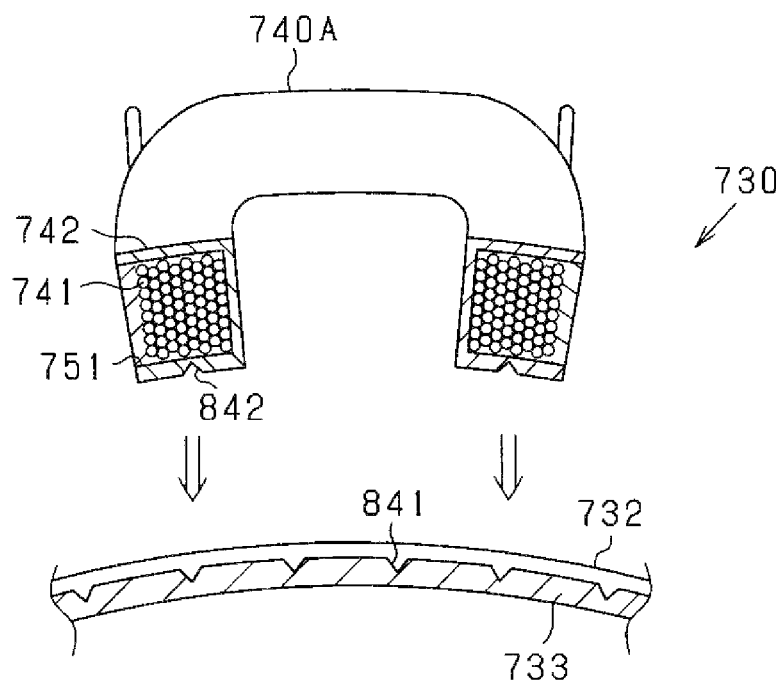

FIG.109
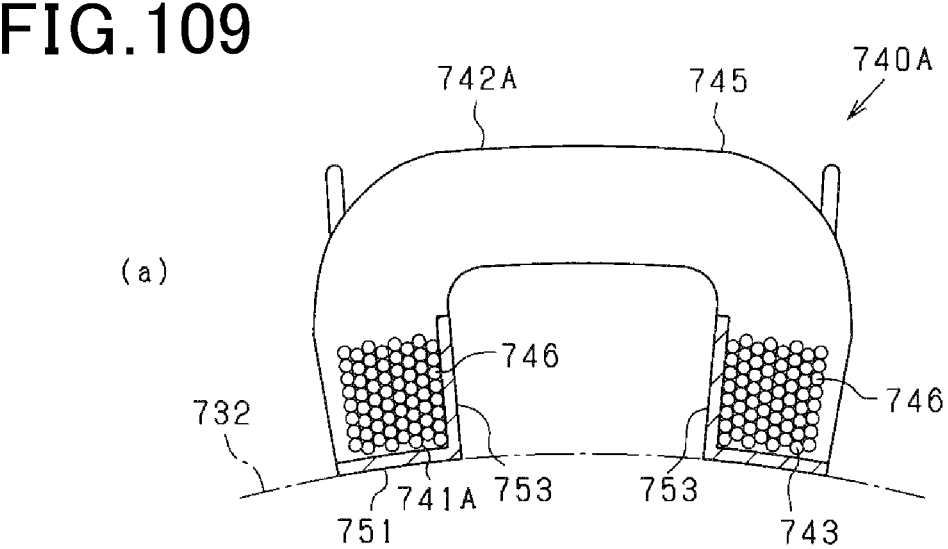
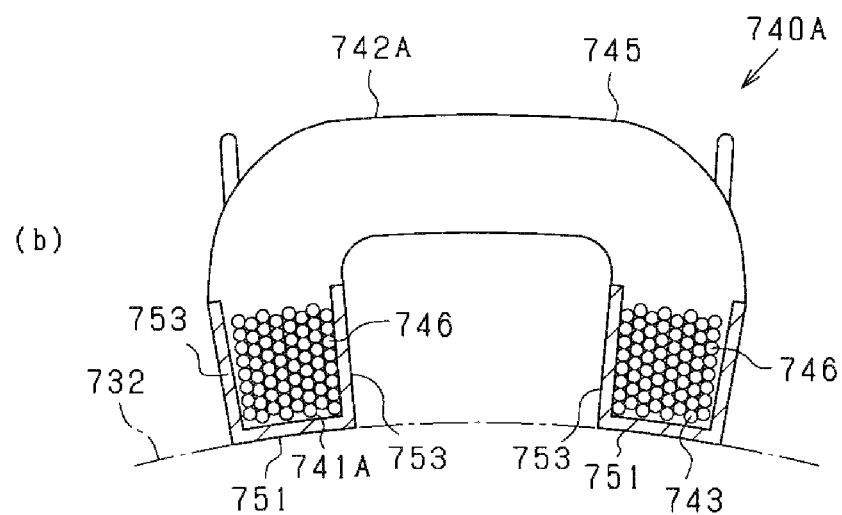
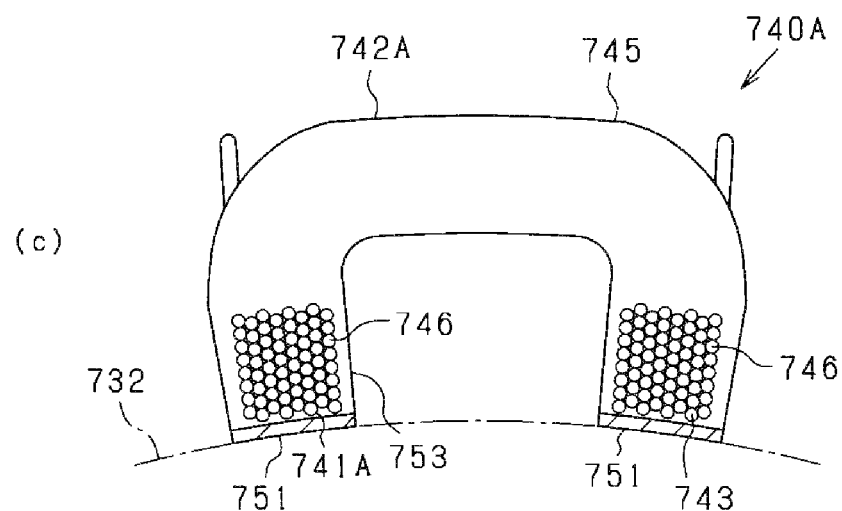

FIG.111
(a)
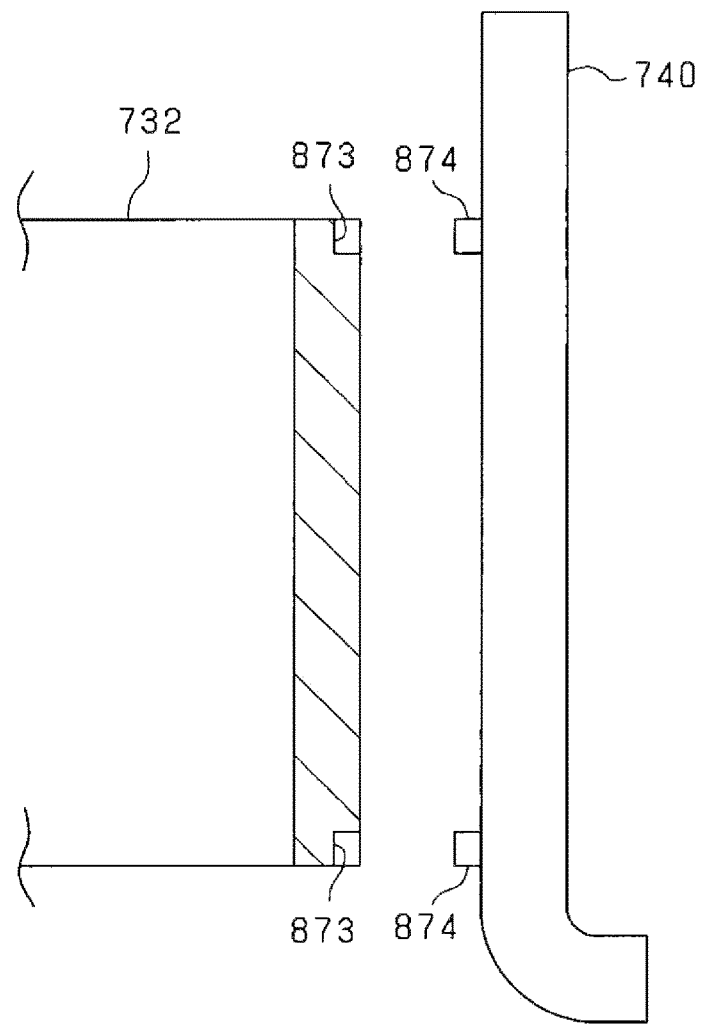
(b)
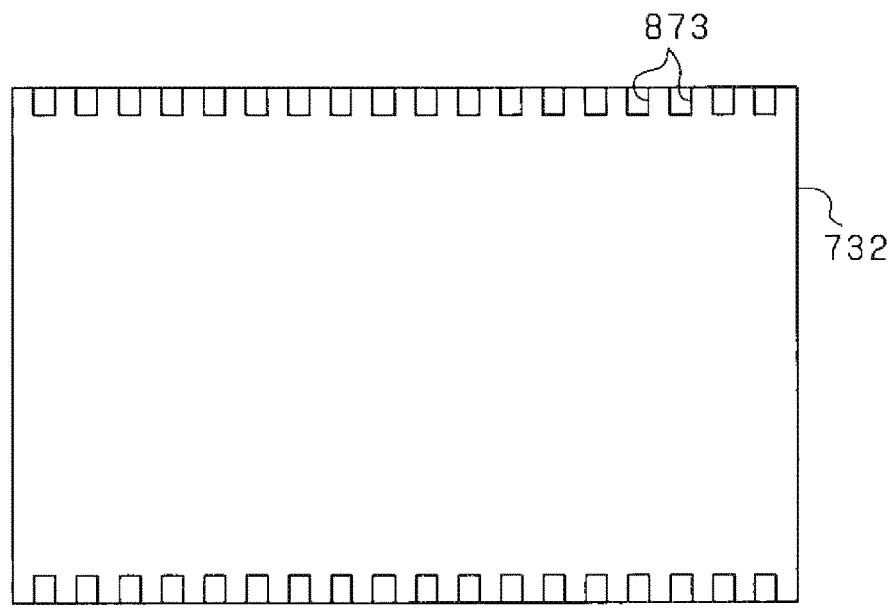

FIG.112
(a)
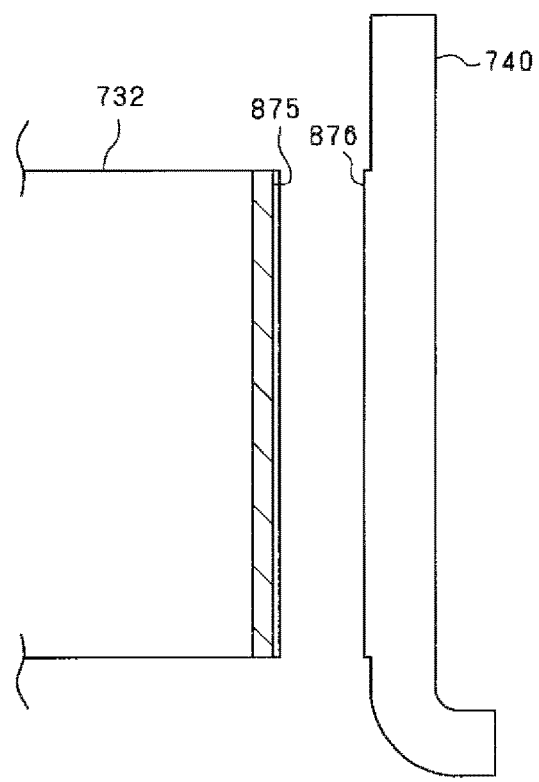
(b)
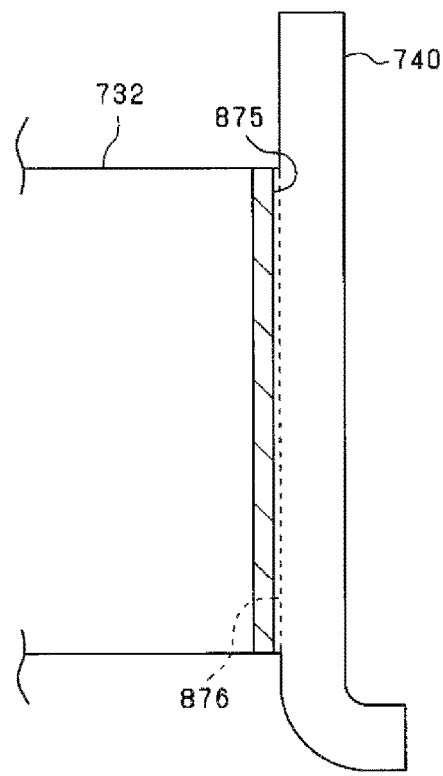

FIG.113 (a)
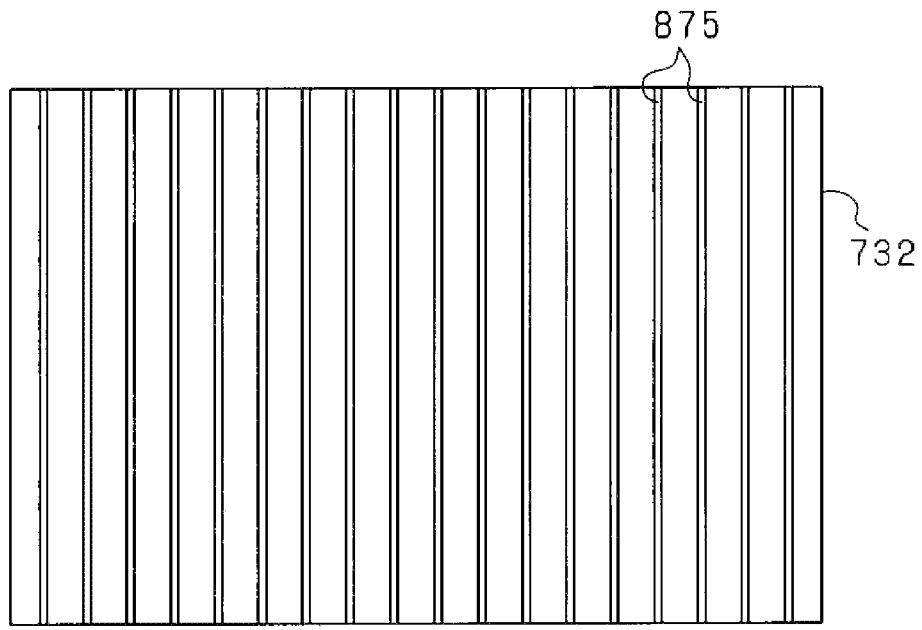
(b)
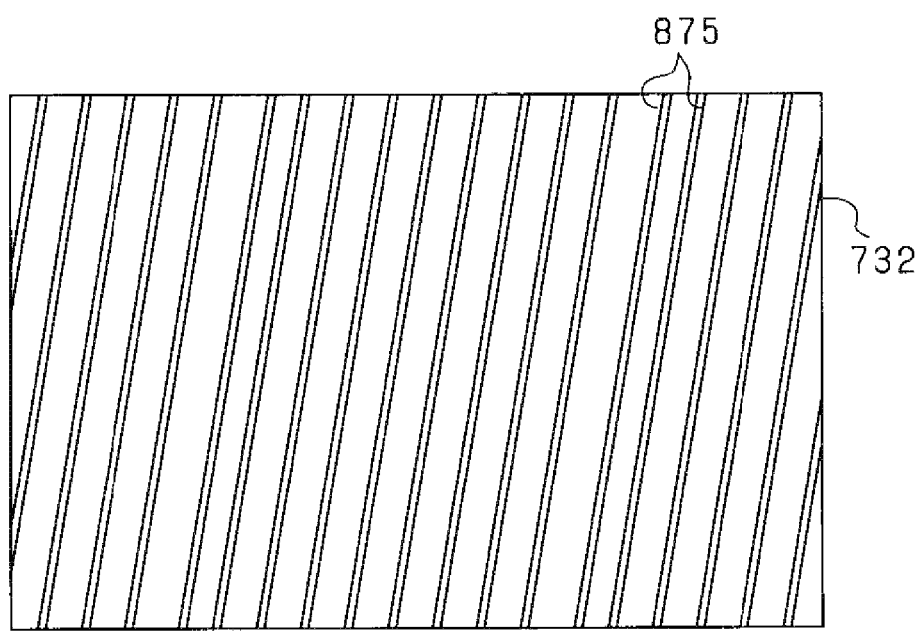

FIG.115
(a)
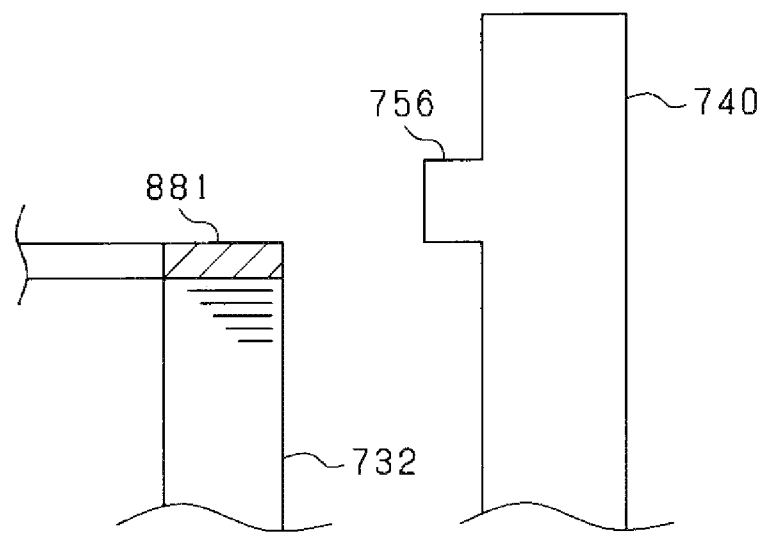
(b)
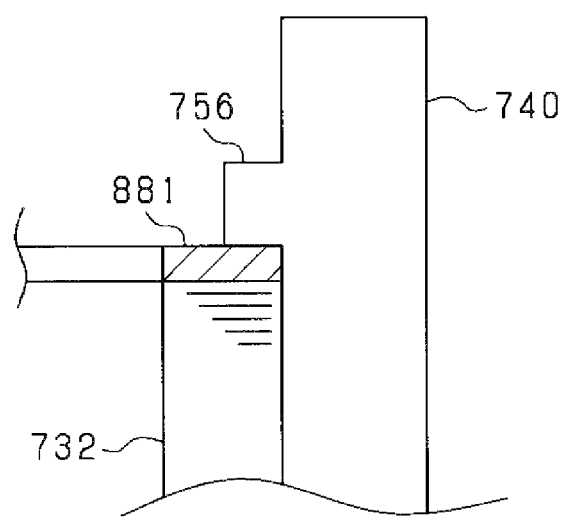

FIG.116
(a)
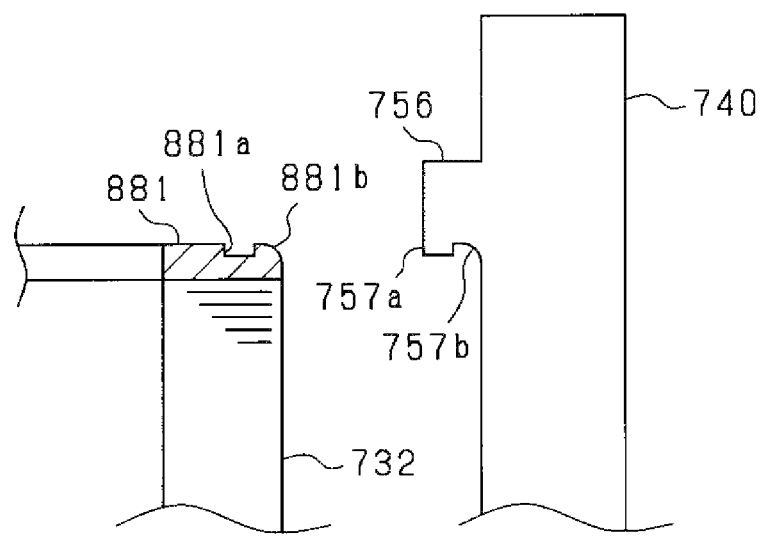
(b)
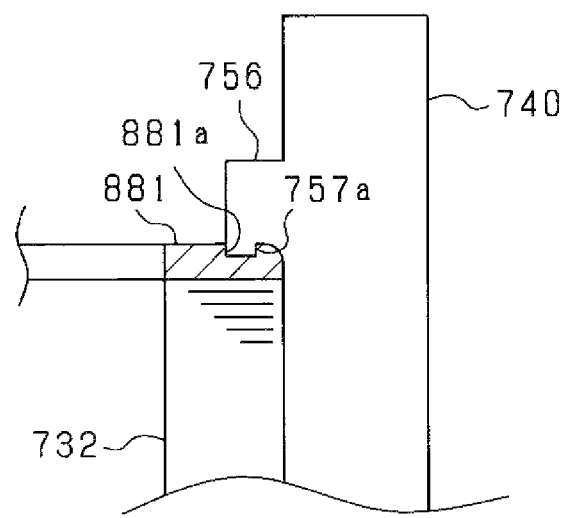

FIG.117
(a) 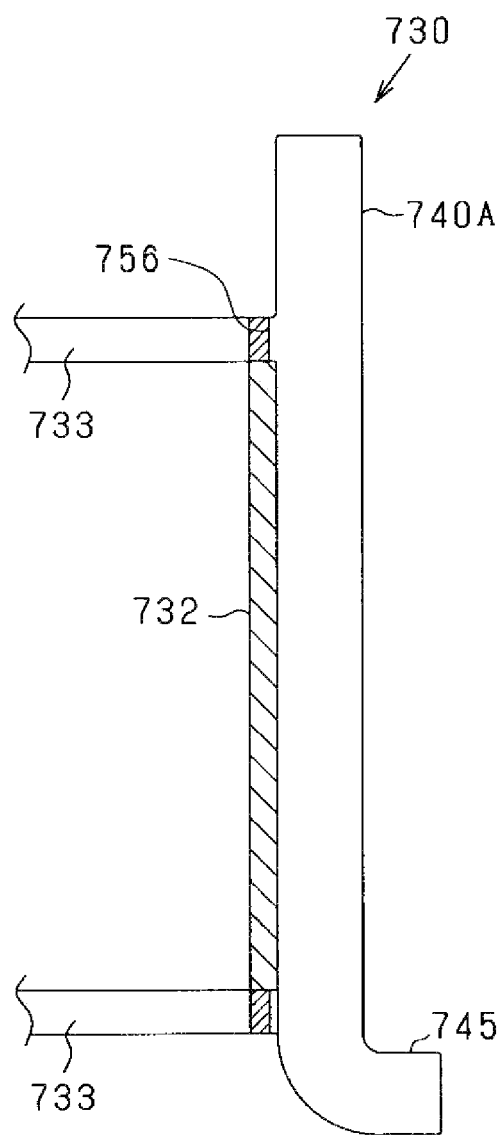
(b) 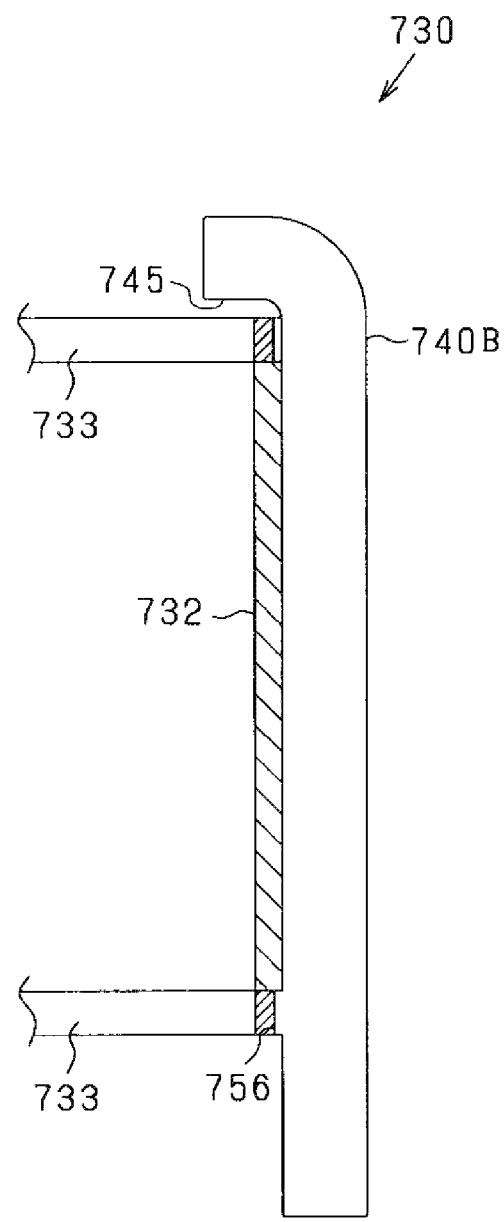

FIG.120
(a)          (b)
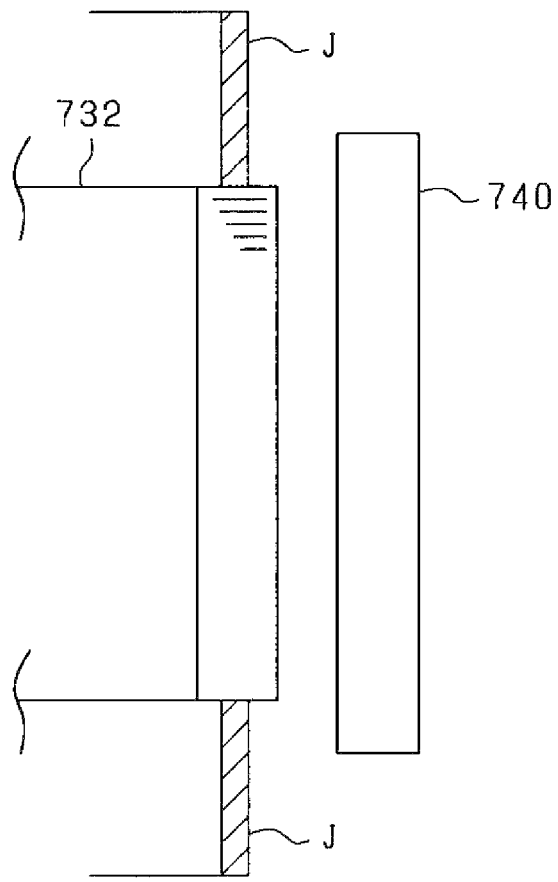
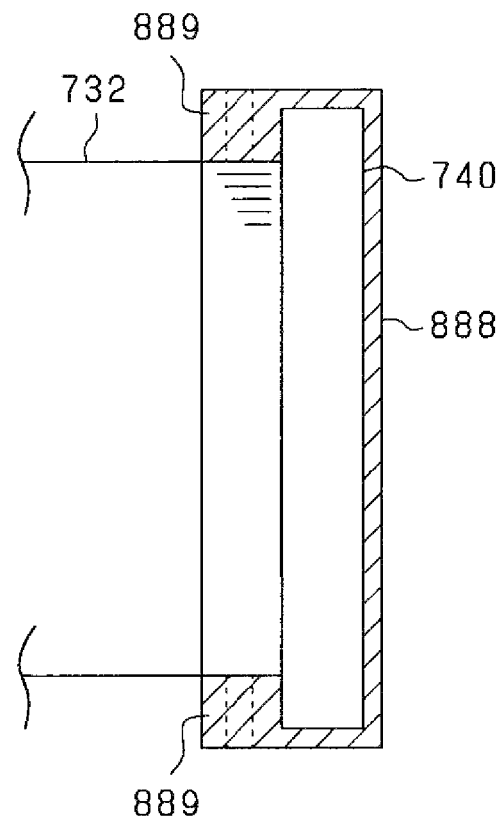

ARMATURE AND ROTATING ELECTRIC MACHINE

CROSS-REFERENCE TO RELATED APPLICATIONS

The present application is a continuation application of International Application No. PCT/JP2020/006143, filed on Feb. 17, 2020, which claims priority to Japanese Patent Application No. No. 2019-032180, filed on Feb. 25, 2019. The contents of these applications are incorporated herein by reference in their entirety.

BACKGROUND

Technical Field

The present disclosure in this specification relates to an armature and a rotating electric machine.

Related Art

A rotating electric machine that includes a field element that includes a magnet portion that has a plurality of magnetic poles of which polarities alternate in a circumferential direction, and an armature that has an armature winding of multiple phases is known. The armature winding has a phase winding for each phase. The phase winding of each phase is configured such that conductor portions are arranged at predetermined intervals in the circumferential direction and the conductor portions of the same phase are connected to each other at coil ends on both ends in an axial direction.

SUMMARY

One aspect of the present disclosure provides an armature that includes: an armature winding of multiple phases that has phase windings, for each phase, that includes a plurality of partial windings; and a base member that includes a circular cylindrical back yoke. The partial winding includes: a pair of intermediate conductor portions that are provided so as to be separated at a predetermined interval in a circumferential direction; crossover portions that are provided on a first end side and a second end side in an axial direction and connect the pair of intermediate conductor portions in an annular shape; a conductor that is wound in multiple layers in the pair of intermediate conductor portions and the crossover portions; and an interference prevention portion that extends in a radial direction and prevents interference between the partial windings that are adjacent to each other in the circumferential direction, in at least either of the crossover portions on both sides in the axial direction. The intermediate conductor portions of the phases are arrayed in a predetermined order in the circumferential direction, by one intermediate conductor portion of the pair of intermediate conductor portions of the partial winding of a first phase being arranged between the pair of intermediate conductor portions of the partial winding of a second phase. The partial windings are assembled to the back yoke in a state in which an insulation layer is interposed between the intermediate conductor portion and the back yoke.

BRIEF DESCRIPTION OF THE DRAWINGS

In the accompanying drawings:

FIG. 24 illustrates, by (a) and (b), detailed diagrams of a flow of magnetic flux in a magnet unit;

FIG. 62 illustrates, by (a) to (c), diagrams of an example of the cooling structure of the switch module;

FIG. 63 illustrates, by (a) and (b), diagrams of an example of the cooling structure of the switch module;

FIG. 72 illustrates, by (a) to (d), configuration diagrams for explaining a first modification of an in-wheel motor;

FIG. 73 illustrates, by (a) to (c), configuration diagrams for explaining a second modification of the in-wheel motor;

FIG. 74 illustrates, by (a) and (b), configuration diagrams for explaining a third modification of the in-wheel motor;

FIG. 88 illustrates, by (a) and (b), diagrams of a configuration of the coil module;

FIG. 90 illustrates, by (a) and (b), diagrams of a configuration of the coil module;

FIG. 102 illustrates, by (a) and (b), diagrams of a configuration of the coil module;

FIG. 104 illustrates, by (a) and (b), diagrams of a configuration of the coil module;

FIG. 106 illustrates, by (a) to (c), cross-sectional views of the lateral cross-section of the stator;

FIG. 107 illustrates, by (a) and (b), cross-sectional views of the lateral cross-section of the stator;

FIG. 109 illustrates, by (a) to (c), diagrams of a configuration of the coil module;

FIG. 111 illustrates, by (a) and (b), diagrams of assembly of the coil module to the stator core;

FIG. 112 illustrates, by (a) and (b), diagrams of assembly of the coil module to the stator core;

FIG. 113 illustrates, by (a) and (b), front views of the stator core;

FIG. 115 illustrates, by (a) and (b), diagrams of assembly of the coil module to the stator core;

FIG. 116 illustrates, by (a) and (b), diagrams of assembly of the coil module to the stator core;

FIG. 117 illustrates, by (a) and (b), diagrams of assembly of the coil module to the stator core;

FIG. 119 is a diagram of assembly of the coil module to the stator core;

FIG. 120 illustrates, by (a) and (b), diagrams of assembly of the coil module to the stator core;

FIG. 121 is a diagram of assembly of the coil module to the stator core;

FIG. 122 is a diagram of assembly of the coil module to the stator core;

FIG. 123 is a perspective view of the stator;

FIG. 124 is a perspective view of a configuration of a stator in a seventeenth modification;

FIG. 125 is a front view of the stator;

FIG. 126 is a vertical cross-sectional view of the stator;

FIG. 127 is a lateral cross-sectional view of the stator;

FIG. 128 is a perspective view in which a stator winding and a stator core are exploded;

FIG. 129 is a circuit diagram of a connection state of partial windings of phase windings of three phases;

FIG. 130 is a perspective view of a coil module;

Figure 131:
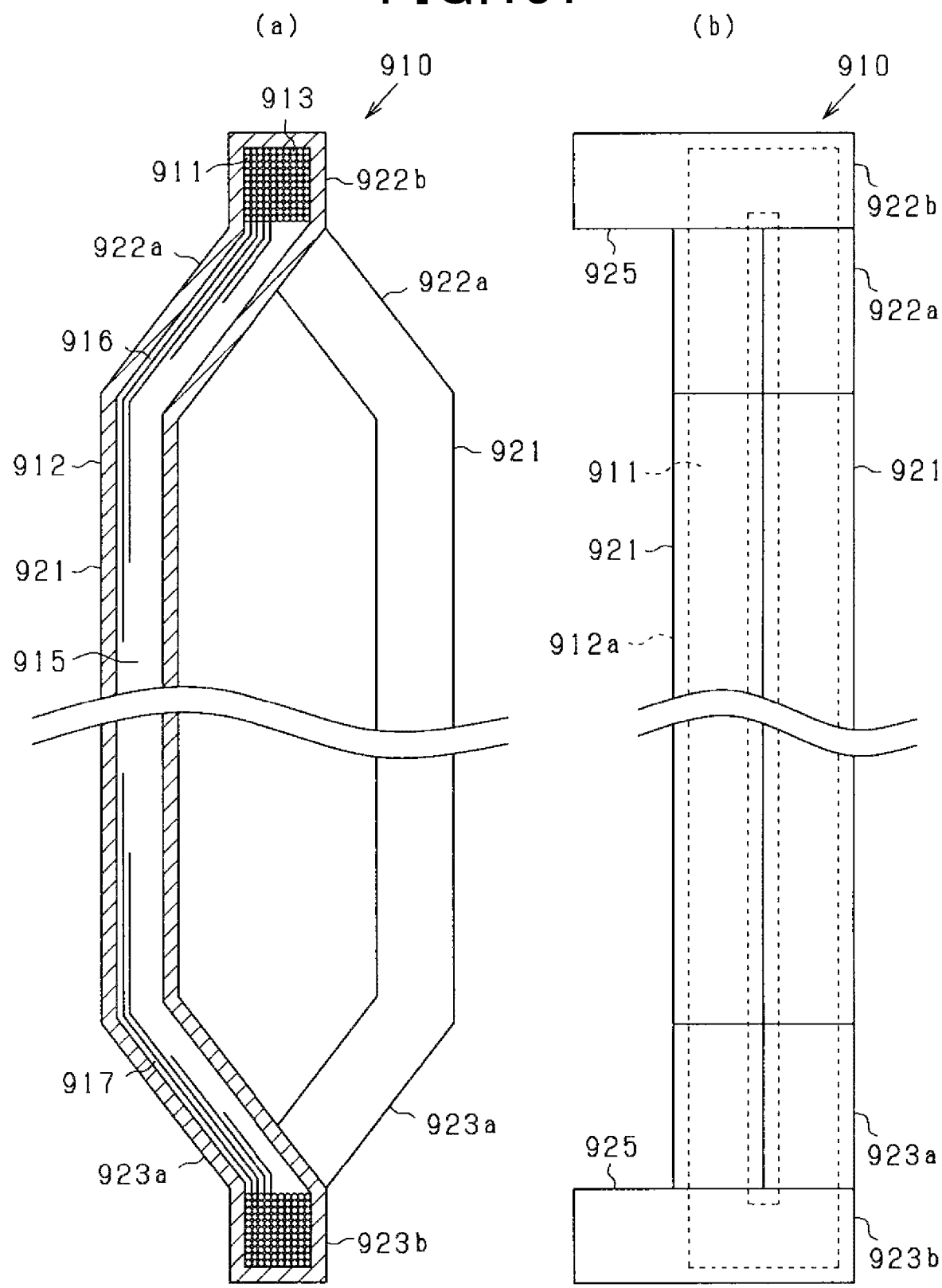
Figure 132:
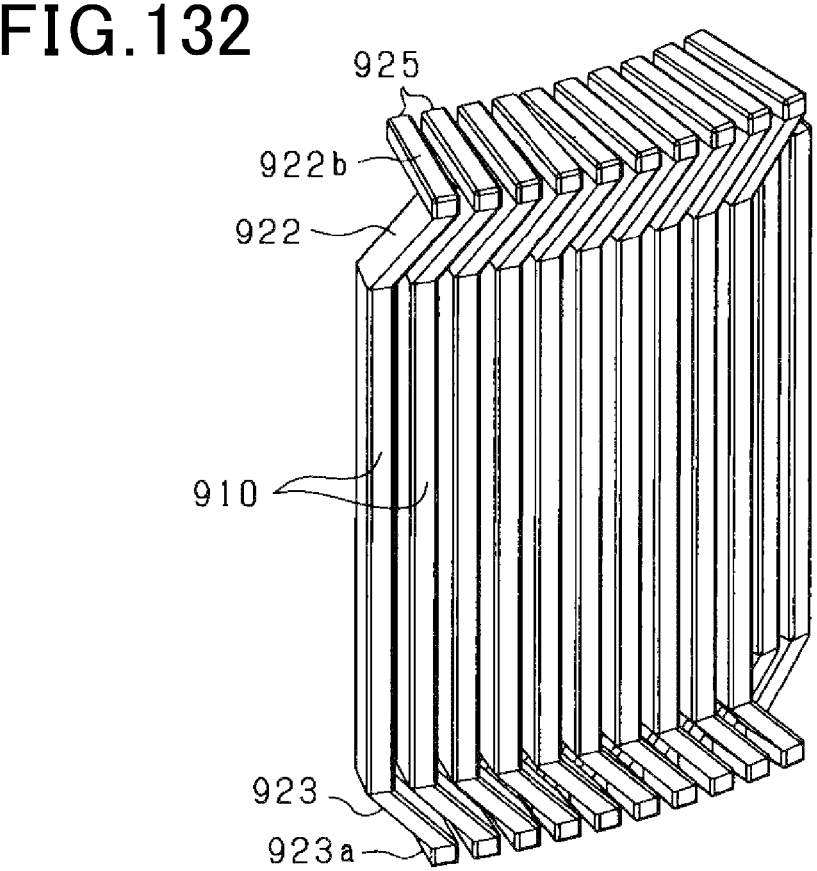
Figure 133:
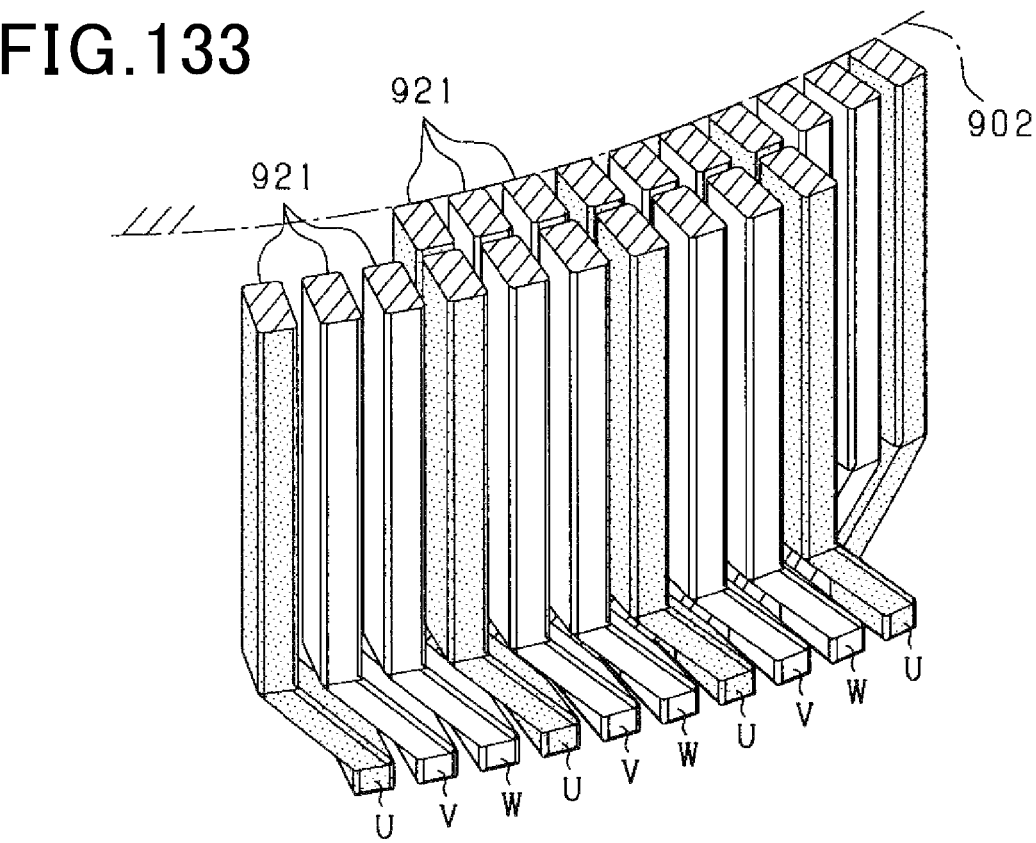
Figure 134:
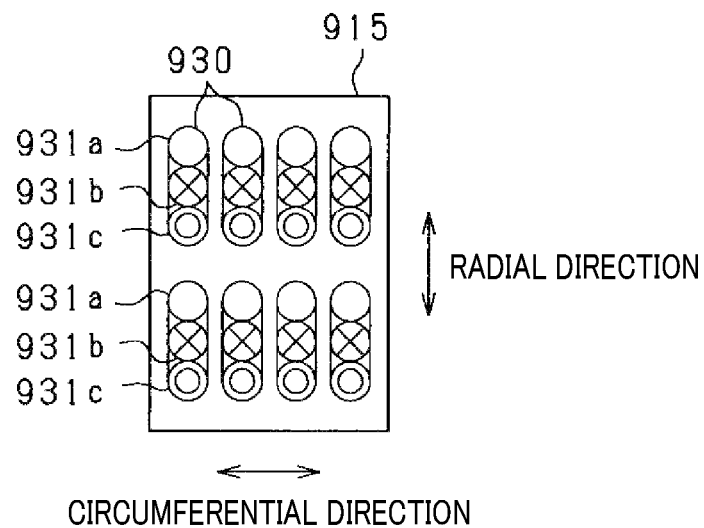
Figure 135:
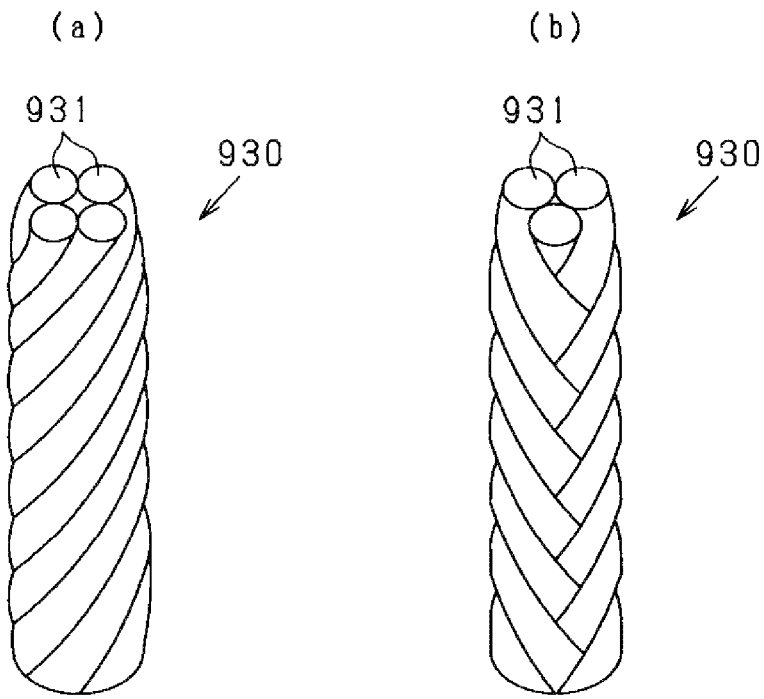

FIG. 131 illustrates, by (a) and (b), diagrams of a configuration of the coil module;

FIG. 132 is a perspective view of a state in which a plurality of coil modules are arrayed in a circumferential direction;

FIG. 133 is a diagram of a lateral cross-section in a state in which the plurality of coil modules are arrayed in the circumferential direction;

FIG. 134 is a cross-sectional view of a cross-sectional structure of the partial windings; and FIG. 135 illustrates, by (a) and (b), perspective views of a configuration of a conductor.

DESCRIPTION OF THE EMBODIMENTS

A rotating electric machine that includes a field element that includes a magnet portion that has a plurality of magnetic poles of which polarities alternate in a circumferential direction, and an armature that has an armature winding of multiple phases is known. The armature winding has a phase winding for each phase. The phase winding of each phase is configured such that conductor portions are arranged at predetermined intervals in the circumferential direction and the conductor portions of the same phase are connected to each other at coil ends on both ends in an axial direction.

In addition, as the armature winding, a technology in which a partial winding that is a portion of the armature winding is configured as a resin-molded coil is known (for example, refer to JP-A-2016-220393).

Here, in the rotating electric machine, a configuration in which, as an armature core to which the armature winding is assembled, an armature core that has a plurality of teeth in the circumferential direction is used, and the armature winding is housed inside slots that are formed between the teeth that are adjacent to each other in the circumferential direction is generally known.

In this configuration, as a result of the armature winding being wound around the teeth and the like, the armature winding is held without becoming detached. However, for example, in an armature that has a so-called slot-less structure that has no teeth, or in other words, in an armature that has a structure in which winding of the armature winding around the teeth is not performed, it is thought that there is room for technical improvement regarding assembly of the armature winding to the armature core.

It is thus desired to provide an armature and a rotating electric machine in which an armature winding can be appropriately assembled.

A plurality of embodiments disclosed in the present specification employ technical measures that differ from one another to achieve respective objects. Objects, features, and effects disclosed in this specification will be further clarified with reference to detailed descriptions that follow and accompanying drawings.

A first exemplary embodiment provides an armature that includes: an armature winding of multiple phases that has phase windings, for each phase, that includes a plurality of partial windings; and a base member that includes a circular cylindrical back yoke.

The partial winding includes: a pair of intermediate conductor portions that are provided so as to be separated at a predetermined interval in a circumferential direction; crossover portions that are provided on a first end side and a second end side in an axial direction and connect the pair of intermediate conductor portions in an annular shape; a conductor that is wound in multiple layers in the pair of intermediate conductor portions and the crossover portions; and an interference prevention portion that extends in a radial direction and prevents interference between the partial windings that are adjacent to each other in the circumferential direction, in at least either of the crossover portions on both sides in the axial direction.

The intermediate conductor portions of the phases are arrayed in a predetermined order in the circumferential direction, by one intermediate conductor portion of the pair of intermediate conductor portions of the partial winding of a first phase being arranged between the pair of intermediate conductor portions of the partial winding of a second phase. The partial windings are assembled to the back yoke in a state in which an insulation layer is interposed between the intermediate conductor portion and the back yoke.

As a result of the above-described configuration, in the plurality of partial windings of the phase winding of each phase, the pair of intermediate conductor portions are provided so as to be separated at a predetermined interval (by a predetermined coil pitch) in the circumferential direction. The pair of intermediate conductor portions are connected in an annular shape by the crossover portions on both sides in the axial direction. In the partial winding, the conductor is wound in multiple layers in the pair of intermediate conductor portions and the crossover portions. In this case, as a result of the interference prevention portion that extends in the radial direction being provided in at least either of the crossover portions on both sides in the axial direction in the partial winding, the intermediate conductor portions of each phase can be arranged so as to be arrayed in a predetermined order in the circumferential direction, while interference between partial windings in the coil ends of the armature winding is prevented.

In addition, as a result of the partial windings being assembled to the back yoke in a state in which the insulation layer is interposed between the intermediate conductor portion and the back yoke, assembly of the armature winding can be suitably performed upon ensuring insulation of the armature winding against the back yoke. In this case, even in the case of an armature that is configured to not include teeth that extend in the radial direction from the back yoke, that is, an armature that has a slot-less structure, assembly of the armature winding can be suitably performed.

According to a second exemplary embodiment, in the first exemplary embodiment, the armature winding includes a plurality of coil modules that include the partial windings and a back-yoke-side insulation wall that is provided on the back yoke side of the intermediate conductor portion in the partial winding. The plurality of coil modules are arranged in an array in the circumferential direction on an inner side in the radial direction or an outer side in the radial direction of the back yoke. The back-yoke-side insulation wall is provided as the insulation layer.

As a result of the above-described configuration, the coil module is provided for each partial winding. The back-yoke-side insulation wall is provided on the back yoke side of the intermediate conductor portion in the coil module. In addition, in a state in which the plurality of coil modules are arranged in an array in the circumferential direction on the inner side in the radial direction or the outer side in the radial direction of the back yoke, the back-yoke-side insulation wall functions as an insulation layer between the intermediate conductor portion and the back yoke. In this case, as a result of the coil modules being assembled to the back yoke, the insulation layer can be provided as desired in a position that is between the intermediate conductor portion and the back yoke side.

According to a third exemplary embodiment, in the second exemplary embodiment, in the coil module, the back-yoke-side insulation wall includes extending portions that extend further in the circumferential direction than the intermediate conductor portion on both sides in the circumferential direction of the intermediate conductor portion. In a state in which the plurality of coil modules are arranged in an array in the circumferential direction, the extending portions of differing coil modules are provided so as to oppose each other in the circumferential direction, between the intermediate conductor portions that are adjacent to each other in the circumferential direction.

In the above-described configuration, the back-yoke-side insulation wall includes the extending portions that extend further in the circumferential direction than the intermediate conductor portion on both sides in the circumferential direction of the intermediate conductor portion. The plurality of coil modules are arranged in an array in the circumferential direction in a state in which the extending portions of differing coil modules are opposing each other between the intermediate conductor portions that are adjacent to each other in the circumferential direction.

In this case, the intermediate conductor portions that are adjacent to each other in the circumferential direction are separated from each other by the extending portion of the back-yoke-side insulation wall in each coil module. As a result, mutual insulation is ensured. Consequently, in addition to insulation from the back yoke in the radial direction in the intermediate conductor portion, interphase insulation in the circumferential direction can also be suitably obtained.

According to a fourth exemplary embodiment, in the third exemplary embodiment, a circumferential-direction insulation wall that extends in the radial direction towards a portion between the intermediate conductor portions that are arrayed in the circumferential direction from the back-yoke-side insulation wall is provided on a side of at least either of the extending portions on both sides in the circumferential direction of the intermediate conductor portions in the back-yoke-side insulation wall.

In the above-described configuration, the circumferential-direction insulation wall that extends in the radial direction from the extending portions on both sides in the circumferential direction, or from the extending portion on one side in the circumferential direction, of the intermediate conductor portion in the back-yoke-side insulation wall is provided. As a result of the circumferential-direction insulation wall, the intermediate conductor portions that are arrayed in the circumferential direction are insulated from each other. As a result, interphase insulation between partial windings of differing phases can be suitably actualized.

According to a fifth exemplary embodiment, in the fourth exemplary embodiment, the circumferential-direction insulation walls of differing coil modules are provided so as to oppose each other in the circumferential direction, between the intermediate conductor portions that are arrayed in the circumferential direction.

In the above-described configuration, in a state in which the plurality of coil modules are arranged in an array in the circumferential direction, while one insulation wall (one back-yoke-side insulation wall) is provided between the back yoke and the intermediate conductor portion that are arrayed in the radial direction, two insulation walls (two circumferential-direction insulation walls) are provided between the intermediate conductor portions that are arrayed in the circumferential direction.

In this case, appropriate interphase insulation can be performed while taking into consideration a greater phase difference than that between the back yoke and the intermediate conductor portion occurring between the intermediate conductor portions of differing phases that are arrayed in the circumferential direction.

Here, the configuration may be such that, on one side in the circumferential direction of the intermediate conductor portions that are arrayed in the circumferential direction, the circumferential-direction insulation walls of differing coil modules are provided so as to oppose each other in the circumferential direction, and on the other side in the circumferential direction of the intermediate conductor portions that are arrayed in the circumferential direction, the circumferential-direction insulation walls are not provided and separation by the extending portion of the back-yoke-side insulation wall is performed.

According to a sixth exemplary embodiment, in the fourth or fifth exemplary embodiment, the circumferential-direction insulation wall has a thickness dimension in the circumferential direction that differs between positions on the inner side in the radial direction and the outer side in the radial direction, and the thickness dimension on the outer side in the radial direction is larger.

In this case, as a result of the thickness dimension in the circumferential direction of the circumferential-direction insulation wall being larger on the outer side in the radial direction than on the inner side in the radial direction, the intermediate conductor portions that are arrayed in the circumferential direction can be appropriately arranged while taking into consideration a circumferential length differing between the inner side in the radial direction and the outer side in the radial direction.

According to a seventh exemplary embodiment, in any one of the fourth to sixth exemplary embodiments, the coil module includes a counter-back-yoke-side insulation wall on a side opposite the back-yoke-side insulation wall with the intermediate conductor portion therebetween in the radial direction.

In this case, the intermediate conductor portion of the partial winding is configured so as not to be exposed on the field element side (air gap side) on the side opposite the back yoke. As a result, insulation of the phase winding can be ensured even should jamming of foreign matter in the air gap or scattering of foreign matter from the field armature side occur.

According an eighth exemplary embodiment, in any one of the second to seventh exemplary embodiments, the coil module includes an insulating winding holder that has at least the back-yoke-side insulation wall, and the partial winding is integrated with the winding holder.

In this case, as a result of the partial winding being integrated with the winding holder, the coil module that has the back-yoke-side inner wall can be easily fabricated.

According to a ninth exemplary embodiment, in any one of the second to eighth exemplary embodiments, the plurality of coil modules are integrally molded with the back yoke by an insulating material.

In the above-described configuration, the plurality of coil modules are assembled to the base member in a state in which the plurality of coil modules are integrally molded with the back yoke by an insulating material. In this case, the plurality of coil modules can be suitably assembled to the base material. In addition, the coil module can be arranged in a state in which the partial winding is interposed between the back-yoke-side insulation wall and the covering layer that is made of the insulating material on the outer side in the radial direction or the inner side in the radial direction of the back yoke. Insulation in the radial direction in the partial winding can be suitably actualized.

According to a tenth exemplary embodiment, in any one of the second to seventh exemplary embodiments, the coil module includes a covering portion that covers a periphery of the partial winding by an insulating material, and the insulation layer on the back yoke side in the covering portion serves as the back-yoke-side insulation wall.

In this case, as a result of the periphery of the partial winding being covered by the covering portion that is made of an insulating material, the coil module that has the back-yoke-side insulation wall can be easily fabricated.

According to an eleventh exemplary embodiment, in any one of the second to eighth and tenth exemplary embodiments, a restraining member that restrains the plurality of coil modules in a state in which the plurality of coil modules are urged towards the base member in the radial direction is provided.

In the above-described configuration, the plurality of coil modules are assembled to the base member so as to be pressed in the radial direction by the restraining member. In this case, the state in which the plurality of coil modules are assembled to the base member can be suitably maintained.

According to a twelfth exemplary embodiment, in the eleventh exemplary embodiment, the armature is provided so as to oppose a magnet portion that configures a field element in the radial direction. The restraining member is provided, in the axial direction of the coil module, in a position that does not oppose the magnet portion in the radial direction.

As a result of the above-described configuration, the restraining member is provided in a position that does not oppose the magnet portion in the radial direction in the axial direction of the coil module. Consequently, restraining of the coil modules by the restraining member can be suitably performed without interference in the air gap between the field element and the armature.

According to a thirteenth exemplary embodiment, in any one of the first to twelfth exemplary embodiments, the armature winding has phase windings of three phases that are connected to one another. In the phase winding, the pair of intermediate conductor portions are provided so as to be separated by two coil pitches, and one intermediate portion each of the partial windings of the two other phases are arranged between the pair of intermediate conductors.

As a result of the above-described configuration, a three-phase armature winding can be suitably configured using the plurality of partial windings that are formed into an annular shape.

According to a fourteenth exemplary embodiment, in any one of the first to thirteenth exemplary embodiments, the partial winding includes a radial-direction curved portion that extends in the radial direction in at least either of the crossover portions on both sides in the axial direction, as the interference prevention portion.

In the above-described configuration, the partial winding includes the radial-direction curved portion in at least either of the crossover portions on both sides in the axial direction. Interference between the partial windings that are adjacent to each other in the circumferential direction is prevented by the radial-direction curved portion. In this case, a suitable configuration for arranging the partial windings that have an annular shape while intersecting the partial windings with each other in the circumferential direction can be actualized.

According to a fifteenth exemplary embodiment, in the fourteenth exemplary embodiment, the partial winding includes: a first partial winding in which an outward curved portion that is curved towards the outer side in the radial direction is provided in the crossover portion in a first coil end on one side of coil ends on both sides in the axial direction, as the radial-direction curved portion; and a second partial winding in which an inward curved portion that is curved towards the inner side in the radial direction is provided in the crossover portion in a second coil end on the other side, as the radial-direction curved portion.

The first partial winding and the second partial winding are assembled to the back yoke such that the crossover portion of the second partial winding is positioned on the outer side in the axial direction of the crossover portion in the first partial winding on the first coil end side, and the crossover portion of the first partial winding is positioned on the outer side in the axial direction of the crossover portion in the second partial winding on the second coil end side.

As a result of the above-described configuration, the outer curved portion that is curved towards the outer side in the radial direction is provided in the crossover portion on the first coil end side of the first partial winding. In addition, the inner curved portion that is curved towards the inner side in the radial direction is provided in the crossover portion on the second coil end side of the second partial winding.

Furthermore, the first partial winding and the second partial winding are assembled to the back yoke such that, on the first coil end side, the crossover portion of the second partial winding is positioned on the outer side in the axial direction of the crossover portion of the first partial winding, and on the second coil end side, the crossover portion of the first partial winding is positioned on the outer side in the axial direction of the crossover portion of the second partial winding. As a result, the first partial winding and the second partial winding are suitably assembled to the base member while interference therebetween is prevented.

In addition, as a result of the above-described configuration, the first partial winding and the second partial winding are arranged so as to be offset from each other in the axial direction, while a winding length in the axial direction is the same. As a result, resistance in each partial winding can be the same. Furthermore, issues such as occurrence of current imbalance during energization, and occurrence of temperature difference accompanying energization can be suppressed.

According to a sixteenth exemplary embodiment, in the fifteenth exemplary embodiment, in the first partial winding, the first partial winding is provided with the outward curved portion on the first coil end side and is not curved in the radial direction on the second coil end side. The second partial winding is provided with the inward curved portion on the second coil end side and is not curved in the radial direction on the first coil end side.

In this case, on the first coil end side, the crossover portion of the second partial winding can connect the pair of intermediate conductor portions with a minimum length, while intersecting with the crossover portion of the first partial winding on the outer side in the axial direction of the crossover portion of the first partial winding.

In addition, on the second coil end side, the crossover portion of the second partial winding can connect the pair of intermediate conductor portions with a minimum length, while intersecting with the crossover portion of the second partial winding on the outer side in the axial direction of the crossover portion of the second partial winding. Therefore, the armature winding can be configured without a coil-end length becoming unnecessarily long.

According to a seventeenth exemplary embodiment, in any one of the fourteenth to sixteenth exemplary embodiments, the armature is provided with a circular cylindrical member that is fixed from one side in the axial direction of the base member, on a side opposite the partial winding, of the inner side in the radial direction and the outer side in the radial direction of the back yoke. The cylindrical member is provided with a stepped contact portion that protrudes towards the side of the base member and comes into contact with an axial-direction end surface of the base member, on a circumferential surface on a side on which the base member is provided. The radial-direction curved portion is curved towards a side opposite the cylindrical member, of the inner and outer sides in the radial direction, on a side on which the contact portion of the cylindrical member is provided in the axial direction.

In the above-described configuration, in the state in which the base member of the armature is assembled to the cylindrical member from one side in the axial direction thereof, the axial-direction end surface of the base member is in contact with the stepped contact portion of the cylindrical member. Therefore, the base member can be suitably fixed to the cylindrical portion in a state in which positioning in the axial direction in relation to the cylindrical member is performed.

In this case, on the side in which the contact portion of the cylindrical member is provided in the axial direction, the radial-direction curved portion of the partial winding is curved towards the side opposite the cylindrical member, of the inner and outer sides in the radial direction. Therefore, an issue in which the radial-direction curved portion comes into contact with the cylindrical portion, and the contact between the axial-direction end portion of the base member and the cylindrical member is hindered, can be prevented.

According to an eighteenth exemplary embodiment, in any one of the first to seventeenth exemplary embodiments, in the partial winding, the conductors that are close to each other in the conductor that is wound in multiple layers are joined together by a joining material.

In the above-described configuration, as a result of the conductors that are close to each other in the conductor that is wound in multiple layers in the partial winding being joined together by a joining material, the conductors in the partial winding can be kept in a desired state of proximity to each other. That is, the state of multiple-layer winding in the partial winding can be kept in a desired state.

Specifically, the conductors in the partial winding may be joined together by a resin material or varnish that serves as the joining material. Alternatively, the configuration may be such that an insulation film of the conductor self-melts, and the conductors are joined together using the melted portion as the joining material.

A rotating electric machine according to a nineteenth exemplary embodiment includes: the armature according to any one of the first to eighteenth exemplary embodiments; and a field element that has a plurality of magnetic poles of which polarities alternate in the circumferential direction. Either of the field element and the armature rotates together with a rotation shaft.

As a result of the above-described configuration, safety in the rotating electric machine can be sufficiently ensured through use of an armature is excellent regarding fixing of the armature winding, insulation, and mountability. In addition, the rotating electric machine that includes an armature that has a slot-less structure can be suitably actualized.

A plurality of embodiments will be described with reference to the drawings. According to the plurality of embodiments, sections that are functionally and/or structurally corresponding and/or related may be given the same reference numbers or reference numbers of which digits in the hundreds place and higher differ. Descriptions according to other embodiments can be referenced regarding the corresponding sections and/or related sections.

For example, a rotating electric machine according to a present embodiment is used as a vehicle power source. However, the rotating electric machine can be widely used for industrial use, in vehicles, household appliances, office automation (OA) equipment, and game machines, and the like. Here, sections according to the embodiments below that are identical or equivalent to each other are given the same reference numbers in the drawings. Descriptions of sections that have the same reference numbers are applicable therebetween.

First Embodiment

A rotating electric machine 10 according to a present embodiment is a synchronous-type multiphase alternating-current motor and has an outer-rotor structure (outer-revolution structure). An overview of the rotating electric machine 10 is shown in FIGS. 1 to 5.

Figure 1:
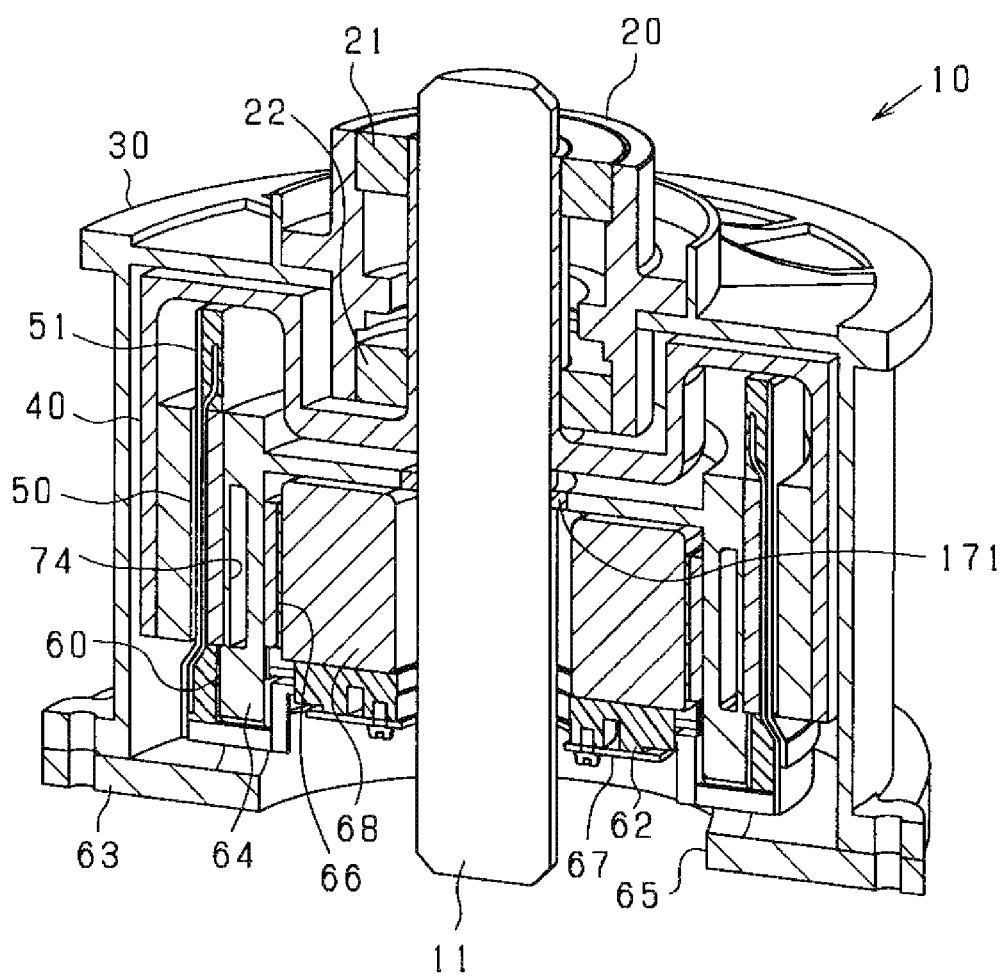
FIG. 1 is a longitudinal cross-sectional perspective view of a rotating electric machine.
Figure 2:
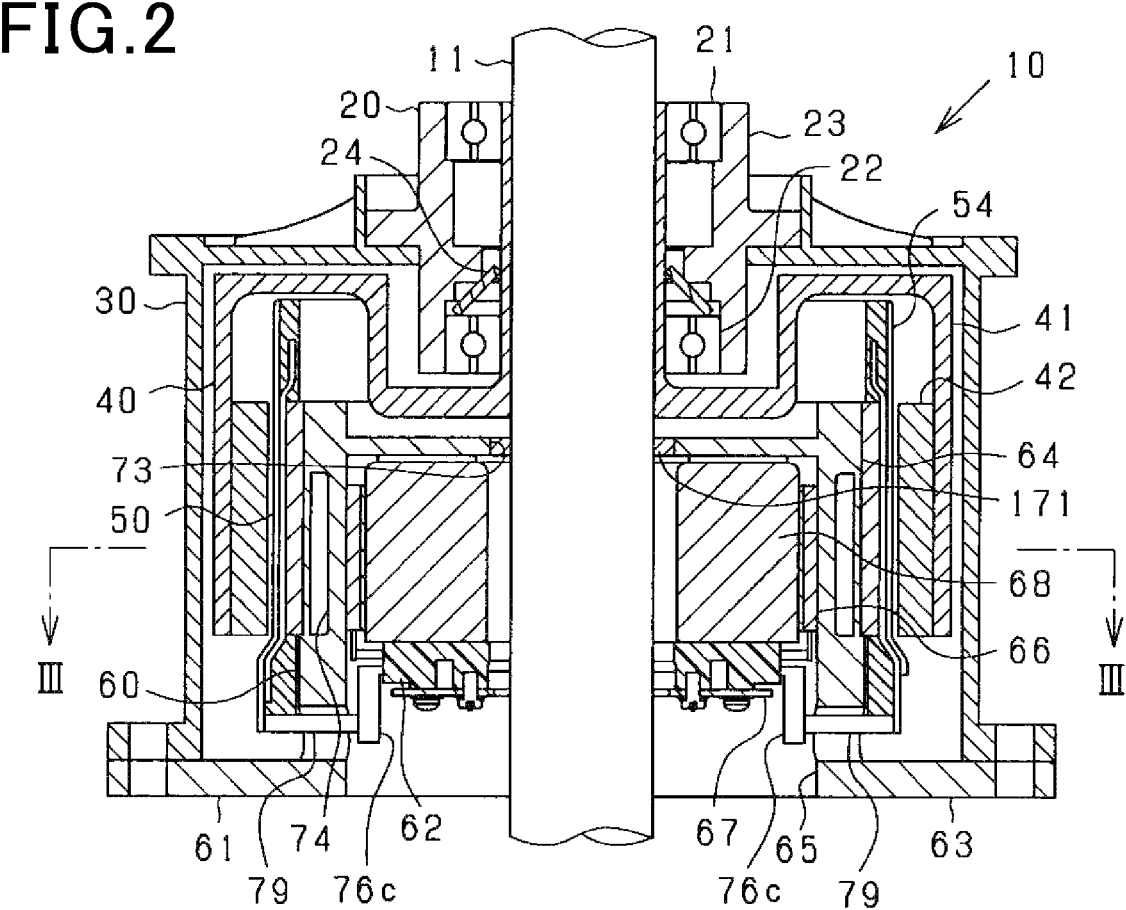
FIG. 2 is a longitudinal cross-sectional view of the rotating electric machine.
Figure 3:
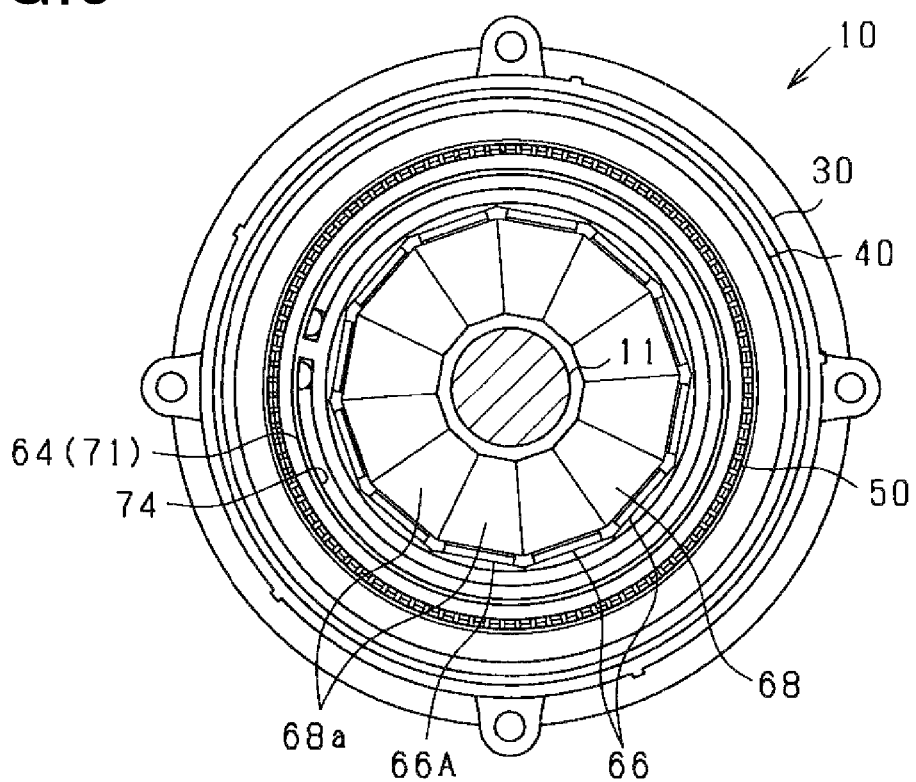
FIG. 3 is a cross-sectional view taken along line III-III in FIG. 2.
Figure 4:
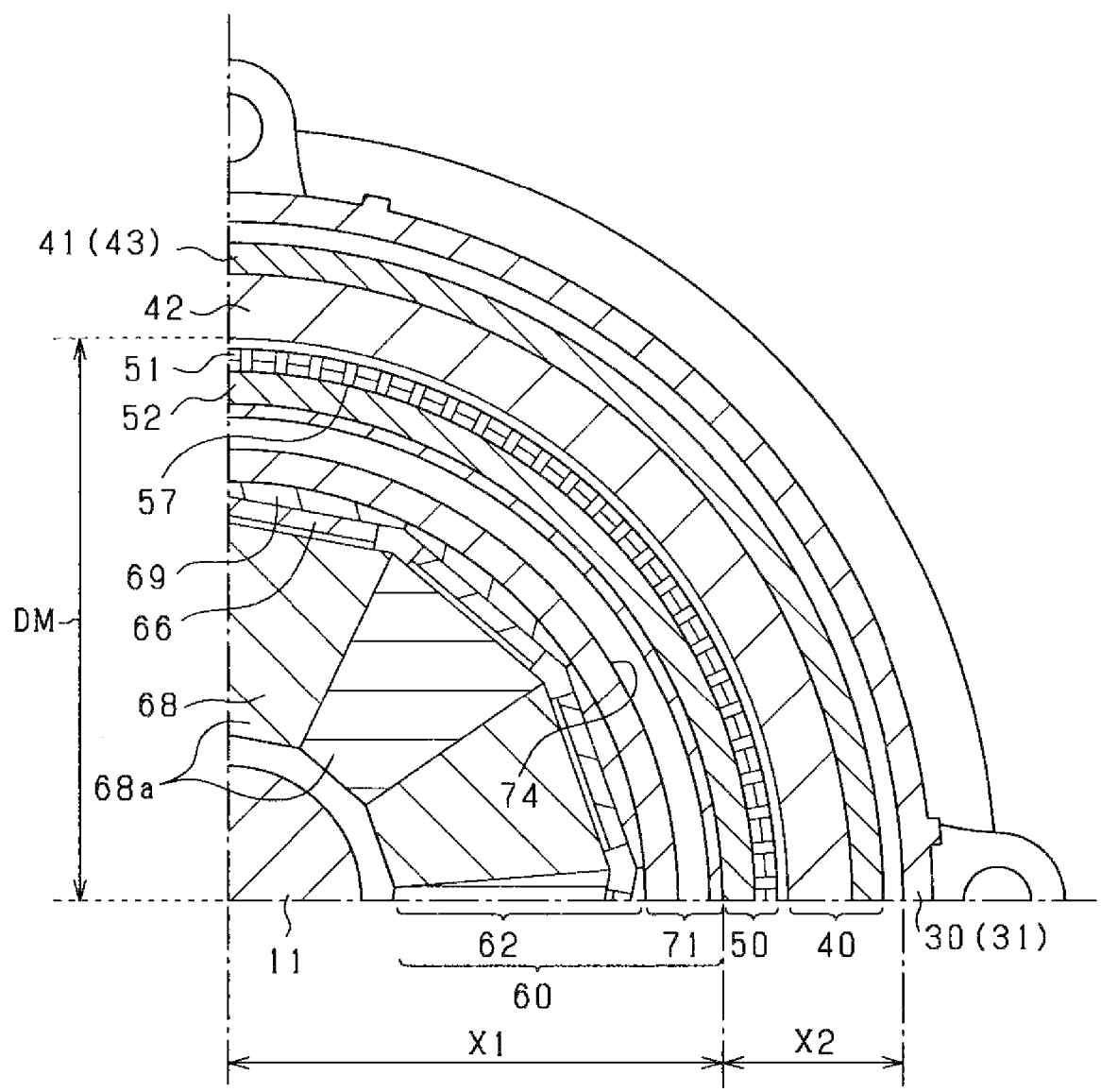
FIG. 4 is a cross-sectional view showing a portion of FIG. 3 in an enlarged manner.
Figure 5:
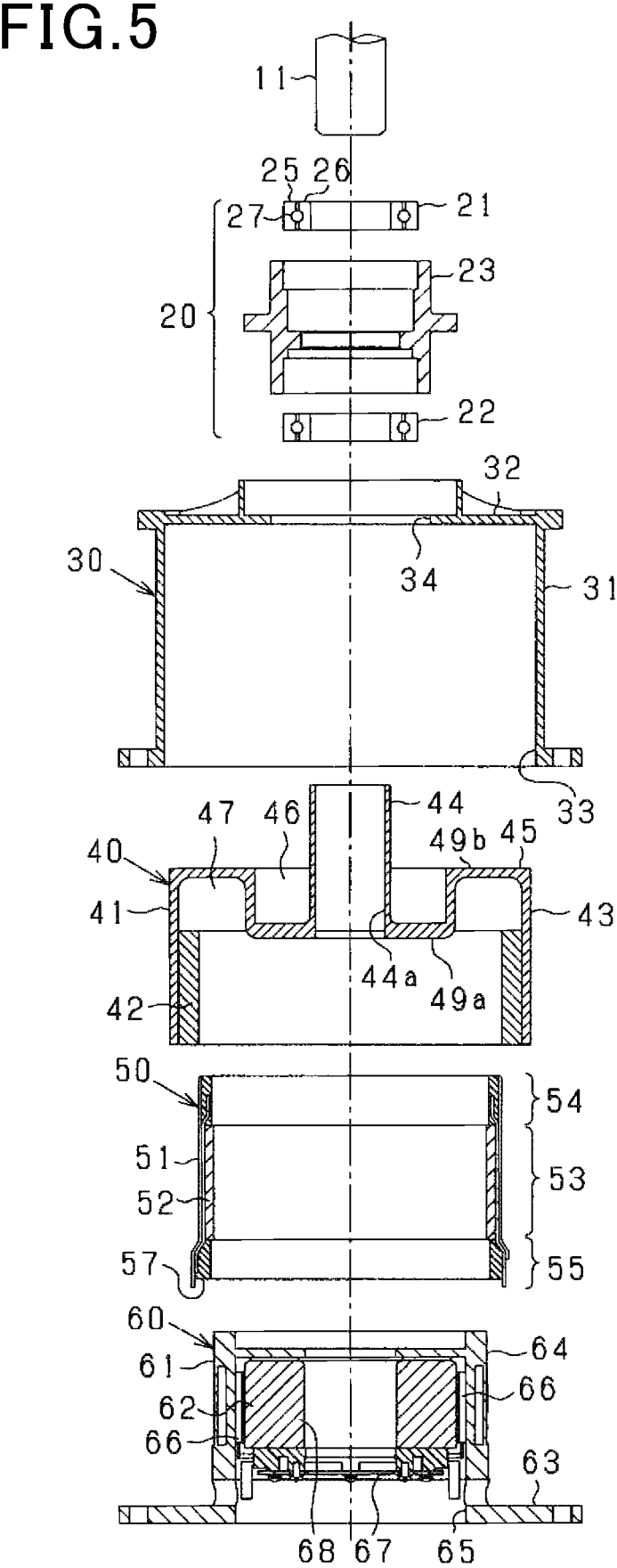
FIG. 5 is an exploded view of the rotating electric machine.

FIG. 1 is a longitudinal cross-sectional perspective view of the rotating electric machine 10. FIG. 2 is a longitudinal cross-sectional view of the rotating electric machine 10 in a direction along a rotation shaft 11. FIG. 3 is a lateral cross-sectional view (cross-sectional view taken along line III-III in FIG. 2) of the rotating electric machine 10 in a direction orthogonal to the rotation shaft 11. FIG. 4 is a cross-sectional view showing a portion of FIG. 3 in an enlarged manner. FIG. 5 is an exploded view of the rotating electric machine 10.

Here, in FIG. 3, for the purpose of illustration, the rotation shaft 11 is omitted and hatching that indicates a cross-sectional plane is omitted. In the description below, a direction in which the rotation shaft 11 extends is an axial direction. A direction that radially extends from a center of the rotation shaft 11 is a radial direction. A direction that circumferentially extends with the rotation shaft 11 as a center is a circumferential direction.

The rotating electric machine 10 generally includes a bearing unit 20, a housing 30, a rotor 40, a stator 50, and an inverter unit 60. The rotating electric machine 10 is configured by all of these members being arranged coaxially with the rotation shaft 11 and assembled in the axial direction in a predetermined order. The rotating electric machine 10 according to the present embodiment is configured to include the rotor 40 that serves as a "field element" and the stator 50 that serves as an "armature". The rotating electric machine 10 is implemented as a revolving-field-type rotating electric machine.

The bearing unit 20 includes two bearings 21 and 22, and a holding member 23. The two bearings 21 and 22 are arranged so as to be separated from each other in the axial direction. The holding member 23 holds the bearings 21 and 22. For example, the bearings 21 and 22 are radial ball bearings. Each of the bearings 21 and 22 includes an outer ring 25, an inner ring 26, and a plurality of balls 27 that are arranged between the outer ring 25 and the inner ring 26. The holding member 23 has a circular cylindrical shape. The bearings 21 and 22 are assembled on a radially inner side of the holding member 23. In addition, the rotation shaft 11 and the rotor 40 are supported so as to freely rotate on a radially inner side of the bearings 21 and 22. The bearings 21 and 22 configure a set of bearings that rotatably support the rotation shaft 11.

In each of the bearings 21 and 22, the balls 27 are held by a retainer (not shown). In this state, a pitch between the balls is maintained. The bearings 21 and 22 have a sealing member in upper and lower portions in the axial direction of the retainer, and an interior thereof is filled with a non-conductive grease (such as a non-conductive urea-based grease). In addition, a position of the inner ring 26 is mechanically held by a spacer. A constant-pressure preload that projects in a vertical direction from an inner side is applied.

The housing 30 includes a peripheral wall 31 that forms a circular cylindrical shape. The peripheral wall 31 has a first end and a second end that are opposing in the axial direction thereof. The peripheral wall 31 has an end surface 32 in the first end and an opening 33 in the second end. The opening 33 is open over the overall second end. A circular hole 34 is formed in a center of the end surface 32. The bearing unit 20 is fixed by a fixing means, such as a screw or a rivet, in a state in which the bearing unit 20 is inserted into the hole 34. In addition, the rotor 40 that has a hollow circular cylindrical shape and the stator 50 that has a hollow circular cylindrical shape are housed inside the housing 30, that is, in an interior space that is demarcated by the peripheral wall 31 and the end surface 32.

According to the present embodiment, the rotating electric machine 10 is an outer-rotor type. Inside the housing 30, the stator 50 is arranged on a radially inner side of the rotor 40 that has the cylindrical shape. The rotor 40 is supported in a cantilevered manner by the rotation shaft 11 on the end surface 32 side in the axial direction.

The rotor 40 includes a magnet holder 41 that is formed into a hollow cylindrical shape and an annular magnet unit 42 that is provided on a radially inner side of the magnet holder 41. The magnet holder 41 has an approximately cup-like shape and functions as a magnet holding member. The magnet holder 41 includes a circular cylindrical portion 43, a fixing portion (attachment) 44, and an intermediate portion 45. The circular cylindrical portion 43 has a circular cylindrical shape.

The fixing portion 14 also has a circular cylindrical shape and has a smaller diameter than the circular cylindrical portion 43. The intermediate portion 45 is a portion that connects the circular cylindrical portion 43 and the fixing portion 44. The magnet unit 42 is attached to an inner circumferential surface of the circular cylindrical portion 43.

Here, the magnet holder 41 is made of a cold-rolled steel sheet (steel plate cold commercial [SPCC]), a forging steel, a carbon fiber-reinforced plastic (CFRP), or the like that has sufficient mechanical strength.

The rotation shaft 11 is inserted into a through hole 44a in the fixing portion 44. The fixing portion 44 is fixed to the rotation shaft 11 that is arranged inside the through hole 44a. That is, the magnet holder 41 is fixed to the rotation shaft 11 by the fixing portion 44. Here, the fixing portion 44 may be fixed to the rotation shaft 11 by spline coupling or key coupling that uses recesses and protrusions, welding, crimping, or the like. As a result, the rotor 40 rotates integrally with the rotation shaft 11.

In addition, the bearings 21 and 22 of the bearing unit 20 are assembled on a radially outer side of the fixing portion 44. As described above, the bearing unit 20 is fixed to the end surface 32 of the housing 30. Therefore, the rotation shaft 11 and the rotor 40 are rotatably supported by the housing 30. As a result, the rotor 40 can freely rotate inside the housing 30.

The fixing portion 44 is provided in the rotor 40 in only one of two end portions that are opposing in the axial direction of the rotor 40. As a result, the rotor 40 is supported by the rotation shaft 11 in a cantilevered manner. Here, the fixing portion 44 of the rotor 40 is rotatably supported at two positions that differ in the axial direction, by the bearings 21 and 22 of the bearing unit 20.

That is, the rotor 40 is rotatably supported by the two bearings 21 and 22 that are separated in the axial direction of the rotor 40, in one of two end portions of the magnet holder 41 that are opposing in the axial direction of the magnet holder 41. Therefore, even in a structure in which the rotor 40 is supported by the rotation shaft 11 in a cantilevered manner, stable rotation of the rotor 40 is implemented. In this case, the rotor 40 is supported by the bearings 21 and 22 at positions that are shifted to one side in relation to a center position in the axial direction of the rotor 40.

In addition, a dimension of a gap between the outer ring 25 and the inner ring 26, and the balls 27 differ between the bearing 22 of the bearing unit 20 that is closer to a center of the rotor 40 (lower side in the drawing) and the bearing 21 on a side opposite thereof (upper side in the drawing). For example, the gap dimension is greater in the bearing 22 that is closer to the center of the rotor 40 than in the bearing 21 on the side opposite thereof. In this case, even when shaking of the rotor 40 or vibration caused by imbalance attributed to component tolerance act on the bearing unit 20 on the side that is closer to the center of the rotor 40, effects of the shaking and the vibration are favorably absorbed. Specifically, a play dimension (gap dimension) is increased by a preload in the bearing 22 that is closer to the center of the rotor 40 (lower side in the drawing).

As a result, the vibration that occurs in the cantilevered-support structure is absorbed by the play portion. The preload may be either of a fixed-position preload and a constant-pressure preload. In the case of the fixed-position preload, the outer rings 25 of the bearing 21 and the bearing 22 are both joined to the holding member 23 using a method such as press-fitting or bonding.

In addition, the inner rings 26 of the bearing 21 and the bearing 22 are both joined to the rotation shaft 11 using a method such as press-fitting or bonding. Here, the preload can be generated by the outer ring 25 of the bearing 21 being arranged in a position that differs in the axial direction from that of the inner ring 26 of the bearing 21. The preload can also be generated by the outer ring 25 of the bearing 22 being arranged in a position that differs in the axial direction from that of the inner ring 26 of the bearing 22.

Furthermore, in a case in which the constant-pressure preload is used, a preload spring, such as wave washer 24, is arranged in an area that is sandwiched between the bearing 22 and the bearing 21 so that the preload is generated in the axial direction from the same area that is sandwiched between the bearing 22 and the bearing 21, toward the outer ring 25 of the bearing 22. In this case as well, the inner rings 26 of the bearing 21 and the bearing 22 are both joined to the rotation shaft 11 using a method such as press-fitting or bonding. The outer ring 25 of the bearing 21 or the bearing 22 is arranged with a predetermined clearance between the outer ring 25 and the holding member 23.

As a result of a configuration such as this, a spring force of the preload spring acts on the outer ring 25 of the bearing 22 in a direction away from the bearing 21. In addition, as a result of this force being transmitted to the rotation shaft 11, a force that presses the inner ring 26 of the bearing 21 in the direction of the bearing 22 is applied. As a result, in both the bearings 21 and 22, the positions of the outer ring 25 and the inner ring 26 in the axial direction are shifted. The preload can be applied to the two bearings in a manner similar to the above-described fixed-position preload.

Here, when the constant-pressure preload is generated, the spring force is not necessarily required to be applied to the outer ring 25 of the bearing 22 as shown in FIG. 2. For example, the spring force may be applied to the outer ring 25 of the bearing 21. In addition, the inner ring 26 of either of the bearings 21 and 22 may be arranged with a predetermined clearance between the inner ring 26 and the rotation shaft 11. The outer rings 25 of the bearings 21 and 22 may be joined to the holding member 23 using a method such as press-fitting or bonding, and the preload may thereby be applied to the two bearings.

Furthermore, when force is applied such that the inner ring 26 of the bearing 21 separates from the bearing 22, force is preferably applied such that the inner ring 26 of the bearing 22 separates from the bearing 21 as well. Conversely, when force is applied such that the inner ring 26 of the bearing 21 approaches the bearing 22, force is preferably applied such that the inner ring 26 of the bearing 22 approaches the bearing 21 as well.

Here, when the present rotating electric machine 10 is applied to a vehicle for the purpose of a vehicle power source or the like, vibrations that have components in a direction in which the preload acts may be applied to a mechanism that generates the preload, or a direction of gravitational force that is applied to a target to which the preload is applied may change. Therefore, when the present rotating electric machine 10 is applied to a vehicle, the fixed-position preload is preferably used.

In addition, the intermediate portion 45 includes an annular inner shoulder portion 49a and an annular outer shoulder portion 49b. The outer shoulder portion 49b is positioned on an outer side of the inner shoulder portion 49a in the radial direction of the intermediate portion 45. The inner shoulder portion 49a and the outer shoulder portion 49b are separated from each other in the axial direction of the intermediate portion 45.

As a result, the circular cylindrical portion 43 and the fixing portion 44 partially overlap in the radial direction of the intermediate portion 45. That is, the circular cylindrical portion 43 protrudes further toward the outer side in the axial direction than a base end portion (a rear-side end portion on the lower side of the drawing) of the fixing portion 44. In the present configuration, the rotor 40 can be supported to the rotation shaft 11 in a position that is closer to the center of gravity of the rotor 40, compared to a case in which the intermediate portion 45 is provided in a planar shape without a step. Stable operation of the rotor 40 can be implemented.

In the above-described configuration of the intermediate portion 45, a bearing-housing recess portion 46 that houses a portion of the bearing unit 20 is formed in the rotor 40 in an annular shape, in a position surrounding the fixing portion 44 in the radial direction and toward an inner side of the intermediate portion 45. In addition, a coil-housing recess portion 47 that houses a coil end 54 of a stator winding 51 of the stator 50, described hereafter, is formed in the rotor 40 in a position surrounding the bearing-housing recess portion 46 in the radial direction and toward an outer side of the intermediate portion 45.

Furthermore, the housing recess portions 46 and 47 are arranged so as to be adjacent to each other on the inner side and the radially outer side. That is, a portion of the bearing unit 20 and the coil end 54 of the stator winding 51 are arranged so as to overlap on the inner side and the radially outer side. As a result, a length dimension in the axial direction of the rotating electric machine 10 can be shortened.

The intermediate portion 45 is provided so as to protrude toward the radially outer side from the rotation shaft 11 side. In addition, a contact preventing portion that extends in the axial direction and prevents contact with the coil end 54 of the stator winding 51 of the stator 50 is provided in the intermediate portion 45. The intermediate portion 45 corresponds to a protruding portion.

An axial-direction dimension of the coil end 54 can be decreased and an axial length of the stator 50 can be shortened by the coil end 54 being bent toward the inner side or the radially outer side. The bending direction of the coil end 54 may be that which takes into consideration assembly with the rotor 40.

When assembly of the stator 50 on the radially inner side of the rotor 40 is assumed, the coil end 54 may be bent toward the radially inner side on an insertion-end side in relation to the rotor 40. The bending direction of a coil end on a side opposite the coil end 54 may be arbitrary. However, in terms of manufacturing, a shape in which the coil end is bent toward the outer side that has spatial leeway is preferable.

In addition, the magnet unit 42 that serves as a magnet portion is configured by a plurality of permanent magnets that are arranged on the radially inner side of the circular cylindrical portion 43 such that polarities alternately change along the circumferential direction. As a result, the magnet unit 42 has a plurality of magnetic poles in the circumferential direction. However, details of the magnet unit 42 will be described hereafter.

The stator 50 is provided on the radially inner side of the rotor 40. The stator 50 includes the stator winding 51 and a stator core 52. The stator winding 51 is formed so as to be wound into an approximately cylindrical shape (annular shape). The stator core 52 is arranged on the radially inner side of the stator winding 51 and serves as a base member. The stator winding 51 is arranged so as to oppose the circular annular magnet unit 42 with a predetermined airgap therebetween. The stator winding 51 is made of a plurality of phase windings. Each of the phase windings is configured by a plurality of conductors that are arrayed in the circumferential direction being connected to one other at a predetermined pitch.

According to the present embodiment, a three-phase winding of a U-phase, a V-phase, and a W-phase and a three-phase winding of an X-phase, a Y-phase, and a Z-phase are used. Through use of two of these three-phase windings, the stator winding 51 is configured as a phase winding of six phases.

The stator core 52 has laminated steel sheets in which electromagnetic steel sheets are formed into a laminated circular annular shape. The electromagnetic steel sheet is a soft magnetic material. The stator core 52 is assembled on the radially inner side of the stator winding 51. For example, the electromagnetic steel sheet is a silicon steel sheet in which about several % (such as 3%) silicon is added to iron. The stator winding 51 corresponds to an armature winding. The stator core 52 corresponds to an armature core.

The stator winding 51 includes a coil side portion 53 and coil ends 54 and 55. The coil side portion 53 is a portion that overlaps the stator core 52 in the radial direction and is on the radially outer side of the stator core 52. The coil ends 54 and 55 respectively protrude from one end side and another end side of the stator core 52 in the axial direction.

The coil side portion 53 opposes each of the stator core 52 and the magnet unit 42 of the rotor 40 in the radial direction. In a state in which the stator 50 is arranged on the inner side of the rotor 40, of the coil ends 54 and 55 on both sides in the axial direction, the coil end 54 that is on the side of the bearing unit 20 (upper side in the drawing) is housed in the coil-housing recess portion 47 that is formed by the magnet holder 41 of the rotor 40. However, details of the stator 50 will be described hereafter.

The inverter unit 60 includes a unit base 61 and a plurality of electrical components 62. The unit base 61 is fixed to the housing 30 by a fastener such as a bolt. The plurality of electrical components 62 are assembled to the unit base 61. For example, the unit base 61 may be made of a CFRP. The unit base 61 includes an end plate 63 and a casing 64. The end plate 63 is fixed to an edge of the opening 33 of the housing 30. The casing 64 is provided integrally with the end plate 63 and extends in the axial direction. The end plate 63 has a circular opening 65 in a center portion thereof. The casing 64 is formed so as to stand erect (protrude) from a circumferential edge portion of the opening 65.

The stator 50 is assembled to an outer circumferential surface of the casing 64. That is, an outer diameter dimension of the casing 64 is a dimension that is the same as an inner diameter dimension of the stator core 52 or slightly smaller than the inner diameter dimension of the stator core 52. As a result of the stator core 52 being assembled on the outer side of the casing 64, the stator 50 and the unit base 61 are integrated. In addition, because the unit base 61 is fixed to the housing 30, in the state in which the stator core 52 is assembled to the casing 64, the stator 50 is in a state of being integrated with the housing 30.

Here, the stator core 52 may be assembled to the unit base 61 by bonding, shrink-fitting, press-fitting, or the like. As a result, positional shifting of the stator core 52 in the circumferential direction or the axial direction in relation to the unit base 61 side is suppressed.

In addition, a radially inner side of the casing 64 is a housing space for housing the electrical components 62. The electrical components 62 are arranged in the housing space so as to surround the rotation shaft 11. The casing 64 serves a role as a housing-space forming portion. The electrical components 62 are configured to actualize a semiconductor module 66 that configures an inverter circuit, a control board 67, and a capacitor module 68.

Here, the unit base 61 is provided on the radially inner side of the stator 50 and corresponds to a stator holder (armature holder) that holds the stator 50. The housing 30 and the unit base 61 configure a motor housing of the rotating electric machine 10. In the motor housing, the holding member 23 is fixed to the housing 30 on one side in the axial direction with the rotor 40 therebetween, and the housing 30 and the unit base 61 are coupled with each other on the other side. For example, in an electric vehicle that is an electric automobile or the like, the rotating electric machine 10 is mounted in the vehicle or the like by the motor housing being attached on the side of the vehicle or the like.

Figure 6:
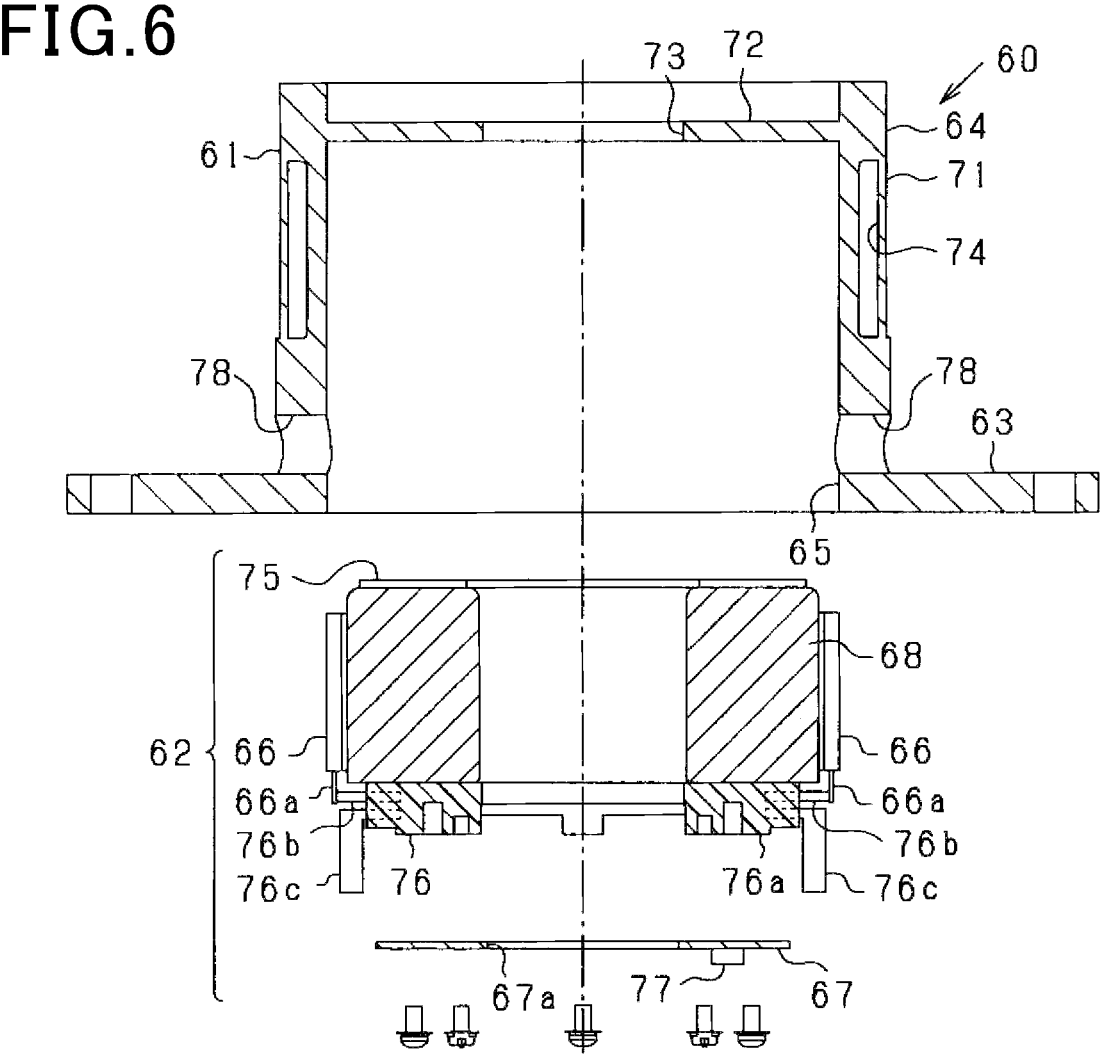
FIG. 6 is an exploded view of an inverter unit.

Here, the configuration of the inverter unit 60 will be further described with reference to FIG. 6, in addition to above-described FIGS. 1 to 5. FIG. 6 is an exploded view of the inverter unit 60.

In the unit base 61, the casing 64 includes a cylindrical portion 71 and an end surface 72 that is provided on one (an end portion on the bearing unit 20 side) of both ends that are opposing in the axial direction of the cylindrical portion 71. A side opposite the end surface 72 of both end portions in the axial direction of the cylindrical portion 71 is completely open through the opening 65 of the end plate 63.

A circular hole 73 is formed in a center of the end surface 72. The rotation shaft 11 can be inserted into the hole 73. A sealing member 171 that seals a gap between the end surface 72 and the outer circumferential surface of the rotation shaft 11 is provided in the hole 73. For example, the sealing member 171 may be a sliding seal that is made of a resin material.

The cylindrical portion 71 of the casing 64 is a partitioning portion that partitions between the rotor 40 and the stator 50 that are arranged on a radially outer side thereof, and the electrical components 62 that are arranged on a radially inner side thereof. The rotor 40 and the stator 50, and the electrical components 62 are respectively arranged so as to be arrayed on the inner side and the radially outer side with the cylindrical portion 71 therebetween.

In addition, the electrical component 62 is an electrical component that configures an inverter circuit. The electrical component 62 provides a power-running function for supplying a current to the phase windings of the stator winding 51 in a predetermined order and rotating the rotor 40, and a power generation function for receiving input of a three-phase alternating-current current that flows through the stator winding 51 in accompaniment with the rotation of the rotation shaft 11 and outputting the three-phase alternating-current current outside as generated power.

Here, the electrical component 62 may only provide either of the power-running function and the power generation function. For example, when the rotating electric machine 10 is used as a vehicle power source, the power generation function is a regeneration function for outputting the three-phase alternating-current current outside as regenerative power.

As shown in FIG. 4, as a specific configuration of the electrical components 62, a capacitor module 68 that has a hollow circular cylindrical shape is provided around the rotation shaft 11, and a plurality of semiconductor modules 66 are arranged in an array in the circumferential direction on an outer circumferential surface of the capacitor module 68. The capacitor module 68 includes a plurality of smoothing capacitors 68a that are connected to one another in parallel.

Specifically, the capacitor 68a is a laminated-type film capacitor that is made of a plurality of film capacitors being laminated. A lateral cross-section of the capacitor 68a has a trapezoidal shape. The capacitor module 68 is configured by twelve capacitors 68a being arranged so as to be annularly arrayed.

Here, for example, in a manufacturing process for the capacitor 68a, a capacitor element is fabricated using an elongated film that has a predetermined width and is made of a plurality of films being laminated. The elongated film is cut into isosceles trapezoids such that a film-width direction serves as a trapezoid-height direction, and tops and bottoms of the trapezoids alternate. In addition, the capacitor 68a is fabricated by electrodes and the like being attached to the capacitor element.

For example, the semiconductor module 66 has a semiconductor switching element, such as a metal-oxide-semiconductor field-effect transistor (MOSFET) or an insulated-gate bipolar transistor (IGBT), and is formed into an approximately plate-like shape.

According to the present embodiment, the rotating electric machine 10 includes two sets of three-phase windings. The inverter circuit is provided for each of the three-phase windings. Therefore, a semiconductor module group 66A that is formed by a total of twelve semiconductor modules 66 being annularly arrayed is provided in the electrical components 62.

The semiconductor module 66 is arranged so as to be sandwiched between the cylindrical portion 71 of the casing 64 and the capacitor module 68. An outer circumferential surface of the semiconductor module group 66A is in contact with an inner circumferential surface of the cylindrical portion 71. An inner circumferential surface of the semiconductor module group 66A is in contact with the outer circumferential surface of the capacitor module 68. In this case, heat that is generated in the semiconductor module 66 is transmitted to the end plate 63 through the casing 64 and released from the end plate 63.

The semiconductor module group 66A may include a spacer 69 on the outer circumferential surface side, that is, between the semiconductor modules 66 and the cylindrical portion 71 in the radial direction. In this case, in the capacitor module 68, a cross-sectional shape of a lateral cross-section that is orthogonal to the axial direction is a regular dodecagon. Meanwhile, a lateral cross-sectional shape of the inner circumferential surface of the cylindrical portion 71 is a circular shape.

Therefore, in the spacer 69, an inner circumferential surface is a flat surface and an outer circumferential surface is a curved surface. The spacer 69 may be integrally provided on the radially outer side of the semiconductor module group 66A so as to be continuous in a circular annular shape. The spacer 69 is a good heat conductor and, for example, may be made of a metal such as aluminum or a heat-radiation gel sheet. Here, the lateral cross-sectional shape of the inner circumferential surface of the cylindrical portion 71 can also be a dodecagon that is identical to the capacitor module 68. In this case, both the inner circumferential surface and the outer circumferential surface of the spacer 69 may be flat surfaces.

In addition, according to the present embodiment, a cooling water passage 74 through which cooling water flows is formed in the cylindrical portion 71 of the casing 64. Heat that is generated in the semiconductor modules 66 is released to the cooling water that flows through the cooling water passage 74 as well. That is, the casing 64 includes a water-cooled mechanism.

As shown in FIGS. 3 and 4, the cooling water passage 74 is formed into an annular shape so as to surround the electrical components 62 (the semiconductor modules 66 and the capacitor module 68). The semiconductor modules 66 are arranged along the inner circumferential surface of the cylindrical portion 71. The cooling water passage 74 is provided in a position that overlaps the semiconductor modules 66 on the inner side and the radially outer side.

The stator 50 is arranged on the outer side of the cylindrical portion 71 and the electrical components 62 are arranged on the inner side. Therefore, heat from the stator 50 is transmitted to the cylindrical portion 71 from the outer side thereof, and heat from the electrical components 62 (such as heat from the semiconductor modules 66) is transmitted from the inner side. In this case, the stator 50 and the semiconductor modules 66 can be simultaneously cooled. Heat from heat generating components of the rotating electric machine 10 can be efficiently released.

Furthermore, at least a portion of the semiconductor modules 66 that configure a portion or an entirety of the inverter circuit that operates the rotating electric machine by performing energization of the stator winding 51 is arranged inside an area that is surrounded by the stator core 52 that is arranged on the radially outer side of the cylindrical portion 71 of the casing 64. The entirety of a single semiconductor module 66 is preferably arranged inside the area that is surrounded by the stator core 52. Furthermore, the entirety of all semiconductor modules 66 is preferably arranged inside the area that is surrounded by the stator core 52.

In addition, at least a portion of the semiconductor modules 66 is arranged inside an area that is surrounded by the cooling water passage 74. All of the semiconductor modules 66 is preferably arranged inside an area that is surrounded by a yoke 141.

Moreover, the electrical components 62 include, in the axial direction, an insulating sheet 75 that is provided on one end surface of the capacitor module 68 and a wiring module 76 that is provided on another end surface. In this case, the capacitor module 68 includes two end surfaces that are opposing in the axial direction thereof, that is, a first end surface and a second end surface. The first end surface of the capacitor module 68 that is close to the bearing unit 20 opposes the end surface 72 of the casing 64 and overlaps the end surface 72 with the insulating sheet 75 sandwiched therebetween. In addition, the wiring module 76 is assembled to the second end surface of the capacitor module 68 that is close to the opening 65.

The wiring module 76 includes a main body portion 76a and a plurality of bus bars 76b and 76c. The main body portion 76a is made of a synthetic resin material and has a circular plate shape. The plurality of bus bars 76b and 76c are embedded inside the main body portion 76a. Electrical connection with the semiconductor modules 66 and the capacitor module 68 is achieved by the bus bars 76b and 76c.

Specifically, the semiconductor module 66 includes a connection pin 66a that extends from an end surface in the axial direction thereof. The connection pin 66a is connected to the bus bar 76b on a radially outer side of the main body portion 76a. In addition, the bus bar 76c extends toward a side opposite the capacitor module 68 on the radially outer side of the main body portion 76a. The bus bar 76c is connected to a wiring member 79 at a tip end portion thereof (see FIG. 2).

As described above, the insulating sheet 75 is provided on the first end surface that is opposing in the axial direction of the capacitor module 68, and the wiring module 76 is provided on the second surface of the capacitor module 68. In this configuration, as a heat releasing path of the capacitor module 68, a path from the first end surface and the second end surface of the capacitor module 68 to the end surface 72 and the cylindrical portion 71 is formed.

That is, a path from the first end surface to the end surface 72 and a path from the second end surface to the cylindrical portion 71 are formed. As a result, heat release from the end surface portions of the capacitor module 68 other than the outer circumferential surface on which the semiconductor modules 66 are provided can be performed. That is, heat release can be performed not only in the radial direction but also the axial direction.

In addition, the capacitor module 68 has a hollow circular cylindrical shape. The rotation shaft 11 is arranged in an inner circumferential portion thereof with a predetermined gap interposed therebetween. Therefore, heat from the capacitor module 68 can also be released from the hollow portion thereof. In this case, as a result of a flow of air being generated by the rotation of the rotation shaft 11, the cooling effect thereof can be improved.

The circular plate-shaped control board 67 is attached to the wiring module 76. The control board 67 includes a printed circuit board (PCB) on which a predetermined wiring pattern is formed. A control apparatus 77 that corresponds to a control unit that is made of various types of integrated circuits (IC), microcomputers, and the like is mounted on the board. The control board 67 is fixed to the wiring module 76 by a fixing means such as a screw. The control board 67 has an insertion hole 67a through which the rotational shaft 11 is inserted in a center portion thereof.

Here, the wiring module 76 has a first surface and a second surface that oppose each other in the axial direction, that is, oppose each other in a thickness direction thereof. The first surface faces the capacitor module 68. The wiring module 76 is provided with the control board 67 on the second surface thereof. The bus bar 76c of the wiring module 76 extends from one side to the other side of both surfaces of the control board 67. In this configuration, the control board 67 may be provided with a notch that prevents interference with the bus bar 76c. For example, a portion of an outer edge portion of the control board 67 that has the circular shape may be notched.

As described above, the electrical components 62 are housed inside the space that is surrounded by the casing 64, and the housing 30, the rotor 40, and the stator 50 are provided in layers on the outer side thereof. In this configuration, shielding from electromagnetic noise that is generated in the inverter circuit is suitably performed.

That is, in the inverter circuit, switching control being performed in each of the semiconductor modules 66 using pulse width modulation (PWM) control based on a predetermined carrier frequency and electromagnetic noise being generated as a result of the switching control can be considered. However, shielding from this electromagnetic noise can be suitably performed by the housing 30, the rotor 40, the stator 50, and the like on the outer side of in the radial direction the electrical components 62.

Furthermore, as a result of at least a portion of the semiconductor modules 66 being arranged inside the area that is surrounded by the stator core 52 that is arranged on the radially outer side of the cylindrical portion 71 of the casing 64, compared to a configuration in which the semiconductor modules 66 and the stator winding 51 are arranged without the stator core 52 therebetween, even if magnetic flux is generated from the semiconductor modules 66, the stator winding 51 is not easily affected.

In addition, even if magnetic flux is generated from the stator winding 51, the semiconductor modules 66 are not easily affected. Here, it is even more effective to arrange the overall semiconductor modules 66 inside the area that is surrounded by the stator core 52 that is arranged on the radially outer side of the cylindrical portion 71 of the casing 64. In addition, when at least a portion of the semiconductor modules 66 is surrounded by the cooling water passage 74, an effect in which heat generated from the stator winding 51 and the magnet unit 42 does not easily reach the semiconductor modules 66 can be achieved.

A through hole 78 through which the wiring member 79 (see FIG. 2) is inserted is formed near the end plate 63 in the cylindrical portion 71. The wiring member 79 electrically connects the stator 50 on the outer side of the cylindrical portion 71 and the electrical components 62 on the inner side thereof.

As shown in FIG. 2, the wiring member 79 is connected to each of the end portion of the stator winding 51 and the bus bar 76c of the wiring module 76 by press-fitting, welding, or the like. For example, the wiring member 79 is a bus bar. A joining surface of the wiring member 79 is preferably crushed to be flat. The through hole 78 may be provided in a single location or a plurality of locations.

According to the present embodiment, the through holes 78 are provided in two locations. In this configuration, winding terminals that extend from the two sets of three-phase windings can each easily be connected by the wiring member 79. This is suitable in terms of performing multi-phase connection.

As described above, as shown in FIG. 4, inside the housing 30, the rotor 40 and the stator 50 are provided in order from the radially outer side, and the inverter unit 60 is provided on the radially inner side of the stator 50. Here, when a radius of the inner circumferential surface of the housing 30 is d, the rotor 40 and the stator 50 are arranged further toward the radially outer side than a distance of d×0.705 from a rotational center of the rotor 40 is.

In this case, when an area on the radially inner side from an inner circumferential surface of the stator 50 (that is, an inner circumferential surface of the stator core 52) that is on the radially inner side, of the rotor 40 and the stator 50, is a first area X1 and an area from the inner circumferential surface of the stator 50 to the housing 30 in the radial direction is a second area X2, an area of a lateral cross-section of the first area X1 is greater than an area of a lateral cross-section of the second area X2.

In addition, in terms of an area over which which the magnet unit 42 of the rotor 40 and stator winding 51 overlap in the radial direction, a volume of the first area X1 is greater than a volume of the second area X2

Here, if the rotor 40 and the stator 50 are considered a magnetic circuit component assembly, inside the housing 30, the first area X1 that is on the radially inner side from an inner circumferential surface of the magnetic circuit component assembly has a greater volume than the second area X2 that is from the inner circumferential surface of the magnetic circuit component assembly to the housing 30 in the radial direction.

Next, the configurations of the rotor 40 and the stator 50 will be described in further detail.

As a configuration of a stator in a rotating electric machine, a configuration in which a plurality of slots are provided in the circumferential direction in a stator core that is made of laminated steel sheets and has a circular annular shape, and a stator winding is wound through the slots is generally known. Specifically, the stator core includes a plurality of teeth that extend in the radial direction from a yoke at predetermined intervals. The slots are formed between the teeth that are adjacent to each other in the circumferential direction. In addition, for example, a plurality of layers of conductors are housed inside the slots in the radial direction, and the stator winding is configured by these conductors.

However, in the above-described stator structure, during energization of the stator winding, magnetic saturation occurring in the teeth portion of the stator core in accompaniment with increase in magnetomotive force in the stator winding, and torque density of the rotating electric machine becoming limited as a result thereof can be considered. That is, in the stator core, magnetic saturation occurs as a result of a rotating magnetic flux that is generated by the energization of the stator winding being concentrated at the teeth.

In addition, as a configuration of an interior permanent magnet (IPM) rotor of a rotating electric machine, a configuration in which a permanent magnet is arranged on a d-axis and a rotor core is arranged on a q-axis of a d-q coordinate system is generally known. In such cases, as a result of the stator winding near the d-axis being excited, an excitation magnetic flux flows from the stator to the q-axis of the rotor in accordance with Fleming's Rule. In addition, as a result, magnetic saturation over a wide area is thought to occur in a q-axis core portion of the rotor.

Figure 7:
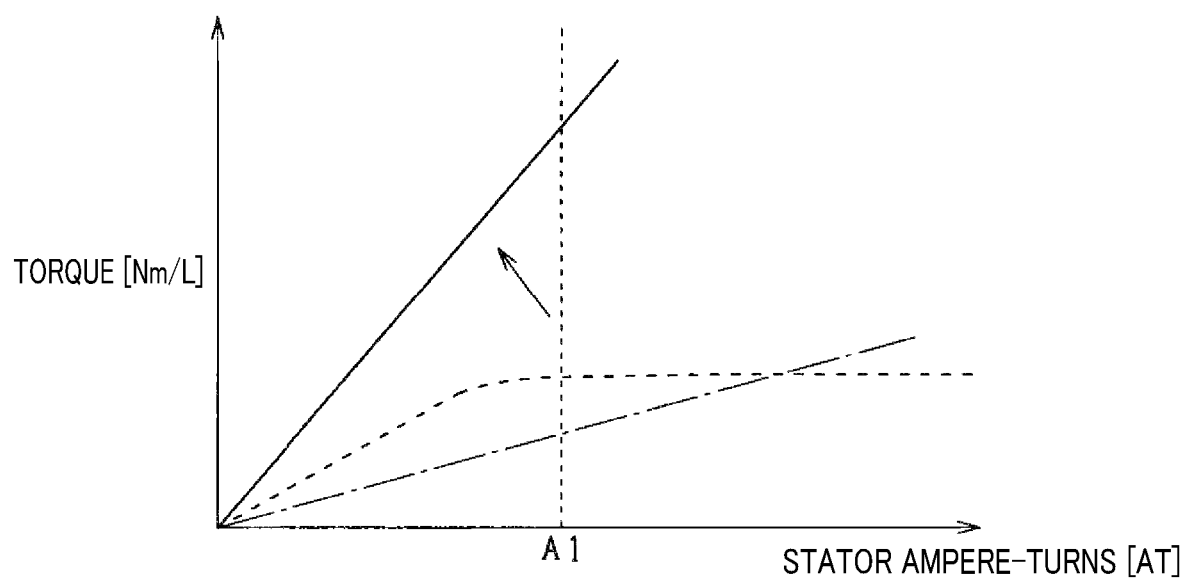
FIG. 7 is a torque diagram of a relationship between ampere-turns of a stator winding and torque density.

FIG. 7 is a torque diagram of a relationship between ampere-turns [AT] and torque density [Nm/L]. The ampere-turns indicates magnetomotive force in the stator winding. A broken line indicates characteristics of a typical IPM-rotor-type rotating electric machine. As shown in FIG. 7, in the typical rotating electric machine, as a result of the magnetomotive force being increased in the stator, magnetic saturation occurs in two locations that are the teeth portion between the slots and the q-axis core portion, and increase in torque becomes limited as a result. In this manner, in the typical rotating electric machine, an ampere-turns design value is limited by A1.

Here, according to the present embodiment, to eliminate limitations attributed to magnetic saturation, the rotating electric machine 10 is also provided with a configuration described below. That is, as a first modification, a slot-less structure is used in the stator 50 to eliminate magnetic saturation that occurs in the teeth of the stator core in the stator. In addition, a surface permanent magnet (SPM) rotor is used to eliminate magnetic saturation that occurs in the q-axis core portion of the IPM rotor.

As a result of the first modification, the above-described two locations in which magnetic saturation occurs can be eliminated. However, decrease in torque in a low-current region can be considered (refer to a single-dot chain line in FIG. 7). Therefore, as a second modification, a polar anisotropic structure in which a magnet magnetic path is extended and magnetic force is increased in the magnet unit 42 of the rotor 40 is used to recover the decrease in torque through magnetic flux enhancement in the SPM rotor.

In addition, as a third modification, recovery of the decrease in torque is achieved through use of a flattened conductor structure in which a thickness of the conductor in the radial direction of the stator 50 is reduced in the coil side portion 53 of the stator winding 51. Here, larger eddy currents are thought to be generated in the stator winding 51 that opposes the magnet unit 42, as a result of the above-described polar anisotropic structure in which the magnetic force is increased.

However, as a result of the third modification, the generation of eddy currents in the radial direction in the stator winding 51 can be suppressed because of the flattened conductor structure that is thin in the radial direction. In this manner, as a result of these first to third configurations, even while significant improvement in torque characteristics can be expected through use of a magnet that has high magnetic force, as indicated by a solid line in FIG. 7, concern regarding the generation of large eddy currents that may occur as a result of the magnet that has high magnetic force can be ameliorated as well.

Furthermore, as a fourth modification, a magnet unit that has a magnetic flux density distribution that is close to a sine wave is used through use of the polar anisotropic structure. As a result, a sine-wave matching ratio can be improved by pulse control, described hereafter, or the like and torque enhancement can be achieved. In addition, because changes in magnetic flux are more gradual compared to that of a radial magnet, eddy current loss (copper loss due to eddy currents) can also be further suppressed.

The sine-wave matching ratio will be described below. The sine-wave matching ratio can be determined based on a comparison between an actual measured waveform of a surface magnetic flux density distribution that is measured by a surface of a magnet being traced by a magnetic flux probe or the like, and a sine wave that has the same period and the same peak value. In addition, a proportion of an amplitude of a primary waveform that is a fundamental wave of the rotating electric machine in relation to an amplitude of the actual measured waveform, that is, an amplitude obtained by another harmonic component being added to the fundamental wave corresponds to the sine-wave matching ratio.

As the sine-wave matching ratio increases, the waveform of the surface magnetic flux density distribution becomes closer to the sine-wave waveform. In addition, when a primary sine-wave current is supplied from an inverter to the rotating electric machine that includes a magnet that has an improved sine-wave matching ratio, because of this and the waveform of the surface magnetic flux density distribution of the magnet being close to the sine waveform as well, a large torque can be generated. Here, the surface magnetic flux density distribution may be estimated by a method other than actual measurement, such as by electromagnetic field analysis using Maxwell's equations.

In addition, as a fifth modification, the stator winding 51 has a wire conductor body structure in which a plurality of wires are gathered together and bundled. As a result, because the wires are connected in parallel, a large current can be supplied. In addition, the generation of eddy currents that are generated in the conductors that are spread in the circumferential direction of the stator 50 as a result of the flattened conductor structure can be suppressed more effectively than when the conductors are made thinner in the radial direction as a result of the third modification, because a cross-sectional area of each wire is reduced. In addition, as a result of a configuration in which the plurality of wires are twisted together, regarding magnetomotive force from a conductor body, eddy currents from a magnetic flux that is generated based on a right-hand screw rule in a current conduction direction can be cancelled.

In this manner, as a result of the fourth modification and the fifth modification being further added, torque enhancement can be achieved while a magnet according to the second modification that has a high magnetic force that is used and, further, while the eddy current loss attributed to the high magnetic force is suppressed.

Descriptions of the above-described slot-less structure of the stator 50, flattened conductor structure of the stator winding 51, and polar anisotropic structure of the magnet unit 42 are separately added below. Here, first, the slot-less structure of the stator 50 and the flattened conductor structure of the stator winding 51 will be described.

Figure 8:
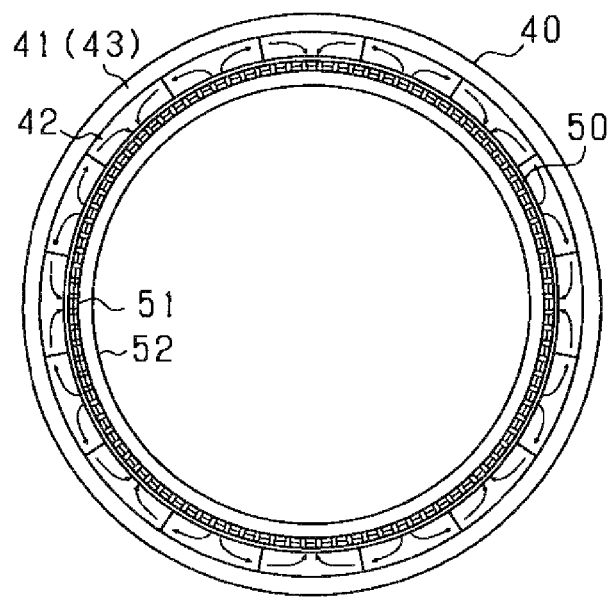
FIG. 8 is a lateral cross-sectional view of a rotor and a stator.
Figure 9:
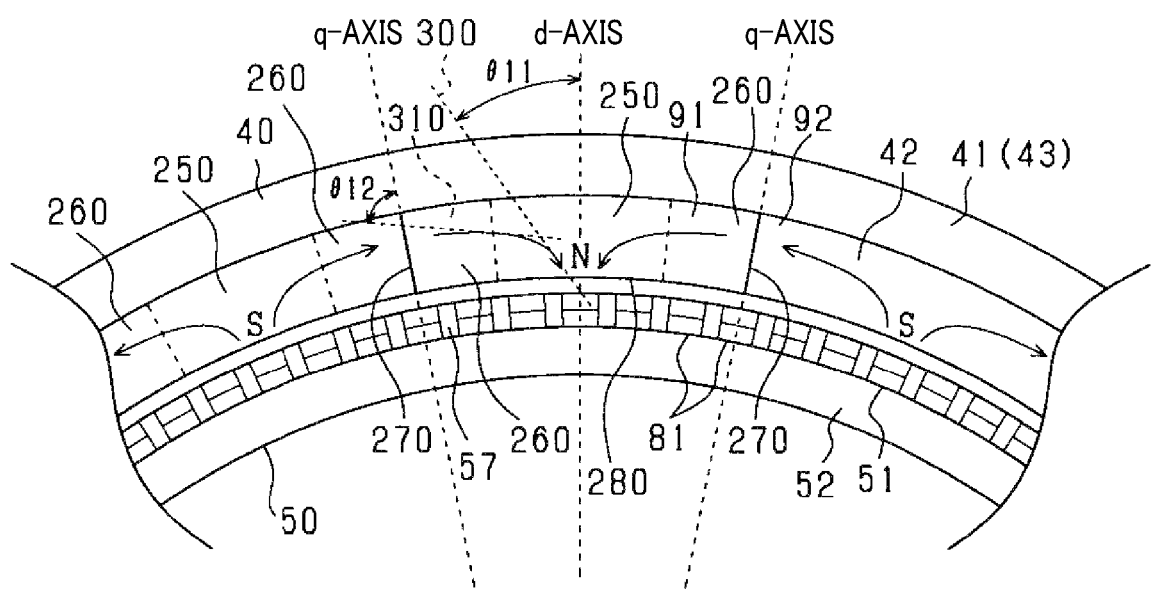
FIG. 9 is a diagram showing a portion of FIG. 8 in an enlarged manner.
Figure 10:
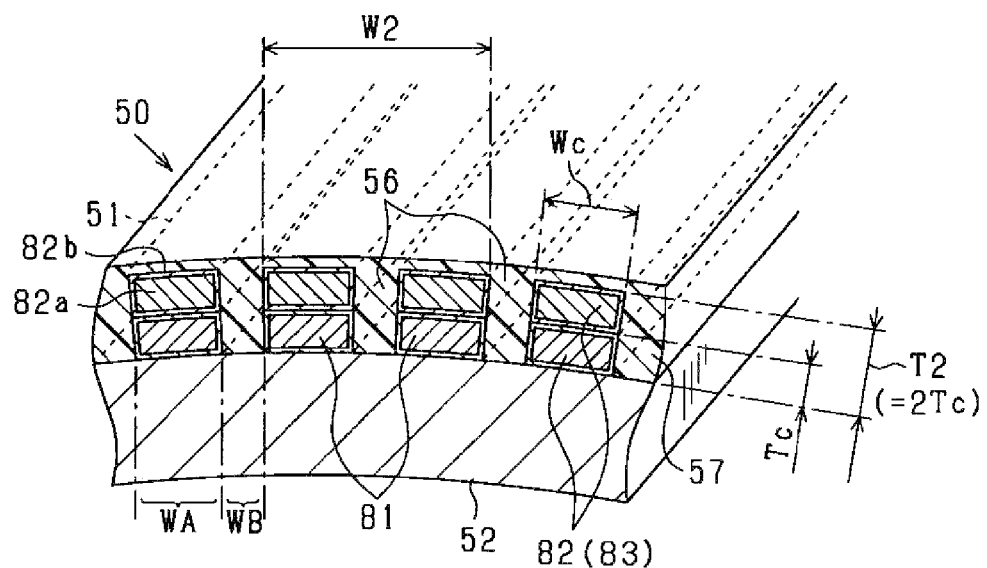
FIG. 10 is a lateral cross-sectional view of the stator.
Figure 11:
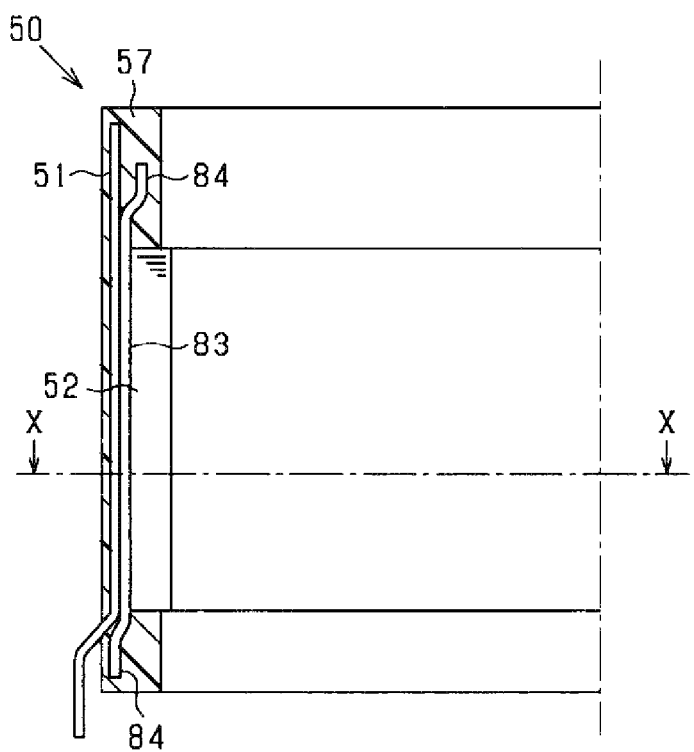
FIG. 11 is a longitudinal cross-sectional view of the stator.
Figure 12:
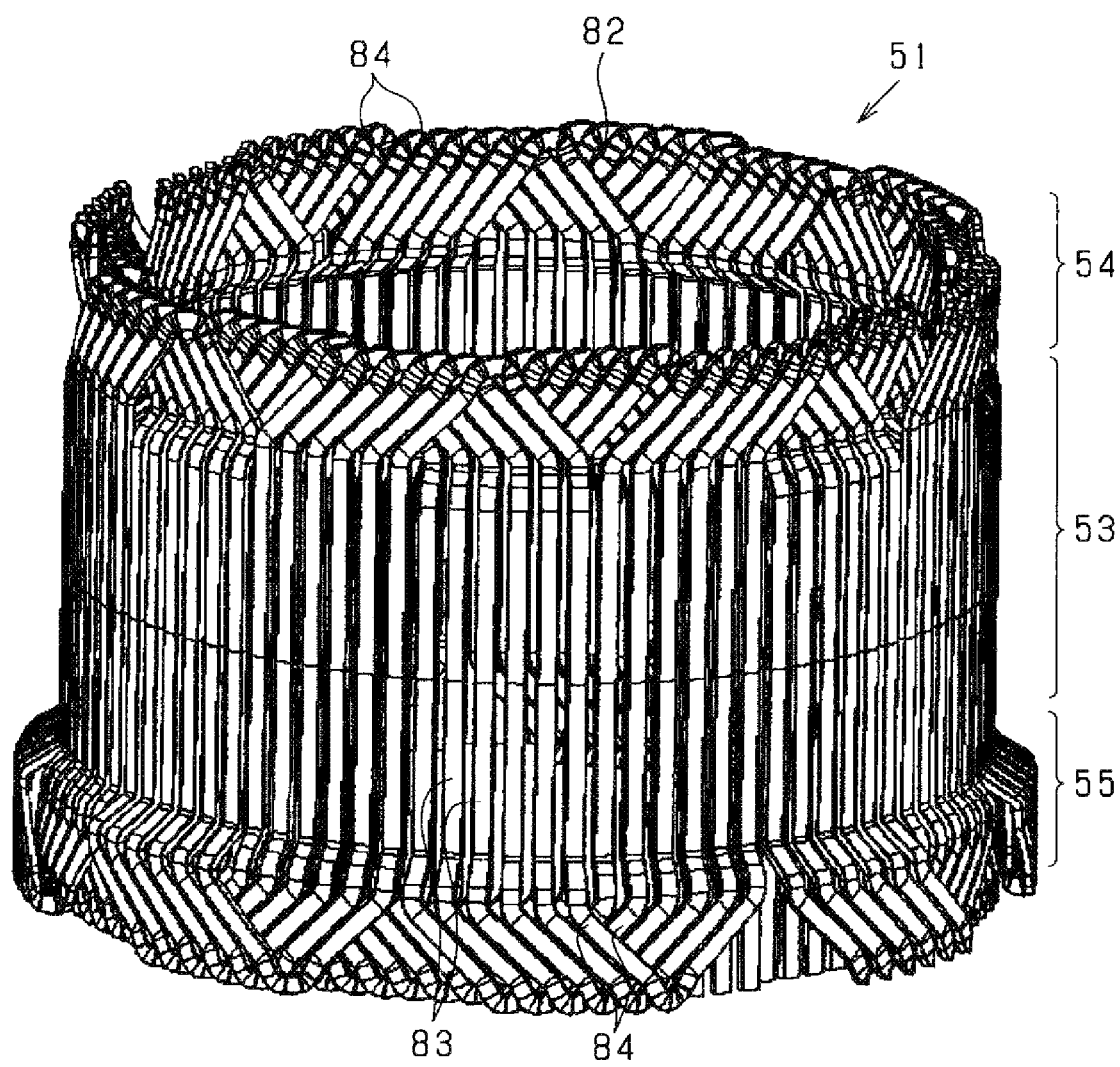
FIG. 12 is a perspective view of the stator winding.

FIG. 8 is a lateral cross-sectional view of the rotor 40 and the stator 50. FIG. 9 is a diagram showing a portion of the rotor 40 and the stator 50 shown in FIG. 8 in an enlarged manner. FIG. 10 is a cross-sectional view showing a lateral cross-section of the stator 50 taken along line X-X in FIG. 11. FIG. 11 is a cross-sectional view showing a vertical cross-section of the stator 50. In addition, FIG. 12 is a perspective view of the stator winding 51. Here, in FIGS. 8 and 9, a magnetization direction of the magnets in the magnet unit 42 is indicated by an arrow.

As shown in FIGS. 8 to 11, the stator core 52 is that in which a plurality of electromagnetic steel sheets are laminated in the axial direction. The stator core 52 has a circular cylindrical shape that has a predetermined thickness in the radial direction. The stator winding 51 is assembled on the radially outer side of the stator core 52 that is the rotor 42 side. In the stator core 52, the outer circumferential surface on the rotor 40 side serves as a conductor setup portion (conductor body area). The outer circumferential surface of the stator core 52 has a curved surface shape that has substantially no unevenness.

A plurality of conductor groups 81 are arranged on the outer circumferential surface of the stator core 52 at predetermined intervals in the circumferential direction. The stator core 52 functions as a back yoke that serves as a portion of a magnetic circuit for rotating the rotor 40. In this case, a tooth (that is, a core) that is made of a soft magnetic material is not provided between two conductor groups 81 that are adjacent to each other in the circumferential direction (that is, a slot-less structure).

According to the present embodiment, the structure is such that a resin material of a sealing member 57 enters a gap 56 between the conductor groups 81. That is, in the stator 50, an inter-conductor member that is provided between the conductor groups 81 in the circumferential direction is configured as the sealing member 57 that is a non-magnetic material. In terms of a state before sealing by the sealing member 57, the conductor groups 81 are arranged on the radially outer side of the stator core 52, at predetermined intervals in the circumferential direction so as to each be separated by the gap 56 that is a conductor-to-conductor area.

The stator 50 that has a slot-less structure is thereby constructed. In other words, each conductor group 81 is made of two conductors 82, as described hereafter. Only a non-magnetic material occupies the area between two conductor groups 81 that are adjacent to each other in the circumferential direction of the stator 50. The non-magnetic material may include a non-magnetic gas such as air, a non-magnetic liquid, and the like, in addition to the sealing member 57. Hereafter, the sealing member 57 is also referred to as the inter-conductor member.

Here, the configuration in which the teeth are provided between the conductor groups 81 that are arrayed in the circumferential direction can be said to be a configuration in which, as a result of the teeth having a predetermined thickness in the radial direction and a predetermined width in the circumferential direction, a portion of the magnetic circuit, that is, a magnet magnetic path is formed between the conductor groups 81. In this regard, the configuration in which the teeth are not provided between the conductor groups 81 can be said to be a configuration in which the above-described magnetic circuit is not formed.

As shown in FIG. 10, the stator winding (that is, the armature winding) 51 is formed to have a predetermined thickness T2 (also referred to, hereafter, as a first dimension) and width W2 (also referred to, hereafter, as a second dimension). The thickness T2 is a shortest distance between the outer circumferential surface and the inner circumferential surface that oppose each other in the radial direction of the stator winding 51. The width W2 is a length, in the circumferential direction of the stator winding 51, of a portion of the stator winding 51 that functions as one of the multiple phases (in the example, three phases: three phases that are the U-phase, V-phase, and W-phase or three phases that are the X-phase, Y-phase, and Z-phase) of the stator winding 51.

Specifically, in FIG. 10, when the two conductor groups 81 that are adjacent to each other in the circumferential direction function as one of the three phases, such as the U-phase, the width W2 is from end to end of the two conductor groups 81 in the circumferential direction. In addition, the thickness T2 is less than the width W2.

Here, the thickness T2 is preferably less than a total width dimension of the two conductor groups 81 that are present within the width W2. In addition, if the cross-sectional shape of the stator winding 51 (more specifically, the conductors 82) is perfectly circular, elliptical, or polygonal, of the cross-section of the conductors 82 along the radial direction of the stator 50, a maximum length in the radial direction of the stator 50 on the cross-section may be W2 and a maximum length in the circumferential direction of the stator 50 on the same cross-section may be W2.

As shown in FIGS. 10 and 11, the stator winding 51 is sealed by the sealing member 57 that is made of a synthetic resin material that serves as a sealing material (molding material). That is, the stator winding 51 is molded by the molding material, together with the stator core 52. Here, the resin may be a non-magnetic body or an equivalent of a non-magnetic body in which Bs=0.

In terms of the lateral cross-section in FIG. 10, the sealing member 57 is provided by the synthetic resin filling the area between the conductor groups 81, that is, the gaps 56. An insulation member is interposed between the conductor groups 81 as a result of the sealing member 57. That is, the sealing member 57 functions as an insulation member in the gap 56. The sealing member 57 is provided on the radially outer side of the stator core 52, over an area that includes all of the conductor groups 81, that is, over an area in which a thickness dimension in the radial direction is greater than the thickness dimension in the radial direction of each conductor group 81.

In addition, in terms of the vertical cross-section in FIG. 11, the sealing member 57 is provided over an area that includes a turn portion 84 of the stator winding 51. The sealing member 57 is provided on the radially inner side of the stator winding 51, over an area that includes at least a portion of an end surface of the stator core 52 that is opposing in the axial direction. In this case, the stator winding 51 is approximately entirely sealed by resin, excluding the end portion of the phase winding of each phase, that is, the connection terminals for the inverter circuit.

The sealing member 57 is provided over an area that includes the end surface of the stator core 52. In this configuration, the laminated steel sheets of the stator core 52 can be pressed toward the inner side in the axial direction by the sealing member 57. As a result, the state of lamination of the steel sheets can be maintained using the sealing member 57. Here, according to the present embodiment, the inner circumferential surface of the stator core 52 is not sealed by resin. However, instead, the overall stator core 52 including the inner circumferential surface of the stator core 52 may be sealed by resin.

When the rotating electric machine 10 is used as a vehicle power source, the sealing member 57 is preferably made of fluororesin that has high heat resistance, epoxy resin, polyphenylene sulfide (PPS) resin, polyether ether ketone (PEEK) resin, liquid crystal polymer (LCP) resin, silicone resin, polyamide-imide (PAI) resin, polyimide (PI) resin, or the like.

In addition, when a coefficient of linear expansion is considered from a perspective of suppressing cracks caused by differences in expansion, the sealing member 57 is preferably made of a material that is the same as that of an outer coating of the conductors of the stator winding 51. That is, a silicone resin of which the coefficient of linear expansion is generally equal to or greater than twice that of other resins is preferably excluded.

Here, in electrical products that do not have an engine that uses combustion, like an electric vehicle, poly(p-phenylene oxide) (PPO) resin and phenolic resin that have heat resistance of about 180° C., and fiber-reinforced plastic (FRP) resin are also candidates. In fields in which ambient temperature of the rotating electric machine can be assumed to be less than 100° C., the materials are not limited to the foregoing.

The torque of the rotating electric machine 10 is proportional to the magnitude of the magnetic flux. Here, when the stator core has teeth, a maximum magnetic flux amount of the stator is dependent on and limited by the saturation magnetic flux density at the teeth. However, when the stator core does not have teeth, the maximum magnetic flux amount of the stator is not limited. Therefore, the configuration is advantageous in terms of increasing a current flowing to the stator winding 51 and achieving torque increase in the rotating electric machine 10.

According to the present embodiment, inductance in the stator 50 decreases as a result of the structure (slot-less structure) in which the teeth are eliminated being used in the stator 50. Specifically, whereas the inductance in a stator of a typical rotating electric machine in which conductors are housed in slots that are partitioned by a plurality of teeth is, for example, about 1 mH, the inductance is reduced to about 5 pH to 60 pH in the stator 50 according to the present embodiment.

According to the present embodiment, even with the rotating electric machine 10 that has the outer-rotor structure, a mechanical time constant Tm can be reduced through reduction of the inductance in the stator 50. That is, reduction of the mechanical time constant Tm can be achieved while higher torque is achieved. Here, when inertia is J, inductance is L, a torque constant is Kt, and a counter electromotive force constant is Ke, the mechanical time constant Tm is calculated by the following expression.

$$Tm = (J \times L)/(Kt \times Ke)$$

In this case, it can be confirmed that the mechanical time constant Tm decreases as a result of decrease in the inductance L.

The conductor groups 81 on the radially outer side of the stator core 52 are configured such that a plurality of conductors 82 of which a cross-section forms a flattened rectangular shape are arranged so as to be arrayed in the radial direction of the stator core 52. The conductor 82 is arranged to be oriented such that, on a lateral cross-section, radial direction dimension<circumferential direction dimension.

As a result, thinness in the radial direction is achieved in each conductor group 81. Furthermore, in addition to thinness in the radial direction being achieved, a conductor-body area extends in a planar manner to an area in which teeth were originally provided, and a flattened conductor area structure is formed. As a result, increase in a heat generation quantity of the conductors that becomes a concern as a result of the cross-sectional area becoming smaller as a result of being thinner is suppressed by the cross-sectional area of the conductor body being increased through flattening in the circumferential direction.

Here, even when the plurality of conductors are arrayed in the circumferential direction and connected in parallel, although decrease in a conductor-body cross-sectional area that amounts to the conductor coating occurs, effects based on the same reasoning can be achieved. Here, each of the conductor groups 81 and each of the conductors 82 may also be referred to as a conductive member, below.

Because slots are not provided, in the stator winding 51 according to the present embodiment, the conductor-body area that is occupied by the stator winding 51 in a single round in the circumferential direction can be designed to be greater than a conductor-body unoccupied area in which the stator winding 51 is not present.

Here, in a conventional rotating electric machine for a vehicle, the conductor-body area/conductor-body unoccupied area in a single round in the circumferential direction of the stator winding being equal to or less than 1 is a matter of course. Meanwhile, according to the present embodiment, the conductor groups 81 are provided such that the conductor-body area is equal to the conductor-body unoccupied area or the conductor-body area is greater than the conductor-body unoccupied area.

Here, as shown in FIG. 10, when a conductor area in which the conductors 82 (that is, a linear portions 83, described hereafter) is arranged in the circumferential direction is a WA and an inter-conductor area between adjacent conductors 82 is WB, the conductor area WA is greater in the circumferential direction than the conductor area WB.

As the conductor group 81 in the stator winding 51, a thickness dimension in the radial direction of the conductor group 81 is less than a width dimension in the circumferential direction corresponding to a single phase within a single magnetic pole. That is, the conductor group 81 is made of two layers of conductors 82 in the radial direction, and two conductor groups 81 are provided in the circumferential direction for a single phase within a single magnetic pole. In this configuration, a relationship expressed by Tc×2<Wc×2 is established, where Tc is the thickness dimension in the radial direction of the conductor 82, and Wc is the width dimension in the circumferential direction of the conductor 82.

Here, as another configuration, the conductor group 81 may be made of two layers of conductors 82, and a single conductor group 81 may be provided in the circumferential direction for a single phase within a single magnetic pole. In this configuration, a relationship expressed by Tc×2<Wc may be established. In short, the conductor portions (conductor groups 81) that are arranged at predetermined intervals in the circumferential direction in the stator winding 51 are that in which the thickness dimension in the radial direction thereof is less than the width dimension in the circumferential direction corresponding to a single phase within a single magnetic pole.

In other words, each of the conductors 82 may be such that the thickness dimension Tc in the radial direction is less than the width dimension Wc in the circumferential direction. In addition, further, the thickness dimension (2Tc) in the radial direction of the conductor group 81 that is made of two layers of the conductors 82 in the radial direction, that is, the thickness dimension (2Tc) in the radial direction of the conductor group 81 may be less than the width dimension Wc in the circumferential direction.

The torque of the rotating electric machine 10 is approximately inversely proportional to the thickness in the radial direction of the stator core 52 of the conductor group 81. In this regard, as a result of the thickness of the conductor group 81 being made thinner on the radially outer side of the stator core 52, the configuration is advantageous in terms of achieving torque increase in the rotating electric machine 10. A reason for this is that a distance from the magnet unit 42 of the rotor 40 to the stator core 52 (that is, a distance of a portion that includes no iron) can be reduced and magnetic resistance can be reduced. As a result, interlinkage flux in the stator core 52 by the permanent magnet can be increased and torque can be enhanced.

In addition, as a result of the thickness of the conductor group 81 being made thinner, even when magnetic flux leaks from the conductor group 81, the magnetic flux can be easily recovered in the stator core 52. The magnetic flux can be suppressed from leaking outside and not being effectively used for torque improvement. That is, reduction in magnetic force as a result of magnetic flux leakage can be suppressed. The interlinkage flux in the stator core 52 by the permanent magnet can be increased, and torque can be enhanced.

The conductor 82 is made of a coated conductor in which a surface of a conductor body 82a is covered by an insulation coating 82b. Insulation is ensured between the conductors 82 that overlap each other in the radial direction and between the conductor 82 and the stator core 52. When the wire 86, described hereafter, is a self-fusing coated wire, the insulation coating 82b is made of the coating of the wire 86. Alternatively, the insulation coating 82b may be made of an insulation member that is overlayed separately from the coating of the wire 86.

Here, in each of the phase windings that are configured by the conductors 82, insulation properties of the insulation coating 82b are maintained, excluding an exposed portion for connection. For example, the exposed portion is an input/output terminal portion or a neutral point portion when a star connection is formed. In the conductor group 81, the conductors 82 that are adjacent in the radial direction are mutually fixed using resin fixing or self-fusing coated wires. As a result, insulation breakdown, vibrations, and noise that occur as a result of the conductors 82 rubbing together are suppressed.

Figure 13:
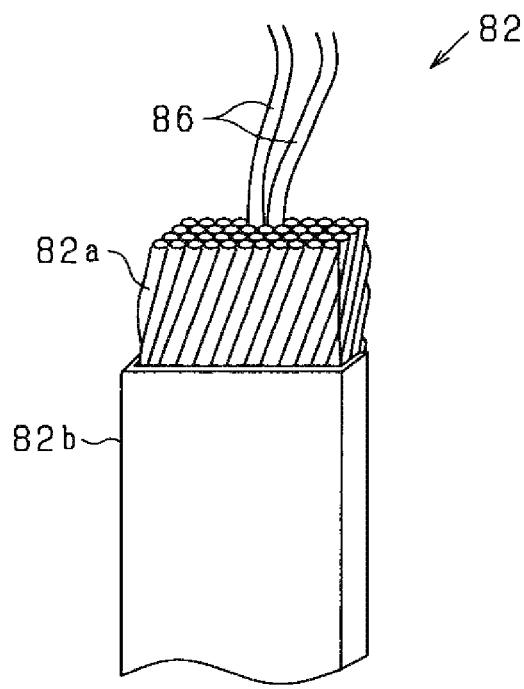
FIG. 13 is a perspective view of a configuration of a conductor.
Figure 14:
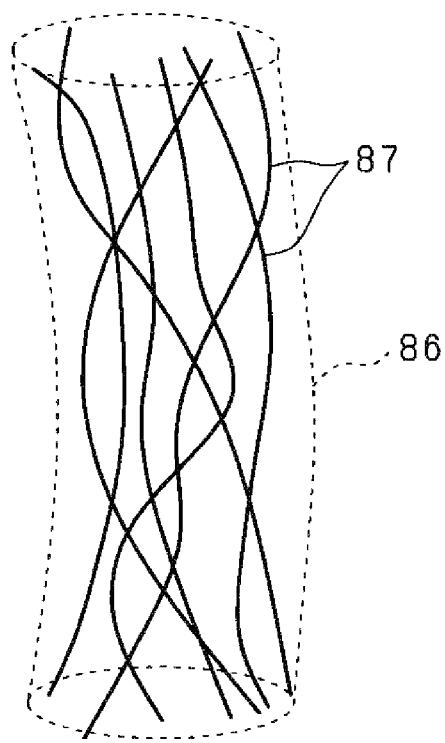
FIG. 14 is a schematic diagram of a configuration of a wire.

According to the present embodiment, the conductor body 82a is configured as a bundle of a plurality of wires 86. Specifically, as shown in FIG. 13, the conductor body 82a is formed into a braided shape by the plurality of wires 86 being twisted. In addition, as shown in FIG. 14, the wire 86 is configured as a composite in which thin, fibrous conductive materials 87 are bundled.

For example, the wire 86 may be a composite of carbon nanotube (CNT) fibers. As the CNT fibers, fibers including boron-containing fine fibers in which at least a portion of carbon is replaced with boron may be used. As carbon-based fine fibers, in addition to CNT fibers, vapor-grown carbon fibers (VGCF) and the like can be used. However, CNT fibers are preferably used. Here, the surface of the wire 86 is covered by a polymer insulation layer such as enamel. In addition, the surface of the wire 86 is preferably covered by a so-called enamel coating that is made of a coating of polyimide or a coating of amide-imide.

The conductors 82 configure the windings of n-phases in the stator winding 51. In addition, the wires 86 of the conductor 82 (that is, the conductor body 82a) are adjacent to each other in a state of contact. The conductor 82 is made of a wire bundle in which a winding conductor body has a portion that is formed by the plurality of wires 86 being twisted in one or more locations within a phase, and a resistance value between twisted wires 86 is greater than a resistance value of the wire 86 itself.

In other words, when two adjacent wires 86 have a first electrical resistivity in the direction in which the wires 86 are adjacent and each of the wires 86 has a second electrical resistivity in the length direction thereof, the first electrical resistivity is greater than the second electrical resistivity. Here, the conductor 82 may be a wire bundle that is formed by the plurality of wires 86, and in which the plurality of wires 86 are covered by an insulation member that has a very high first electrical resistivity. In addition, the conductor body 82a of the conductor 82 may be configured by the plurality of wires 86 that are twisted together.

In the above-described conductor body 82a, because the plurality of wires 86 are twisted together, generation of eddy currents in the wires 86 can be suppressed and decrease in eddy currents in the conductor body 82a can be achieved. In addition, as a result of the wires 86 being twisted, a section in which directions in which a magnetic field is applied are opposite each other is produced in a single wire 86, and a counter electromotive voltage is canceled. Therefore, decrease in eddy currents can again be achieved. In addition, as a result of the wire 86 being made of the fibrous conductive materials 87, thinning and significant increase in the number of twists can be achieved. Eddy currents can be more suitably reduced.

Here, an insulation method for the wires 86 herein is not limited to the above-described polymer insulation coating and may be a method in which flow of current is made difficult between the twisted wires 86 using contact resistance. That is, if a relationship is such that the resistance value between the twisted wires 86 is greater than the resistance value of the wire 86 itself, the above-described effects can be achieved as a result of a potential difference that is generated as a result of the difference in resistance values.

For example, as a result of a manufacturing facility for fabricating the wire 86 and a manufacturing facility for fabricating the stator 50 (armature) of the rotating electric machine 10 being used as separate discontinuous facilities, the wires 86 can become oxidized due to transportation time, work intervals, and the like. Contact resistance can be increased and is, therefore, favorable.

As described above, the conductor 82 has a cross-section that has a flattened rectangular shape. A plurality of conductors 82 are arranged so as to be arrayed in the radial direction. For example, the conductor 82 maintains the shape by a plurality of coated wires 86 that are the self-fusing coated wires that include a fusion layer and an insulation layer being bundled in a twisted state and the fusion layers being fused together.

Here, the conductor 82 may be formed by wires that do not have the fusion layer or wires that are the self-fusing coated wires being hardened into a desired shape by a synthetic resin or the like in a twisted state. When the thickness of the insulation coating 82b of the conductor 82 is, for example, 80 μm to 100 μm and thicker than a coating thickness (5 μm to 40 μm) of a conductor that is typically used, insulation between the conductor 82 and the stator core 52 can be ensured without an insulation paper or the like being interposed therebetween.

In addition, the insulation coating 82b is preferably configured to have higher insulation properties than the insulation layer of the wire 86 and be capable of insulating between phases. For example, when the thickness of the polymer insulation layer of the wire 86 is about 5 μm, the thickness of the insulation coating 82b of the conductor 82 is preferably about 80 μm to 100 μm, and made capable of suitably insulating between phases.

Furthermore, the conductor 82 may be configured such that the plurality of wires 86 are bundled without being twisted. That is, the conductor 82 may have any of a configuration in which the plurality of wires 86 are twisted over the overall length thereof, a configuration in which the plurality of wires 86 are twisted in a portion of the overall length, and a configuration in which the plurality of wires 86 are bundled without being twisted anywhere in the overall length. In summary, the conductor 82 that configures the conductor portion is a wire bundle in which the plurality of wires 86 are bundled, and the resistance value between the bundled wires is greater than the resistance value of the wire 86 itself.

The conductor 82 is formed by bending so as to be arranged in a predetermined arrangement pattern in the circumferential direction of the stator winding 51. As a result, as the stator winding 51, a phase winding is formed for each phase. As shown in FIG. 12, in the stator winding 51, the coil side portion 53 is formed by the linear portion 83 of the conductor 82 that linearly extends in the axial direction, and the coil ends 54 and 55 are formed by the turn portions 84 that protrude further toward both outer sides than the coil side portion 53 in the axial direction.

As a result of the linear portion 83 and the turn portion 84 being alternately repeated, the conductors 82 are configured as a series of conductors in a wave-winding state. The linear portion 83 is arranged in a position that opposes the magnet unit 42 in the radial direction. The linear portions 83 of the same phase that are arranged with a predetermined interval therebetween in positions on the outer side in the axial direction of the magnet unit 42 are connected to each other by the turn portion 84. Here, the linear portion 83 corresponds to a "magnet opposing portion".

According to the present embodiment, the stator winding 51 is formed by being wound into a circular annular shape by distributed winding. In this case, in the coil side portion 53, the linear portions 83 are arranged in the circumferential direction at an interval that corresponds to a single pole pair of the magnet unit 42, for each phase. In the coil ends 54 and 55, the linear portions 83 of each phase are connected to each other by the turn portion 84 that is formed into a substantial V-shape.

In the linear portions 83 that form a pair in correspondence to a single pole pair, respective current directions are opposite each other. In addition, between one coil end 54 and the other coil end 55, a combination of the pair of linear portions 83 that are connected by the turn portion 84 differs. As a result of the connections at the coil ends 54 and 55 being repeated in the circumferential direction, the stator winding 51 is formed into an approximately circular cylindrical shape.

More specifically, the stator winding 51 is that in which the winding of each phase is configured using two pairs of conductors 82 for each phase, and one three-phase winding (U-phase, V-phase, and W-phase) and the other three-phase winding (X-phase, Y-phase, and Z-phase) of the stator winding 51 are provided in two layers that are on the inner side and the radially outer side. In this case, when the number of phases of the stator winding 51 is S (6 in the case of the example) and the number of conductors 82 per phase is m, 2×S×m=2Sm conductors 82 are formed for each pole pair. According to the present embodiment, the number of phases S is six and the number m is four, and the rotating electric machine has eight pole pairs (16 poles). Therefore, 6×4×8=192 conductors 82 are arranged in the circumferential direction of the stator core 52.

In the stator winding 51 shown in FIG. 12, in the coil side portion 53, the linear portions 83 are arranged so as to overlap in two layers that are adjacent in the radial direction and, in the coil ends 54 and 55, the turn portions 84 extend in the circumferential direction from the linear portions 83 that overlap in the radial direction, at directions that are opposite each other in the circumferential direction. That is, in the conductors 82 that are adjacent to each other in the radial direction, the directions of the turn portions 84 are opposite each other, excluding the end portions of the stator winding 51.

Figure 15:
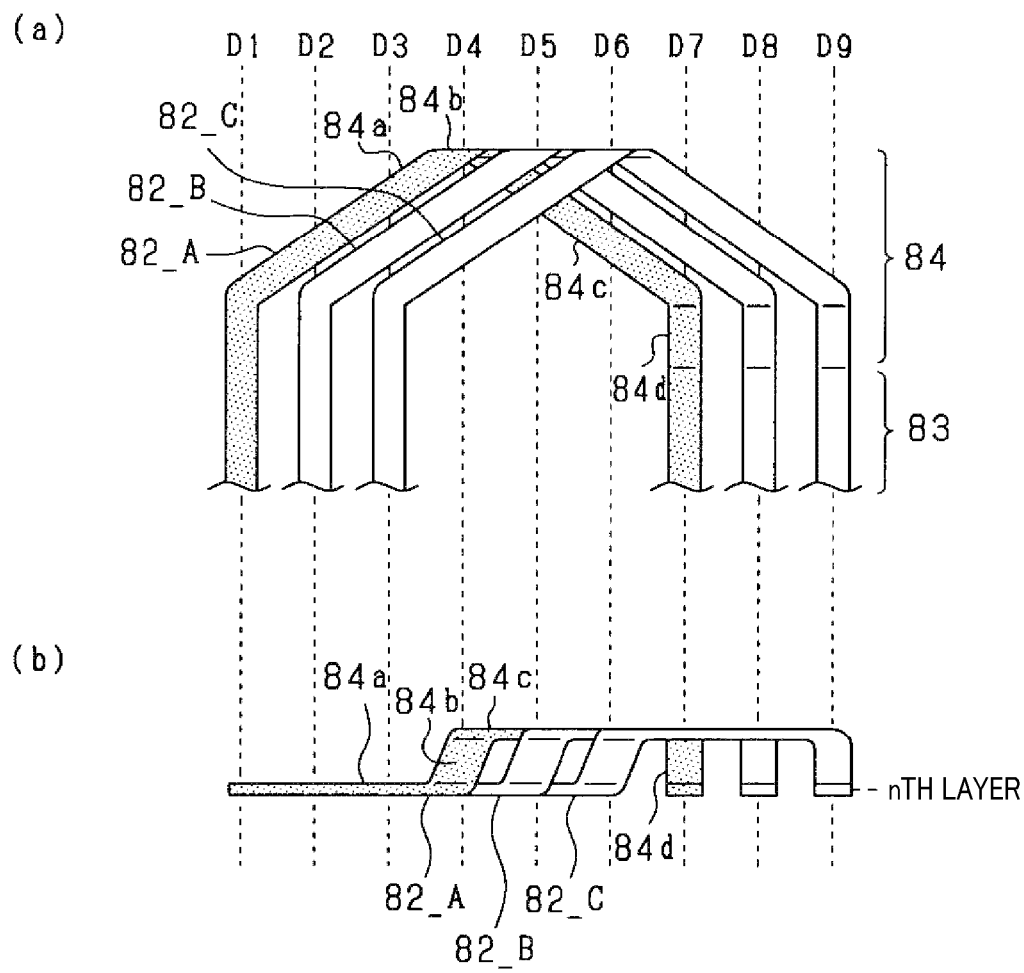
FIG. 15 illustrates, by (a) and (b), diagrams of an aspect of the conductors in an nth layer.

Here, a winding structure of the conductors 82 in the stator winding 51 will be described in detail. According to the present embodiment, a plurality of conductors 82 that are formed by wave-winding are provided so as to overlap in a plurality of layers (such as two layers) that are adjacent in the radial direction. FIG. 15 shows, by (a) and (b), diagrams of an aspect of the conductors 82 in an nth layer.

FIG. 15 shows, by (a), the shape of the conductors 82 when viewed from the stator winding 51. FIG. 15 shows, by (b), the shape of the conductors 82 when viewed from one axial direction side of the stator winding 51. Here, in FIG. 15 by (a) and (b), the positions in which the conductor groups 81 are arranged are respectively D1, D2, D3, . . . . In addition, for convenience of description, only three conductors 82 are shown. The three conductors 82 are a first conductor 82_A, a second conductor 82_B, and a third conductor 82_C.

In the conductors 82_A to 82_C, the linear portions 83 are all arranged in positions in the nth layer, that is, the same position in the radial direction. The linear portions 83 that are separated from each other by six positions (corresponding to 3×m pairs) in the circumferential direction are connected to each other by the turn portion 84. In other words, in the conductors 82_A to 82_C, two of both ends of seven linear portions 83 that are arrayed in an adjacent manner in the circumferential direction of the stator winding 51 on the same circle of which a center is an axial center of the rotor 40 are connected to each other by a single turn portion 84. For example, in the first conductor 82_A, a pair of linear portions 83 are respectively arranged in D1 and D7, and the pair of linear portions 83 are connected to each other by the turn portion 84 that has an inverted V-shape.

In addition, the other conductors 82_B and 82_C are respectively arranged such that the positions in the circumferential direction are shifted by one position each in the same nth layer. In this case, because the conductors 82_A to 82_C are all arranged in the same layer, the turn portions 84 interfering with one another can be considered. Therefore, according to the present embodiment, an interference prevention portion in which a portion of each turn portion 84 is offset in the radial direction is formed in the turn portions 84 of the conductors 82_A to 82_C.

Specifically, the turn portion 84 of each of the conductors 82_A to 82_C includes an oblique portion 84*a*, a peak portion 84*b*, an oblique portion 84*c*, and a return portion 84*d*.

The oblique portion 84*a* is a portion that extends in the circumferential direction on the same circle (first circle). The peak portion 84*b* is shifted from the oblique portion 84*a* further toward the radially inner side (upper side in FIG. 15 by (b)) than the same circle and reaches another circle (second circle). The oblique portion 84*c* extends in the circumferential direction on the second circle. The return portion 84*d* returns from the first circle to the second circle.

The peak portion 84*b*, the oblique portion 84*c*, and the return portion 84*d* correspond to the interference prevention portion. Here, the oblique portion 84*c* may be configured to shift toward the radially outer side in relation to the oblique portion 84*a*.

In other words, the turn portion 84 of each of the conductors 82_A to 82_C has the oblique portion 84*a* on one side and the oblique portion 84*c* on the other side, of both sides that sandwich the peak portion 84*b* that is a center position in the circumferential direction. The positions in the radial direction of the oblique portions 84*a* and 84*c* (positions in a rearward direction on paper in FIG. 15 by (a) and positions in an up/down direction in FIG. 15 by (b)) differ from each other.

For example, the turn portion 84 of the first conductor 82_A is configured to extend along the circumferential direction with a D1 position in the nth layer as a starting position, turn to the radial direction (such as toward the radially inner side) at the peak portion 84*b* that is the center position in the circumferential direction, subsequently turn again to the circumferential direction, thereby extending again along the circumferential direction, and further, turn again to the radial direction (such as toward the radially outer side) at the returning portion 84*d*, thereby reaching a D7 position in the nth layer that is a terminal position.

As a result of the above-described configuration, in the conductors 82_A to 82_C, the one oblique portions 84*a* are arrayed from top to bottom in order from the first conductor 82_A→second conductor 82_B→third conductor 82_C. In addition, the top to bottom order of the conductors 82_A to 82_B is interchanged at the peak portions 84*b*, and the other oblique portions 84*c* are arrayed from top to bottom in order from the third conductor 82_C→second conductor 82_B→first conductor 82_A. Therefore, the conductors 82_A to 82_C can be arranged in the circumferential direction without interfering with one other.

Here, the conductor group 81 is formed by the plurality of conductors 82 being overlapped in the radial direction. In this configuration, the turn portion 84 that is connected to the linear portion 83 on the radially inner side, and the turn portion 84 that is connected to the linear portion 83 on the radially outer side, among the linear portions 83 of a plurality of layers, may be arranged so as to be further separated in the radial direction than the linear portions 84.

In addition, when the conductors 82 of a plurality of layers are bent toward the same side in the radial direction at the end portions of the turn portions 84, that is, near boundary portions with the linear portions 83, insulation being compromised as a result of interference between the conductors 82 of adjacent layers may be prevented from occurring.

Figure 16:
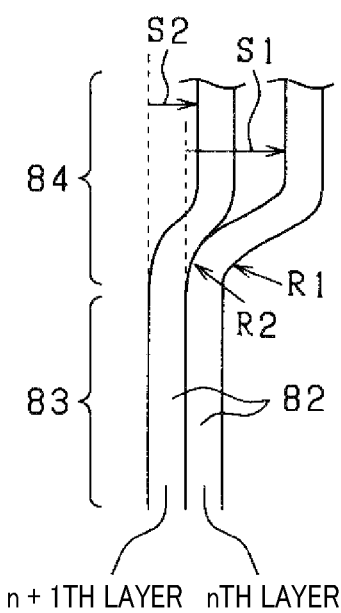
FIG. 16 is a side view of the conductors in the nth layer and an n+1th layer.

For example, in D7 to D9 in FIG. 15 by (a) and (b), the conductors 82 that overlap in the radial direction are each bent in the radial direction at the return portion 84*d* of the turn portion 84. In this case, as shown in FIG. 16, a radius of curvature of a bending portion may be made to differ between the conductor 82 of the nth layer and the conductor 82 of the n+1th layer. Specifically, a radius of curvature R1 of the conductor 82 on the radially inner side (nth layer) is less than a radius of curvature R2 of the conductor 82 on the radially outer side (n+1th layer).

In addition, an amount of shifting in the radial direction may be made to differ between the conductor 82 of the nth layer and the conductor 82 of the n+1th layer. Specifically, a shift amount S1 of the conductor 82 on the radially inner side (nth layer) is less than a shift amount S2 of the conductor 82 on the radially outer side (n+1th layer).

As a result of the above-described configuration, even when the conductors 82 that overlap in the radial direction are bent in the same direction, mutual interference between the conductors 82 can be suitably prevented. As a result, favorable insulation properties can be achieved.

Next, the structure of the magnet unit 42 in the rotor 40 will be described. According to the present embodiment, the magnet unit 42 is made of a permanent magnet. A permanent magnet of which a remanent flux density $Br=1.0$ [T] and intrinsic coercive force $Hcj=400$ [kA/m] or greater is assumed. In short, the permanent magnet that is used according to the present embodiment is a sintered magnet in which a granular magnetic material is sintered and solidified in a mold. The intrinsic coercive force Hcj on a J-H curve is equal to or greater than 400 [kA/m], and the remnant flux density Br is equal to or greater than 1.0 [T].

When 5000 to 10,000 [AT] is applied as a result of inter-phase excitation, if a permanent magnet of which a magnetic length of a single pole pair, that is, an N pole and an S pole, or in other words, a length of a path over which magnetic flux between the N pole and the S pole flows that passes through the magnet is 25 [mm] is used, $Hcj=10,000$ [A], indicating that demagnetization does not occur.

Still in other words, the magnet unit 42 is that in which saturation magnetic flux density Js is equal to or greater than 1.2 [T], grain size is equal to or less than 10 [μm], and when an orientation ratio is α, Js×α is equal to or greater than 1.0 [T].

A supplementary description is provided below, regarding the magnet unit 42. The magnet unit 42 (magnet) is characteristic in that 2.15 [T]≥Js≥1.2 [T]. In other words, as the magnet that is used in the magnet unit 42, NdFe11TiN, Nd2Fe14B, Sm2Fe17N3, an FeNi magnet that has L10-type crystals, and the like can be used.

Here, compositions such as SmCo5 (samarium-cobalt), FePt, Dy2Fe14B, and CoPt cannot be used. Also, 2.15 [T]≥Js≥1.2 [T] may be met even in magnets of the same type of compounds, such as Dy2Fe14B and Nd2Fe14B, in which dysprosium that is a heavy rare earth is typically used to impart the high coercive force of Dy, while only slightly losing the high Js characteristics of neodymium. These magnets can be used in this case as well.

In such cases, for example, the magnet is referred to as ([Nd1−xDyx]2Fe14B). Furthermore, 2.15 [T]≥Js≥1.2 [T] can be achieved even in two or more types of magnets that have differing compositions, such as magnets that are made of two or more types of materials, such as FeNi plus Sm2Fe17N3. For example, 2.15 [T]≥Js≥1.2 [T] can be achieved even in a mixed magnet in which coercive force is increased by a small amount of Dy2Fe14B, for example, in which Js<1 [T] being mixed with a Nd2Fe14B magnet of which Js=1.6 [T] and which has leeway in terms of Js.

In addition, in a rotating electric machine that operates at a temperature that is outside a range of human activity, such as 60° C. or higher, that exceeds the temperatures of a desert, or such as for use in a vehicle motor in which an in-vehicle temperature approaches 80° C. when left stationary in the summer, the components of FeNi and Sm2Fe17N3 of which a coefficient of temperature dependence is particularly small are preferably included.

A reason for this is that, in motor operation ranging from a temperature state that is close to −40° C. in Northern Europe, which is within the range of human activity, to the aforementioned 60° C. or higher that exceeds the temperatures of a desert, or to heat resistance temperatures of about 180° C. to 240° C. of a coil enamel coating, motor characteristics significantly differ based on the coefficient of temperature dependence.

Therefore, optimal control and the like with the same motor driver becomes difficult. Through use of FeNi that has the L10-type crystals or Sm2Fe17N3, or the like, described above, because these magnets have a coefficient of temperature dependence that is equal to or less than half that of Nd2Fe14B, load placed on the motor driver can be suitably reduced.

In addition, the magnet unit 42 has a characteristic that, using the above-described magnet composition, a magnitude of particle size in a fine powder state before orientation is equal to or less than 10 μm, and equal to or greater than a single magnetic-domain particle size. In a magnet, coercive force increases as a result of particles of a powder being micronized to the order of several hundred nm. Therefore, in recent years, powder that is as micronized as possible is used.

However, when the powder is too fine, the BH product of the magnet decreases as a result of oxidation and the like. Therefore, a particle size that is equal to or greater than the single magnet-domain particle size is preferable. When the particle size is up to the single magnet-domain particle size, it is known that coercive force increases as a result of micronization. Here, the magnitude of particle size described herein refers to the magnitude of particle size in a fine powder state in an orientation step, in terms of a manufacturing process of a magnet.

Furthermore, each of a first magnet 91 and a second magnet 92 of the magnet unit 42 is a sintered magnet that is formed by so-called sintering in which a magnetic powder is baked at a high temperature and hardened. This sintering is performed so that, when saturation magnetization Js of the magnet unit 42 is equal to or greater than 1.2 T, the grain size of the first magnet 91 and the second magnet 92 is equal to or less than 10 μm, and the orientation ratio is α, a condition that Js×α is equal to or greater than 1.0 T (tesla) is met.

In addition, the first magnet 91 and the second magnet 92 are each sintered to meet the following conditions. In addition, as a result of orientation being performed in the orientation step in the manufacturing process, unlike a definition of a magnetic force direction of an isotropic magnet as a result of a magnetizing step, the first magnet 91 and the second magnet 92 have a high orientation ratio. A high orientation ratio is set so that the saturation magnetization Js of the magnet unit 42 according to the present embodiment is equal to or greater than 1.2 T, and the orientation ratio α of the first magnet 91 and the second magnet 92 is Jr≥Js×α≥1.0 [T].

Here, for example, the orientation ratio α referred to herein is, in each of the first magnet 91 or the second magnet 92, α=5/6 when six easy axes of magnetization are present and, of the six easy axes of magnetization, five are oriented toward a direction A10 that is the same direction and the remaining one is oriented toward a direction B10 that is tilted at an angle of 90 degrees relative to the direction A10, and α=(5+0.707)/6 when the remaining one is oriented toward a direction B10 that is tilted by 45 degrees in relation to the direction A10, because the component of the remaining one that is oriented toward the direction A10 is cos 45°=0.707.

In the present example, the first magnet 91 and the second magnet 92 are formed by sintering. However, if the above-described conditions are met, the first magnet 91 and the second magnet 92 may be formed by other methods. For example, a method in which an MQ3 magnet or the like is formed can be used.

According to the present embodiment, because a permanent magnet of which the easy axis of magnetization is controlled by orientation is used, a magnetic circuit length inside the magnet can be made longer compared to the magnetic circuit length of a conventional linear orientation magnet that outputs 1.0 [T] or greater. That is, the magnetic circuit length for a single pole pair can be achieved using a smaller quantity of magnetic material.

In addition, compared to a design in which the conventional linear orientation magnet is used, even when the magnet is exposed to harsh high-temperature conditions, a reversible demagnetization range thereof can be maintained. In addition, the disclosers of the present application have found a configuration in which characteristics similar to those of a polar anisotropic magnet can be achieved even through use of a magnet of a conventional technology.

Here, the easy axis of magnetization refers to a crystal orientation at which magnetization is facilitated in a magnet. The orientation of the easy axis of magnetization in a magnet is a direction of which the orientation ratio that indicates an extent to which the directions of the easy axes of magnetization match is equal to or greater than 50% or a direction that is the average of the orientations of the magnet.

As shown in FIGS. 8 and 9, the magnet unit 42 is formed into a circular annular shape and is provided on the inner side of the magnet holder 41 (specifically, the radially inner side of the circular cylindrical portion 43). The magnet unit 42 includes the first magnet 91 and the second magnet 92 that are each a polar anisotropic magnet and of which the polarities differ from each other. The first magnet 91 and the second magnet 92 are alternately arranged in the circumferential direction. The first magnet 91 is a magnet that forms the N pole in a portion near the stator winding 51. The second magnet 92 is a magnet that forms the S pole in a portion near the stator winding 51. The first magnet 91 and the second magnet 92 are permanent magnets made of, for example, a rare earth magnet such as a neodymium magnet.

As shown in FIG. 9, in each of the magnets 91 and 92, the magnetization direction extends in a circular arc shape between a d-axis (direct axis) that is a magnetic pole center in a well known d-q coordinate system and a q-axis (quadrature axis) that is a magnetic pole boundary between the N pole and the S pole (in other words, the magnetic flux density is 0 tesla). In each of the magnets 91 and 92, on the d-axis side, the magnetization direction is the radial direction of the magnet unit 42 that has the circular annular shape. On the q-axis side, the magnetization direction of the magnet unit 42 that has the circular annular shape is the circumferential direction. This will be described in further detail, below.

As shown in FIG. 9, each of the magnets 91 and 92 includes a first portion 250 and two second portions 260 that are positioned on both sides of the first portion 250 in the circumferential direction of the magnet unit 42. In other words, the first portion 250 is closer to the d-axis than the second portion 260, and the second portion 260 is closer to the q-axis than the first portion 250.

In addition, the magnet unit 42 is configured such that the direction of an easy axis of magnetization 300 in the first portion 250 is more parallel to the d-axis than the direction of an easy axis of magnetization 310 in the second portion 260. In other words, the magnet unit 42 is configured such that an angle θ11 that the easy axis of magnetization 300 in the first portion 250 forms with the d-axis is smaller than an angle θ12 that the easy axis of magnetization 310 in the second portion 260 forms with the q-axis.

More specifically, the angle θ11 is an angle that is formed by the d-axis and the easy axis of magnetization 300 when a direction from the stator 50 (armature) toward the magnet unit 42 on the d-axis is forward. The angle θ12 is an angle that is formed by the q-axis and the easy axis of magnetization 310 when a direction from the stator 50 (armature) toward the magnet unit 42 on the q-axis is forward. Here, the angle θ11 and the angle θ12 are both equal to or less than 90° according to the present embodiment.

The easy axes of magnetization 300 and 310 herein are each based on the following definition. When, in respective portions of the magnets 91 and 92, one easy axis of magnetization is oriented toward a direction A11 and another easy axis of magnetization is oriented toward a direction B11, an absolute value (|cos θ|) of a cosine of an angle θ formed by the direction A11 and the direction B11 is the easy axis of magnetization 300 or the easy axis of magnetization 310.

That is, in each of the magnets 91 and 92, the orientation of the easy axis of magnetization differs between the d-axis side (the portion located closer to the d-axis) and the q-axis side (the portion located closer to the q-axis). On the d-axis side, the orientation of the easy axis of magnetization is an orientation that is close to a direction that is parallel to the d-axis. On the q-axis side, the orientation of the easy axis of magnetization is an orientation that is close to a direction that is orthogonal to the q-axis.

In addition, a magnet magnetic path that has a circular arc shape may be formed based on the orientations of the easy axes of magnetization. Here, in each of the magnets 91 and 92, the easy axis of magnetization on the d-axis side may have an orientation that is parallel to the d-axis and the easy axis of magnetization on the q-axis side may have an orientation that is orthogonal to the q-axis.

In addition, in the magnets 91 and 92, of the circumferential surface of each of the magnets 91 and 92, a stator-side outer surface that is on the stator 50 side (lower side in FIG. 9) and an end surface on the q-axis side in the circumferential direction serve as magnetic flux action surfaces that are inflow/outflow surfaces for the magnetic flux. The magnet magnetic path is formed so as to connect these magnetic flux action surfaces (the stator-side outer surface and the end surface on q-axis side).

Figure 17:
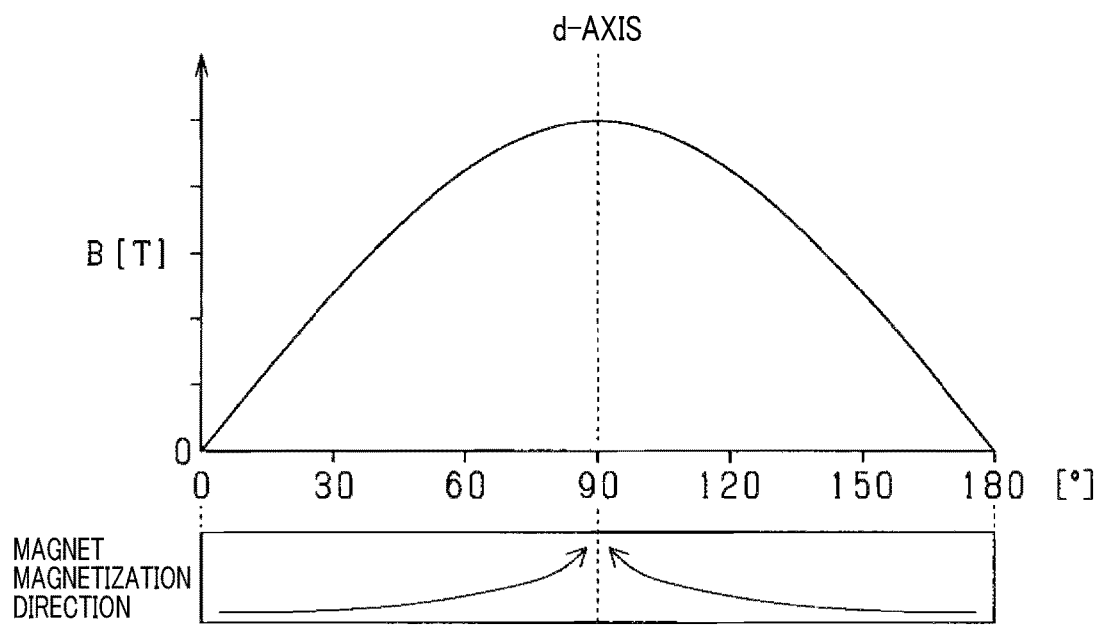
FIG. 17 is a diagram of a relationship between electrical angle and magnetic flux density in a magnet according to an embodiment.

In the magnet unit 42, as a result of the magnets 91 and 92, the magnetic flux flows between adjacent N and S poles in a circular arc shape. Therefore, for example, the magnet magnetic path is longer compared to that of a radial anisotropic magnet. Therefore, as shown in FIG. 17, the magnetic flux density distribution is close to a sine wave. As a result, unlike the magnetic flux density distribution of the radial anisotropic magnet shown as a comparative example in FIG. 18, the magnetic flux can be concentrated toward a center side of the magnetic pole. The torque of the rotating electric machine 10 can be increased.

In addition, a difference in the magnetic flux density distribution is present between the magnet unit 42 according to the present embodiment and a conventional magnet that has a Halbach array. Here, in FIGS. 17 and 18, a horizontal axis indicates electrical angle and a vertical axis indicates magnetic flux density. In addition, in FIGS. 17 and 18, 90° on the horizontal axis indicates the d-axis (that is, the magnetic pole center), and 0° and 180° on the horizontal axis indicates the q-axis.

That is, as a result of the magnets 91 and 92 configured as described above, the magnet magnetic flux on the d-axis is strengthened and changes in the magnetic flux near the q-axis are suppressed. As a result, the magnets 91 and 92 of which the changes in surface magnetic flux from the q-axis to the d-axis are gradual at each magnetic pole can be suitably implemented.

For example, the sine-wave matching ratio of the magnetic flux density distribution may be a value that is equal to or greater than 40%. As a result, compared to a case in which a radial orientation magnet or a parallel orientation magnet of which the sine-wave matching ratio is about 30% is used, the amount of magnetic flux in a waveform center portion can be reliably improved. In addition, when the sine-wave matching ratio is equal to or greater than 60%, the amount of magnetic flux in the waveform center portion can reliably be improved compared to that of a magnetic flux concentration array such as the Halbach array.

Figure 18:
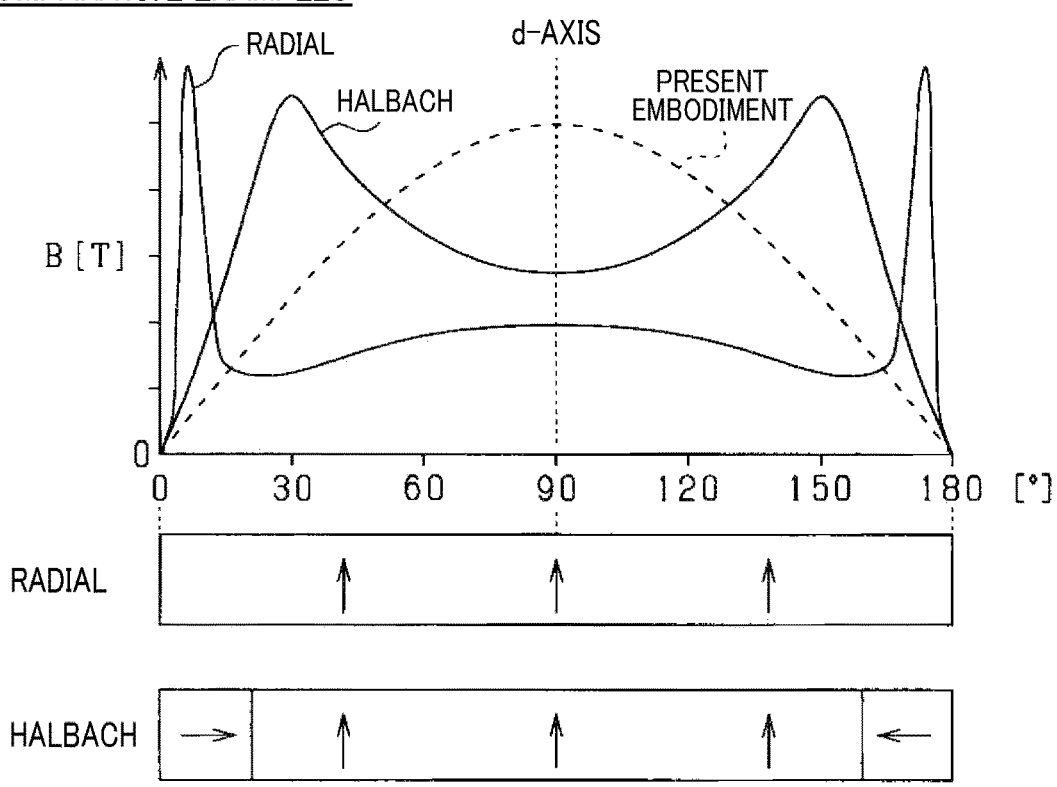
FIG. 18 is a diagram of the relationship between electrical angle and magnetic flux density in a magnet of a comparative example.

In the radial anisotropic magnet shown in FIG. 18, the magnetic density near the q-axis sharply changes. As the change in magnetic flux density becomes sharper, the eddy currents that are generated in the stator winding 51 increase. In addition, the change in magnetic flux on the stator winding 51 side also becomes sharp. In this regard, according to the present embodiment, the magnetic flux density distribution is a magnetic flux waveform that is close to a sine wave. Therefore, near the q-axis, the change in the magnetic flux density is smaller than the change in the magnetic flux density in the radial anisotropic magnet. As a result, the generation of eddy currents can be suppressed.

In the magnet unit 42, the magnetic flux is generated near the d-axis of each of the magnets 91 and 92 (that is, near the magnetic pole center) at an orientation that is orthogonal to the magnetic flux action surface 280 on the stator 50 side. The magnetic flux forms a circular arc shape that recedes from the d-axis as the magnetic flux recedes from the magnetic flux action surface 280 on the stator 50 side.

In addition, the magnetic flux becomes stronger as the magnetic flux becomes more orthogonal to the magnetic flux action surface. In this regard, in the rotating electric machine 10 according to the present embodiment, because the conductor groups 81 are thinner in the radial direction as described above, the center position in the radial direction of the conductor group 81 becomes close to the magnetic flux action surface of the magnet unit 42. A strong magnetic flux can be received in the stator 50 from the rotor 40.

In addition, the stator 50 is provided with the circular cylindrical stator core 52 on the radially inner side of the stator winding 51, that is, on the side opposite the rotor 40 with the stator winding 51 therebetween. Therefore, the magnetic flux that extends from the magnetic flux action surface of each magnet 91 and 92 is drawn to the stator core 52 and circles the stator core 52 using the stator core 52 as a portion of a magnetic path. In this case, the orientation and the path of the magnet magnetic flux can be optimized.

Hereafter, as a manufacturing method for the rotating electric machine 10, assembly steps for the bearing unit 20, the housing 30, the rotor 40, the stator 50, and the inverter unit 60 shown in FIG. 5 will be described. Here, the inverter unit 60 includes the unit base 61 and the electrical components 62 as shown in FIG. 6. Work steps that include the assembly step for the unit base 61 and the electrical components 62 will be described. In the description below, an assembly that is made of the stator 50 and the inverter unit 60 is a first unit. An assembly that is made of the bearing unit 20, the housing 30, and the rotor 40 is a second unit.

The present manufacturing steps are: a first step of mounting the electrical components 62 on the radially inner side of the unit base 61; a second step of manufacturing the first unit by mounting the unit base 61 on the radially inner side of the stator 50; a third step of manufacturing the second unit by inserting the fixing portion 44 of the rotor 40 into the bearing unit 20 that is assembled to the housing 30; a fourth step of mounting the first unit on the radially inner side of the second unit; and a fifth step of fixing the housing 30 and the unit base 61 by fastening. An order of execution of these steps is the first step→second step→third step→fourth step→fifth step.

As a result of the above-described manufacturing method, after the bearing unit 20, the housing 30, the rotor 40, the stator 50, and the inverter unit 60 are assembled as a plurality of assemblies (sub-assemblies), these assemblies are assembled together. Therefore, ease of handling, completion of inspection for each unit, and the like can be implemented. Construction of a logical assembly line can be achieved. Therefore, multi-product production can also be easily accommodated.

At the first step, on at least either of the radially inner side of the unit base 61 and the outer portion in the radial direction of the electrical component 62, a good heat conductor that provides good heat conduction may be applied by coating, bonding, or the like, and in this state, the electrical component 62 may be mounted to the unit base 61. As a result, heat generation from the semiconductor module 66 can be efficiently transmitted to the unit base 61.

At the third step, an insertion operation of the rotor 40 may be performed while a coaxial state is maintained between the housing 30 and the rotor 40. Specifically, for example, a jig that prescribes the position of the outer circumferential surface of the rotor 40 (the outer circumferential surface of the magnet holder 41) or the inner circumferential surface of the rotor 40 (inner circumferential surface of the magnet unit 42) with reference to the inner circumferential surface of the housing 30 is used, and the housing 30 and the rotor 40 are assembled while either of the housing 30 and the rotor 40 is slid along the jig. As a result, heavy components can be assembled without an unbalanced load being applied to the bearing unit 20. Reliability of the bearing unit 20 is improved.

At the fourth step, the assembly of the first unit and the second unit may be performed while the coaxial state between the first unit and the second unit is maintained. Specifically, for example, a jig that prescribes the position of the inner circumferential surface of the unit base 61 with reference to the inner circumferential surface of the fixing portion 44 of the rotor 40 is used, and assembly of the units is performed while either of the first unit and the second unit is slid along the jig. As a result, because the rotor 40 and the stator 50 can be assembled while mutual interference at miniscule gaps between the rotor 40 and the stator 50 is prevented, elimination of defective products attributed to assembly, such as damage to the stator winding 51 and chipping of the permanent magnets, can be achieved.

The order of the above-described steps can also be the second step→third step→fourth step→fifth step→first step. In this case, the delicate electrical components 62 are assembled last. Stress applied to the electrical components 62 during the assembly step can be minimized.

Figure 19:
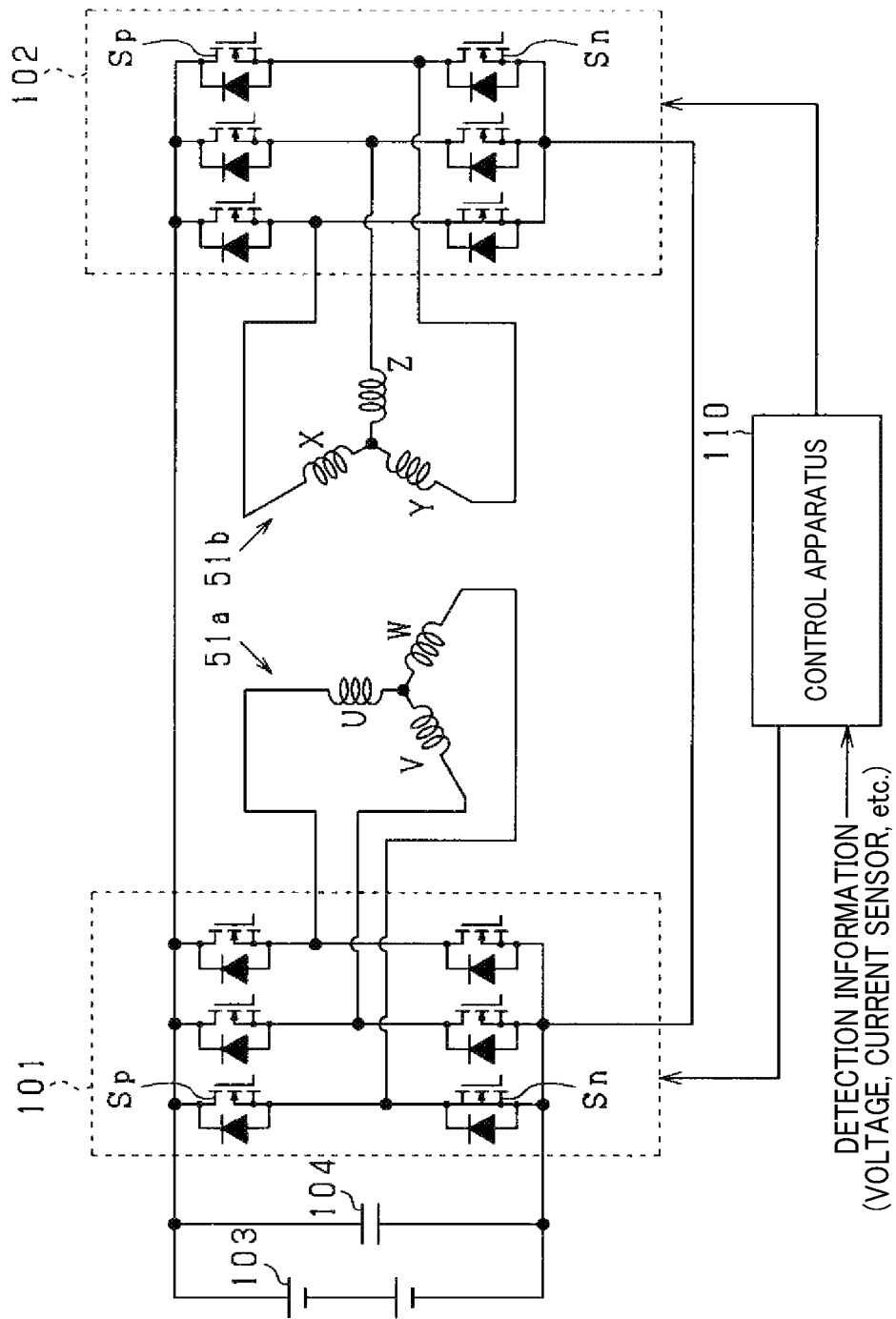
FIG. 19 is an electric circuit diagram of a control system of the rotating electric machine.
Figure 20:
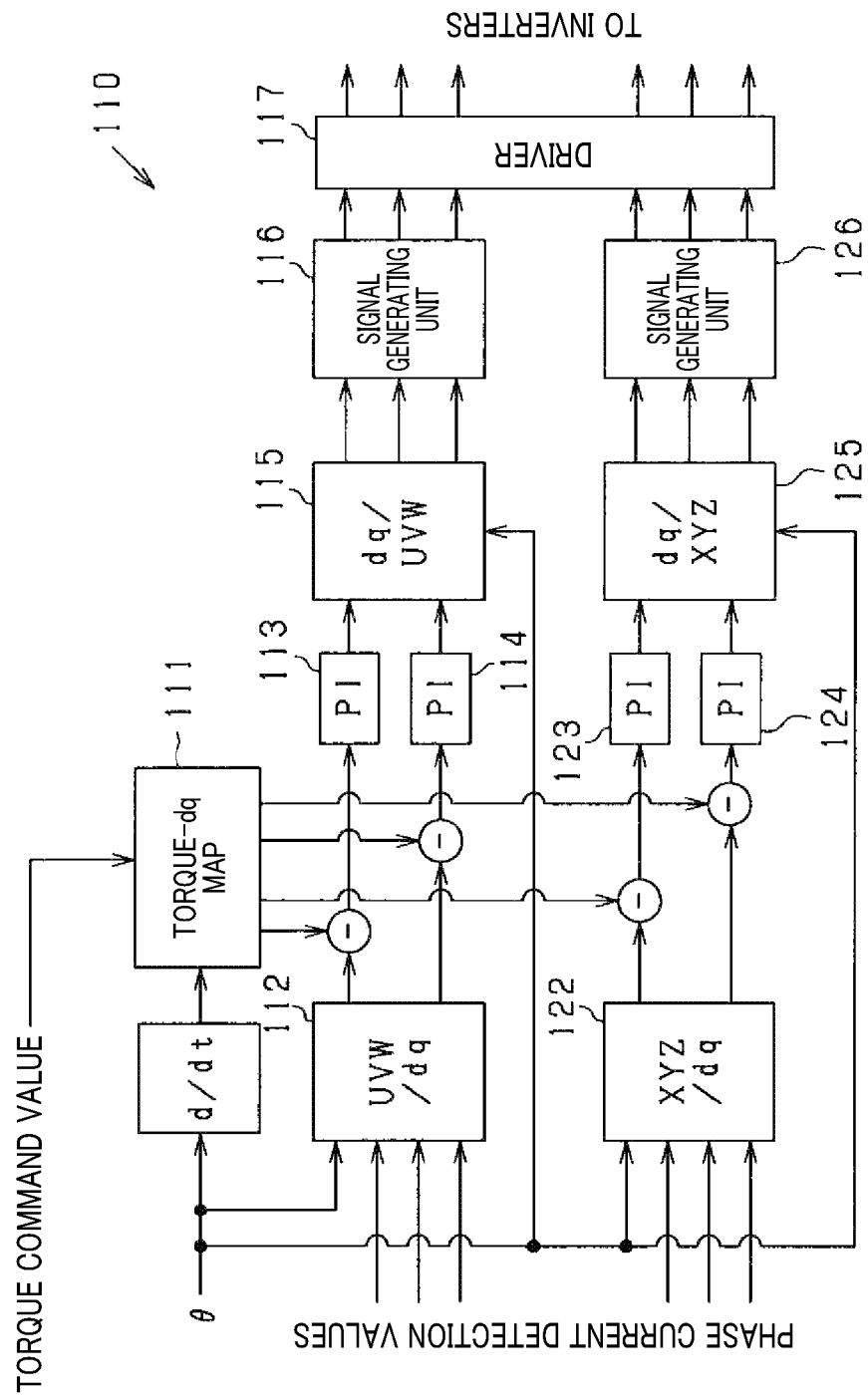
FIG. 20 is a functional block diagram of a current feedback control process performed by a control apparatus.

Next, a configuration of a control system that controls the rotating electric machine 10 will be described. FIG. 19 is an electric circuit diagram of the control system of the rotating electric machine 10. FIG. 20 is a functional block diagram of a control process performed by the control apparatus 110.

In FIG. 19, two sets of three-phase windings 51*a* and 51*b* are shown as the stator winding 51. The three-phase winding 51*a* is made of the U-phase winding, the V-phase winding, and the W-phase winding. The three-phase winding 51*b* is made of the X-phase winding, the Y-phase winding, and the Z-phase winding. For the three-phase windings 51*a* and 51*b*, a first inverter 101 and a second inverter 102 that correspond to power converters are respectively provided.

The inverters 101 and 102 are configured by a full-bridge circuit that has the same number of upper and lower arms as the number of phases of the phase winding. Energization current is adjusted in each phase winding of the stator winding 51 by switching on/off of a switch (semiconductor switching element) that is provided in each arm.

A direct-current power supply 103 and a smoothing capacitor 104 are connected in parallel to the inverters 101 and 102. For example, the direct-current power supply 103 is configured by an assembled battery in which a plurality of unit batteries are connected in series. Here, each switch of the inverters 101 and 102 corresponds to the semiconductor module 66 shown in FIG. 1 and the like. The capacitor 104 corresponds to the capacitor module 68 shown in FIG. 1 and the like.

The control apparatus 110 includes a microcomputer that includes a central processing unit (CPU) and various memories. The control apparatus 110 performs energization control through switching on/off of the switches in the inverters 101 and 102 based on various types of detection information of the rotating electric machine 10, and requests for power-running drive and power generation. The control apparatus 110 corresponds to the control apparatus 77 shown in FIG. 6.

For example, the detection information of the rotating electric machine 10 includes a rotation angle (electrical angle information) of the rotor 40 that is detected by an angle detector such as resolver, a power-supply voltage (inverter input voltage) that is detected by a voltage sensor, and an energization current of each phase that is detected by a current sensor. The control apparatus 110 generates operating signals to operate the switches of the inverters 101 and 102, and outputs the operating signals. Here, for example, the request for power generation is a request for regenerative drive when the rotating electric machine 10 is used as a vehicle power source.

The first inverter 101 includes a serial-connection body of an upper arm switch Sp and a lower arm switch Sn for each of the three phases that are made of the U-phase, the V-phase, and the W-phase. A high-potential-side terminal of the upper arm switch Sp of each phase is connected to a positive electrode terminal of the direct-current power supply 103. A low-potential-side terminal of the lower arm switch Sn of each phase is connected to a negative electrode terminal (ground) of the direct-current power supply 103.

One end of each of the U-phase winding, the V-phase winding, and the W-phase winding is connected to an intermediate connection point between the upper arm switch Sp and the lower arm switch Sn of each phase. These phase windings are connected by a star connection (Y connection). Other ends of the phase windings are connected to one another at a neutral point.

The second inverter 102 has a configuration that is similar to that of the first inverter 101. The second inverter 102 includes a serial-connection body of an upper arm switch Sp and a lower arm switch Sn for each of the three phases that are made of the X-phase, the Y-phase, and the Z-phase. A high-potential-side terminal of the upper arm switch Sp of each phase is connected to the positive electrode terminal of the direct-current power supply 103. A low-potential-side terminal of the lower arm switch Sn of each phase is connected to the negative electrode terminal (ground) of the direct-current power supply 103.

One end of each of the X-phase winding, the Y-phase winding, and the Z-phase winding is connected to an intermediate connection point between the upper arm switch Sp and the lower arm switch Sn of each phase. These phase windings are connected by a star connection (Y connection). Other ends of the phase windings are connected to one another at a neutral point.

FIG. 20 shows a current feedback process for controlling the phase currents of the U-, V-, and W-phases, and a current feedback process for controlling the phase currents of the X-, Y-, and Z-phases. Here, first, the control process on the U-, V-, and W-phase side will be described.

In FIG. 20, a current command value setting unit 111 sets a d-axis current command value and a q-axis current command value based on a power-running torque command value or a power-generation torque command value for the rotating electric machine 10, and an electrical angular velocity $\omega$ obtained by time-differentiating the electrical angle $\theta$, using a torque-dq map.

Here, the current command value setting unit 111 is provided to be shared between the U-, V-, and W-phase side and the X-, Y-, and Z-phase side. Here, for example, the power-generation torque command value is a regeneration-torque command value when the rotating electric machine 10 is used as a vehicle power source.

A dq converting unit 112 converts a current detection value (three-phase current) from a current sensor that is provided for each phase to a d-axis current and a q-axis current that are components of an orthogonal two-dimensional rotating coordinate system in which a field direction (direction of an axis of a magnetic field or field direction) is the d-axis.

A d-axis current feedback control unit 113 calculates a d-axis command voltage as a manipulated variable for performing feedback control of the d-axis current to the d-axis current command value. In addition, a q-axis current feedback control unit 114 calculates a q-axis command voltage as a manipulated variable for performing feedback control of the q-axis current to the q-axis current command value. In the feedback control units 113 and 114, the command voltages are calculated using a proportional-integral (PI) feedback method based on deviation of the d-axis current and the q-axis current from the current command values.

A three-phase converting unit 115 converts the d-axis and q-axis command voltages to U-phase, V-phase, and W-phase command voltages. Here, the above-described units 111 to 115 are a feedback control unit that performs feedback control of a fundamental wave current based on dq transformation. The U-phase, V-phase, and W-phase command voltages are feedback control values.

In addition, an operating signal generating unit 116 generates an operating signal for the first inverter 101 based on the command voltages of the three phases using a known triangular-wave-carrier comparison method. Specifically, the operating signal generating unit 116 generates a switch operating signal (duty signal) for the upper and lower arms of each phase by PWM control based on a comparison of magnitude between a signal in which the command voltages of the three phases are standardized by the power supply voltage and a carrier signal such as a triangular wave signal.

Moreover, a similar configuration is provided on the X-, Y-, and Z-phase side as well. A dq converting unit 122 converts a current detection value (three-phase currents) from a current sensor that is provided for each phase to a d-axis current and a q-axis current that are components of an orthogonal two-dimensional rotating coordinate system in which a field direction is the d-axis.

A d-axis current feedback control unit 123 calculates a d-axis command voltage and a q-axis current feedback control unit 124 calculates a q-axis command voltage. A three-phase converting unit 125 converts the d-axis and q-axis command voltages to X-phase, Y-phase, and Z-phase command voltages.

In addition, an operating signal generating unit 126 generates an operating signal for the second inverter 102 based on the command voltages of the three phases. Specifically, the operating signal generating unit 126 generates a switch operating signal (duty signal) for the upper and lower arms of each phase by PWM control based on a comparison of magnitude between a signal in which the command voltages of the three phases are standardized by the power supply voltage and a carrier signal such as a triangular wave signal.

A driver 117 turns on/off the switches Sp and Sn of each of the three phases in the inverters 101 and 102 based on the switch operating signals generated in the operating signal generating units 116 and 126.

Next, a torque feedback control process will be described. For example, this process is mainly used for the purpose of increasing output and reducing loss in the rotating electric machine 10 under driving conditions in which the output voltages of the inverters 101 and 102 increase, such as in a high-rotation region and a high-output region. The control apparatus 110 selects either of the torque feedback control process and the current feedback control process based on the driving conditions of the rotating electric machine 10, and performs the selected process.

Figure 21:
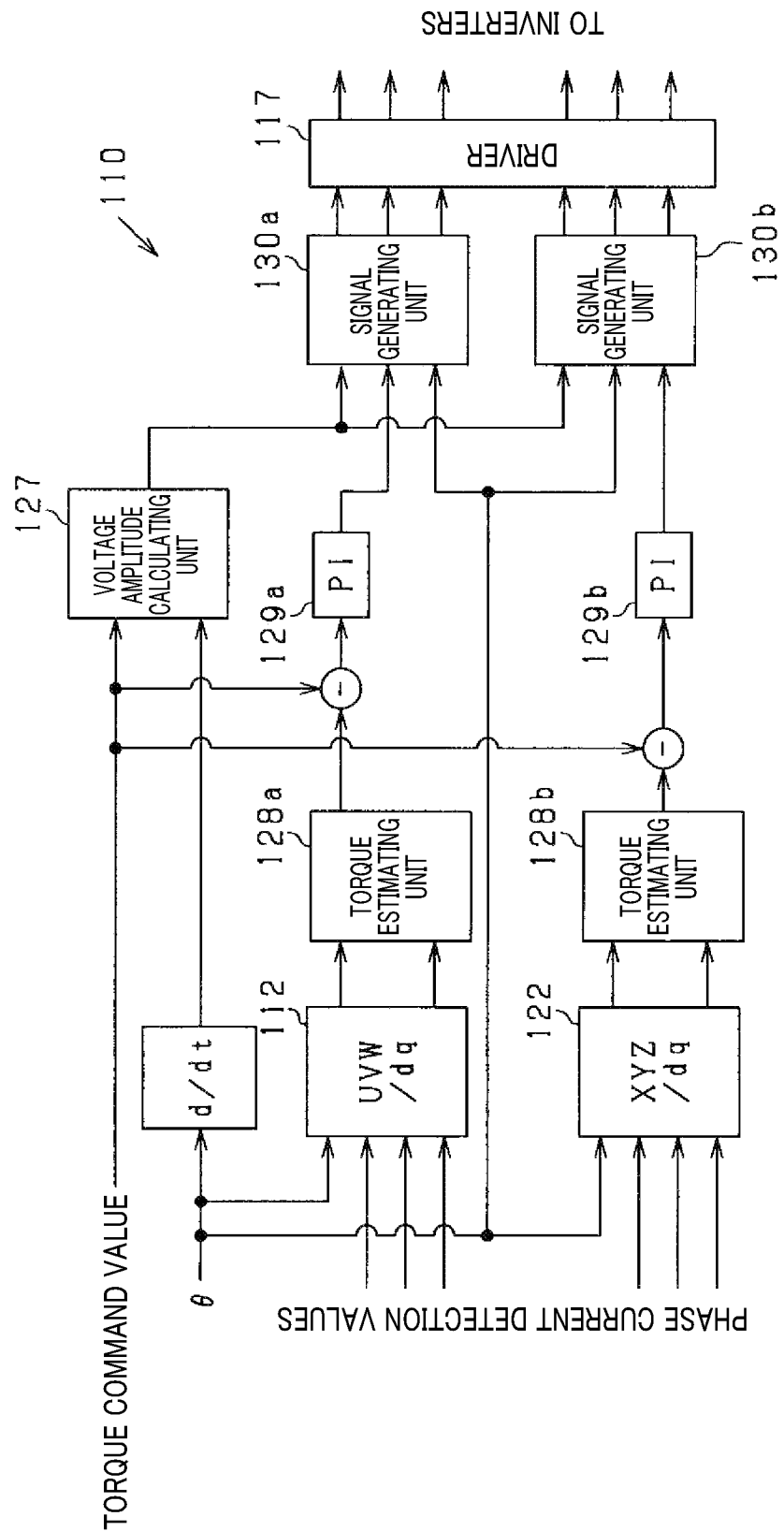
FIG. 21 is a functional block diagram of a torque feedback control process performed by the control apparatus.

FIG. 21 shows the torque feedback control process that corresponds to the U-, V-, and W-phases and the torque feedback control process that corresponds to the X-, Y-, and Z-phases. Here, in FIG. 21, configurations that are identical to those in FIG. 20 are given the same reference numbers. Descriptions thereof are omitted. Here, first, the control process on the U-, V-, and W-phase side will be described.

A voltage amplitude calculating unit 127 calculates a voltage amplitude command that is a command value for a magnitude of a voltage vector, based on the power-running torque command value or the power-generation torque command value for the rotating electric machine 10, and the electrical angular velocity ω obtained by time-differentiating the electrical angle θ.

A torque estimating unit 128a calculates a torque estimation value that corresponds to the U-, V-, and W-phases based on the d-axis current and the q-axis current converted by the dq converting unit 112. Here, the torque estimating unit 128a may calculate the voltage amplitude command based on map information in which the d-axis current, the q-axis current, and the voltage amplitude command are associated.

A torque feedback control unit 129a calculates a voltage phase command that is a command value for a phase of the voltage vector as a manipulated variable for performing feedback control of the torque estimation value to the power-running torque command value or the power-generation torque command value. In the torque feedback control unit 129a, the voltage phase command is calculated using the PI feedback method, based on the deviation of the torque estimation value from the power-running torque command value or the power-generation torque command value.

An operating signal generating unit 130a generates the operating signal of the first inverter 101 based on the voltage amplitude command, the voltage phase command, and the electrical angle θ. Specifically, the operating signal generating unit 130a calculates the command voltages of the three phases based on the voltage amplitude command, the voltage phase command, and the electrical angle θ, and generates the switch operating signal for the upper and lower arms of each phase by PWM control based on a comparison of magnitude between a signal in which the calculated command voltages of the three phases are standardized by the power supply voltage and a carrier signal such as a triangular wave signal.

Here, the operating signal generating unit 130a may generate the switch operating signal based on pulse pattern information that is map information in which the voltage amplitude command, the voltage phase command, the electrical angle θ, and the switch operating signal are associated, the voltage amplitude command, the voltage phase command, and the electrical angle θ.

Moreover, a similar configuration is provided on the X-, Y-, and Z-phase side as well. A torque estimating unit 128b calculates a torque estimation value that corresponds to the X-, Y-, and Z-phases based on the d-axis current and the q-axis current converted by the dq converting unit 122.

A torque feedback control unit 129b calculates a voltage phase command as a manipulated variable for performing feedback control of the torque estimation value to the power-running torque command value or the power-generation torque command value. In the torque feedback control unit 129b, the voltage phase command is calculated using the PI feedback method, based on the deviation of the torque estimation value from the power-running torque command value or the power-generation torque command value.

An operating signal generating unit 130b generates the operating signal of the second inverter 102 based on the voltage amplitude command, the voltage phase command, and the electrical angle θ. Specifically, the operating signal generating unit 130b calculates the command voltages of the three phases based on the voltage amplitude command, the voltage phase command, and the electrical angle θ, and generates the switch operating signal for the upper and lower arms of each phase by PWM control based on a comparison of magnitude between a signal in which the calculated command voltages of the three phases are standardized by the power supply voltage and a carrier signal such as a triangular wave signal. The driver 117 turns on/off the switches Sp and Sn of each of the three phases in the inverters 101 and 102 based on the switch operating signals generated in the operating signal generating units 130a and 130b.

Here, the operating signal generating unit 130b may generate the switch operating signal based on pulse pattern information that is map information in which the voltage amplitude command, the voltage phase command, the electrical angle θ, and the switch operating signal are associated, the voltage amplitude command, the voltage phase command, and the electrical angle θ.

Here, in the rotating electric machine 10, occurrence of electrical corrosion in the bearings 21 and 22 in accompaniment with generation of axial current is a concern. For example, when energization of the stator winding 51 is switched by switching, distortion in the magnetic flux occurs as a result of a minute shift in switching timing (switching imbalance).

Electrical corrosion occurring as a result in the bearings 21 and 22 that support the rotation shaft 11 becomes a concern. The distortion in the magnetic flux occurs based on the inductance in the stator 50. As a result of electromotive voltage in the axial direction that is generated by the distortion in the magnetic flux, insulation breakdown occurs inside the bearings 21 and 22, and electrical corrosion progresses.

In this regard, according to the present embodiment, three measures that are described below are taken as electrical corrosion measures. A first electrical corrosion measure is an electrical corrosion suppression measure that is achieved by inductance being reduced in accompaniment with the stator 50 becoming coreless and the magnet magnetic flux of the magnet unit 42 being smoothed. A second electrical corrosion measure is an electrical corrosion suppression measure that is achieved by the rotation shaft having the cantilevered structure as a result of the bearings 21 and 22. A third electrical corrosion measure is an electrical corrosion suppression measure that is achieved by the circular annular stator winding 51 being molded from a molding material together with the stator core 52. Details of each of these measures will be separately described below.

First, in the first electrical corrosion measure, the stator 50 is configured to be toothless between the conductor groups 81 in the circumferential direction and provided with the sealing member 57 that is made of a non-magnetic material between the conductor groups 81, instead of the teeth (core) (see FIG. 10).

As a result, reduction of inductance in the stator 50 can be achieved. As a result of reduction of inductance in the stator 50 being achieved, even if a shift in switching timing occurs during energization of the stator winding 51, the occurrence of magnetic flux distortion attributed to the shift in switching timing can be suppressed and, furthermore, electrical corrosion suppression in the bearings 21 and 22 can be performed. Here, the inductance on the d-axis may be equal to or less than the inductance on the q-axis.

In addition, the magnets 91 and 92 are configured to be oriented such that, on the d-axis side, the orientation of the easy axis of magnetization is more parallel to the d-axis compared to the q-axis side (see FIG. 9). As a result, the magnetic flux on the d-axis is strengthened. The changes in surface magnetic flux (increase/decrease in magnetic flux) from the q-axis toward the d-axis at each magnetic pole becomes gradual. Therefore, sudden changes in voltage attributed to switching imbalance is suppressed. Moreover, a configuration that contributes to electrical corrosion suppression is achieved.

In the second electrical corrosion measure, in the rotating electric machine 10, the bearings 21 and 22 are arranged so as to be concentrated on one side in the axial direction in relation to a center in the axial direction of the rotor 40 (see FIG. 2). As a result, compared to a configuration in which a plurality of bearings are provided on both sides in the axial direction with a rotor therebetween, the effects of electrical corrosion can be reduced.

That is, the rotor is double-supported by the plurality of bearings. In this configuration, a closed circuit that passes through the rotor, the stator, and each of the bearings (that is, the bearings on both sides in the axial direction sandwiching the rotor) is formed in accompaniment with generation of a high-frequency magnetic flux. Electrical corrosion of the bearings as a result of an axial current becomes a concern. In contrast, the rotor 40 is cantilever-supported by the plurality of bearings 21 and 22. In this configuration, the above-described closed circuit is not formed. Electrical corrosion of the bearings is suppressed.

In addition, the rotating electric machine 10 has the following configuration in relation to the configuration for one-side arrangement of the bearings 21 and 22. In the magnet holder 41, the contact preventing portion that extends in the axial direction and prevents contact with the stator 50 is provided in the intermediate portion 45 that protrudes in the radial direction of the rotor 40 (see FIG. 2). In this case, in cases in which a closed circuit of the axial current is formed by way of the magnet holder 41, a closed-circuit length can be lengthened and circuit resistance thereof can be increased. As a result, suppression of electrical corrosion of the bearings 21 and 22 can be achieved.

The holding member 23 of the bearing unit 20 is fixed to the housing on one side in the axial direction with the rotor 40 therebetween. In addition, on the other side, the housing 30 and the unit base 61 (stator holder) are coupled with each other (see FIG. 2). As a result of the present configuration, the configuration in which the bearings 21 and 22 are arranged in the axial direction of the rotation shaft 11 to be concentrated on one side in the axial direction can be suitably implemented.

In addition, in the present configuration, the unit base 61 is connected to the rotation shaft 11 via the housing 30. Therefore, the unit base 61 can be arranged in a position that is electrically separated from the rotation shaft 11. Here, if an insulation member such as resin is interposed between the unit base 61 and the housing 30, a configuration in which the unit base 61 and the rotation shaft 11 are further electrically separated is achieved. As a result, electrical corrosion of the bearings 21 and 22 can be suitably suppressed.

In the rotating electric machine 10 according to the present embodiment, as a result of the one-sided arrangement of the bearings 21 and 22 and the like, axial voltage that acts on the bearings 21 and 22 is reduced. In addition, a potential difference between the rotor 40 and the stator 50 is reduced. Therefore, even when a conductive grease is not used in the bearings 21 and 22, reduction of the potential difference acting on the bearings 21 and 22 can be achieved. The conductive grease is thought to generate noise because fine particles of carbon and the like are typically included.

In this regard, according to the present embodiment, a non-conductive grease is used in the bearings 21 and 22. Therefore, a disadvantage in which noise is generated in the bearings 21 and 22 can be suppressed. For example, during application to an electric vehicle such as an electric automobile, measures against noise in the rotating electric machine 10 are considered to be required. This configuration can be suitably used as such a measure against noise.

In the third electrical corrosion measure, as a result of the stator winding 51 being molded from a molding material together with the stator core 52, positional shifting of the stator winding 51 in the stator 50 is suppressed (see FIG. 11).

In particular, in the rotating electric machine 10 according to the present embodiment, because an inter-conductor member (teeth) is not provided between the conductor groups 81 in the circumferential direction in the stator winding 51, concern that a positional shift may occur in the stator winding 51 can be considered. However, as a result of the stator winding 51 being molded together with the stator core 52, shifting of the conductor position of the stator winding 51 is suppressed. Therefore, distortion in the magnetic flux as a result of a positional shift in the stator winding 51 and the occurrence of electrical corrosion in the bearings 21 and 22 as a result can be suppressed.

Here, the unit base 61 that serves as a housing member that fixes the stator core 51 is made of a CFRP. Therefore, for example, compared to a case in which the unit base 61 is made of aluminum or the like, electrical discharge to the unit base 61 is suppressed, and furthermore, a suitable electrical corrosion suppression measure can be achieved.

In addition, as an electrical corrosion suppression measure for the bearings 21 and 22, at least either of the outer ring 52 and the inner ring 26 can be made of a ceramic material. Alternatively, a configuration in which an insulation sleeve is provided on the outer side of the outer ring 25 or the like can also be used.

Hereafter, other embodiments will be described mainly focusing on differences with the first embodiment.

Second Embodiment

According to a present embodiment, the polar anisotropic structure of the magnet unit 42 in the rotor 40 is modified. This will be described in detail, below.

Figure 22:
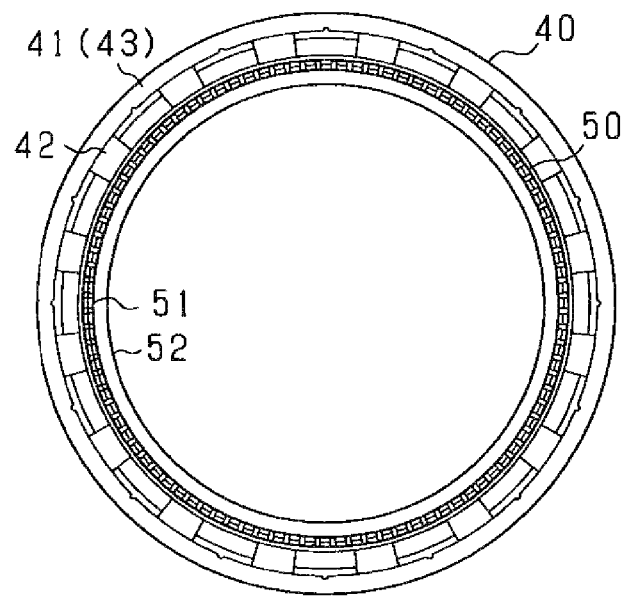
FIG. 22 is a lateral cross-sectional view of a rotor and a stator according to a second embodiment.
Figure 23:
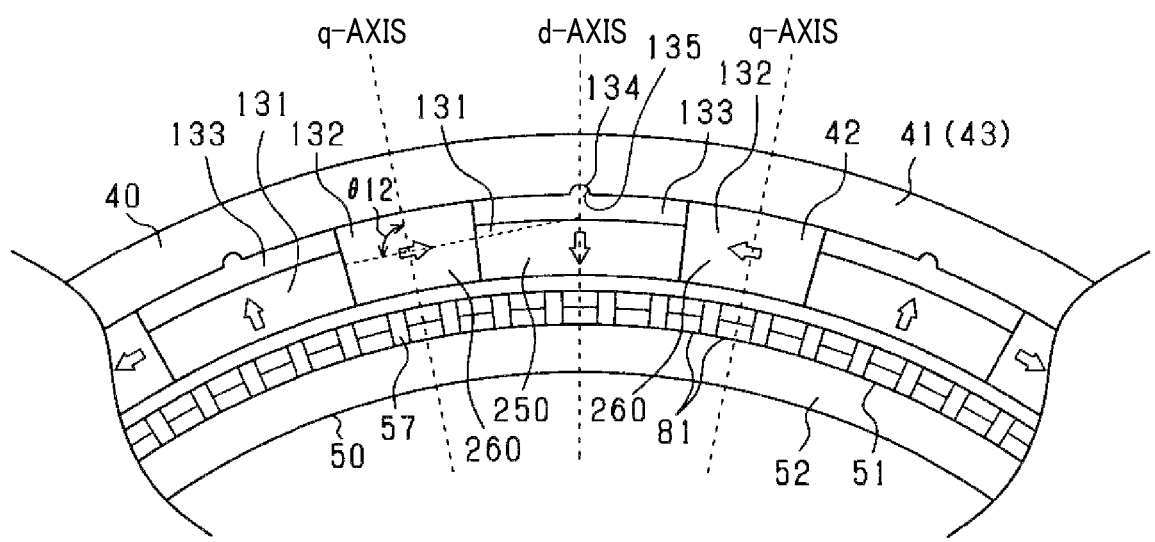
FIG. 23 is a diagram showing a portion of FIG. 22 in an enlarged manner.

As shown in FIGS. 22 and 23, the magnet unit 42 is configured using a magnet array that is referred to as a Halbach array. That is, the magnet unit 42 includes a first magnet 131 of which a magnetization direction (orientation of a magnetization vector) is the radial direction and a second magnet 132 of which the magnetization direction (orientation of a magnetization vector) is the circumferential direction. The first magnets 131 are arranged at predetermined intervals in the circumferential direction. The second magnets 132 are arranged in positions between the first magnets 131 that are adjacent in the circumferential direction. For example, the first magnet 131 and the second magnet 132 are permanent magnets that are made of a rare earth magnet such as a neodymium magnet.

The first magnets 131 are arranged to be separated from each other in the circumferential direction, such that the poles on the side opposing the stator 50 (inner side in the radial direction) are alternately the N pole and the S pole. In addition, the second magnets 132 are arranged, such that the polarities alternate in the circumferential direction, adjacent to each of the first magnets 131.

The circular cylindrical portion 43 that is provided so as to surround these magnets 131 and 132 may be a soft magnetic body core that is made of a soft magnetic material and functions as a back core. Here, in the magnet unit 42 according to the second embodiment as well, the relationship of the easy axes of magnetization in relation to the d-axis and the q-axis in the d-q coordinate system is the same as that according to the above-described first embodiment.

In addition, a magnetic body 133 that is made of a soft magnetic material is arranged on the radially outer side of the first magnet 131, that is, on the side of the circular cylindrical portion 43 of the magnet holder 41. For example, the magnetic body 133 may be made of an electromagnetic steel sheet, or a soft iron or a dust core material. In this case, a length in the circumferential direction of the magnetic body 133 is the same as the length in the circumferential direction of the first magnet 131 (in particular, the length in the circumferential direction of the outer circumferential portion of the first magnet 131).

In addition, a thickness in the radial direction of an integrated body in a state in which the first magnet 131 and the magnetic body 133 are integrated is the same as the thickness in the radial direction of the second magnet 132. In other words, the first magnet 131 has a thickness in the radial direction that is thinner than the second magnet 132 by an amount corresponding to the magnetic body 133.

The magnets 131 and 132 and the magnetic body 133 are mutually fixed by an adhesive or the like. The radially outer side of the first magnet 131 in the magnet unit 42 is a side opposite the stator 50. The magnetic body 133 is provided on the side opposite the stator 50 (counter-stator side), of both sides of the first magnet 131 in the radial direction.

In the outer circumferential portion of the magnetic body 133, a key 134 that serves as a protruding portion that protrudes toward the radially outer side, that is, the circular cylindrical portion 43 side of the magnet holder 41 is formed. In addition, on the inner circumferential surface of the circular cylindrical portion 43, a key groove 135 that serves as a recess portion that houses the key 134 of the magnetic body 133 is formed. The protruding shape of the key 134 and the groove shape of the key groove 135 are identical. In correspondence to the keys 134 that are formed in the magnetic bodies 133, the same number of key grooves 135 as the keys 134 are formed.

As a result of engagement of the keys 134 and the key grooves 135, positional shifting of the first magnet 131, the second magnet 132, and the magnet holder 41 in the circumferential direction (rotation direction) is suppressed. Here, the circular cylinder portion 43 of the magnet holder 41 and the magnetic body 133 in which the key 134 and the key groove 135 are provided may be arbitrary. However, in a manner opposite to the description above, the key groove 135 can be provided in the outer circumferential portion of the magnetic body 133 and the key 134 can be provided in the inner circumferential portion of the circular cylindrical portion 43 of the magnet holder 41.

Here, in the magnet unit 42, as a result of the first magnets 131 and the second magnets 132 being alternately arrayed, the magnetic flux density at the first magnets 131 can be increased. Therefore, in the magnet unit 42, concentration of the magnetic flux on one surface can occur. Magnetic flux reinforcement on the side closer to the stator 50 can be achieved.

In addition, as a result of the magnetic body 133 being arranged on the radially outer side of the first magnet 131, that is, on the counter-stator side, partial magnetic saturation on the radially outer side of the first magnet 131 can be suppressed.

In addition, demagnetization of the first magnet 131 that occurs as a result of magnetic saturation can be suppressed. Consequently, magnetic force of the magnet unit 42 can be increased as a result. The magnet unit 42 according to the present embodiment has, so to speak, a configuration in which a portion of the first magnet 131 in which demagnetization easily occurs is replaced by the magnetic body 133.

FIG. 24 shows, by (a) and (b), diagrams that show a flow of magnetic flux in the magnet unit 42 in detail. FIG. 24 shows, by (a), a case in which a conventional configuration in which the magnetic body 133 is not provided in the magnet unit 42 is used. FIG. 24 shows, by (b), a case in which the configuration according to the present embodiment in which the magnetic body 133 is provided in the magnet unit 42 is used.

Here, FIG. 24 shows, by (a) and (b), the circular cylindrical portion 43 and the magnet unit 42 of the magnet holder 41 in a linearly exploded state. A lower side of the drawings is the stator side and an upper side is the counter-stator side.

In FIG. 24 by (a), the magnetic flux action surface of the first magnet 131 and the side surface of the second magnet 132 are both in contact with the inner circumferential surface of the circular cylindrical portion 43. In addition, the magnetic flux action surface of the second magnet 132 is in contact with the side surface of the first magnet 131.

In this case, a composite magnetic flux is generated in the circular cylindrical portion 43. The composite magnetic flux is made of a magnetic flux F1 that passes through an outer-side path of the second magnet 132 and enters the contact surface with the first magnet 131, and a magnetic flux that is approximately parallel to the circular cylindrical portion 43 and draws the magnetic flux F2 of the second magnet 132. Therefore, magnetic saturation partially occurring near the contact surface of the first magnet 131 and the second magnet 132 in the circular cylindrical portion 43 is a concern.

In this regard, in FIG. 24 by (b), the magnetic body 133 is provided between the magnetic flux action surface of the first magnet 131 and the inner circumferential surface of the circular cylindrical portion 43 on the side opposite the stator 50 of the first magnet 131. Therefore, passage of magnetic flux is allowed by the magnetic body 133. Consequently, magnetic saturation in the circular cylindrical portion 43 can be suppressed. Resistance against demagnetization is improved.

In addition, in FIG. 24 by (b), unlike in FIG. 24 by (a), magnetic flux F2 that promotes magnetic saturation can be eliminated. As a result, permeance of the overall magnetic circuit can be effectively improved. As a result of a configuration such as this, the magnetic circuit characteristics thereof can be maintained even under harsh, high-temperature conditions.

Furthermore, compared to a radial magnet in a conventional SPM rotor, the magnet magnetic path that passes through the interior of the magnet is long. Therefore, magnet permeance increases. Magnetic force increases, and torque can be enhanced. Furthermore, because the magnetic flux is concentrated in the center of the d-axis, the sine-wave matching ratio can be increased. In particular, if a current waveform is a sine wave or a trapezoid wave by PWM control or a 120-degree energization switching integrated circuit (IC) be used, the torque can be more effectively enhanced.

Here, in cases in which the stator core 52 is made of electromagnetic steel sheets, the thickness in the radial direction of the stator core 52 may be ½ of the thickness in the radial direction of the magnet unit 42 or greater than ½. For example, the thickness the radial direction of the stator core 52 in may be equal to or greater than ½ of the thickness direction in the radial direction of the first magnet 131 that is provided in a magnetic pole center of the magnet unit 42.

In addition, the thickness in the radial direction of the stator core 52 may be less than the thickness in the radial direction of the magnet unit 42. In this case, the magnet magnetic flux is about 1 [T] and the saturation magnetic flux density of the stator core 52 is 2 [T]. Therefore, as a result of the thickness in the radial direction of the stator core 52 being equal to or greater than ½ of the thickness direction in the radial direction of the magnet unit 42, magnetic flux leakage toward the inner circumferential side of the stator core 52 can be prevented.

In a magnet that has a Halbach structure or polar anisotropic structure, the magnetic path has a pseudo circular-arc shape. Therefore, the magnetic flux thereof can be increased in proportion to the thickness of the magnet that covers the magnetic flux in the circumferential direction.

In such a configuration, the magnetic flux that flows to the stator core 52 is thought to not exceed the magnetic flux in the circumferential direction. That is, when an iron-based metal that has a saturation magnetic flux density of 2 [T] is used in relation to a magnetic flux of 1 [T] of the magnet, if the thickness of the stator core 52 is equal to or greater than half the magnet thickness, a rotating electric machine that is compact and lightweight can be suitably provided without the occurrence of magnetic saturation.

Here, because a diamagnetic field from the stator 50 acts on the magnet magnetic flux, the magnet magnetic flux typically becomes equal to or less than 0.9 [T]. Therefore, if the stator core has a thickness that is half that of the magnet, magnetic permeability thereof can be suitably kept high.

Modifications in which sections of the above-described configuration are modified will be described below.

First Modification

According to the above-described embodiment, the outer circumferential surface of the stator core 52 is a curved surface with substantially no unevenness, and a plurality of conductor groups 81 are arranged in an array at predetermined intervals on the outer circumferential surface thereof. However, this configuration may be modified. For example, as shown in FIG. 25, the stator core 52 may have a circular annular yoke 141 and a protruding portion 142.

The yoke 141 is provided on the side opposite the rotor 40 (lower side in the drawing), of both sides in the radial direction of the stator winding 51. The protruding portion 142 extends from the yoke 141 so as to protrude toward an area between the linear portions 83 that are adjacent to each other in the circumferential direction.

The protruding portion 142 is provided at predetermined intervals on the radially outer side of the yoke 141, that is, on the rotor 40 side. The conductor groups 81 of the stator winding 51 engage with the protruding portions 142 in the circumferential direction and are arranged in an array in the circumferential direction while using the protruding portions 142 as positioning portions for the conductor groups 81. Here, the protruding portion 142 corresponds to the "inter-conductor member".

Figure 25:
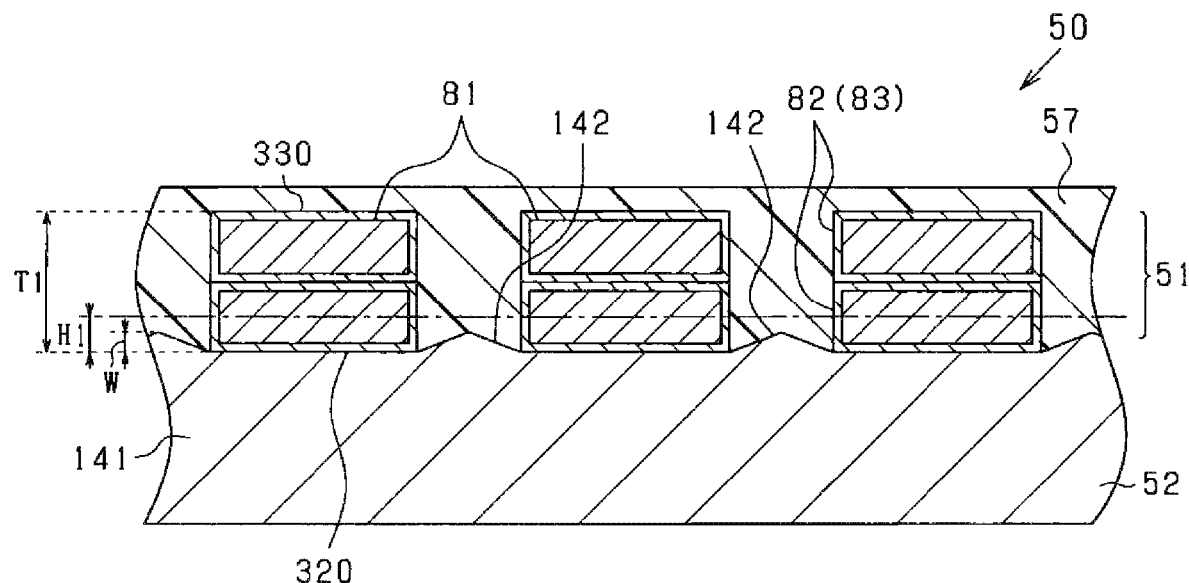
FIG. 25 is a cross-sectional view of the stator in a first modification.

The protruding portion 142 is configured such that a thickness dimension in the radial direction from the yoke 141, or in other words, as shown in FIG. 25, a distance W from an inner side surface 320 of the linear portion 83 that is adjacent to the yoke 141 to a peak of the protruding portion 142 in the radial direction of the yoke 141 is less than ½ of a thickness dimension (H1 in the drawing) in the radial direction of the linear portion 83 that is adjacent to the yoke 141 in the radial direction.

In other words, an area that is three-fourths of a dimension (thickness) T1 of the conductor group 81 (conductive member) in the radial direction of the stator winding 51 (stator core 52) (twice the thickness of the conductor 82, or in other words, a minimum distance between the surface 320 of the conductor group 81 that is in contact with the stator core 52 and a surface 330 of the conductor group 81 that faces the rotor 40) may be occupied by a non-magnetic member (sealing member 57).

As a result of a thickness restriction of the protruding portion 142 such as this, the protruding portions 142 do not function as teeth between the conductor groups 81 (that is, the linear portions 83) that are adjacent to each other in the circumferential direction, and formation of a magnetic path by the teeth does not occur.

The protruding portions 142 may not be provided between all of the conductor groups 81 that are arrayed in the circumferential direction. The protruding portion 142 is merely required to be provided between at least one set of conductor groups 81 that are adjacent in the circumferential direction. For example, the protruding portion 142 may be provided at equal intervals between every predetermined number of conductor groups 81 in the circumferential direction. The shape of the protruding portion 142 may be an arbitrary shape, such as a rectangle or a circular arc.

In addition, the linear portions 83 may be provided in a single layer on the outer circumferential surface of the stator core 52. Therefore, in a broad sense, all that is required is that the thickness dimension in the radial direction of the protruding portion 142 from the yoke 141 be less than ½ of the thickness dimension in the radial direction of the linear portion 83.

Here, when a virtual circle of which a center is the axial center of the rotation shaft 11 and that passes through a center position in the radial direction of the linear portion 83 that is adjacent to the yoke 141 in the radial direction is assumed, the protruding portion 142 may have a shape that protrudes from the yoke 141 within the virtual circle, or in other words, a shape that does not protrude further toward the radially outer side (that is, the rotor 40 side) than the virtual circle.

As a result of the above-described configuration, the thickness dimension in the radial direction of the protruding portion 142 is limited. In addition, the protruding portion 142 does not function as the teeth between the linear portions 83 that are adjacent to each other in the circumferential direction. Therefore, compared to a case in which the teeth are provided between the linear portions 83, the linear portions 83 that are adjacent to each other can be brought closer together. As a result, a cross-sectional area of the conductor body 82a can be increased. Heat generation that occurs in accompaniment with the energization of the stator winding 51 can be reduced.

In this configuration, alleviation of magnetic saturation can be achieved as a result of the teeth not being provided. Energization current to the stator winding 51 can be increased. In this case, increase in the amount of heat generation in accompaniment with the increase in energization current can be suitably addressed. In addition, in the stator winding 51, the turn portion 84 includes the interference prevention portion that is shifted in the radial direction and prevents interference with another turn portion 84. Therefore, differing turn portions 84 can be arranged so as to be separated from each other in the radial direction. As a result, improvement in heat releasability can be achieved even in the turn portions 84. As a result of the foregoing, heat releasing performance in the stator 50 can be optimized.

In addition, if the yoke 141 of the stator core 52 and the magnet unit 42 of the rotor 40 (that is, the magnets 91 and 92) are separated by a predetermined distance or more, the thickness dimension in the radial direction of the protruding portion 142 is not bound to H1 in FIG. 25. Specifically, if the yoke 141 and the magnet unit 42 are separated by 2 mm or more, the thickness dimension in the radial direction of the protruding portion 142 may be equal to or greater than H1 in FIG. 25.

For example, when the thickness dimension in the radial direction of the linear portion 83 exceeds 2 mm and the conductor group 81 is made of two layers of conductors 82 on the inner side and the radially outer side, the protruding portion 142 may be provided in a range up to a halfway position of the linear portion 83 that is not adjacent to the yoke 141, that is, the conductor 82 in the second layer when counted from the yoke 141. In this case, if the thickness dimension in the radial direction of the protruding portion 142 is up to H1×3/2, as a result of the cross-sectional area of the conductors of the conductor group 81 being increased, the above-described effect can appropriately be achieved.

Figure 26:
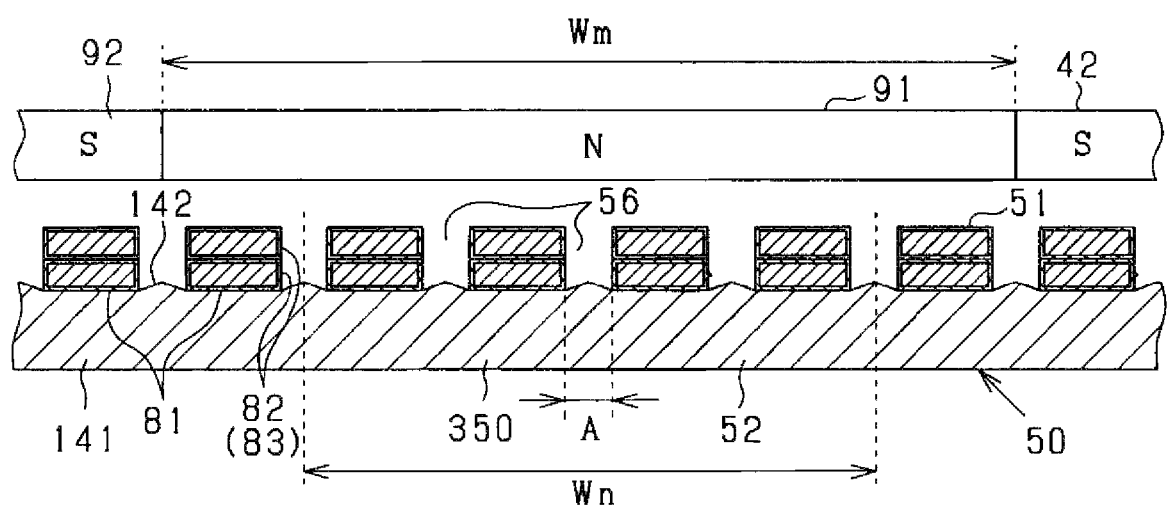
FIG. 26 is a cross-sectional view of the stator in the first modification.

In addition, the stator core 52 may be configured as shown in FIG. 26. Here, in FIG. 26, the sealing member 57 is omitted. However, the sealing member 57 may be provided. In FIG. 26, the magnet unit 42 and the stator core 52 are shown in a linearly exploded state for convenience.

In FIG. 26, the stator 50 includes the protruding portion 142 that serves as the inter-conductor member between the conductors 82 (that is, the linear portions 83) that are adjacent in the circumferential direction. The stator 50 includes a portion 350 that, when the stator winding 51 is energized, magnetically functions together with one of the magnetic poles (the N pole or the S pole) of the magnet unit 42 and extends in the circumferential direction of the stator 50.

When a length of this portion 350 in the circumferential direction of the stator 50 is Wn, when a total width (that is, a total dimension in the circumferential direction of the stator 50) of the protruding portions 142 that are present in this length range Wn is Wt, the saturation magnetic flux density of the protruding portion 142 is Bs, the width dimension in the circumferential direction corresponding to a single pole of the magnet unit 42 is Wm, and the residual magnetic flux density of the magnet unit 42 is Br, the protruding portion 142 is made of a magnetic material that satisfies a relationship expressed by:

$$Wt \times Bs \leq Wm \times Br \qquad (1).$$

Here, the range Wn is set to include a plurality of conductor groups 81 that are adjacent in the circumferential direction and of which an excitation period overlaps. At this time, a center of the gap 56 of the conductor groups 81 is preferably set as a reference (boundary) for setting the range Wn.

For example, in the case of the configuration shown as an example in FIG. 26, the conductor groups 81 up to a fourth in order from the conductor group 81 of which the distance from the magnetic pole center of the N pole in the circumferential direction is the shortest corresponds to the foregoing plurality of conductor groups 81. In addition, the range Wn is set to include the four conductor groups 81. At this time, the ends of the range Wn (starting point and ending point) are the centers of the gaps 56.

In FIG. 26, because a half of the protruding portion 142 each is included in the two ends of the range Wn, the range Wn includes a total of four protruding portions 142. Therefore, when a width of the protruding portion 142 (that is, the dimension of the protruding portion 142 in the circumferential direction of the stator 50, or in other words, the interval between adjacent conductor groups 81) is A, the total width of the protruding portions 142 that are included in the range is Wt=½A+A+A+½A=4A.

Specifically, according to the present embodiment, the three-phase winding of the stator winding 51 is a distributed winding. In the stator winding 51, in relation to a single pole of the magnet unit 42, the number of protrusions 142, that is, the number of gaps 56 that are the areas between the conductor groups 81 is the number of phases×Q. Here, Q refers to the number of conductors 82 that are in contact with the stator core 52 among the conductors 82 of a single phase.

Here, when the conductor group 81 is that in which the conductors 82 are laminated in the radial direction of the rotor 40, Q can also be considered to be the number of conductors 82 on the inner circumferential side of the conductor groups 81 of a single phase. In this case, when the three-phase winding of the stator winding 51 is energized in a predetermined order of the phases, the protruding portions 14 corresponding to two phases are excited within a single pole.

Therefore, when the width dimension in the circumferential direction of the protruding portion 142 (that is, the gap 56) is A, the total width dimension Wt in the circumferential direction of the protruding portions 142 that are excited by the energization of the stator winding 51 within the range of a single pole of the magnet unit 42 is the number of excited phases×Q×A=2×2×A.

In addition, with the total width dimension Wt prescribed in this manner, in the stator core 52, the protruding portion 142 is configured as a magnetic material that satisfies the relationship in (1), above. Here, the total width dimension Wt is also the circumferential-direction dimension of a portion within a single pole in which relative permeability may be greater than 1.

In addition, taking into consideration leeway, the total width dimension Wt may be the width dimension in the circumferential direction of the protruding portions 142 in a single magnetic pole. Specifically, because the number of protruding portions 142 in relation to a single pole of the magnet unit 42 is the number of phases×Q, the width dimension (total width dimension Wt) in the circumferential direction of the protruding portions 412 in a single magnetic pole may be number of phases×Q×A=3×2×A=6A.

Here, the distributed winding referred to herein is that in which a single pole pair of the stator winding 51 is present at a single pole-pair cycle (N pole and S pole) of the magnetic poles. The single pole pair of the stator winding 51 is made of the two linear portions 83 through which currents flow in opposite directions and that are electrically connected by the turn portion 84, and the turn portion 84. If the above-described condition is met, even a short pitch winding is considered an equivalent of a distributed winding of a full pitch winding.

Next, an example of a case of a concentrated winding will be described. The concentrated winding herein is that in which the width of a single pole pair of the magnetic poles and the width of a single pole pair of the stator winding 51 differ. As examples of the concentrated winding, those where the relationship is three conductor groups 81 per a single magnetic pole pair, three conductor groups 81 per two magnetic pole pairs, nine conductor groups 81 per four magnetic pole pairs, and nine conductor groups 81 per five magnetic pole pairs, can be given.

Here, in a case in which the stator winding 51 is a concentrated winding, when the three-phase winding of the stator winding 51 is energized in a predetermined order, the stator winding 51 corresponding to two phases is excited. As a result, the protruding portions 142 corresponding to two phases are excited. Therefore, the width dimension Wt in the circumferential direction of the protruding portions 142 that are excited by the energization of the stator winding 51 within the range of a single pole of the magnet unit 42 is A×2.

In addition, with the width dimension Wt prescribed in this manner, the protruding portion 142 is configured as a magnetic material that satisfies the relationship in (1), above. Here, in the case of the concentrated winding described above, a sum of the widths of the protruding portions 142 that are present in the circumferential direction of the stator 50 in the area surrounded by the conductor groups 81 of the same phase is A. In addition, Wm in the concentrated winding corresponds to a perimeter of a surface of the magnet unit 42 opposing an air gap×number of phases÷number of dispersions of the conductor group 81.

Here, in a magnet of which the BH product is equal to or greater than 20 [MGOe (kJ/m^3)], such as a neodymium magnet, a samarium cobalt magnet, or a ferrite magnet, Bd is just over 1.0 [T]. In iron, Br is just over 2.0 [T]. Therefore, as a high output motor, in the stator 52, the protruding portion 142 is merely required to be made of a magnetic material that satisfies a relationship expressed by Wt<½× Wm.

In addition, when the conductor 82 includes an outer-layer coating 182 as described hereafter, the conductors 82 may be arranged in the circumferential direction of the stator core 52 such that the outer-layer coatings 182 of the conductors 82 are in contact with each other. In this case, Wt can be considered to be 0 or the thickness of the outer-layer coatings 182 of both conductors 82 that are in contact.

In FIG. 25 and FIG. 26, the inter-conductor member (protruding portion 142) that is disproportionately small in relation to the magnet magnetic flux on the rotor 40 side is provided. Here, the rotor 40 is a flat surface-magnet-type rotor that has low inductance and does not have saliency in terms of magnetic resistance. In this configuration, reduction of inductance in the stator 50 can be achieved. The occurrence of magnetic flux distortion attributed to a shift in the switching timing of the stator winding 51 is suppressed. Furthermore, electrical corrosion of the bearings 21 and 22 is suppressed.

Second Modification

Figure 27:
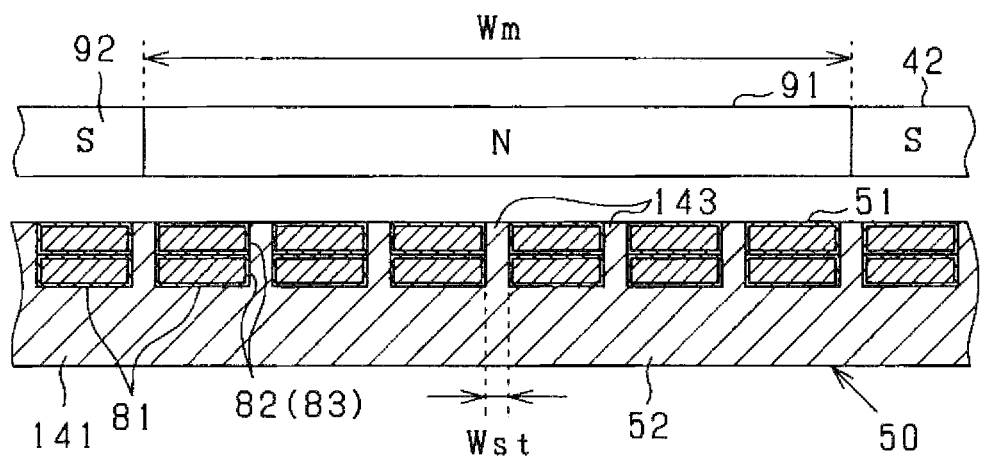
FIG. 27 is a cross-sectional view of the stator in a second modification.

As the stator 50 that uses the inter-conductor member that satisfies the relationship in expression (1), above, the following configuration can also be used. In FIG. 27, a tooth-like portion 143 is provided as the inter-conductor member on the outer circumferential surface side (upper surface side in the drawing) of the stator core 52. The tooth-like portion 143 is provided at a predetermined interval in the circumferential direction so as to protrude from the yoke 141 and has a thickness dimension that is the same as that of the conductor group 81 in the radial direction. A side surface of the tooth-like portion 143 is connected to the conductors 82 of the conductor group 81. However, a gap may be provided between the tooth-like portion 143 and the conductors 82.

The tooth-like portion 143 is restricted regarding the width dimension in the circumferential direction and has a thin pole tooth (stator tooth) that is disproportionally small relative to the amount of magnets. As a result of the configuration, the tooth-like portion 143 is reliably saturated by the magnet magnetic flux at 1.8 T or greater, and inductance can be reduced by reduction in permeance.

Here, in the magnet unit 42, when a surface area for a single pole of the magnetic flux action surface on the stator side is Sm and the residual magnetic flux density of the magnet unit 42 is Br, the magnetic flux on the magnet unit side is, for example, Sm×Br.

In addition, when the surface area on the rotor side of each tooth-like portion 143 is St, the number of conductors 82 for a single phase is m, and the tooth-like portions 143 corresponding to two phases are excited within a single pole by energization of the stator winding 51, the magnetic flux on the stator side is, for example, St×m×2×Bs. In this case, reduction in inductance can be achieved as a result of the dimensions of the tooth-like portion 143 being restricted so as to satisfy a relationship expressed by:

$$St \times m \times 2 \times Bs < Sm \times Br \qquad (2).$$

Here, in a case in which the dimensions of the magnet unit 42 and the tooth-like portion 143 in the axial direction are the same, when the width dimension in the circumferential direction corresponding to a single pole of the magnet unit 42 is Wm and a width dimension in the circumferential direction of the tooth-like portion 143 is Wst, expression (2) is replaced as in expression (3).

$$Wst \times m \times 2 \times Bs < Wm \times Br \qquad (3)$$

More specifically, for example, when an assumption is made that Bs=2T, Br=1T, and m=2, expression (3), above, is a relationship expressed by Wst<Wm/8. In this case, reduction in induction is achieved as a result of the width dimension Wst of the tooth-like portion 143 being made less than ⅛ of the width dimension Wm corresponding to a single pole of the magnet unit 42. Here, when several m is 1, the width dimension Wst of the tooth-like portion 143 may be less than ¼ of the width dimension Wm corresponding to a single pole of the magnet unit 42.

Here, in expression (3), above, Wst×m×2 corresponds to the width dimension in the circumferential direction of the tooth-like portion 143 that is excited by energization of the stator winding 51 within the range of a single pole of the magnet unit 42.

In FIG. 27, in a manner similar to the configurations in FIGS. 25 and 26, described above, the inter-conductor member (tooth-like portion 143) that is disproportionately small in relation to the magnet magnetic flux on the rotor 40 side is provided. In this configuration, reduction of inductance in the stator 50 can be achieved. The occurrence of magnetic flux distortion attributed to a shift in the switching timing of the stator winding 51 is suppressed. Furthermore, electrical corrosion of the bearings 21 and 22 is suppressed.

Third Modification

According to the above-described embodiment, the sealing member 57 that covers the stator winding 51 is provided in a range that includes all of the conductor groups 81 on the outer side of the stator core 52 in the radial direction, that is, a range in which the thickness dimension in the radial direction becomes greater than the thickness dimension in the radial direction of the conductor group 81. However, this configuration may be modified.

Figure 28:
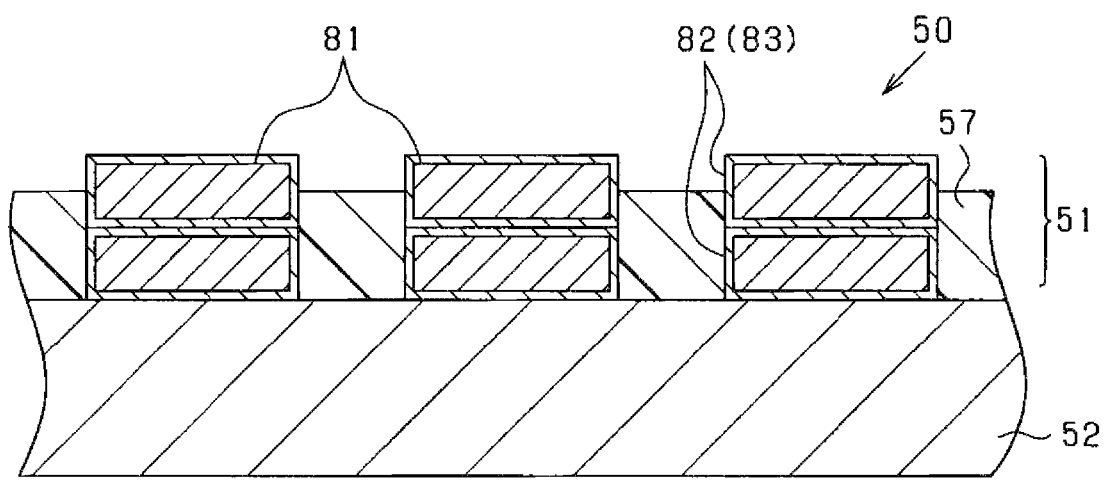
FIG. 28 is a cross-sectional view of the stator in a third modification.

For example, as shown in FIG. 28, the sealing member 57 is configured to be provided such that a portion of the conductor 82 protrudes outward. More specifically, the sealing member 57 is configured to be provided such that a portion of the conductor 82 on the outermost side in the radial direction of the conductor group 81 is exposed toward the radially outer side, that is, the stator 50 side. In this case, the thickness dimension in the radial direction of the sealing member 57 may be the same as the thickness dimension in the radial direction of the conductor group 81 or less than the thickness dimension.

Fourth Modification

Figure 29:
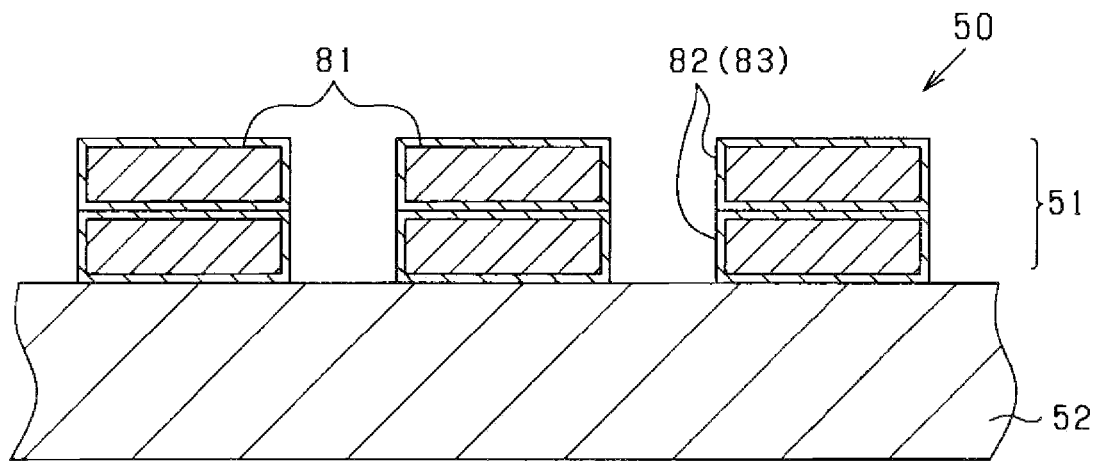
FIG. 29 is a cross-sectional view of the stator in a fourth modification.

As shown in FIG. 29, in the stator 50, the conductor groups 81 may not be sealed by the sealing member 57. That is, the sealing member 57 that covers the stator winding 51 may not be used. In this case, the inter-conductor member is not provided between the conductor groups 81 that are arrayed in the circumferential direction and gaps are formed. In short, the inter-conductor member is not provided between the conductor groups 81 that are arrayed in the circumferential direction. Here, air can be considered a non-magnetic body or an equivalent of a non-magnetic body in which Bs=0. Air may be provided in the gap.

Fifth Modification

When the inter-conductor member in the stator 50 is made of a non-magnetic material, a material other than resin can be used as the non-magnetic material. For example, a metal-based non-magnetic material can be used such as by SUS304 that is an austenitic stainless steel being used.

Sixth Modification

The stator 50 may not include the stator core 52. In this case, the stator 50 is configured by the stator winding 51 shown in FIG. 12. Here, in the stator 50 that does not include the stator core 52, the stator winding 51 may be sealed by a sealing material. Alternatively, the stator 50 may include a circular annular winding holding portion that is made of a non-magnetic material such as synthetic resin, instead of the stator core 52 that is made of a soft magnetic material.

Seventh Modification

According to the above-described first embodiment, the plurality of magnets 91 and 92 that are arrayed in the circumferential direction are used as the magnet unit 42 of the rotor 40. However, this configuration may be modified. An annular magnet that is a circular annular permanent magnet may be used as the magnet unit 42.

Figure 30:
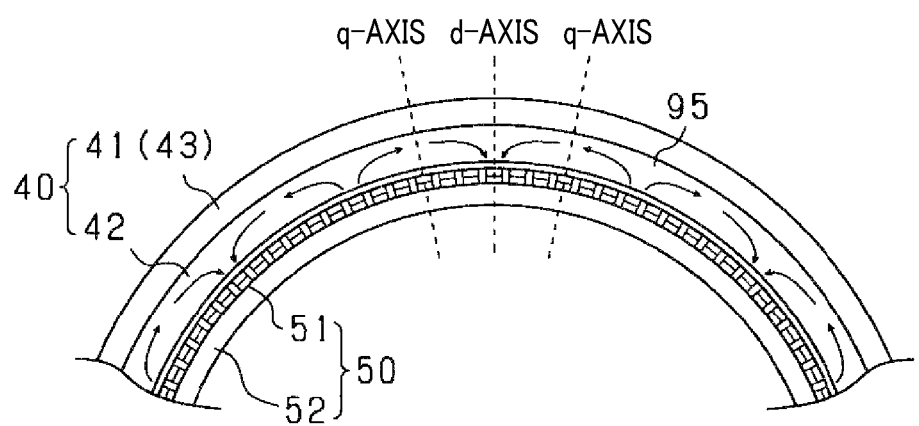
FIG. 30 is a lateral cross-sectional view of the rotor and the stator in a seventh modification.

Specifically, as shown in FIG. 30, an annular magnet 95 is fixed on the radially inner side of the circular cylindrical portion 43 of the magnet holder 41. A plurality of magnetic poles of which the polarities alternate in the circumferential direction are provided in the annular magnet 95. The magnet is integrally formed on both the d-axis and the q-axis. A circular-arc-shaped magnet magnetic path of which a direction of orientation on the d-axis of the magnetic pole is the radial direction and a direction of orientation on the q-axis between magnetic poles is the circumferential direction is formed in the annular magnet 95.

Here, in the annular magnet 95, the orientation is merely required to be such that a circular-arc-shaped magnet magnetic path in which the easy axis of magnetization is parallel to the d-axis or oriented to be close to parallel to the d-axis in a portion located close to the d-axis, and the easy axis of magnetization is orthogonal to the q-axis or oriented to be close to orthogonal to the q-axis in a portion located close to the q-axis is formed.

Eighth Modification

In a present modification, a part of a control method of the control apparatus 110 is modified. In the present modification, sections that differ from the configuration described according to the first embodiment will mainly be described.

Figure 31:
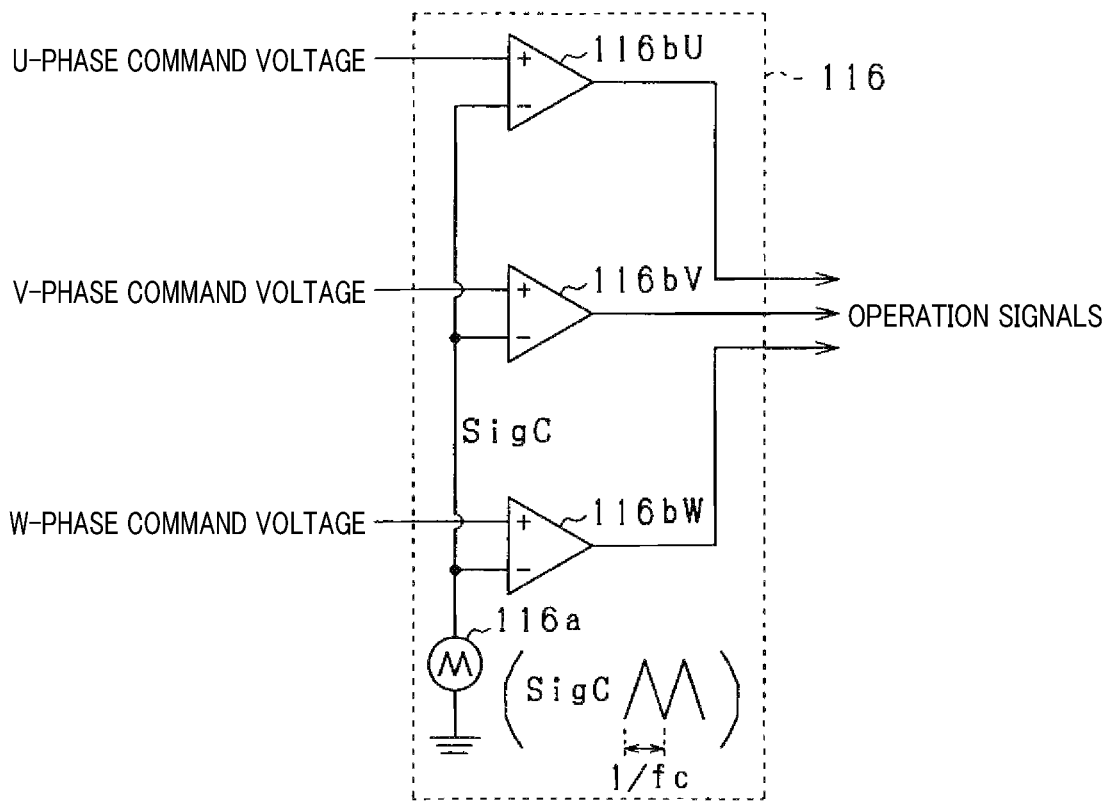
FIG. 31 is a functional block diagram of a part of a process performed by an operating signal generating unit in an eighth modification.

First, processes within the operating signal generating units 116 and 126 shown in FIG. 20, and the operating signal generating unit 130a and 130b shown in FIG. 21 will be described with reference to FIG. 31. Here, the processes in the operating signal generating units 116, 126, 130a, and 130b are basically similar. Therefore, the process in the operating signal generating unit 116 will be described below as an example.

The operating signal generating unit 116 includes a carrier generating unit 116a and U-, V-, and W-phase comparators 116bU, 116bV, and 116bW. According to the present embodiment, the carrier generating unit 116a generates a triangular wave signal as a carrier signal SigC and outputs the carrier signal SigC.

The carrier signal SigC generated by the carrier generating unit 116a, and the U-, V-, and W-phase command voltages calculated by the three-phase converting unit 115 are inputted to the U-, V-, and W-phase comparators 116bU, 116bV, and 116bW. For example, the U-, V-, and W-phase command voltages are waveforms in the shape of sine waves, and phases are shifted from each other by 120° in electrical angle.

The U-, V-, and W-phase comparators 116bU, 116bV, and 116bW generate the operating signals for the switches Sp and Sn of the upper arms and the lower arms of the U-, V-, and W-phases in the first inverter 101 by PWM control based on a comparison of magnitude between the U-, V-, and W-phase command voltages and the carrier signal SigC.

Specifically, the operating signal generating unit 116 generates the operating signals for the switches Sp and Sn of the U-, V-, and W-phases by PWM control based on a comparison of magnitude between signals in which the U-, V-, and W-phase command voltages are standardized by the power supply voltage, and the carrier signal. The driver 117 turns on/off the switches Sp and Sn of the U-, V-, and W-phases in the first inverter 101 based on the operating signals generated by the operating signal generating unit 116.

The control apparatus 110 performs a process for changing the carrier frequency fc of the carrier signal SigC, that is, the switching frequency of the switches Sp and Sn. The carrier frequency fc is set to be high in a low-torque region or a high-rotation region of the rotating electric machine 10, and set to be low in a high-torque region of the rotating electric machine 10. This setting is performed to suppress decrease in controllability of the current that flows to each phase winding.

That is, reduction of inductance in the stator 50 can be achieved in accompaniment with the stator 50 being made coreless. Here, when the inductance decreases, the electrical time constant of the rotating electric machine 10 decreases. As a result, ripples in the current that flows to each phase winding may increase, controllability of the current that flows to the winding may decrease, and current control may diverge.

The effects of this decrease in controllability can become more pronounced when the current that flows to the winding (such as an effective value of the current) is in a low-current region than when the current is included in a high-current region. In response to this issue, in the present modification, the control apparatus 100 changes the carrier frequency fc.

A process for changing the carrier frequency fc will be described with reference to FIG. 32. For example, this process is repeatedly performed at a predetermined control cycle by the control apparatus 110 as a process of the operating signal generating unit 116.

At step S10, the control apparatus 110 determines whether the current that flows to the winding 51a of each phase is in the low-current region. This process is a process for determining that the current torque of the rotating electric machine 10 is in the low-torque region. As a method for determining whether the current is in the low-current region, for example, first and second methods below can be given.

<First Method>

The torque estimation value of the rotating electric machine 10 is calculated based on the d-axis current and the q-axis current that are converted by the dq converting unit 112. In addition, when the calculated torque estimation value is determined to be less than a torque threshold, the current flowing to the winding 51a is determined to be in the low-current region. When the torque estimation value is determined to be equal to or greater than the torque threshold, the current is determined to be in the high-current region. Here, for example, the torque threshold may be set to ½ of a starting torque (also referred to as a locked-rotor torque) of the rotating electric machine 10.

<Second Method>

When the rotation angle of the rotor 40 detected by the angle detector is determined to be equal to or greater than a speed threshold, the current that flows to the winding 51a is determined to be in the low-current region, that is, the high-rotation region. Here, for example, the speed threshold may be set to a rotation speed when a maximum torque of the rotating electric machine 10 is the torque threshold.

When a negative determination is made at step S10, the control apparatus 110 determines that the current is in the high-current region and proceeds to step S11. At step S11, the control apparatus 110 sets the carrier frequency fc as a first frequency fL.

When an affirmative determination is made at step S10, the control apparatus 110 proceeds to step S12 and sets the carrier frequency fc as a second frequency fH that is higher than the first frequency fL.

As a result of the present modification described above, the carrier frequency fc is set to be higher when the current that flows to each phase winding is in the low-current region than when the current is in the high-current region. Therefore, in the low-current region, the switching frequency of the switches Sp and Sn can be increased, and increase in current ripples can be suppressed. As a result, the decrease in current controllability can be suppressed.

Meanwhile, when the current that flows to each phase winding is in the high-current region, the carrier frequency fc is set to be lower than when the current is in the low frequency region. In the high-current region, the amplitude of the current that flows to the winding is greater than that in the low-current region. Therefore, the effect that the increase in current ripples that are attributed to the decrease in inductance has on current controllability is small. Consequently, in the high-current region, the carrier frequency fc can be set to be lower than that in the low-current region. Switching loss in the inverters 101 and 102 can be reduced.

In the present modification, modes described below are possible.

Figure 32:
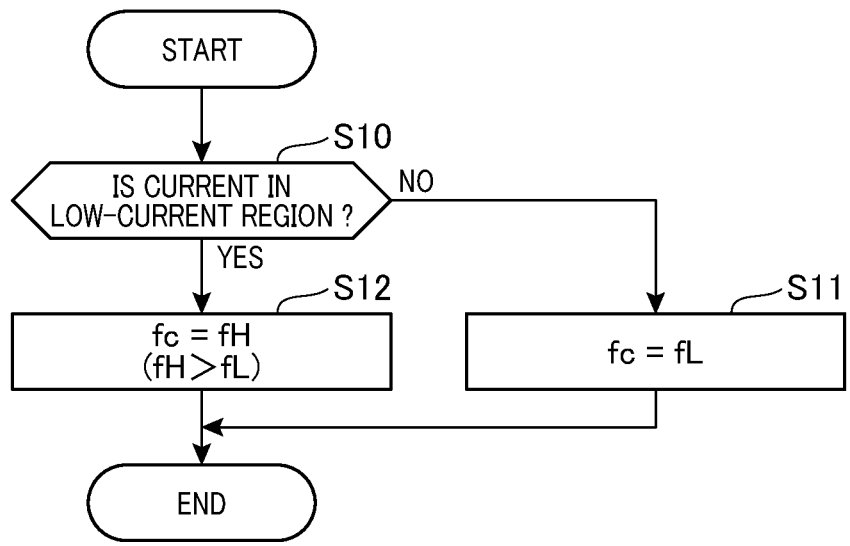
FIG. 32 is a flowchart of the steps in a carrier frequency changing process.

When the carrier frequency fc is set to the first frequency fL, when the affirmative determination is made at step S10 in FIG. 32, the carrier frequency fc may be gradually changed from the first frequency fL toward the second frequency fH.

In addition, when the carrier frequency fc is set to the second frequency fH, when the negative determination is made at step S10, the carrier frequency fc may be gradually changed from the second frequency fH toward the first frequency fL.

The operating signals of the switches may be generated by space vector modulation (SVM) control, instead of PWM control. In this case as well, the changes in the switching frequency described above can be applied.

Ninth Modification

Figure 33:
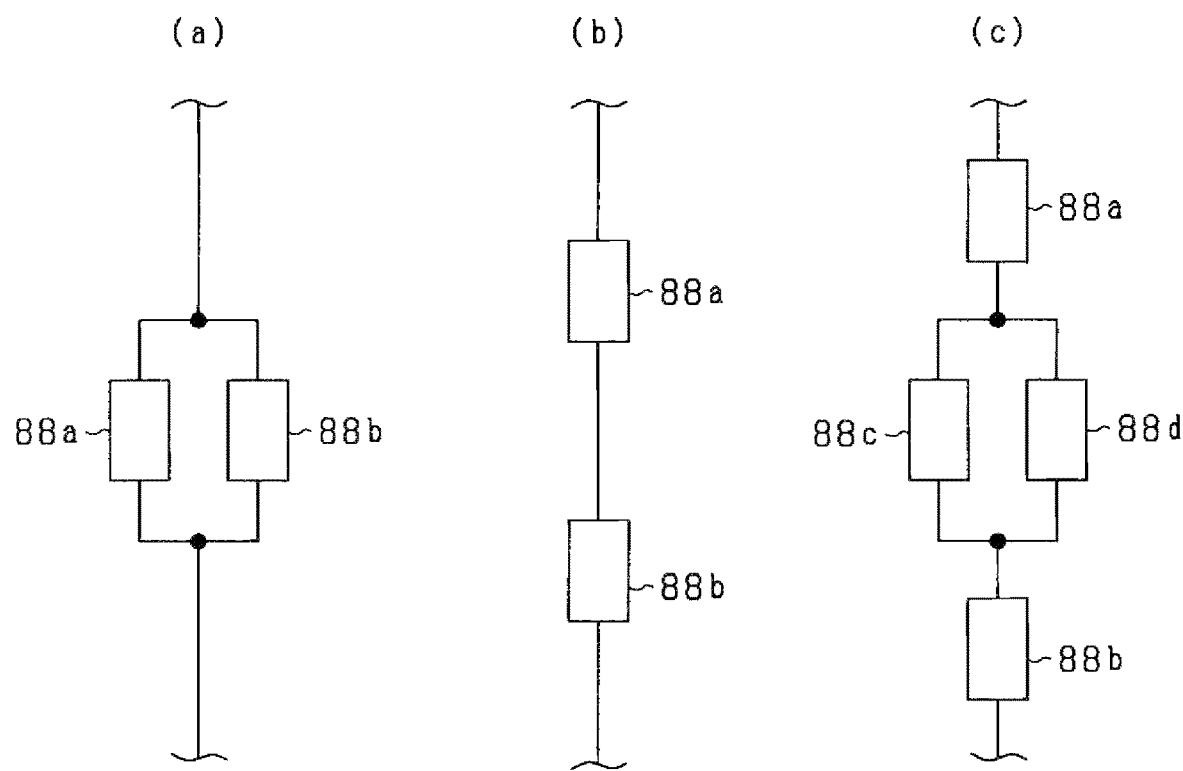
FIG. 33 illustrates, by (a) to (c), diagrams of aspects of connection of conductors configuring a conductor group in a ninth modification.

According to the above-described embodiments, the conductors configuring the conductor group 81 that are in two pairs for each phase are connected in parallel as shown in FIG. 33 by (a). FIG. 33 shows, by (a), a diagram showing an electrical connection between first and second conductors 88a and 88b that are two pairs of conductors. Here, instead of the configuration shown in FIG. 33 by (a), the first and second conductors 88a and 88b may be connected in series as shown in FIG. 33 by (b).

Figure 34:
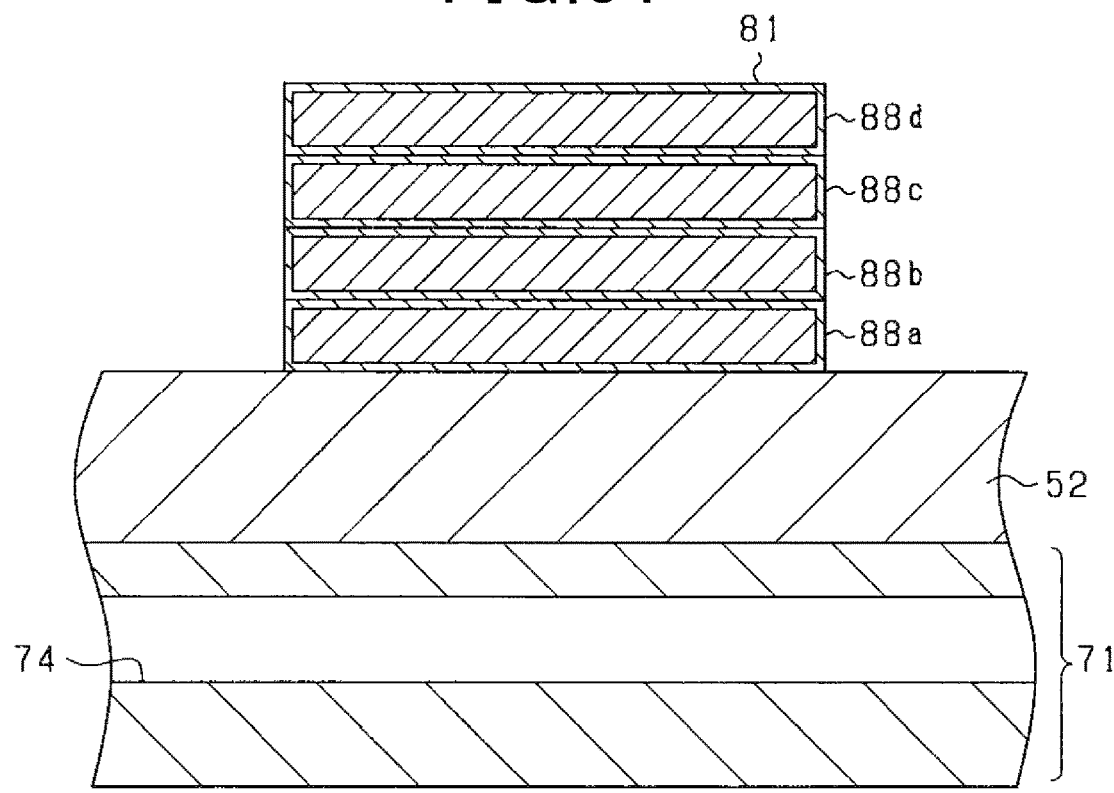
FIG. 34 is a diagram of a configuration in which four pairs of conductors are arranged in a laminated manner in the ninth modification.

In addition, a multiple layer conductor of three pairs or more may be arranged so as to be laminated in the radial direction. FIG. 34 shows a configuration in which first to fourth conductors 88a to 88d that are four pairs of conductors are arranged in a laminated manner. The first to fourth conductors 88a to 88d are arranged so as to be arrayed in the radial direction in order of first, second, third, and fourth conductors 88a, 88b, 88c, and 88d, from the conductor closest to the stator core 52.

Here, as shown in FIG. 33 by (c), the third and fourth conductors 88c and 88d may be connected in parallel. In addition, the first conductor 88a may be connected to one end of this parallel-connection body and the second conductor 88b may be connected to the other end. When the parallel connection is used, current density in the conductors that are connected in parallel can be reduced. Heat generation during energization can be suppressed.

Therefore, a cylindrical stator winding is assembled to a housing (unit base 61) in which the cooling water passage 74 is formed. In this configuration, the first and second conductors 88a and 88b that are not connected in parallel are arranged on the stator core 52 side that is in contact with the unit base 61, and the third and fourth conductors 88c and 88d that are connected in parallel are arranged on the counter-stator core side. As a result, the cooling performance of the conductors 88a to 88d in the multiple-layer conductor structure can be equalized.

Here, the thickness dimension in the radial direction of the conductor group 81 that is made of the first to fourth conductors 88a to 88d is merely required to be less than the width dimension in the circumferential direction corresponding to a single phase within a single magnetic pole.

Tenth Modification

Figure 35:
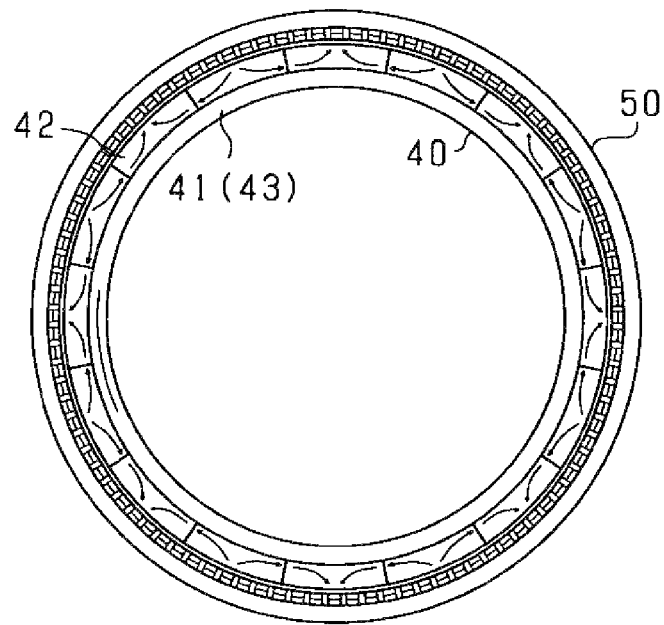
FIG. 35 is a lateral cross-sectional view of an inner-rotor-type rotor and stator in a tenth modification.
Figure 36:
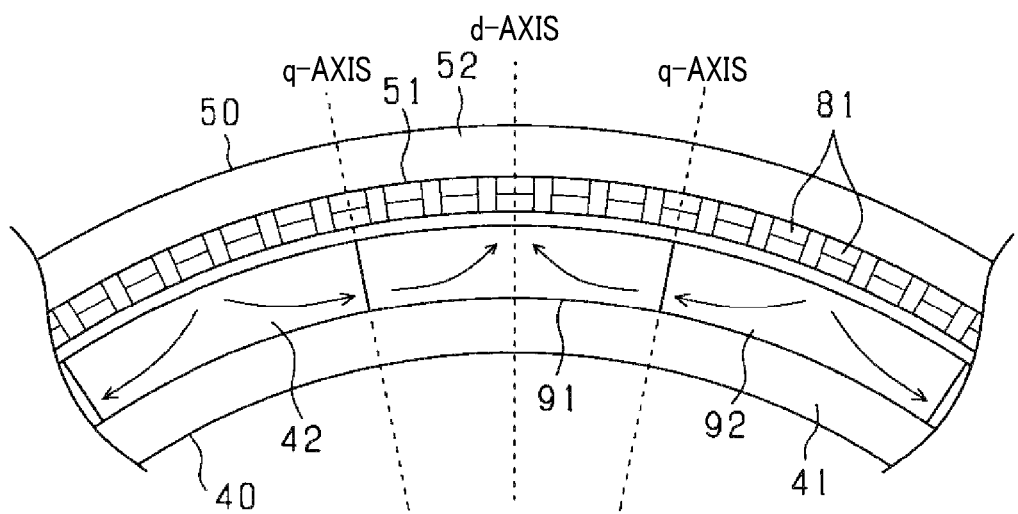
FIG. 36 is a diagram showing a portion of FIG. 35 in an enlarged manner.

The rotating electric machine 10 may have an inner-rotor structure (internally revolving structure). In this case, for example, inside the housing 30, the stator 50 may be provided on the radially outer side and the rotor 40 may be provided on the radially inner side thereof. In addition, the inverter unit 60 may be provided on one side or both sides of both ends in the axial direction of the stator 50 and the rotor 40. FIG. 35 is a lateral cross-sectional view of the rotor 40 and the stator 50. FIG. 36 is a diagram showing a portion of the rotor 40 and the stator 50 in an enlarged manner.

The configuration in FIGS. 35 and 36 in which the inner-rotor structure is presumed is a configuration that is similar to the configuration in FIGS. 8 and 9 in which the outer-rotor structure is presumed, aside from the rotor 40 and the stator 50 being reversed on the inner side and the radially outer side. In brief, the stator 50 includes the stator winding 51 that has a flattened conductor structure and the stator core 52 that does not have teeth. The stator winding 51 is assembled on the radially inner side of the stator core 52. The stator core 52 has any of the configurations below, in a manner similar to that in the case of the outer-rotor structure.

(A) In the stator 50, the inter-conductor member is provided between the conductor portions in the circumferential direction, and when the width dimension in the circumferential direction of the inter-conductor member in a single magnetic pole is Wt, the saturation magnetic density of the inter-conductor member is Bs, the width dimension in the circumferential direction of the magnet unit in a single magnetic pole is Wm, and the residual magnetic flux density of the magnet unit is Br, a magnetic material in which a relationship expressed by Wt×Bs≤Wm×Br is satisfied is used as the inter-conductor member.

(B) In the stator 50, the inter-conductor member is provided between the conductor portions in the circumferential direction, and a non-magnetic material is used as the inter-conductor member.

(C) In the stator 50, the inter-conductor member is not provided between the conductor portions in the circumferential direction.

In addition, the foregoing similarly applies to the magnets 91 and 92 of the magnet unit 42. That is, the magnet unit 42 is configured using the magnets 91 and 92 oriented such that, at locations near to the d-axis that is the magnetic pole center, the orientation of the easy axis of magnetization is parallel to the d-axis compared to at locations near to the q-axis that is the magnetic pole boundary. Details of the magnetization direction and the like of the magnets 91 and 92 are as described above. The annular magnet 95 (see FIG. 30) can be used in the magnet unit 42.

Figure 37:
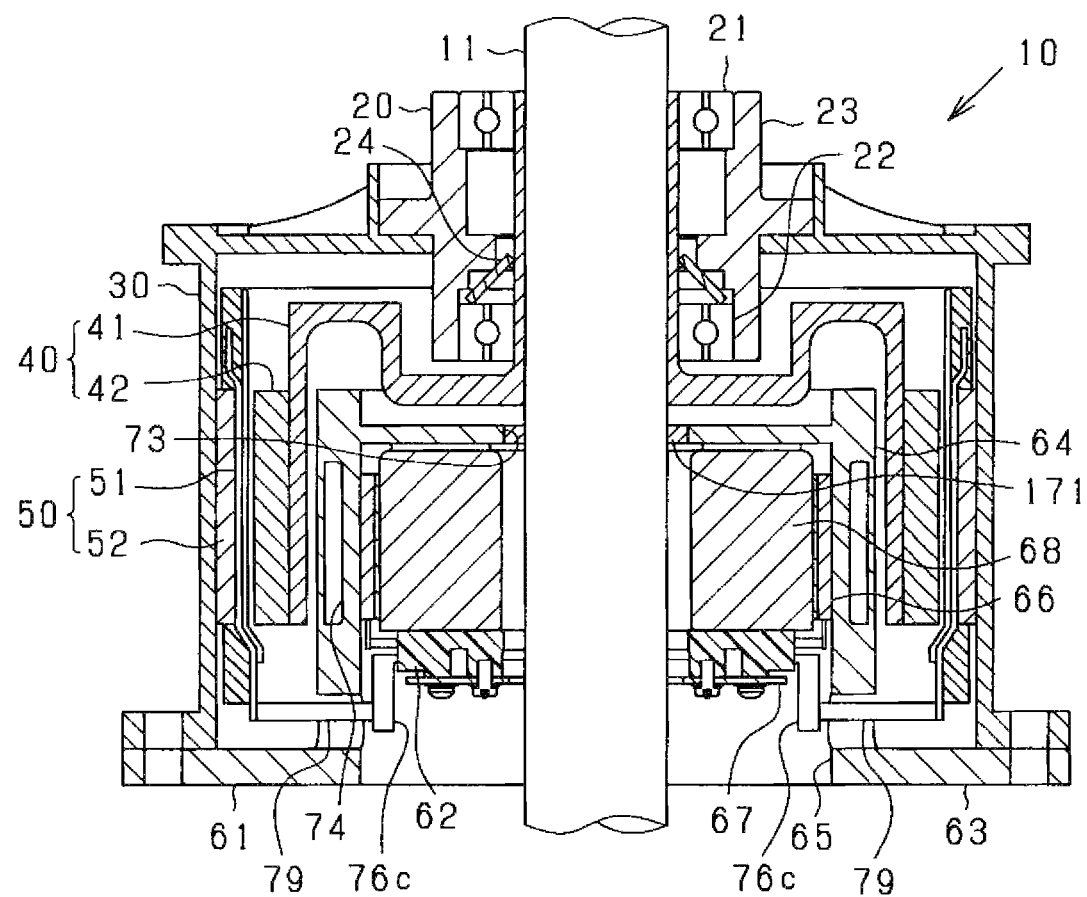
FIG. 37 is a longitudinal cross-sectional view of an inner-rotor-type rotating electric machine.

FIG. 37 is a longitudinal cross-sectional view of the rotating electric machine 10 when the rotating electric machine 10 is the inner-rotor-type. FIG. 37 is a diagram that corresponds to FIG. 2 that has been described earlier. Differences with the configuration in FIG. 2 will briefly be described.

In FIG. 37, the annular stator 50 is fixed on the inner side of the housing 30, and the rotor 40 is rotatably provided on the inner side of the rotor 50 with a predetermined air gap therebetween. In a manner similar to that in FIG. 2, the bearings 21 and 22 are arranged so as to be concentrated on one side in the axial direction in relation to the center in the axial direction of the rotor 40. As a result, the rotor 40 is cantilever-supported. In addition, the inverter unit 60 is provided on the inner side of the magnet holder 41 of the rotor 40.

Figure 38:
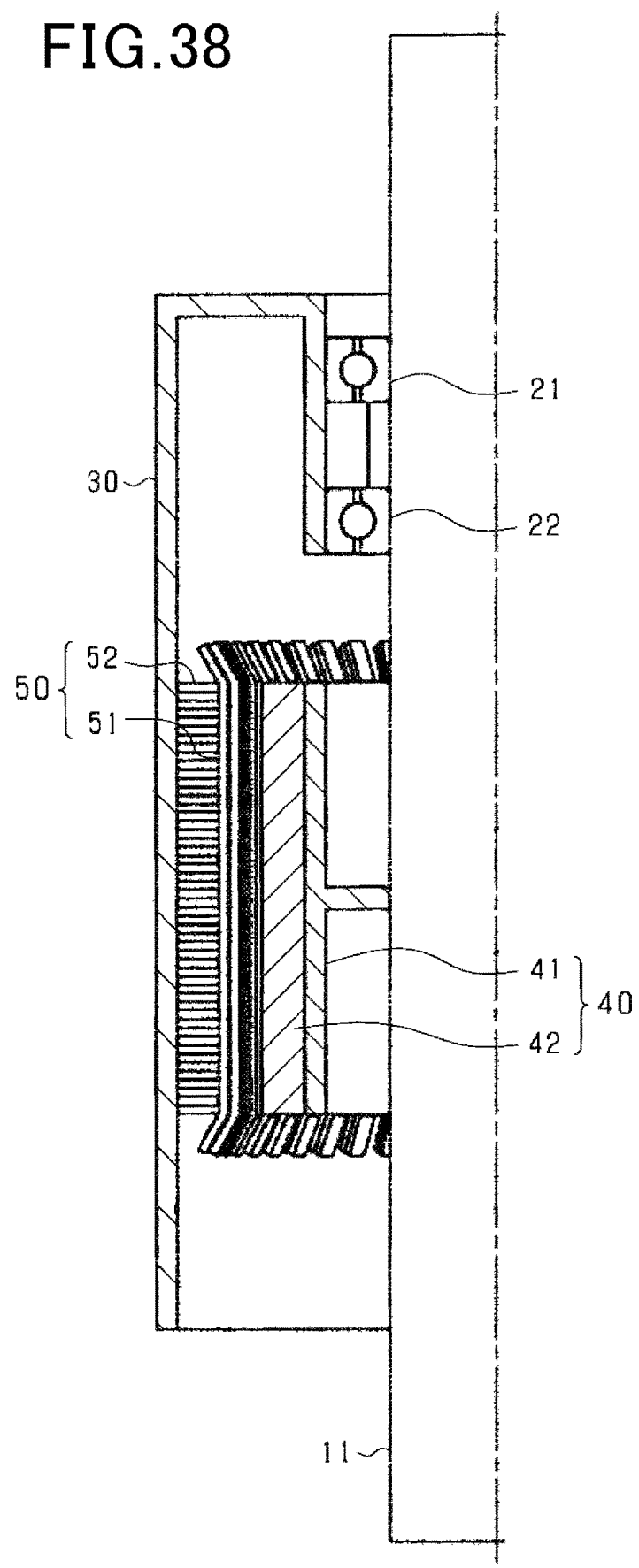
FIG. 38 is a longitudinal cross-sectional view of a schematic configuration of the inner-rotor-type rotating electric machine.

FIG. 38 shows another configuration of the rotating electric machine 10 that has the inner-rotor structure. In FIG. 38, in the housing 30, the rotation shaft 11 is rotatably supported by the bearings 21 and 22, and the rotor 40 is fixed to the rotation shaft 11. In a manner similar to the configuration shown in FIG. 2 and the like, the bearings 21 and 22 are arranged so as to be concentrated on one side in the axial direction in relation to the center in the axial direction of the rotor 40. The rotor 40 includes the magnet holder 41 and the magnet unit 42.

In the rotating electric machine 10 in FIG. 38, as a difference with the rotor 10 in FIG. 37, the inverter unit 60 is not provided on the radially inner side of the rotor 40. The magnet holder 41 is connected to the rotation shaft 11 in a position on the radially inner side of the magnet unit 42. In addition, the stator 50 has the stator winding 51 and the stator core 52, and is attached to the housing 30.

Eleventh Modification

Figure 39:
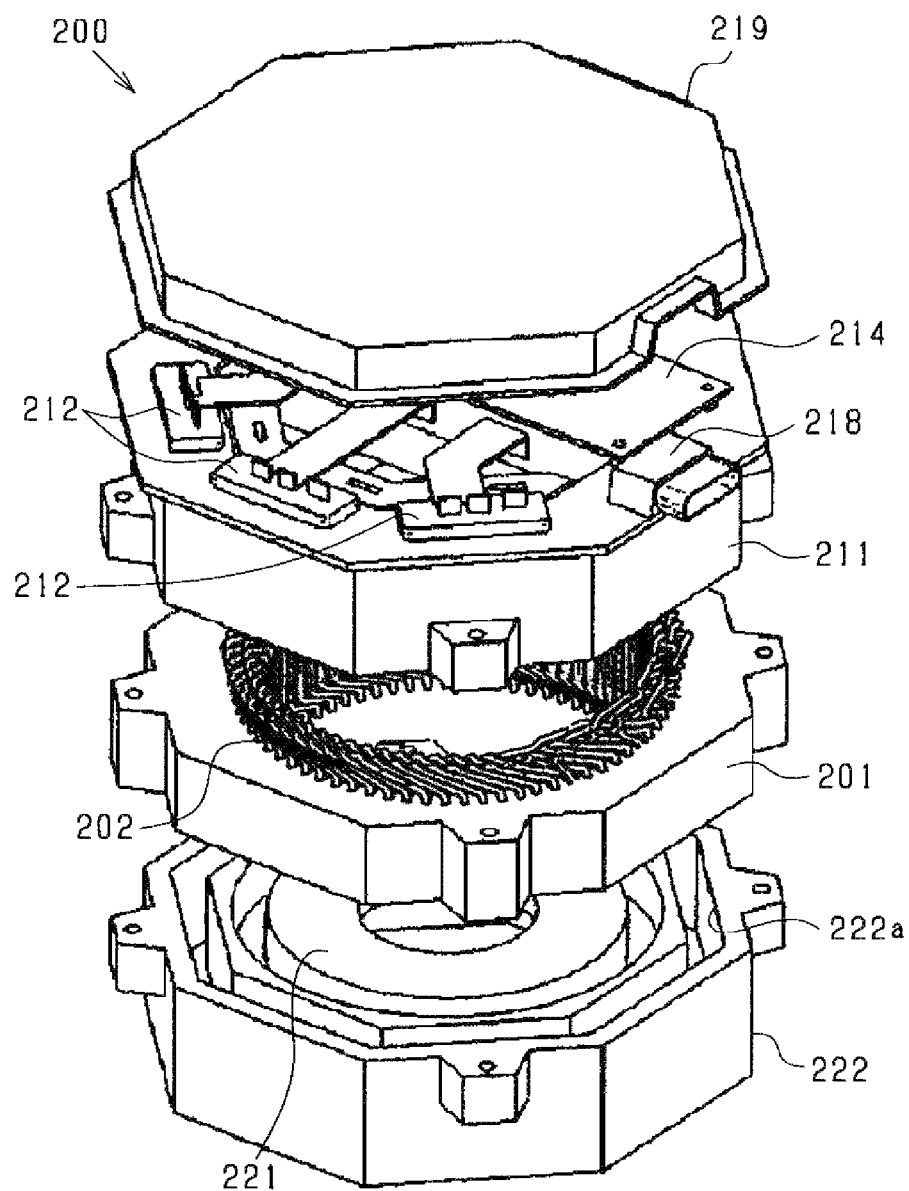
FIG. 39 is a diagram of a configuration of a rotating electric machine having an inner-rotor structure in an eleventh modification.
Figure 40:
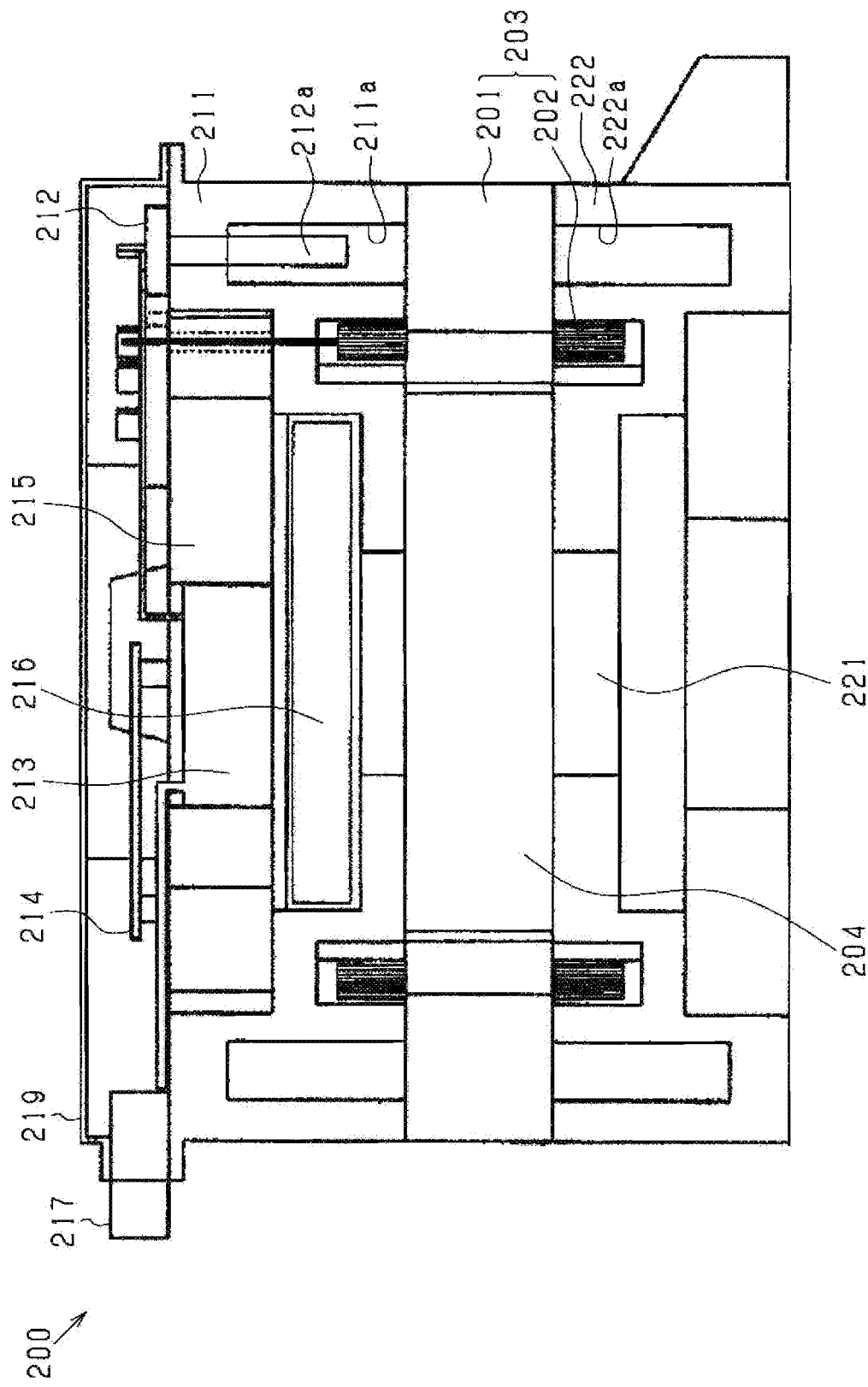
FIG. 40 is a diagram of the configuration of the rotating electric machine having an inner-rotor structure in the eleventh modification.

Another configuration will be described as the rotating electric machine that has an inner-rotor structure. FIG. 39 is an exploded perspective view of a rotating electric machine 200. FIG. 40 is a cross-sectional side view of the rotating electric machine 20. Here, the vertical direction is indicated with reference to the state in FIGS. 39 and 40.

As shown in FIGS. 39 and 40, the rotating electric machine 200 includes a stator 203 and a rotor 204. The stator 203 includes an annular stator core 201 and a multiple-phase stator winding 202. The rotor 204 is arranged on the inner side of the stator core 201 so as to freely rotate. The stator 203 corresponds to an armature. The rotor 204 corresponds to a field element. The stator core 201 is configured by numerous silicon steel sheets being laminated. The stator winding 202 is attached to the stator core 201. Although omitted in the drawings, the rotor 204 includes a rotor core and a plurality of permanent magnets that serve as a magnet unit.

A plurality of magnet insertion holes are provided in the rotor core at an even interval in the circular circumferential direction. The permanent magnets that are magnetized such that the magnetization directions alternately change for each adjacent magnetic pole are mounted in the magnet insertion holes. Here, the permanent magnet of the magnet unit may be that which has the Halbach array as described in FIG. 23 or a configuration similar thereto. Alternatively, the permanent magnet of the magnet unit may be that which has the characteristics of polar anisotropy in which the orientation direction (magnetization direction) extends in a circular arc shape between the d-axis that is the magnetic pole center and the q-axis that is the magnetic pole boundary, such as that described in FIGS. 9 and 30.

Here, the stator 203 may have any of the configurations below.

(A) In the stator 203, the inter-conductor member is provided between the conductor portions in the circumferential direction, and when the width dimension in the circumferential direction of the inter-conductor member in a single magnetic pole is Wt, the saturation magnetic density of the inter-conductor member is Bs, the width dimension in the circumferential direction of the magnet unit in a single magnetic pole is Wm, and the residual magnetic flux density of the magnet unit is Br, a magnetic material in which a relationship expressed by Wt×Bs≤Wm×Br is satisfied is used as the inter-conductor member.

(B) In the stator 203, the inter-conductor member is provided between the conductor portions in the circumferential direction, and a non-magnetic material is used as the inter-conductor member.

(C) In the stator 203, the inter-conductor member is not provided between the conductor portions in the circumferential direction.

In addition, in the rotor 204, the magnet unit is configured using a plurality of magnets that are oriented such that, on the side of the d-axis that is the magnetic pole center, the orientation of the easy axis of magnetization is parallel to the d-axis compared to the side of the q-axis that is the magnetic pole boundary.

An annular inverter case 211 is provided on one end side in the axial direction of the rotating electric machine 200. The inverter case 211 is arranged such that a case lower surface is in contact with an upper surface of the stator core 201. A plurality of power modules 212 that configure an inverter circuit, a smoothing capacitor 213 that suppresses ripples in the voltage and the current that occur as a result of the switching operation of the semiconductor switching elements, the control board 214 that has a control unit, a current sensor 215 that detects a phase current, and a resolver stator 216 that is a rotation frequency sensor for the rotor 204 are provided inside the inverter case 211. The power modules 212 include IGBTs that are the semiconductor switching elements and diodes.

A power connector 217 and a signal connector 218 are provided on a peripheral edge of the inverter case 211. The power connector 217 is connected to a direct-current circuit of a battery that is mounted in the vehicle. The signal connector 218 is used to receive and transmit various signals between the rotating electric machine 200 side and a vehicle-side control apparatus. The inverter case 211 is covered by a top cover 219. Direct-current power from the onboard battery is inputted via the power connector 217, converted by the switching of the power modules 212, and supplied to the stator winding 202 of each phase.

A bearing unit 221 that rotatably holds the rotation shaft of the rotor 204 and an annular rear case 222 that houses the bearing unit 221 are provided on a side opposite the inverter case 211, of both sides in the axial direction of the stator core 201. For example, the bearing unit 211 includes two sets of bearings, and is arranged so as to be concentrated on one side in the axial direction in relation to the center in the axial direction of the rotor 204. However, the plurality of bearings in the bearing unit 211 may be provided so as to be dispersed on both sides in the axial direction of the stator core 201, and the rotation shaft may be double-supported by the bearings. The rotating electric machine 200 is connected to the vehicle side by the rear case 222 being fixed to an attachment portion of a gear case or a transmission of the vehicle by bolt-fastening.

A cooling passage 211a for allowing a coolant to flow is formed inside the inverter case 211. The cooling passage 211a is formed by a space that is provided in an annular recessing shape from a lower surface of the inverter case 211 being sealed by the upper surface of the stator core 201. The cooling passage 211a is formed so as to surround the coil end of the stator winding 202. A module case 212a for the power modules 212 is inserted inside the cooling passage 211a. A cooling passage 222a is also formed in the rear case 222 so as to surround the coil end of the stator winding 202. The cooling passage 222a is formed by a space that is provided in an annular recessing shape from an upper surface of the rear case 222 being sealed by a lower surface of the stator core 201.

Twelfth Modification

Figure 41:
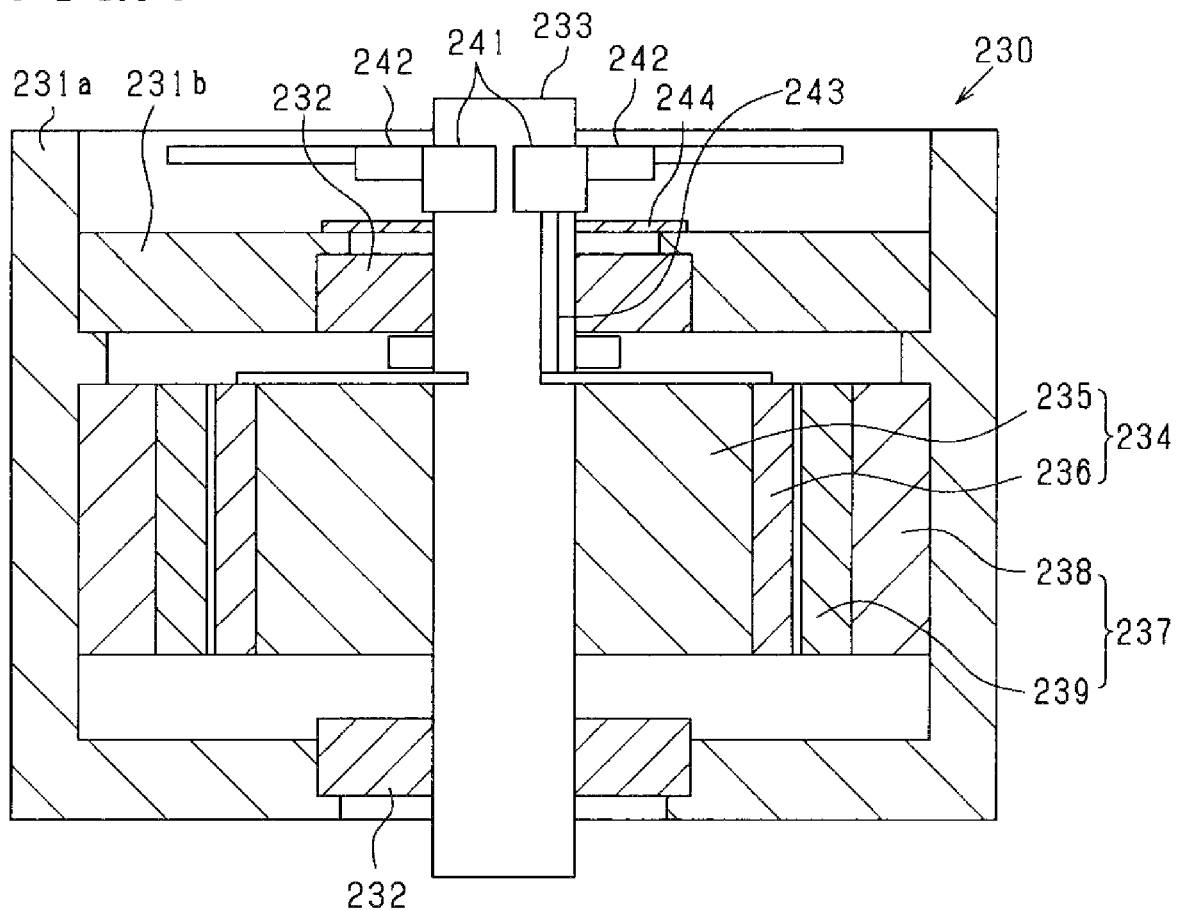
FIG. 41 is a diagram of a configuration of a revolving-armature-type rotating electric machine in a twelfth modification.

Up to this point, configurations that are implemented in a rotation-field-type rotating electric machine have been described. However, the configuration can be modified and implemented in a rotating-armature-type rotating electric machine. FIG. 41 shows a configuration of a rotating-armature-type rotating electric machine 230.

In the rotating electric machine 230 in FIG. 41, a bearing 232 is fixed to each of housings 231a and 231b, and a rotation shaft 233 is supported by the bearing 232 so as to freely rotate. For example, the bearing 232 is an oil-retaining bearing that includes a porous metal permeated with oil. A rotor 234 that serves as an armature is fixed to the rotation shaft 233. The rotor 234 includes a rotor core 235 and a multiple-phase rotor winding 236 that is fixed to an outer circumferential portion of the rotor core 235. In the rotor 234, the rotor core 235 has a slot-less structure. The rotor winding 236 has a flattened conductor structure. That is, the rotor winding 236 has a flattened structure in which an area for each phase is longer in the circumferential direction than the radial direction.

In addition, a stator 237 that serves as a field element is provided on the radially outer side of the rotor 234. The stator 237 includes the stator core 238 that is fixed to the housing 231a and a magnet unit 239 that is fixed to the inner circumferential side of the stator core 238. The magnet unit 239 is configured to include a plurality of magnetic poles of which the polarities alternate in the circumferential direction.

In a manner similar to the magnet unit 42 and the like described earlier, the magnet unit 239 is configured to be oriented such that, on the side of the d-axis that is the magnetic pole center, the orientation of the easy axis of magnetization is parallel to the d-axis compared to the side of the q-axis that is the magnetic pole boundary. The magnet unit 239 includes a sintered neodymium magnet that is oriented. The intrinsic coercive force thereof is equal to or greater than 400 [kA/m], and the remnant flux density Br is equal to or greater than 1.0 [T].

The rotating electric machine 230 of the present example is a two-pole, three-coil brushed coreless motor. The rotor winding 236 is divided into three, and the magnet unit 239 has two poles. The number of poles and the number of coils of the brushed motor varies, such as 2:3, 4:10, or 4:21, depending on an intended use thereof.

A commutator 241 is fixed to the rotation shaft 233, and a plurality of brushes 242 are arranged on the radially outer side thereof. The commutator 241 is electrically connected to the rotor winding 236 via a conductor 243 that is embedded in the rotation shaft 233. A direct-current current flows in and out of the rotor winding 236 through the commutator 241, the brushes 242, and the conductor 243. The commutator 241 is configured to be divided in the circumferential direction as appropriate, based on the number of phases of the rotor winding 236. Here, the brushes 242 may be directly connected to a direct-current power supply such as a storage battery by electrical wiring, or may be connected to the direct-current power supply through a terminal block or the like.

A resin washer 244 that serves as a sealing member is provided in the rotation shaft 233, between the bearing 232 and the commutator 241. As a result of the resin washer 244, oil that seeps out from the bearing 232 that is an oil-retaining bearing is suppressed from flowing out toward the commutator 241 side.

Thirteenth Modification

In the stator winding 51 of the rotating electric machine 10, the conductors 82 may have a plurality of insulation coatings inside and outside thereof. For example, the conductor 82 may be configured by a plurality of conductors (wires) that have insulation coatings being bundled and the bundle being covered by an outer-layer coating.

In this case, the insulation coatings of the wires configure the insulation coatings on the inner side. The outer-layer coating configures the insulation coating on the outer side. In addition, in particular, insulation performance of the insulation coating on the outer side, among the plurality of insulation coatings of the conductor 82, may be made higher than the insulation performance of the insulation coatings on the inner side. Specifically, a thickness of the insulation coating on the outer side is made thicker than a thickness of the insulation coatings on the inner side.

For example, the thickness of the insulation coating on the outer side may be 100 µm and the thickness of the insulation coating on the inner side may be 40 µm. Alternatively, a material that has a lower dielectric constant than the insulation coating on the inner side may be used as the insulation coating on the outer side. All that is required is that at least either of the foregoing is applied. Here, the wire may be configured as a bundle of a plurality of conductive materials.

As a result of insulation on the outermost layer of the conductor 82 being strengthened as described above, the conductor 82 becomes suitable for use in a high-voltage vehicle system. In addition, appropriate driving of the rotating electric machine 10 can be achieved even in elevated regions where air pressure is low.

Fourteenth Modification

In the conductor 82 that includes the plurality of insulation coatings inside and outside, at least either of a rate of linear expansion (coefficient of linear expansion) and bonding strength may differ between the insulation coating on the outer side and the insulation coating on the inner side. The configuration of the conductor 82 of the present modification is shown in FIG. 42.

Figure 42:
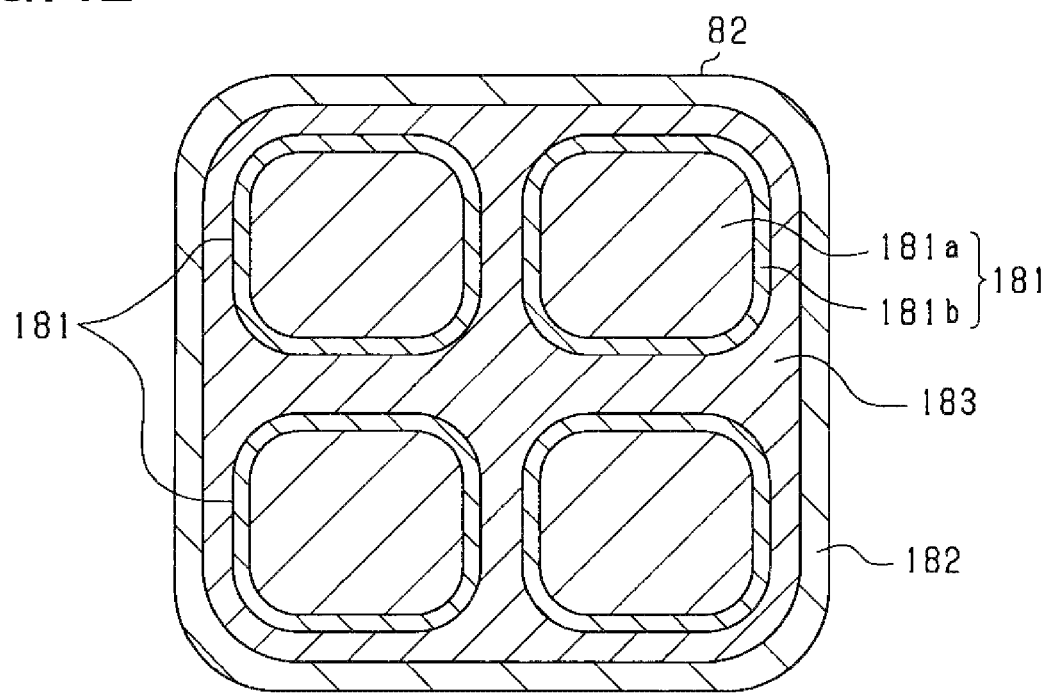
FIG. 42 is a cross-sectional view of a configuration of a conductor in a fourteenth modification.

In FIG. 42, the conductor 82 includes a plurality (four in the drawing) of wires 181, an outer-layer coating 182 (outer insulation coating) that is made of resin, for example, and surrounds the plurality of wires 181, and an intermediate layer 183 (intermediate insulation coating) that fills an area surrounding the wires 181 inside the outer layer coating 182. The wire 181 includes a conductive portion 181a that is made of a copper material and a conductor coating 181b (inner insulation coating) that is made of an insulation material. In terms of the stator winding, insulation is provided between phases by the outer-layer coating 182. Here, the wiring 181 may be configured as a bundle of a plurality of conductive materials.

The intermediate layer 183 has a higher rate of linear expansion than the conductor coating 181b of the wire 181 and a lower rate of linear expansion than the outer-layer coating 182. That is, in the conductor 82, the rate of linear expansion increases toward the outer side.

In general, in the outer-layer coating 182, the coefficient of linear expansion is higher than that of the conductor coating 181b. As a result of the intermediate layer 183 that has a rate of linear expansion that is midway between those of the outer-layer coating 182 and the conductor coating 181b, the intermediate layer 183 functions as a cushion material and can prevent simultaneous breakage on the outer layer side and the inner layer side.

Furthermore, in the conductor 82, the conductive portion 181a and the conductor coating 181b are bonded in the wire 181. The conductor coating 181b and the intermediate layer 183, and the intermediate layer 183 and the outer-layer coating 182 are respectively bonded. In these bonded portions, bonding strength weakens toward the outer side of the conductor 82. That is, the bonding strength between the conductive portion 181a and the conductor coating 181b is weaker than the bonding strength between the conductor coating 181b and the intermediate layer 183, and the bonding strength between the intermediate layer 183 and the outer-layer coating 182.

In addition, when the bonding strength between the conductor coating 181 and the intermediate layer 183 and the bonding strength between the intermediate layer 183 and the outer-layer coating 182 are compared, the latter (on the outer side) may be weaker or equal. Here, for example, a magnitude of the bonding strength between coatings can be ascertained by tensile strength that is required when the two layers of coatings are peeled apart.

As a result of the bonding strength of the conductor 82 being set as described above, even if an inner/outer temperature difference occurs as a result of heat generation or cooling, breakage occurring on both the inner layer side and the outer layer side (co-breakage) can be suppressed.

Here, heat generation and temperature changes in the rotating electric machine mainly manifest as copper loss that is heat-generated from the conductive portion 181a of the wire 181 and iron loss that is generated from within the core. However, these two types of losses are transmitted from the conductive portion 181a inside the conductor 82 or from outside the conductor 82. A heat generation source is not present in the intermediate layer 183.

In this case, as a result of the intermediate layer 183 having bonding force that can serve as a cushion for both, simultaneous breakage thereof can be prevented. Therefore, favorable usage can be achieved even for use in fields that involve high voltage resistance or significant temperature changes, such as use in vehicles.

A supplementary description is provided below. For example, the wire 181 may be an enamel wire. In this case, the wire 181 includes a resin coating layer (conductor coating 181b) made of polyamide (PA), PI, PAI, or the like. In addition, the outer-layer coating 182 on the outer side of the wire 181 is preferably made of a similar PA, PI, PAI, or the like and thick in terms of thickness. As a result, breakage of the coating due to a difference in linear expansion is suppressed.

Here, as the outer-layer coating 182, in addition to that in which measures are taken by the material, such as PA, PI, or PAI being made thick, use of that in which the dielectric constant is smaller than that of PI or PAI, such as PPS, PEEK, fluororesin, polycarbonate, silicon resin, epoxy, polyethylene naphthalate, or liquid crystal polymer (LCP), is also preferred in terms of increasing conductor density in the rotating electric machine. As a result of these resins, even when the coating is thinner than a PI or PAI coating that is equivalent to the conductor coating 181b or of equal thickness to the conductor coating 181b, the insulation performance thereof can be increased. As a result, an occupancy ratio of the conductive portion can be increased.

In general, the above-described resin provides insulation in which the dielectric constant is more favorable than that of the insulation coating of the enamel wire. Of course, there are examples in which the dielectric constant deteriorates due to a state of molding or due to impurities. Among the foregoing, PPS and PEEK generally have a greater coefficient of linear expansion than an enamel coating. However, because the coefficient of linear expansion thereof is less than that of other resins, PPS and PEEK are suitable as the outer-layer coating in the second layer.

In addition, the bonding strength between the two types of coatings (intermediate insulation coating and outer-layer insulation coating) on the outer side of the wire 181 and the enamel coating of the wire 181 is preferably weaker than the bonding strength between the copper wire in the wire 181 and the enamel coating. As a result, a phenomenon in which the enamel coating and the two types of coatings break simultaneously is suppressed.

When a water-cooled structure, a liquid-cooled structure, or an air-cooled structure is added to the stator, thermal stress and impact stress are thought to basically be applied from the outer-layer coating 182 and beyond. However, even in cases in which the insulation layer of the wire 181 and the above-described two types of coatings are made of differing resins, as a result of a portion in which the coatings are not bonded being provided, the thermal stress and impact stress can be reduced.

That is, the insulation structure is formed by a space being provided between the two types of coatings and the wire (enamel wire), and fluororesin, polycarbonate, silicon resin, epoxy, polyethylene naphthalate, or LCP being used. In this case, the outer-layer coating and the inner-layer coating are preferably bonded using an adhesive material that has a low dielectric constant and a low coefficient of linear expansion, such as epoxy.

As a result, in addition to mechanical strength, coating breakage as a result of friction caused by shaking due to vibrations in the conductive portion and the like, or breakage of the outer-layer coating as a result of the difference in coefficient of linear expansion can be suppressed.

As an outermost-layer fixing that is generally a final step for the periphery of the stator winding and imparts mechanical strength, fixing, and the like, in relation to the conductor 82 that is configured as described above, a resin, such as epoxy, PPS, PEEK, or LCP, of which moldability is favorable and properties such as the dielectric constant and the coefficient of linear expansion are similar to the properties of the enamel coating is preferred.

In general, resin potting using urethane or silicon is commonly performed. However, in the above-described resin, the coefficient of linear expansion thereof differs by almost two-fold compared to other resins, and thermal stress that may shear the resin is generated. Therefore, the resin is unsuitable for use at 60 V or higher for which strict insulation regulations are internationally applied. In this regard, as a result of a final insulation step that is easily fabricated by injection molding or the like using epoxy, PPS, PEEK, LCP, or the like, the requirements described above can be achieved.

Modifications other than those described above are listed below.

A distance DM in the radial direction between a surface on the armature side in the radial direction of the magnet unit 42 and the axial center of the rotor may be equal to or greater than 50 mm. Specifically, for example, the distance DM in the radial direction between the surface on the radially inner side of the magnet unit 42 (specifically, the first and second magnets 91 and 92) shown in FIG. 4 and the axial center of the rotor 40 may be equal to or greater than 50 mm.

As the rotating electric machine that has a slot-less structure, a small-scale rotating electric machine that is used for models of which output ranges from several tens to several hundred watts and the like is known. In addition, the disclosers of the present application have not ascertained examples in which the slot-less structure is used in a large-scale rotating electric machine for industrial use that typically exceeds 10 kW. The disclosers of the present application have examined reasons therefor.

The rotating electric machines that have become mainstream in recent years are largely classified into the following four types. These rotating electric machines are a brushed motor, a squirrel-cage-type induction motor, a permanent-magnet-type synchronous motor, and a reluctance motor.

In the brushed motor, excitation current is supplied via a brush. Therefore, in the case of a large-scale brushed motor, the brush may become large and maintenance may become complicated. As a result, there is a history in that, in accompaniment with the remarkable advancements in semiconductor technology, the brushed motors have been replaced by brushless motors such as induction motors. Meanwhile, in the field of compact motors, many coreless motors are also being supplied across the world because of advantages in terms of low inertia and economic efficiency.

In the squirrel-cage-type induction motor, the principle is that torque is generated by a magnetic field that is generated by a stator winding on a primary side being received by a core of a rotor on a secondary side, an induction current being sent in a concentrated manner to a squirrel-cage-type conductor, and a reaction magnetic field being formed. Therefore, from the perspective of compactness and higher efficiency of an apparatus, eliminating the core from both the stator side and the rotor side cannot necessarily be said to be expedient.

The reluctance motor is a motor that simply uses changes in reluctance in the core. In principle, eliminating the core is not preferable.

In the permanent-magnet-type synchronous motor, the IPM (that is, an embedded magnet-type rotor) has become mainstream in recent years. Unless there are special circumstances, large-scale machines in particular are often IPMs.

The IPM has a characteristic of having both magnet torque and reluctance torque. The IPM is operated while proportions of these torques are adjusted as appropriate by inverter control. Therefore, the IPM is a compact motor that has excellent controllability.

Figure 43:
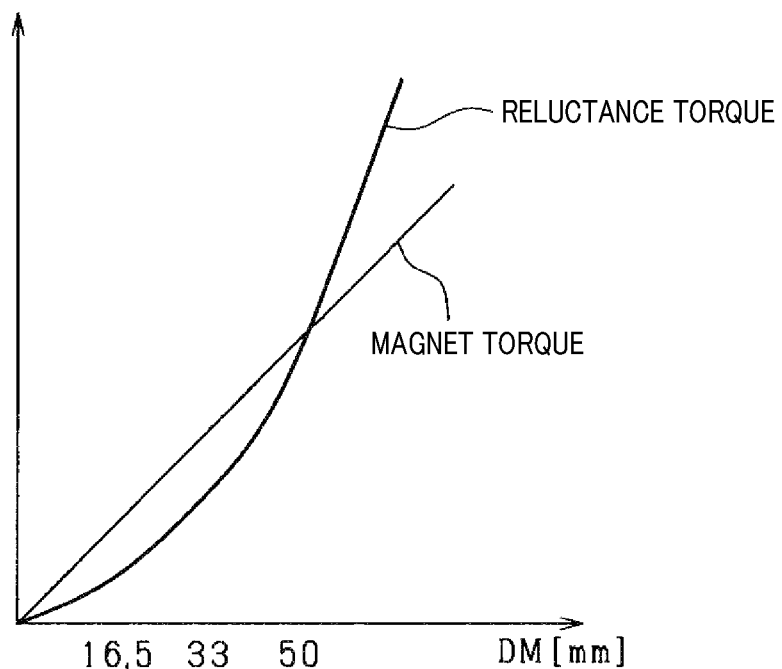
FIG. 43 is a diagram of a relationship among reluctance torque, magnet torque, and DM, where DM is a distance in a radial direction between a surface on an armature side in the radial direction of the magnet unit and an axial center of the rotor.

When, based on analysis by the disclosers of the present application, the torques on the rotor surface that generates the magnet torque and the reluctance torque are drawn with the distance DM in the radial direction between the surface on the armature side in the radial direction of the magnet unit and the axial center of the rotor, that is, a radius of the stator core of a typical inner rotor is taken on a horizontal axis, the torques are as shown in FIG. 43.

As shown in expression (eq1), below, whereas a potential of the magnet torque is determined by magnetic field strength generated by the permanent magnet, a potential of the reluctance torque is determined by inductance, particularly a magnitude of a q-axis inductance, as shown in expression (eq2), below.

$$\text{Magnet torque} = k \cdot \Psi \cdot Iq \qquad \text{(eq1)}$$

Reluctance torque=$k \cdot (Lq-Ld) \cdot Iq \cdot Id$ (eq2)

Here, the magnetic field strength of the permanent magnet and the magnitude of the inductance in the winding are compared based on DM. The magnetic field strength generated by the permanent magnet, that is, a magnetic flux amount Ψ, is proportional to a total area of the permanent magnet on a surface that opposes the stator. In the case of a circular cylindrical rotor, the total area is the surface area of a circular cylinder.

Strictly speaking, because the N pole and the S pole are present, the magnet field strength is proportional to an occupied area that is half the circular cylindrical surface. The surface area of the circular cylinder is proportional to a radius of the circular cylinder and a circular cylinder length. That is, if the circular cylinder length is fixed, the surface area is proportional to the radius of the circular cylinder.

Meanwhile, although an inductance Lq of the winding is dependent on core shape, sensitivity is low. Rather, because the inductance Lq is proportional to a square of the number of windings of the stator winding, dependence on the number of windings is high. Here, when μ is the magnetic permeability of the magnetic circuit, N is the number of windings, S is the cross-sectional area of the magnetic circuit, and δ is an effective length of the magnetic circuit, inductance L=$\mu \cdot N^2 \times S/\delta$.

Figure 44:
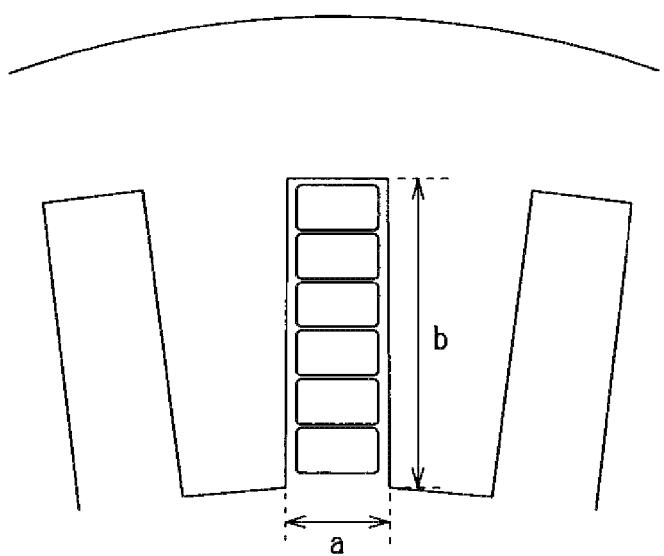
FIG. 44 is a diagram of teeth.

The number of windings of the winding is dependent on a size of a winding space. Therefore, in the case of a circular cylindrical motor, the number of windings is dependent on the winding space of the stator, that is, the slot area. As shown in FIG. 44, the slot area is proportional to a product a×b of a length dimension a in the circumferential direction and a length dimension b in the radial direction, because the shape of the slot is approximately a quadrangle.

The length dimension in the circumferential direction of the slot increases as the diameter of the circular cylinder increases. Therefore, the length dimension in the circumferential direction of the slot is proportional to the diameter of the circular cylinder. The length dimension in the radial direction of the slot is simply proportional to the diameter of the circular cylinder. That is, the slot area is proportional to a square of the diameter of the circular cylinder.

In addition, as is clear from expression (eq2), above, the reluctance torque is proportional to a square of the stator current. Therefore, the performance of the rotating electric machine is determined by the manner in which a large current can be supplied. The performance is dependent on the slot area of the stator. From the foregoing, if the length of the circular cylinder is fixed, the reluctance torque is proportional to the square of the diameter of the circular cylinder. With this in mind, a diagram in which a relationship between the magnetic torque, the reluctance torque, and DM is plotted is FIG. 43.

As shown in FIG. 43, the magnet torque linearly increases in relation to DM. The reluctance torque quadratically increases in relation to DM. It is clear that, when DM is relatively small, the magnet torque is dominant. The reluctance torque becomes dominant as the stator core radius increases.

The disclosers of the present application have reached a conclusion that, under predetermined conditions, an intersection between the magnet torque and the reluctance torque in FIG. 43 is near a stator core radius of about 50 mm. That is, in a 10 kW-class motor in which the stator core radius sufficiently exceeds 50 mm, because use of reluctance torque is currently mainstream, eliminating the core is difficult. This is presumed to be one reason for which the slot-less structure is not used in the field of large-scale machinery.

In the case of a rotating electric machine in which a core is used in the stator, magnetic saturation of the core is an issue at all times. In particular, in a radial-gap-type rotating electric machine, the longitudinal cross-sectional shape of the rotation shaft is fan-shaped for each magnetic pole. A magnetic path width becomes narrower toward the inner circumferential side of the apparatus, and a dimension on the inner circumferential side of a teeth portion that forms the slots determines a performance limit of the rotating electric machine.

Regardless of how high performance the permanent magnet that is used is, if magnetic saturation occurs in this section, the performance of the permanent magnet cannot be sufficiently obtained. To prevent magnetic saturation from occurring in this section, the inner circumference is designed to be large, thereby resulting in a larger apparatus.

For example, in a distributed-winding rotating electric machine, if the winding is a three-phase winding, magnetic flux is supplied so as to be distributed among three to six teeth per magnetic pole. However, because the magnetic flux tends to become concentrated at the teeth toward the front in the circumferential direction, the magnetic flux does not flow evenly to the three to six teeth. In this case, while the magnetic flux flows in a concentrated manner to a portion (such as one or two) of the teeth, the teeth that are magnetically saturated also move in the circumferential direction in accompaniment with the rotation of the rotation shaft. This is also a factor in the generation of slot ripples.

From the foregoing, in the rotating electric machine that has a slot-less structure and of which DM is equal to or greater than 50 mm, the teeth are preferably eliminated to resolve magnetic saturation. However, when the teeth are eliminated, magnetic resistance in the magnetic circuit in the rotor and the stator increases, and the torque of the rotating electric machine decreases. A reason for the increase in magnetic resistance is, for example, the air gap between the rotor and the stator becoming larger.

Therefore, in the rotating electric machine that has the slot-less structure in which DM is equal to or greater than 50 mm, described above, there is room for improvement regarding the enhancement of torque. Therefore, there is significant merit in applying the above-described configuration that enables torque to be enhanced, to the rotating electric machine that has the slot-less structure and in which the DM is equal to or greater than 50 mm, described above.

Here, the distance DM in the radial direction between the surface on the armature side in the radial direction of the magnet unit and the axial center of the rotor may be equal to or greater than 50 mm in not only the rotating electric machine that has the outer-rotor structure, but also the rotating electric machine that has the inner rotor structure as well.

The stator winding 51 of the rotating electric machine 10 may be configured such that the linear portions 83 of the conductors 82 are provided in a single layer in the radial direction. In addition, when the linear portions 83 are arranged in a plurality of layers on the inner side and the radially outer side, the number of layers may be arbitrary. The linear portions 83 may be provided in three layers, four layers, five layers, six layers, etc.

For example, in FIG. 2, the rotation shaft 11 is provided so as to protrude toward both one end side and the other end side of the rotating electric machine 10 in the axial direction.

However, this configuration may be modified. The rotation shaft 11 may be configured to protrude toward only one end side.

In this case, with a portion that is cantilever-supported by the bearing unit 20 as an end portion, the rotation shaft 11 may be provided so as to extend toward the outer side in the axial direction thereof.

In the present configuration, because the rotation shaft 11 does not protrude inside the inverter unit 60, an internal space of the inverter unit 60, or specifically, the internal space of the cylindrical portion 71 can be more widely used.

In the rotating electric machine 10 configured as described above, a non-conductive grease is used in the bearings 21 and 22. However, this configuration may be modified. A conductive grease may be used in the bearings 21 and 22. For example, a conductive grease that includes metal particles, carbon particles, or the like may be used.

As a configuration in which the rotation shaft 11 is supported so as to rotate freely, the bearings may be provided in two locations, on one end side and the other end side in the axial direction of the rotor 40. In this case, in terms of the configuration in FIG. 1, the bearings may be provided in two locations, on one end side and the other end side with the inverter unit 60 therebetween.

In the rotating electric machine 10 configured as described above, the intermediate portion 45 of the magnet holder 41 in the rotor 40 includes the inner shoulder portion 49*a* and the annular outer shoulder portion 49*b*. However, these shoulder portions 49*a* and 49*b* may be eliminated, and the intermediate portion 45 may be configured to have a flat surface.

In the rotating electric machine 10 configured as described above, the conductor body 82*a* is a bundle of a plurality of wires 86 in the conductor 82 of the stator winding 51. However, this configuration may be modified. A square conductor that has a rectangular cross-section may be used as the conductor 82. In addition, a circular conductor that has a circular cross-sectional shape or an elliptical cross-sectional shape may be used as the conductor 82.

In the rotating electric machine 10 configured as described above, the inverter unit 60 is provided on the radially inner side of the stator 50. However, instead, the inverter unit 60 may not be provided on the radially inner side of the stator 50. In this case, an internal area that is the radially inner side of the stator 50 may be left as an empty space. In addition, a component other than the inverter unit 60 can be arranged in the internal area.

In the rotating electric machine 10 configured as described above, the housing 30 may not be provided. In this case, for example, the rotor 40, the stator 50, and the like may be held in a portion of the wheel or another vehicle component.

Embodiment as an In-Wheel Motor for a Vehicle

Next, an embodiment in which the rotating electric machine is provided integrally with a vehicle wheel of a vehicle as an in-wheel motor will be described.

Figure 45:
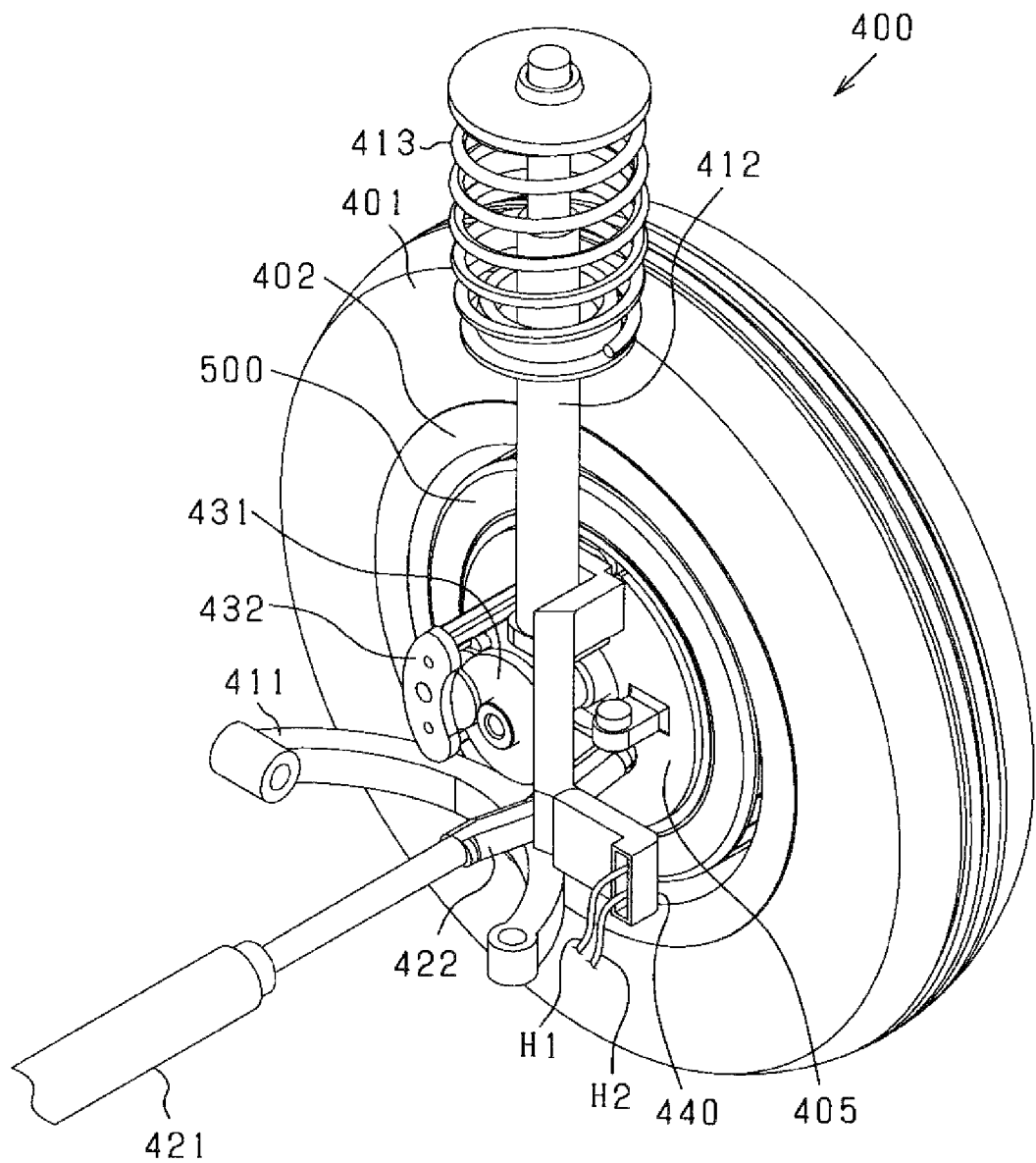
FIG. 45 is a perspective view of a vehicle wheel having an in-wheel-motor structure and a surrounding structure thereof.
Figure 46:
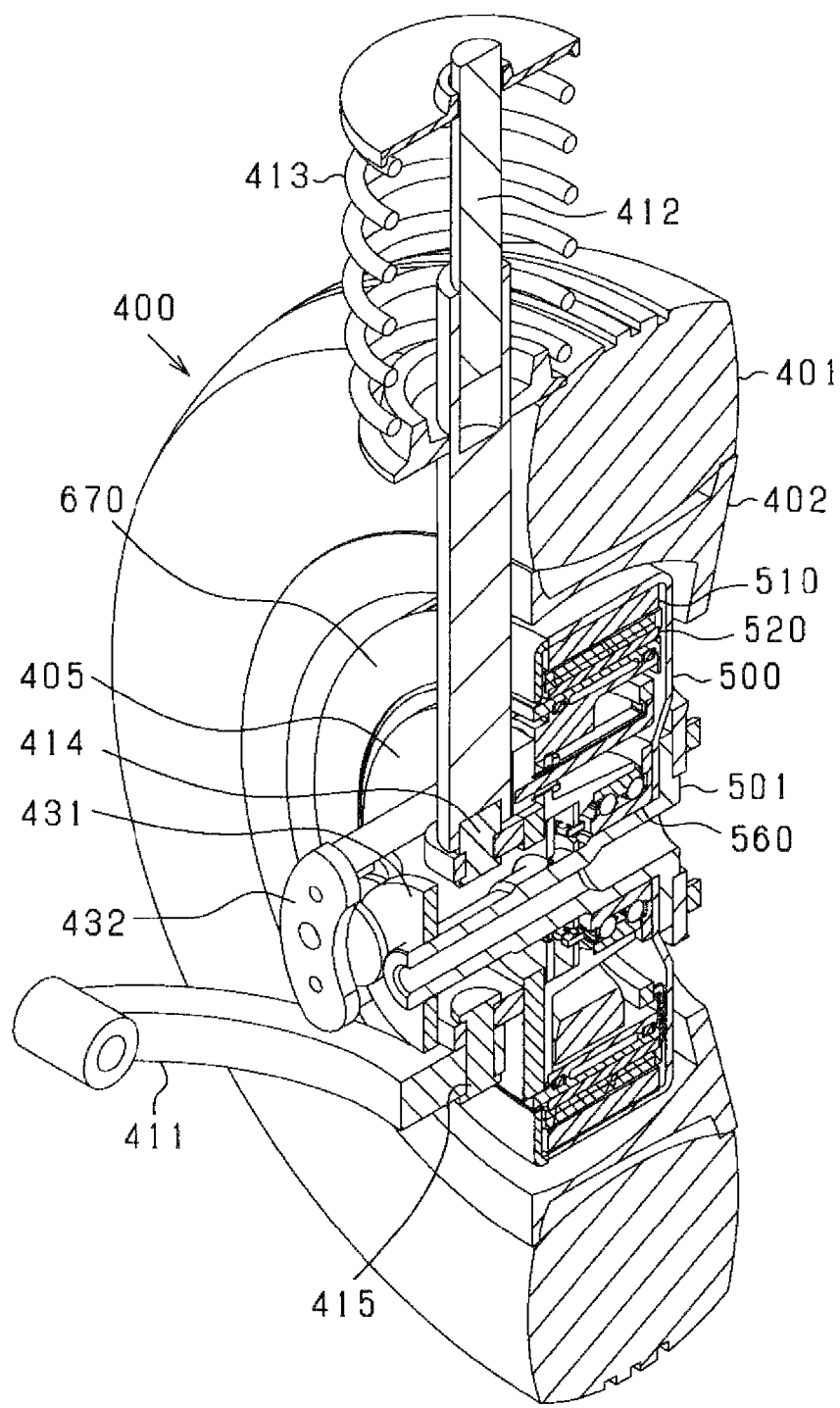
FIG. 46 is a longitudinal cross-sectional view of the vehicle wheel and the surrounding structure thereof.
Figure 47:
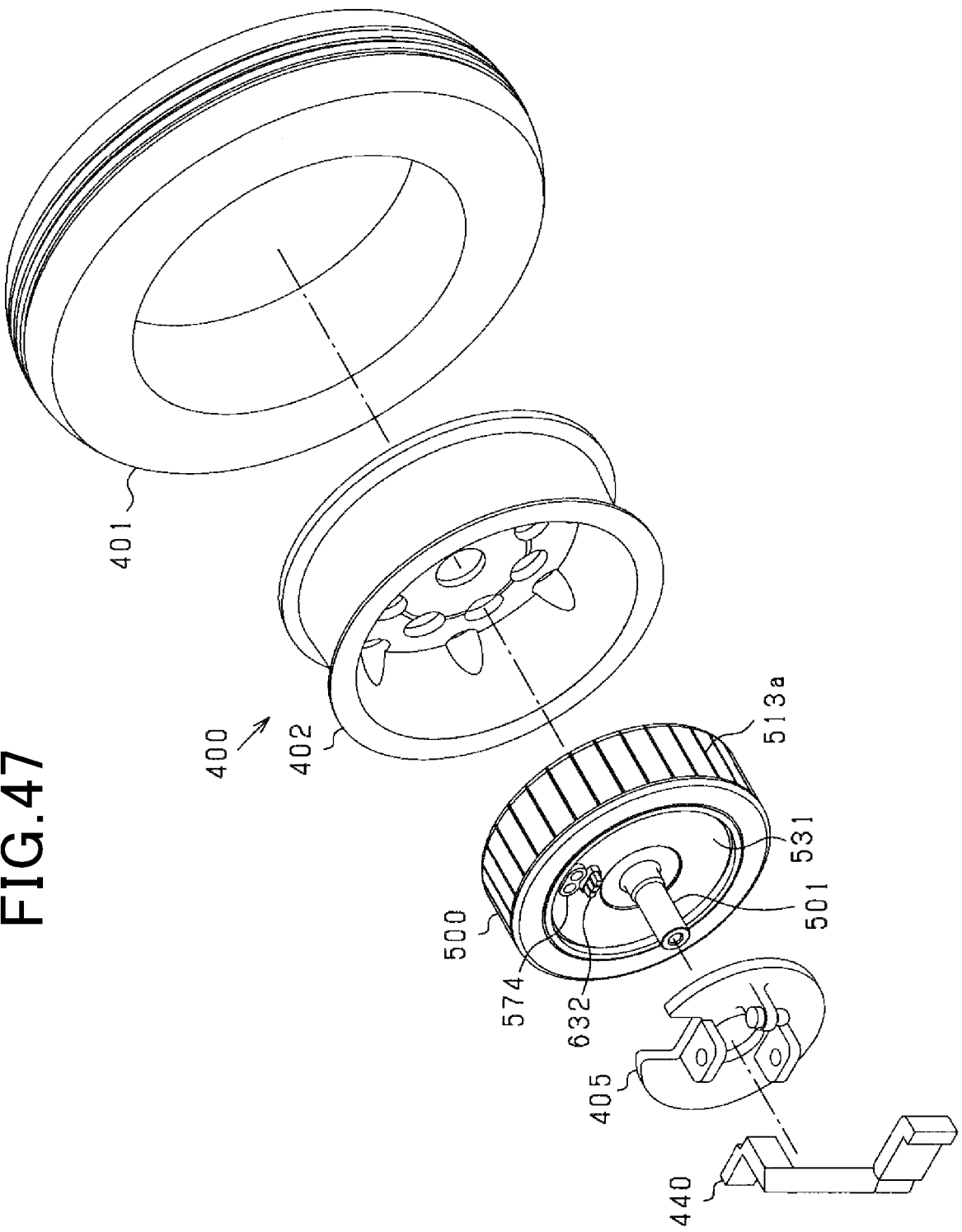
FIG. 47 is an exploded perspective view of the vehicle wheel.

FIG. 45 is a perspective view of a vehicle wheel 400 that has an in-wheel motor structure and a surrounding structure thereof. FIG. 46 is a longitudinal cross-sectional view of the vehicle wheel 400 and the surrounding structure thereof. FIG. 47 is an exploded perspective view of the vehicle wheel 400. Each of these drawings is a perspective view in which the vehicle wheel 400 is viewed from inside the vehicle.

Here, in the vehicle, the in-wheel motor structure according to the present embodiment can be applied in various modes. For example, in a vehicle that has two wheels each in the front and rear of the vehicle, the in-wheel motor according to the present embodiment can be applied to the two wheels on the front side of the vehicle, the two wheels on the rear side of the vehicle, or the four wheels in the front and rear of the vehicle. However, the in-wheel motor according to the present embodiment can also be applied to a vehicle in which at least either of the front and rear of the vehicle has a single wheel. Here, the in-wheel motor is an application example of a drive unit for a vehicle.

As shown in FIGS. 45 to 47, for example, the vehicle wheel 400 includes a tire 401 that is a known tire that is filled with air, a wheel 402 that is fixed to an inner circumferential side of the tire 401, and a rotating electric machine 500 that is fixed to an inner circumferential side of the wheel 402. The rotating electric machine 500 includes a fixed portion that is a portion that includes a stator and a rotating portion that is a portion that includes a rotor. The fixed portion is fixed to a vehicle body side.

In addition, the rotating portion is fixed to the wheel 402. The tire 401 and the wheel 402 rotate as a result of the rotation of the rotating unit. Here, in the rotating electric machine 500, a detailed configuration including the fixed portion and the rotating portion will be described hereafter.

In addition, in the vehicle wheel 400, as peripheral apparatuses, a suspension apparatus that holds the vehicle wheel 400 to a vehicle body (not shown), a steering apparatus that enables an orientation of the vehicle wheel 400 to be changed, and a brake apparatus that performs braking of the vehicle wheel 400 are attached.

The suspension apparatus is an independent-suspension-type suspension. For example, application of an arbitrary type, such as a trailing arm type, a strut type, a wishbone type, or a multilink type, is possible. According to the present embodiment, as the suspension apparatus, a lower arm 411 is provided so as to be oriented to extend toward the vehicle-body center side, and a suspension arm 412 and a spring 413 are provided so as to be oriented to extend in the vertical direction.

For example, the suspension arm 412 may be configured as a shock absorber. However, a detailed illustration thereof is omitted. The lower arm 411 and the suspension arm 412 are each connected to the vehicle body side and connected to a circular-disk-shaped base plate 405 that is fixed to the fixed portion of the rotating electric machine 500. As shown in FIG. 46, on the rotating electric machine 500 side (base plate 405 side), the lower arm 411 and the suspension arm 412 are supported by support axes 414 and 415 so as to be in a coaxial state with each other.

In addition, as the steering apparatus, for example, application of a rack-and-pinion type structure or a ball-and-nut type structure, or application of a hydraulic power steering system or an electric power steering system is possible. According to the present embodiment, a rack apparatus 421 and a tie rod 422 are provided as the steering apparatus. The rack apparatus 421 is connected to the base plate 405 on the rotating electric machine 500 side by the tie rod 422.

In this case, when the rack apparatus 421 is operated in accompaniment with the rotation of a steering shaft (not shown), the tie rod 422 moves in a left/right direction of the vehicle. As a result, the vehicle wheel 400 rotates around the support shafts 414 and 415 of the lower arm 411 and the suspension arm 412 and a vehicle-wheel direction is changed.

As the brake apparatus, a disk brake or a drum brake is suitable. According to the present embodiment, as the brake apparatus, a disk rotor 431 that is fixed to the rotation shaft 501 of the rotating electric machine 500 and a brake caliper 432 that is fixed to the base plate 405 on the rotating electric machine 500 side are provided. In the brake caliper 432, a brake pad is operated by hydraulic pressure or the like. As a result of the brake pad being pressed against the disk rotor 431, braking force caused by friction is generated and rotation of the vehicle wheel 400 is stopped.

In addition, a housing duct 440 that houses electrical wiring H1 and a cooling pipe H2 that extend from the rotating electric machine 500 is attached to the vehicle wheel 400. The housing duct 440 is provided so as to extend from an end portion on the fixed portion side of the rotating electric machine 500, along an end surface of the rotating electric machine 500, and avoid the suspension arm 412. The housing duct 440 is fixed to the suspension arm 412 in this state.

As a result, a connection portion to the housing duct 440 of the suspension arm 412 has a fixed positional relationship with the base plate 405. Therefore, stress that is generated in the electrical wiring H1 and the cooling pipe H2 as a result of vibrations in the vehicle and the like can be suppressed. Here, the electrical wiring H1 is connected to an onboard power supply unit and an onboard electronic control unit (ECU) (not shown). The cooling pipe H2 is connected to a radiator (not shown).

Next, a configuration of the rotating electric machine 500 that is used as the in-wheel motor will be described in detail. According to the present embodiment, an example in which the rotating electric machine 500 is applied to the in-wheel motor is given. The rotating electric machine 500 has superior efficiency and output compared to a motor of a vehicle drive unit that has a speed reducer as in conventional technology.

That is, if the rotating electric machine 500 is used for a purpose that enables actualization of more practical pricing (lower pricing), compared to conventional technology, through cost reduction, the rotating electric machine 500 may also be used as a motor for purposes other than the vehicle drive unit. In such cases as well, in a manner similar to that when the rotating electric machine 500 is applied to the in-wheel motor, superior performance is exhibited. Here, efficiency refers to an index that is used during testing in traveling mode to derive fuel efficiency of a vehicle.

Figure 48:
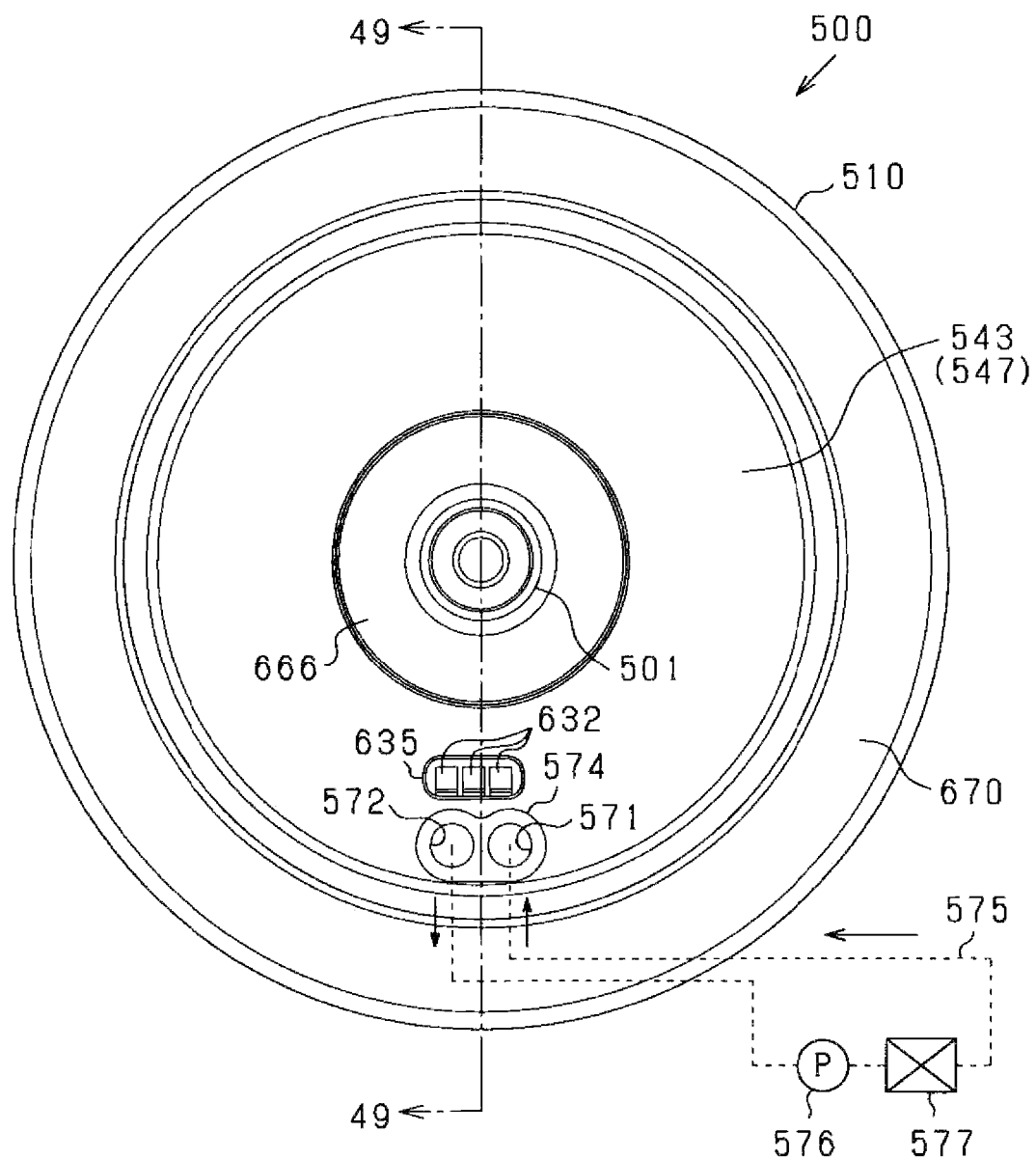
FIG. 48 is a side view of a rotating electric machine viewed from a protruding side of a rotation shaft.

An overview of the rotating electric machine 500 is shown in FIGS. 48 to 51. FIG. 48 is a side view of the rotating electric machine 500 viewed from a protruding side of the rotation shaft 501 (inner side of the vehicle).

Figure 49:
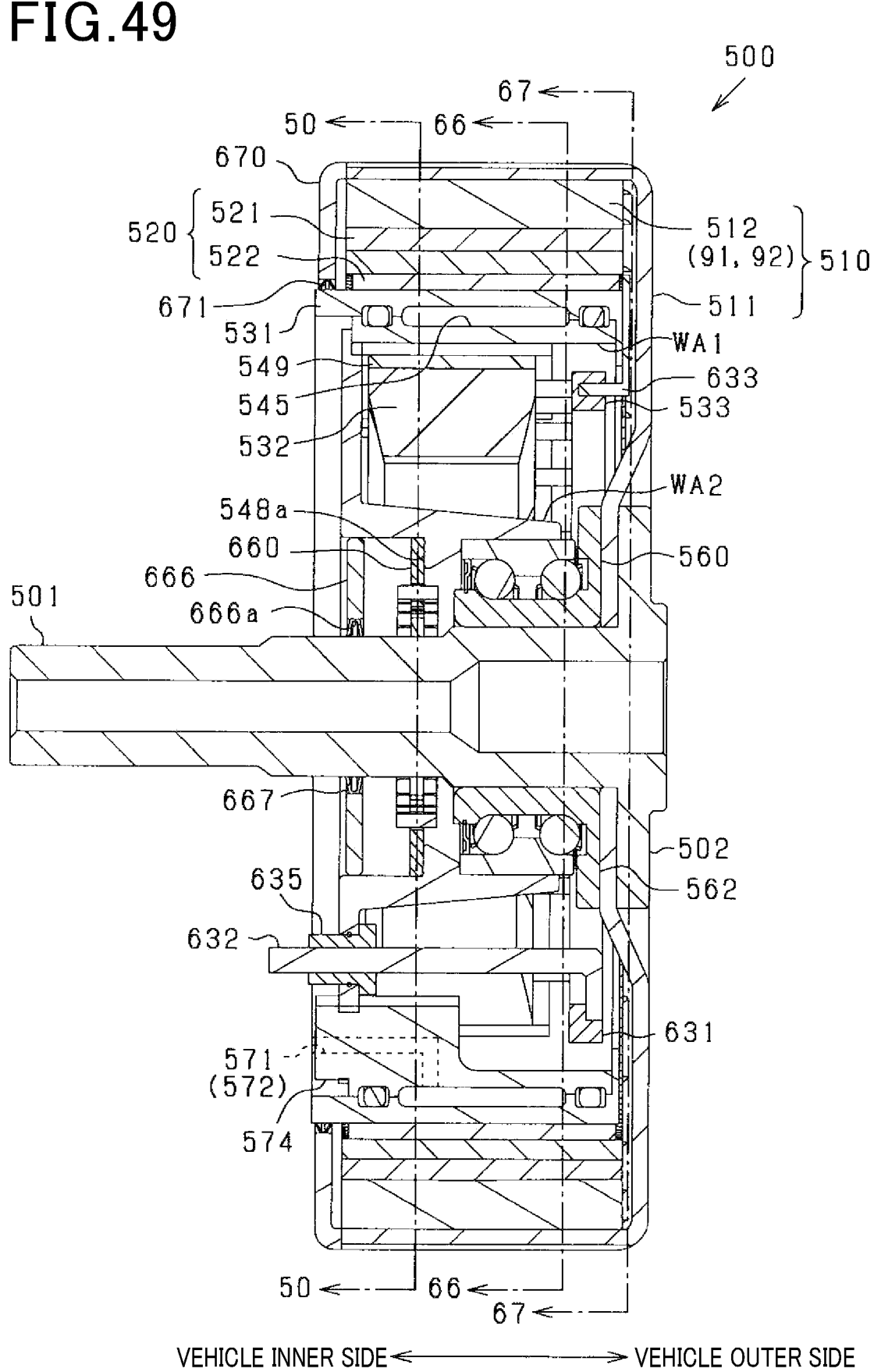
FIG. 49 is a cross-sectional view taken along line 49-49 in FIG. 48.
Figure 50:
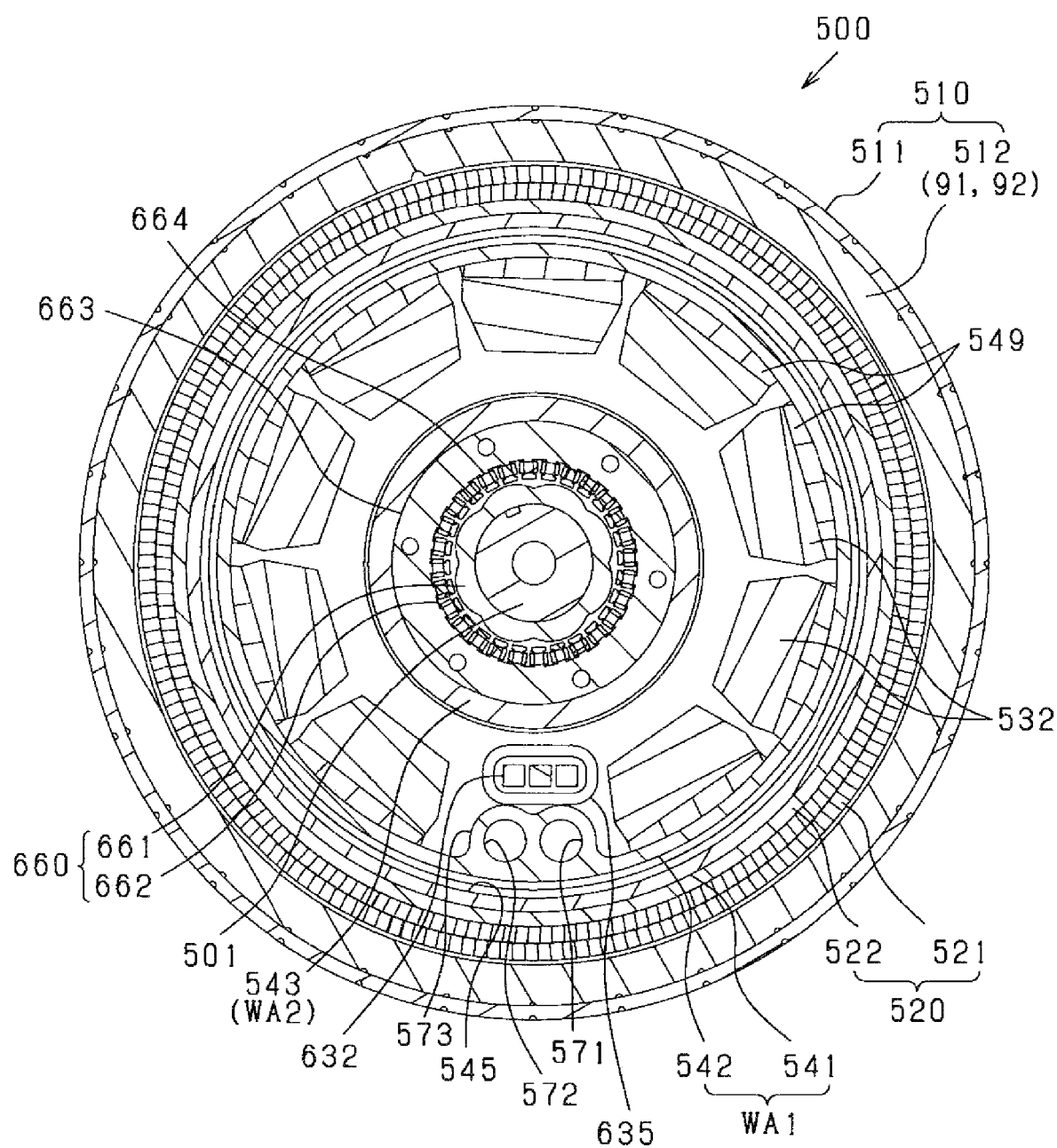
FIG. 50 is a cross-sectional view taken along line 50-50 in FIG. 49.
Figure 51:
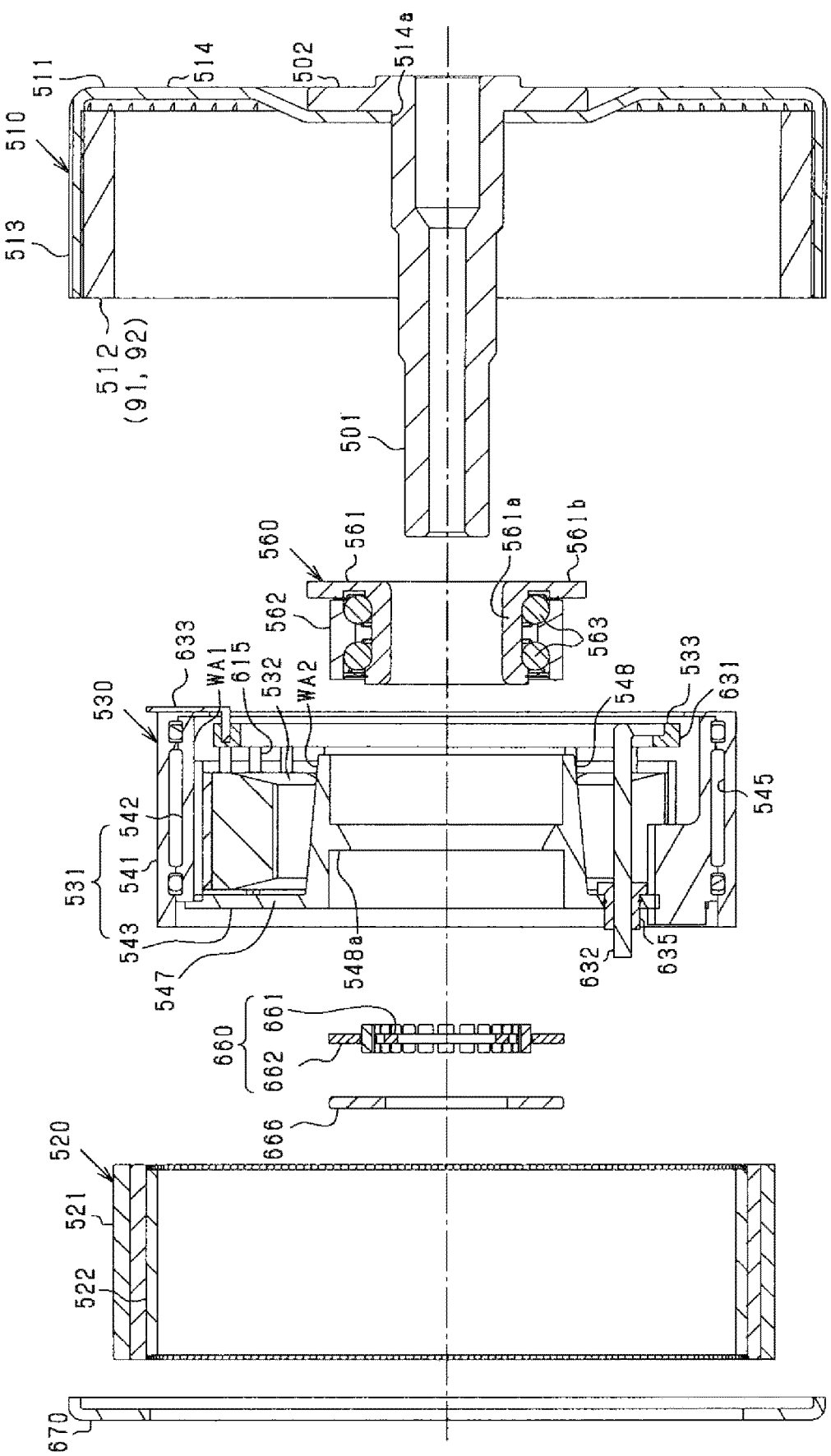
FIG. 51 is an exploded cross-sectional view of the rotating electric machine.

FIG. 49 is a longitudinal cross-sectional view of the rotating electric machine 500 (a cross-sectional view taken along line 49-49 in FIG. 48). FIG. 50 is a lateral cross-sectional view of the rotating electric machine 500 (a cross-sectional view taken along line 50-50 in FIG. 49). FIG. 51 is an exploded cross-sectional view in which constituent elements of the rotating electric machine 500 are in an exploded state. In the description below, a direction in which the rotation shaft 501 extends in an outer-side direction of the vehicle body in FIG. 51 is an axial direction. A direction that radially extends from the rotation shaft 501 is a radial direction.

In FIG. 48, on a center line that is drawn to form a cross-section 49 that passes through a center of the rotation shaft 501, that is, a rotational center of a rotating portion, each of two directions that extend in a circumferential manner from an arbitrary point excluding the rotational center of the rotation portion is a circumferential direction. In other words, the circumferential direction may be either of a clockwise direction and a counter-clockwise direction with an arbitrary point on the cross-section 49 as a starting point.

In addition, in terms of a vehicle-mounted state, a right side in FIG. 49 is a vehicle outer side and a left side is a vehicle inner side. In other words, in terms of the vehicle-mounted state, a rotor 510 described hereafter is arranged further toward the outer-side direction of the vehicle body than a rotor cover 670.

The rotating electric machine 500 according to the present embodiment is an outer-rotor-type, surface-magnet-type rotating electric machine. The rotating electric machine 500 generally includes the rotor 510, a stator 520, an inverter unit 530, a bearing 560, and the rotor cover 670. The rotating electric machine 10 is configured by all of these components being arranged coaxially with the rotation shaft 501 that is provided integrally with the rotor 510 and assembled in the axial direction in a predetermined order.

In the rotating electric machine 500, the rotor 510 and the stator 520 each have a circular cylindrical shape and are arranged so as to oppose each other with an airgap therebetween. As a result of the rotor 510 integrally rotating with the rotation shaft 501, the rotor 510 rotates on the radially outer side of the stator 520. The rotor 510 corresponds to a "field element". The stator 520 corresponds to an "armature".

The rotor 510 includes an approximately circular cylindrical rotor carrier 511 and an annular magnet unit 512 that is fixed to the rotor carrier 511. The rotation shaft 501 is fixed to the rotor carrier 511.

The rotor carrier 511 includes a circular cylindrical portion 513. The magnet unit 512 is fixed to an inner circumferential surface of the inner cylindrical portion 513. That is, the magnet unit 512 is provided so as to be surrounded by the circular cylindrical portion 513 of the rotor carrier 511 from the radially outer side.

In addition, the circular cylindrical portion 513 includes a first end and a second end that are opposing in the axial direction thereof. The first end is positioned in a direction on the outer side of the vehicle body. The second end is positioned in a direction in which the base plate 405 is present. In the rotor carrier 511, the first end of the circular cylindrical portion 513 is provided so as to be continuous with an end plate 514.

That is, the circular cylindrical portion 513 and the end plate 514 are an integrated structure. The second end of the circular cylindrical portion 513 is open. For example, the rotor carrier 511 is formed by a cold-rolled steel sheet (SPCC or SPHC that has a thicker plate thickness than SPCC), a forging steel, a CFRP, or the like that has sufficient mechanical strength.

An axial length of the rotation shaft 501 is longer than a dimension in the axial direction of the rotor carrier 511. In other words, the rotation shaft 501 protrudes toward the open end side (vehicle inner-side direction) of the rotor carrier 511, and the above-described brake apparatus and the like are attached to the end portion on the protruding side.

A through hole 514a is formed in a center portion of the end plate 514 of the rotor carrier 511. The rotation shaft 501 is fixed to the rotor carrier 511 in a state in which the rotation shaft 501 is inserted into the through hole 514a of the end plate 514. The rotation shaft 501 has a flange 502 that extends so as to be oriented to intersect (be orthogonal to) the axial direction in a portion in which the rotor carrier 511 is fixed. The rotation shaft 501 is fixed to the rotor carrier 511 in a state in which the flange and the surface on the vehicle outer side of the end plate 514 are surface-joined. Here, in the vehicle wheel 400, the wheel 402 is fixed using a fastener such as a bolt that is erected in the direction of the vehicle outer side, from the flange 502 of the rotation shaft 501.

In addition, the magnet unit 512 is configured by a plurality of permanent magnets that are arranged such that the polarities alternately change along the circumferential direction of the rotor 510. As a result, the magnet unit 512 has a plurality of magnetic poles in the circumferential direction.

For example, the permanent magnet is fixed to the rotation carrier 511 by bonding. The magnet unit 512 has the configuration that is described as the magnet unit 42 in FIGS. 8 and 9 according to the first embodiment. As the permanent magnet, a sintered neodymium magnet of which the intrinsic coercive force is equal to or greater than 400 [kA/m], and the remnant flux density Br is equal to or greater than 1.0 [T] is used.

In a manner similar to the magnet unit 42 in FIG. 9 and the like, the magnet unit 512 includes the first magnet 91 and the second magnet 92 that are polar anisotropic magnets and of which the polarities differ from each other.

As described in FIGS. 8 and 9, in each of the magnets 91 and 92, the orientation of the easy axis of magnetization differs between the d-axis side (the portion located closer to the d-axis) and the q-axis side (the portion located closer to the q-axis). On the d-axis side, the orientation of the easy axis of magnetization is an orientation that is close to a direction that is parallel to the d-axis. On the q-axis side, the orientation of the easy axis of magnetization is an orientation that is close to a direction that is orthogonal to the q-axis. In addition, a magnet magnetic path that has a circular arc shape is formed as a result of orientation based on the orientations of the easy axes of magnetization.

Here, in each of the magnets 91 and 92, the easy axis of magnetization on the d-axis side may have an orientation that is parallel to the d-axis and the easy axis of magnetization on the q-axis side may have an orientation that is orthogonal to the q-axis. In short, the magnet unit 239 is configured to be oriented such that, on the side of the d-axis that is the magnetic pole center, the orientation of the easy axis of magnetization is parallel to the d-axis compared to the side of the q-axis that is the magnetic pole boundary.

As a result of the magnets 91 and 92, the magnet magnetic flux on the d-axis is strengthened and changes in the magnetic flux near the q-axis are suppressed. As a result, the magnets 91 and 92 of which the changes in surface magnetic flux from the q-axis to the d-axis is gradual at each magnetic pole can be suitably implemented. As the magnet unit 512, the configuration of the magnet unit 42 shown in FIGS. 22 and 23, or the configuration of the magnet unit 42 shown in FIG. 30 can also be used.

Here, the magnet unit 512 may have a stator core (back yoke) that includes a plurality of electromagnetic steel sheets being laminated in the axial direction on the side of the circular cylindrical portion 513 of the rotor carrier 511, that is, the outer circumferential surface side. That is, the rotor core may be provided on the radially inner side of the circular cylindrical portion 513 of the rotor carrier 511, and the permanent magnet (magnets 91 and 92) is provided on the radially inner side of the rotor core.

Figure 52:
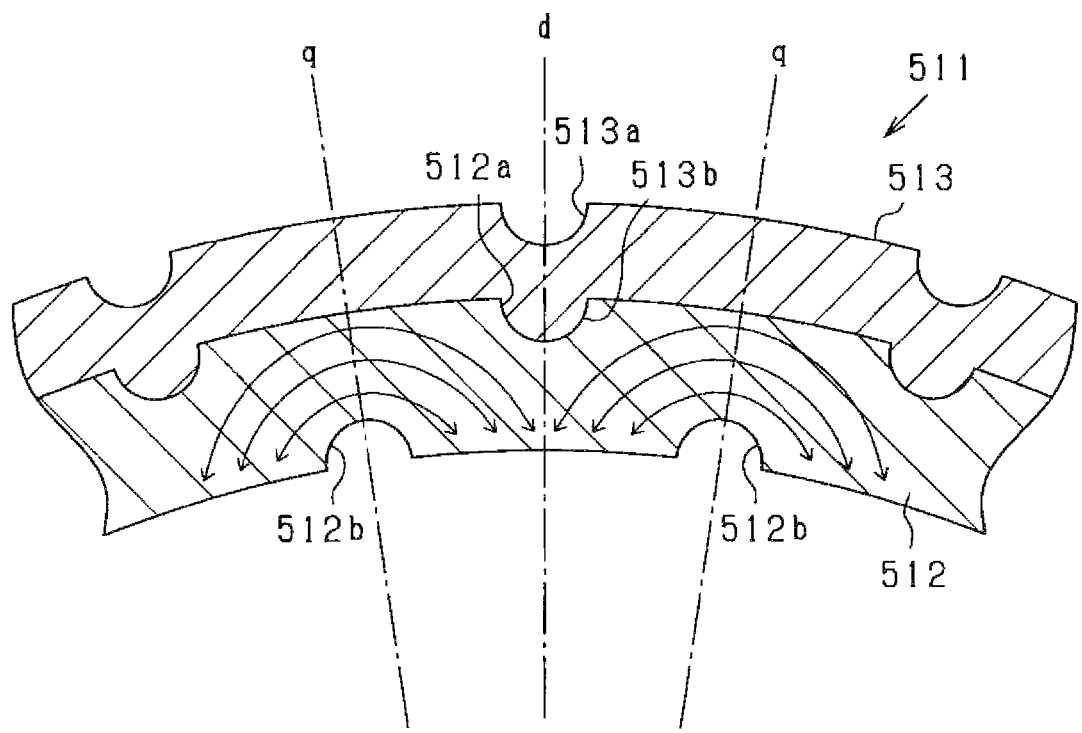
FIG. 52 is a partial cross-sectional view of a rotor.

As shown in FIG. 47, recess portions 513a are formed in a direction that extends in the axial direction at predetermined intervals in the circumferential direction in the circular cylindrical portion 513 of the rotor carrier 511. For example, the recess portions 513a are formed by press machining. As shown in FIG. 52, a protruding portion 513b is formed on the inner circumferential surface side of the circular cylindrical portion 513, in a position that is on a back side of the recess portion 513a. Meanwhile, on the outer circumferential surface side of the magnet unit 512, the recess portion 512a is formed to match the protruding portion 513b of the circular cylindrical portion 513b.

As a result of the protruding portion 513b of the circular cylindrical portion 513 entering the recess portion 512a, positional shifting in the circumferential direction of the magnet unit 512 is suppressed. That is, the protruding portion 513 on the rotor carrier 511 side functions as a rotation stopping portion of the magnet unit 512. Here, a method for forming the protruding portion 513b is arbitrary and may be other than press machining.

In FIG. 52, the direction of the magnet magnetic path in the magnet unit 512 is indicated by an arrow. The magnet magnetic path extends in a circular arc shape so as to straddle the q-axis that is the magnetic pole boundary. In addition, on the d-axis that is the magnetic pole center, the magnet magnetic path is oriented to be parallel or close to parallel to the d-axis. In the magnet unit 512, the recess portion 512b is formed for each position corresponding to the q-axis on the inner circumferential surface side.

In this case, in the magnet unit 512, the length of the magnet magnetic path differs between that on a side close to the stator 520 (lower side in the drawing) and that on a side away from the stator 520 (upper side in the drawing). The length of the magnet magnetic path is shorter on the side closer to the stator 520. The recess portion 512b is formed in a position at which the length of the magnet magnetic path is the shortest.

That is, in the magnet unit 512, taking into consideration the difficulty in generating sufficient magnet magnetic flux in a location in which the length of the magnet magnetic path is short, the magnet is eliminated in the location at which the magnet magnetic flux is weak. Here, an effective magnetic flux density Bd of a magnet increases as a length of a magnetic circuit passing through the interior of the magnet becomes longer. In addition, a permeance coefficient Pc and the effective magnetic flux density Bd of the magnet have a relationship in which when one increases, the other increases. In FIG. 52, described above, reduction in the amount of magnets can be achieved while decrease in the permeance coefficient Pc that is an indicator of the magnitude of the effective magnetic flux density Bd of the magnet is suppressed.

Here, in B-H coordinates, an intersecting point between a permeance straight line and a demagnetization curved line based on the shape of the magnet is an operation point. The magnetic flux density at the operation point is the effective magnetic flux density Bd of the magnet. In the rotating electric machine 500 according to the present embodiment, an amount of iron in the stator 520 is reduced. In this configuration, the approach in which the magnetic circuit straddles the q-axis is very effective.

In addition, the recess portion 512b of the magnet unit 512 can be used as an air passage that extends in the axial direction. Therefore, air cooling performance can also be improved.

Figure 53:
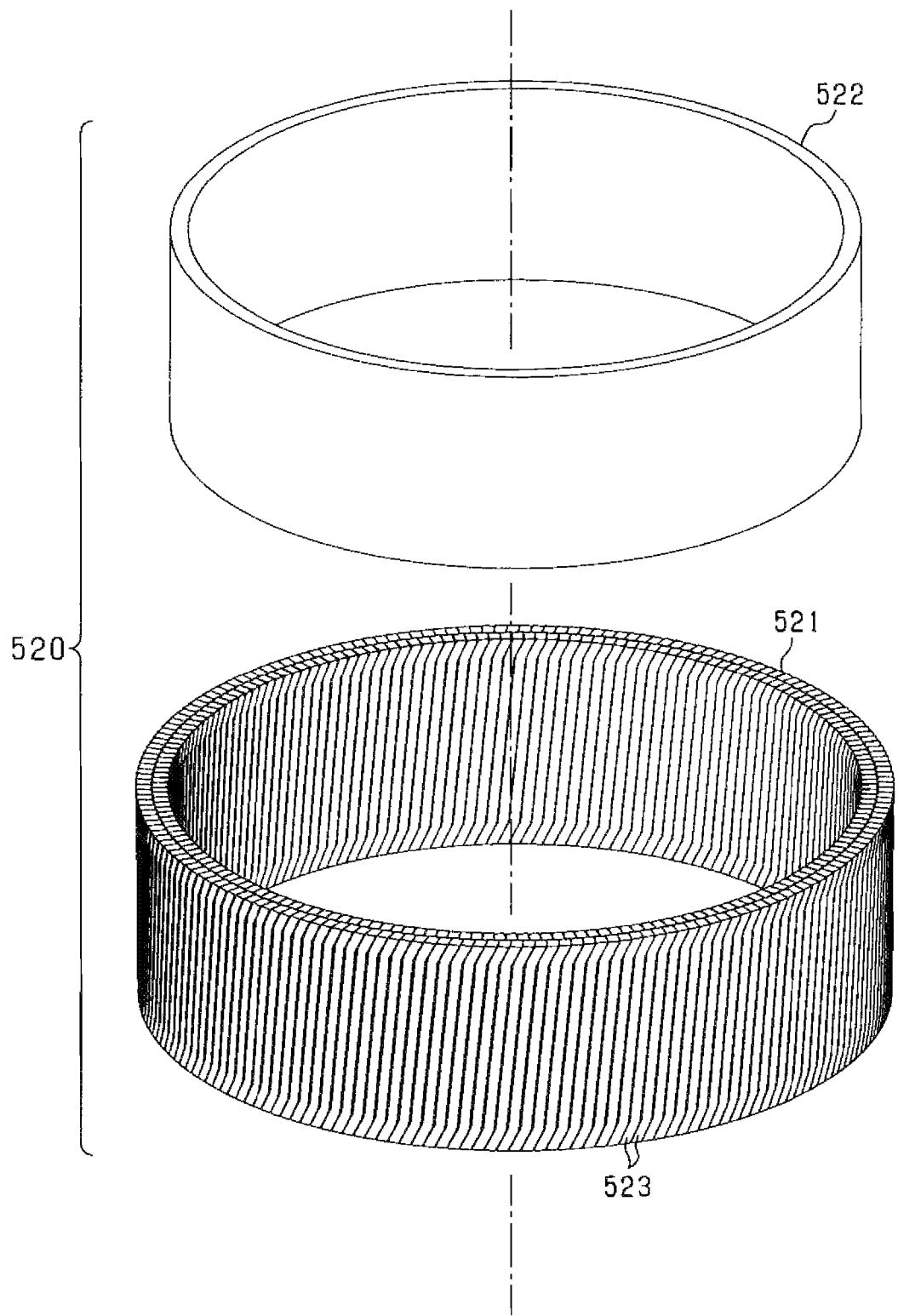
FIG. 53 is a perspective view of a stator winding and a stator core.

Next, the configuration of the stator 520 will be described. The stator 520 includes a stator winding 521 and a stator core 522. FIG. 53 is a perspective view of the stator winding 521 and the stator core 522 in an exploded state.

The stator winding 521 is made of a plurality of phase windings that are formed so as to be wound into an approximately cylindrical shape (annular shape). The stator core 522 that serves as a base member is assembled to the radially inner side of the stator winding 521. According to the present embodiment, as a result of phase windings of the U-phase, V-phase, and W-phase being used, the stator winding 521 is configured as phase windings of three phases. Each phase winding is configured by two layers of conductors 523 on the inner side and the radially outer side. In a manner similar to the stator 50 described earlier, the stator 520 is characterized by having a slot-less structure and a flattened conductor structure in the stator winding 521. The stator 520 has a configuration that is similar to or like the stator 50 shown in FIGS. 8 to 16.

The configuration of the stator core 522 will be described. In a manner similar to the stator core 52 described earlier, the stator core 522 is that in which a plurality of electromagnetic steel sheets are laminated in the axial direction and has a circular cylindrical shape that has a predetermined thickness in the radial direction. The stator winding 521 is assembled to the stator core 522 on the radially outer side that is the rotor 510 side. The outer circumferential surface of the stator core 522 has a curved surface shape that has substantially no unevenness. In a state in which the stator winding 521 is assembled thereto, the conductors 523 that configure the stator winding 521 are arranged so as to be arrayed in the circumferential direction on the outer circumferential surface of the stator core 522. The stator core 522 functions as a back core.

The stator 520 may be that which uses any of (A) to (C), below.

(A) In the stator 520, an inter-conductor member is provided between the conductors 523 in the circumferential direction, and when the width dimension in the circumferential direction of the inter-conductor member in a single magnetic pole is Wt, the saturation magnetic density of the inter-conductor member is Bs, the width dimension in the circumferential direction of the magnet unit 512 in a single magnetic pole is Wm, and the residual magnetic flux density of the magnet unit 512 is Br, a magnetic material in which a relationship expressed by Wt×Bs≤Wm×Br is satisfied is used as the inter-conductor member.

(B) In the stator 520, the inter-conductor member is provided between the conductors 523 in the circumferential direction, and a non-magnetic material is used as the inter-conductor member.

(C) In the stator 520, the inter-conductor member is not provided between the conductors 523 in the circumferential direction.

As a result of the configuration of the stator 520 such as this, inductance is reduced compared to a rotating electric machine that has a typical teeth structure in which teeth (core) for establishing a magnetic path are provided between the conductor portions that serve as the stator winding. Specifically, the inductance can be made 1/10 or less. In this case, because impedance decreases in accompaniment with the decrease in inductance, output power in relation to input power of the rotating electric machine 500 is increased.

Furthermore, this configuration can contribute to increase in torque. In addition, compared to a rotating electric machine that uses an embedded-magnet-type rotor in which torque output is performed using a voltage of an impedance component (in other words, using reluctance torque), a high-output rotating electric machine can be provided.

According to the present embodiment, the stator winding 521 is configured to be integrally molded from a molding material (insulation member) that is made of resin or the like, together with the stator core 522. The mold material is interposed between the conductors 523 that are arrayed in the circumferential direction. Based on this structure, the stator 520 according to the present embodiment corresponds to configuration (B), among (A) to (C), described above.

In addition, the conductors 523 that are adjacent to each other in the circumferential direction are such that end surfaces in the circumferential direction are in contact with each other or are closely arranged with a minute gap therebetween. Based on this configuration, the stator 520 may have configuration (C), described above. Here, when configuration (A), described above, is used, a protruding portion may be provided on the outer circumferential surface of the stator core 522 to match an orientation of the conductors 523 in the axial direction, that is, for example, to match a skew angle if the stator winding 521 has a skewed structure.

Figure 54:
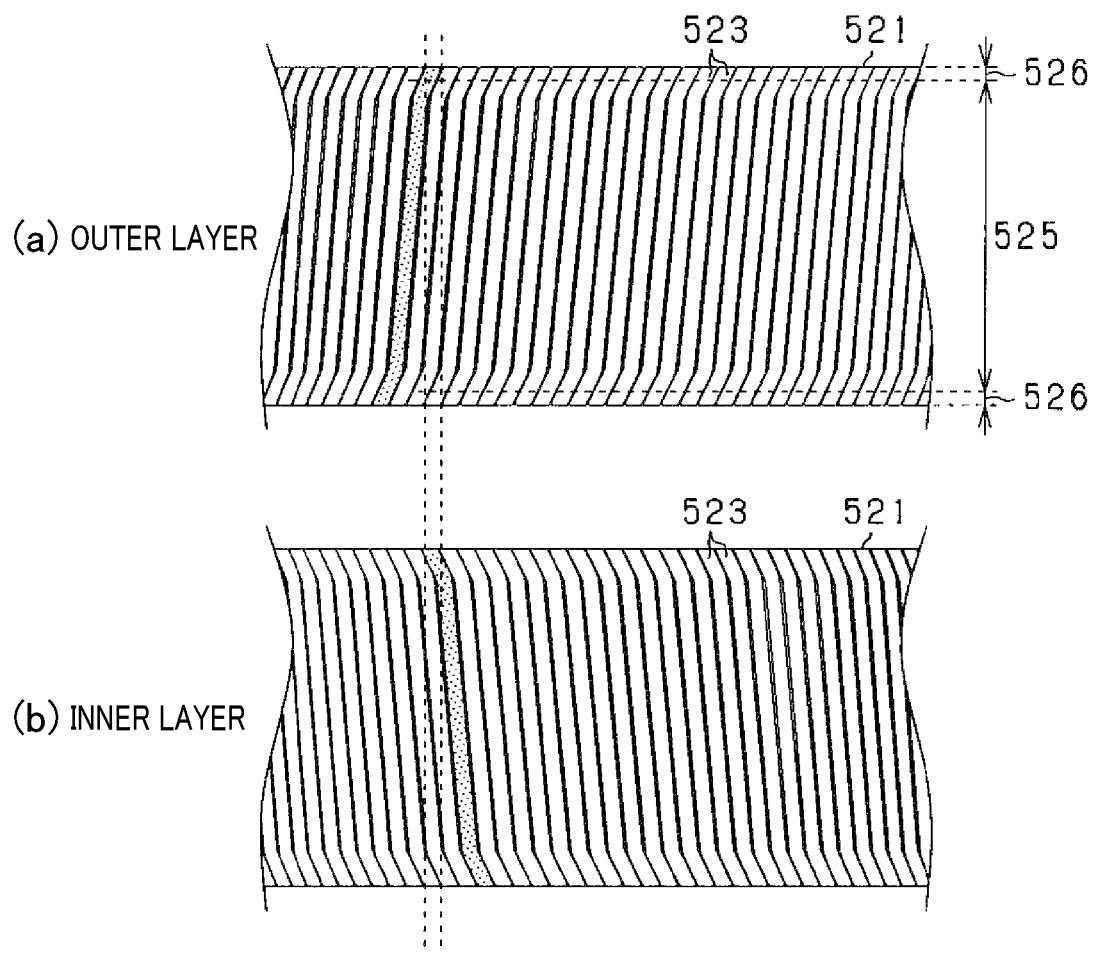
FIG. 54 illustrates, by (a) and (b), developed front views of the stator winding in a planarly expanded state.

Next, the configuration of the stator winding 521 will be described with reference to FIG. 54 by (a) and (b). FIG. 54 shows, by (a) and (b), developed front views in which the stator winding 521 is expanded in a planar manner. FIG. 54 shows, by (a), each conductor 523 that is positioned on the outer layer in the radial direction. FIG. 54 shows, by (b), each conductor 523 that is positioned in the inner layer in the radial direction.

The stator winding 521 is formed by being wound into a circular annular shape by distributed winding. In the stator winding 521, a conductor material is wound in two layers on the inner side and the radially outer side. In addition, skewing is applied in differing directions between the conductors 523 on the inner layer side and the outer layer side (see FIG. 54 by (a) and (b)). The conductors 523 are mutually insulated. The conductor 523 may be configured as a bundle of a plurality of wires 86 (see FIG. 13).

In addition, for example, the conductors 523 that are of the same phase and that have the same energization direction are provided so as to be arrayed two at a time in the circumferential direction. In the stator winding 521, a single conductor portion of the same phase is configured by the conductors 523 that are in two layers in the radial direction and two conductors in the circumferential direction (that is, a total of four conductors). The conductor portion is provided one each within a single magnetic pole.

In the conductor portion, a thickness dimension in the radial direction thereof is preferably smaller than a width dimension in the circumferential direction corresponding to a single phase within a single magnetic pole. The stator winding 521 preferably has a flattened conductor structure, as a result. Specifically, for example, in the stator winding 521, a single conductor portion of the same phase may be configured by the conductors 523 that are in two layers in the radial direction and four conductors in the circumferential direction (that is, a total of eight conductors).

Alternatively, on a conductor cross-section of the stator winding 521 shown in FIG. 50, the width dimension in the circumferential direction may be greater than the thickness dimension in the radial direction. The stator winding 51 shown in FIG. 12 can also be used as the stator winding 521. However, in this case, a space for housing the coil end of the stator winding is required to be secured inside the rotor carrier 511.

In the stator winding, the conductors 523 are arranged in an array in the circumferential direction so as to be tilted at a predetermined angle in relation to the stator core 522, in coil sides 525 that overlap on the inner side and the radially outer side. In addition, the conductors 523 are reversed (doubled back) toward the inner side in the axial direction at coil ends 526 on both sides that are further on the outer side in the axial direction than the stator core 522, and continuously connected.

In FIG. 54 by (a), an area that serves as the coil side 525 and an area that serves as the coil end 526 are each shown. The conductor 523 on the inner layer side and the conductor 523 on the outer layer side are connected to each other at the coil end 526. As a result, each time the conductor 523 is reversed (each time the conductor 523 is doubled back) in the axial direction at the coil end 526, the conductor 523 alternately switches between the inner layer side and the outer layer side. In other words, the stator winding 521 is configured such that, in the conductors 523 that are continuous in the circumferential direction, switching between inner and outer layers is performed to match a reversal of a direction of a current.

In addition, in the stator winding 521, two types of skewing of which skew angles differ between that of end portion areas that are both ends in the axial direction and that of a center area that is sandwiched between the end portion areas are applied.

Figure 55:
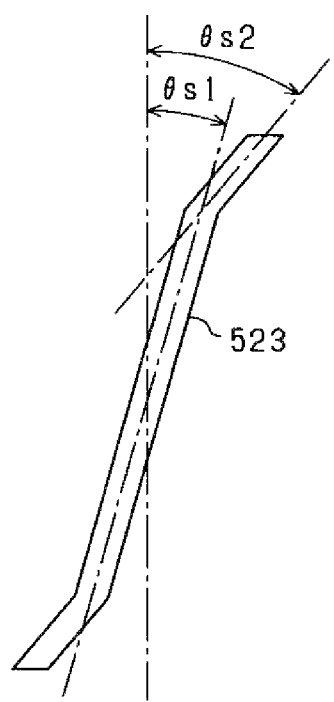
FIG. 55 is a diagram of skew of a conductor.

That is, as shown in FIG. 55, in the conductor 523, a skew angle θs1 of the center area and a skew angle θs2 of the end portion area differ. The skew angle θs1 is smaller than the skew angle θs2. The end portion area is prescribed as an area that includes the coil side 525 in the axial direction. The skew angle θs1 and the skew angle θs2 are tilt angles at which the conductors 523 are tilted in relation to the axial direction. The skew angle θs1 of the center area may be prescribed to be an angle range that is appropriate for eliminating harmonic components of the magnetic flux that are generated as a result of energization of the stator winding 521.

As a result of the skew angles of the conductor 523 in the stator winding 521 differing between that of the center area and that of the end portion areas, and the skew angle θs1 of the center area being smaller than the skew angle θs2 of the end portion areas, a winding factor of the stator winding 521 can be increased while reduction of the coil end 526 is achieved.

In other words, a length of the coil end 526, that is, a conductor length of the portion that projects out from the stator core 522 in the axial direction can be shortened while a desired winding factor is ensured. As a result, torque enhancement can be implemented while size reduction of the rotating electric machine 50 is implemented.

Here, an appropriate range of the skew angle θs1 of the center area will be described. When an X-number of conductors 523 are arranged within a single magnetic pole in the stator winding 521, an X-order harmonic component being generated as a result of the energization of the stator winding 521 can be considered. When the number of phases is S and the number of pairs is m, X=2×S×m.

The disclosers of the present application have focused on the following. That is, because the X-order harmonic component is a component that composes a composite wave of an X−1-order harmonic component and an X+1-order harmonic component, the X-order harmonic component can be reduced as a result of at least either of the X−1-order harmonic component and the X+1-order harmonic component being reduced. In light of this focus, the disclosers of the present application have found that the X-order harmonic component can be reduced as a result of the skew angle θs1 being set within an angle range of 360°/(X+1) to 360°/(X−1) in electrical angles.

For example, when S=3 and m=2, to reduce the harmonic component of X=12th order, the skew angle θs1 is set within an angle range of 360°/13 to 360°/11. That is, the skew angle θs1 may be set to an angle within a range of 27.7° to 32.7°.

As a result of the skew angle θs1 of the center area being set as described above, in the center area, the NS-alternating magnet magnetic flux can be actively interlinked. The winding factor of the stator winding 521 can be increased.

The skew angle θs2 of the end portion area is an angle that is greater than the skew angle θs1 of the center area, described above. In this case, the angle range of the skew angle θs2 is θs1<θs2<90°.

In addition, in the stator winding 521, the conductor 523 on the inner layer side and the conductor 523 on the outer layer side may be connected by welding or bonding of the end portions of the conductors 523. Alternatively, the conductor 523 on the inner layer side and the conductor 523 on the outer layer side may be connected by bending them. In the stator winding 521, the end portion of each phase winding is electrically connected to a power converter (inverter) by a bus bar or the like in the coil end 526 on one side (that is, one end side in the axial direction), of the coil ends 526 on both sides in the axial direction. Therefore, here, a configuration in which the conductors are connected to each other in the coil end 526 will be described, while differentiation is made between the coil end 526 on the bus-bar connection side and the coil end 526 on an opposite side thereof.

As a first configuration, the conductors 523 are connected by welding in the coil ends 526 on the bus-bar connection side, and the conductors 523 are connected by a means other than welding in the coil ends 526 on the opposite side thereof.

For example, as a means other than welding, connection by bending of the conductor material can be considered. In the coil end 526 on the bus-bar connection side, the bus bar being welded to the end portions of the phase windings can be assumed. Therefore, as a result of the configuration in which the conductors 523 are connected by welding in the same coil end 526 thereof, the welding portion can be performed in a series of steps and work efficiency can be improved.

As a second configuration, the conductors 523 are connected by a means other than welding in the coil ends 536 on the bus-bar connection side, and the conductors 523 are connected by welding in the coil ends 526 on the opposite side thereof.

In this case, if the conductors 523 are connected by welding in the coil ends 526 on the bus-bar connection side, a need to keep sufficient separation distance between the bus bar and the coil ends 526 to prevent contact between the welding portion and the bus bar arises. However, as a result of the present configuration, the separation distance between the bus bar and the coil ends 526 can be reduced. As a result, restrictions related to the length of the stator winding 521 in the axial direction or the bus bar can be relaxed.

As a third configuration, the conductors 523 are connected by welding in the coil ends 526 on both sides in the axial direction. In this case, all of the conductor materials that are prepared before welding can be of a short wire length. Improvement in work efficiency can be achieved through elimination of a bending step.

As a fourth configuration, the conductors 523 are connected by a means other than welding in the coil ends 526 on both sides in the axial direction. In this case, sections in which welding is performed can be minimized in the stator winding 521. Concern regarding insulation peeling occurring at a welding step can be reduced.

In addition, at a step of fabricating the circular annular stator winding 521, a strip-shaped winding that is aligned in a planar shape may be fabricated, and the strip-shaped winding may subsequently be formed into an annular shape. In this case, in a state in which the stator winding is in the form of the planar, strip-shaped winding, welding of the conductors at the coil ends 526 may be performed as required.

When the planar, strip-shaped winding is formed into the annular shape, the strip-shaped winding may be formed into an annular shape using a circular columnar tool that has the same diameter as the stator core 522, by the winding being wrapped around the circular columnar tool. Alternatively, the strip-shaped winding may be directly wrapped around the stator core 522.

Here, the configuration of the stator winding 521 can also be modified in the following manner.

For example, in the stator winding 521 shown in FIG. 54 by (a) and (b), the skew angles of the center area and the end portion area may be the same.

In addition, in the stator winding 521 shown in FIG. 54 by (a) and (b), the end portions of the conductors 523 of the same phase that are adjacent to each other in the circumferential direction may be connected to each other by a crossover wire that extends in a direction that is orthogonal to the axial direction.

The number of layers of the stator winding 521 is merely required to be 2×n layers (n being a natural number). The stator winding 521 can have four layers, six layers, or the like, instead of two layers.

Next, the inverter unit 530 that is a power conversion unit will be described. Here, a configuration of the inverter unit 530 will be described with reference to FIGS. 56 and 57 that are exploded cross-sectional views of the inverter unit 530. Here, FIG. 57 shows components shown in FIG. 56 as two subassemblies.

The inverter unit 530 includes an inverter housing 531, a plurality of electrical modules 532 that are assembled to the inverter housing 531, and a bus bar module 533 that electrically connects the electrical modules 532.

The inverter housing 531 includes an outer wall member 541, an inner wall member 542, and a boss formation member 543. The outer wall member 541 has a circular cylindrical shape. The inner wall member 542 has a circular cylindrical shape of which an outer circumference diameter is smaller than a diameter of the outer wall member 541, and is arranged on the radially inner side of the outer wall member 541. The boss formation member 543 is fixed to one end side in the axial direction of the inner wall member 542.

The members 541 to 543 are preferably made of a conductive material, and for example, is made of a CFRP. The inverter housing 531 is configured by the outer wall member 541 and the inner wall member 542 being assembled so as to be overlapped on the inner side and the radially outer side, and the boss formation member 543 being assembled to one end side in the axial direction of the inner wall member 542. This assembled state is the state shown in FIG. 57.

The stator core 522 is fixed to the radially outer side of the outer wall member 541 of the inverter housing 531. As a result, the stator 520 and the inverter unit 530 are integrated.

Figure 56:
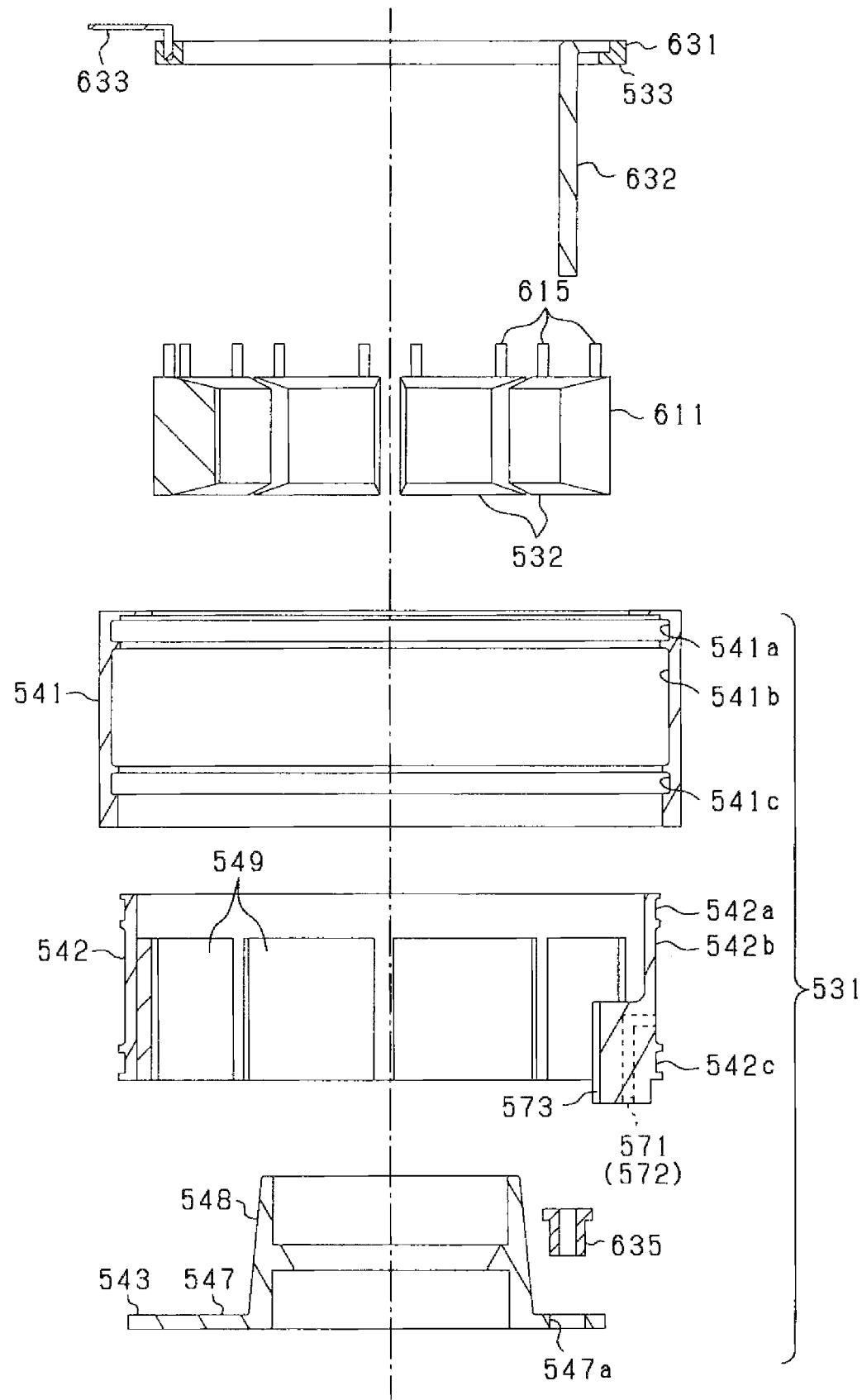
FIG. 56 is an exploded cross-sectional view of an inverter unit.
Figure 57:
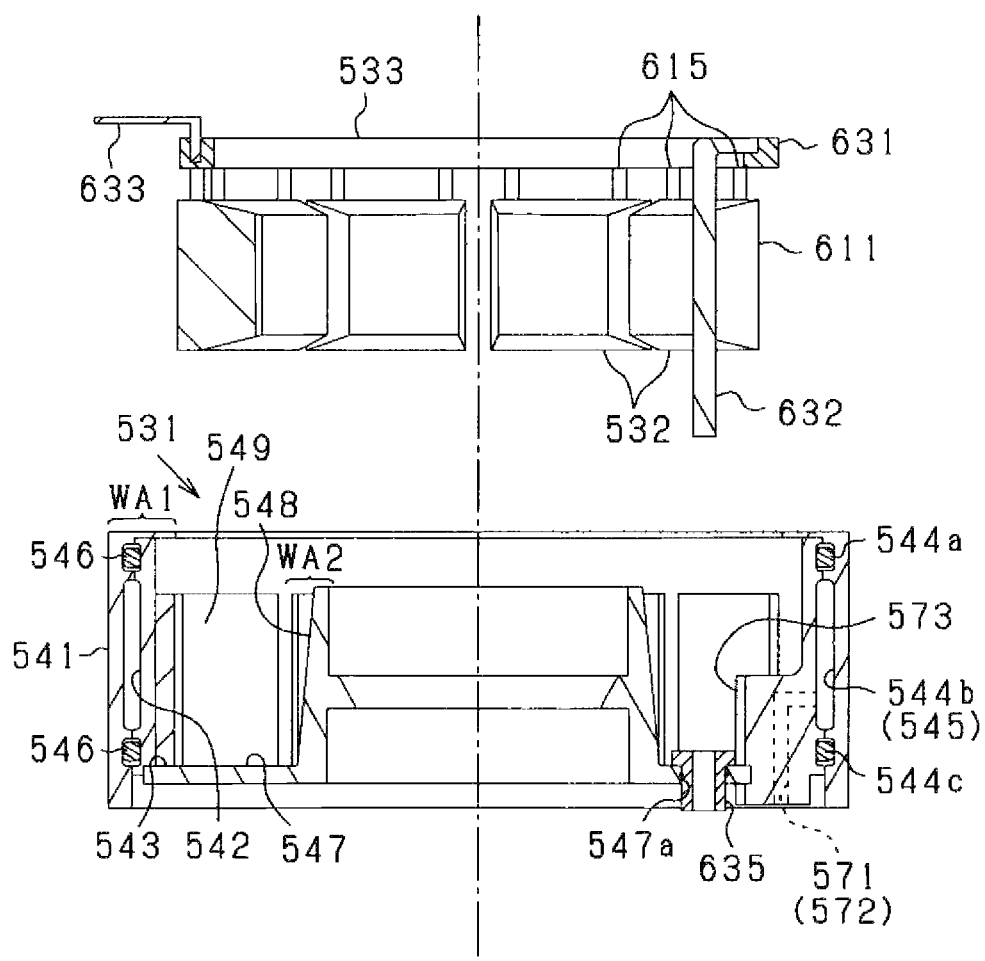
FIG. 57 is an exploded cross-sectional view of the inverter unit.

As shown in FIG. 56, a plurality of recess portions 541*a*, 541*b*, and 541*c* are formed on an inner circumferential surface of the outer wall member 541. In addition, a plurality of recess portions 542*a*, 542*b*, and 542*c* are formed on an outer circumferential surface of the inner wall member 542. Furthermore, as a result of the outer wall member 541 and the inner wall member 542 being assembled together, three hollow portions 544*a*, 544*b*, and 544*c* are formed between the outer wall member 541 and the inner wall member 542 (see FIG. 57).

Among the hollow portions 544*a*, 544*b*, and 544*c*, the hollow portion 544*b* in the center is used as a cooling water passage 545 through which cooling water that serves as a coolant flows. In addition, a sealing member 546 is housed in the hollow portions 544*a* and 544*c* on both sides sandwiching the hollow portion 544*b* (cooling water passage 545). The hollow portion 544*b* (cooling water passage 545) is sealed by the sealing member 546. The cooling water passage 545 will be described in detail hereafter.

In addition, in the boss formation member 543, an end plate 547 that has a circular-disk ring shape, and a boss portion 548 that protrudes from the end plate 547 toward a housing interior are provided. The boss portion 548 is provided in a hollow cylindrical shape.

For example, as shown in FIG. 51, of a first end of the inner wall member 542 in the axial direction and a second end on the protruding side (that is, the vehicle inner side) of the rotation shaft 501 that opposes the first end, the boss formation member 543 is fixed to the second end. Here, in the vehicle wheel 400 shown in FIGS. 45 to 47, the base plate 405 is fixed to the inverter housing 531 (more specifically, the end plate 547 of the boss formation member 543).

The inverter housing 531 is configured to have a double layer of peripheral walls in the radial direction with the axial center as a center. The peripheral wall on the outer side of the double layer of peripheral walls is formed by the outer wall member 541 and the inner wall member 542. The peripheral wall on the inner side is formed by the boss portion 548.

Here, in the description below, the peripheral wall on the outer side that is formed by the outer wall member 541 and the inner wall member 542 is also referred to as an "outer peripheral wall WA1", and the peripheral wall on the inner side that is formed by the boss portion 548 is also referred to as an "inner peripheral wall WA2".

An annular space is formed between the outer peripheral wall WA1 and the inner peripheral wall WA2 in the inverter housing 531. The plurality of electrical modules 532 are arranged so as to be arrayed in the circumferential direction inside the annular space. The electrical module 532 is fixed to the inner circumferential surface of the inner wall member 542 by bonding, screw-fastening, or the like. According to the present embodiment, the inverter housing 531 corresponds to a "housing member". The electrical module 532 corresponds to an "electrical component".

The bearing 560 is housed on the inner side of the inner peripheral wall WA2 (boss portion 548). The rotation shaft 501 is supported by the bearing 560 so as to freely rotate. The bearing 560 is a hub bearing that rotatably supports the vehicle wheel 400 in a vehicle-wheel center portion. The bearing 560 is provided in a position that overlaps the rotor 510, the stator 520, and the inverter unit 530 in the axial direction.

In the rotating electric machine 500 according to the present embodiment, as a result of the magnet unit 512 being able to be made thinner in accompaniment with the orientation in the rotor 510, and the slot-less structure and the flattened conductor structure being used in the stator 520, the thickness dimension in the radial direction of the magnetic circuit portion can be reduced and the hollow space further toward the radially inner side than the magnetic circuit portion is can be expanded.

As a result, arrangement of the magnetic circuit portion, the inverter unit 530, and the bearing 560 in a state in which the magnetic circuit portion, the inverter unit 530, and the bearing 560 are laminated in the radial direction becomes possible. The boss portion 548 serves as a bearing holding portion that holds the bearing 560 on the inner side thereof.

For example, the bearing 560 is a radial ball bearing. The bearing 560 includes an inner ring 561, an outer ring 562, and a plurality of balls 563. The inner ring 561 forms a cylindrical shape. The outer ring 562 forms a cylindrical shape that has a larger diameter than the inner ring and is arranged on the radially outer side of the inner ring 561. The plurality of balls 563 are arranged between the inner ring 561 and the outer ring 562. The bearing 560 is fixed to the inverter housing 531 by the outer ring 562 being assembled to the boss formation member 543, and the inner ring 561 is fixed to the rotation shaft 501. This inner ring 561, outer ring 562, and balls 563 are all made of a metal material such as carbon steel.

In addition, the inner ring 561 of the bearing 560 has a cylindrical portion 561a that houses the rotation shaft 501 and a flange 561b that extends in a direction that intersects (is orthogonal to) the axial direction from one end portion in the axial direction of the cylindrical portion 561a. The flange 561b is a portion that is in contact with the end plate 514 of the rotor carrier 511 from the inner side.

In a state in which the bearing 560 is assembled to the rotation shaft 501, the rotor carrier 511 is held so as to be sandwiched between the flange 502 of the rotation shaft 501 and the flange 561b of the inner ring 561. In this case, the flange 502 of the rotation shaft 501 and the flange 561b of the inner ring have the same angle of intersection in relation to the axial direction as each other (according to the present embodiment, both are right angles). The rotor carrier 511 is held so as to be sandwiched between these flanges 502 and 561b.

The rotor carrier 511 is supported from the inner side by the inner ring 561 of the bearing 560. In this configuration, an angle of the rotor carrier 511 in relation to the rotation shaft 501 can be held at an appropriate angle. Furthermore, a degree of parallelism of the magnet unit 512 in relation to the rotation shaft 501 can be favorably maintained. As a result, even when the rotor carrier 511 is expanded in the radial direction, resistance against vibration and the like can be improved.

Next, the electrical modules 532 that are housed in the inverter housing 531 will be described.

The plurality of electrical modules 532 are that in which electrical components such as the semiconductor switching element that configures the power converter and the smoothing capacitor are divided into a plurality of groups and individually modularized. The electrical modules 532 include a switch module 532A that includes the semiconductor switching element that is a power element, and a capacitor module 532B that includes the smoothing capacitor.

As shown in FIGS. 49 and 50, a plurality of spacers 549 that have flat surfaces for attaching the electrical modules 532 are fixed to the inner circumferential surface of the inner wall member 542. The electrical module 532 is attached to the spacer 549. That is, whereas the inner circumferential surface of the inner wall member 542 is a curved surface, an attachment surface of the electrical module 532 is a flat surface. Therefore, a flat surface is formed on the inner circumferential surface side of the inner wall member 542 by the spacer 549, and the electrical module 532 is fixed to the flat surface.

Here, the configuration in which the spacer 549 is interposed between the inner wall member 542 and the electrical module 532 is not a requisite. The electrical module 532 can also be directly attached to the inner wall member 542 by the inner circumferential surface of the inner wall member 542 being a flat surface or the attachment surface of the electrical module 532 being a curved surface.

In addition, the electrical module 532 can also be fixed to the inverter housing 531 in a state in which the electrical module 532 is not in contact with the inner circumferential surface of the inner wall member 542. For example, the electrical module 532 is fixed to the end plate 547 of the boss formation member 543. The switch module 532A can be fixed in a state of contact with the inner circumferential surface of the inner wall member 542, and the capacitor module 532B can be fixed in a state of non-contact with the inner circumferential surface of the inner wall member 542.

Here, when the spacer 549 is provided on the inner circumferential surface of the inner wall member 542, the outer peripheral wall WA1 and the spacer 549 correspond to a "cylindrical portion". In addition, when the spacer 549 is not used, the outer peripheral wall WA1 corresponds to the "cylindrical portion".

As described above, the cooling water passage 545 through which the cooling water that serves as a coolant flows is formed in the outer peripheral wall WA1 of the inverter housing 531. Each electrical module 532 is cooled by the cooling water that flows through the cooling water passage 545.

Here, as the coolant, a cooling oil can also be used instead of the cooling water. The cooling water passage 545 is provided in an annular shape along the outer peripheral wall WA1. The cooling water that flows through the cooling water passage 545 flows from an upstream side to a downstream side via each electrical module 532. According to the present embodiment, the cooling water passage 545 is provided in an annular shape so as to overlap each electrical module 532 on the inner side and the radially outer side and surround each electrical module 532.

The inner wall member 542 is provided with an inlet passage 571 through which the cooling water flows into the cooling water passage 545, and an outlet passage 572 through which the cooling water flows out from the cooling water passage 545. The plurality of electrical modules 532 are fixed to the inner circumferential surface of the inner wall member 542 as described above.

In this configuration, a space between the electrical modules that are adjacent in the circumferential direction is more expanded in a single location than other spaces. A protruding portion 573 in which a portion of the inner wall member 542 protrudes toward the radially inner side is formed in the expanded portion. In addition, the inlet passage 571 and the outlet passage 572 are provided so as to be laterally arrayed along the radial direction in the protruding portion 573.

Figure 58:
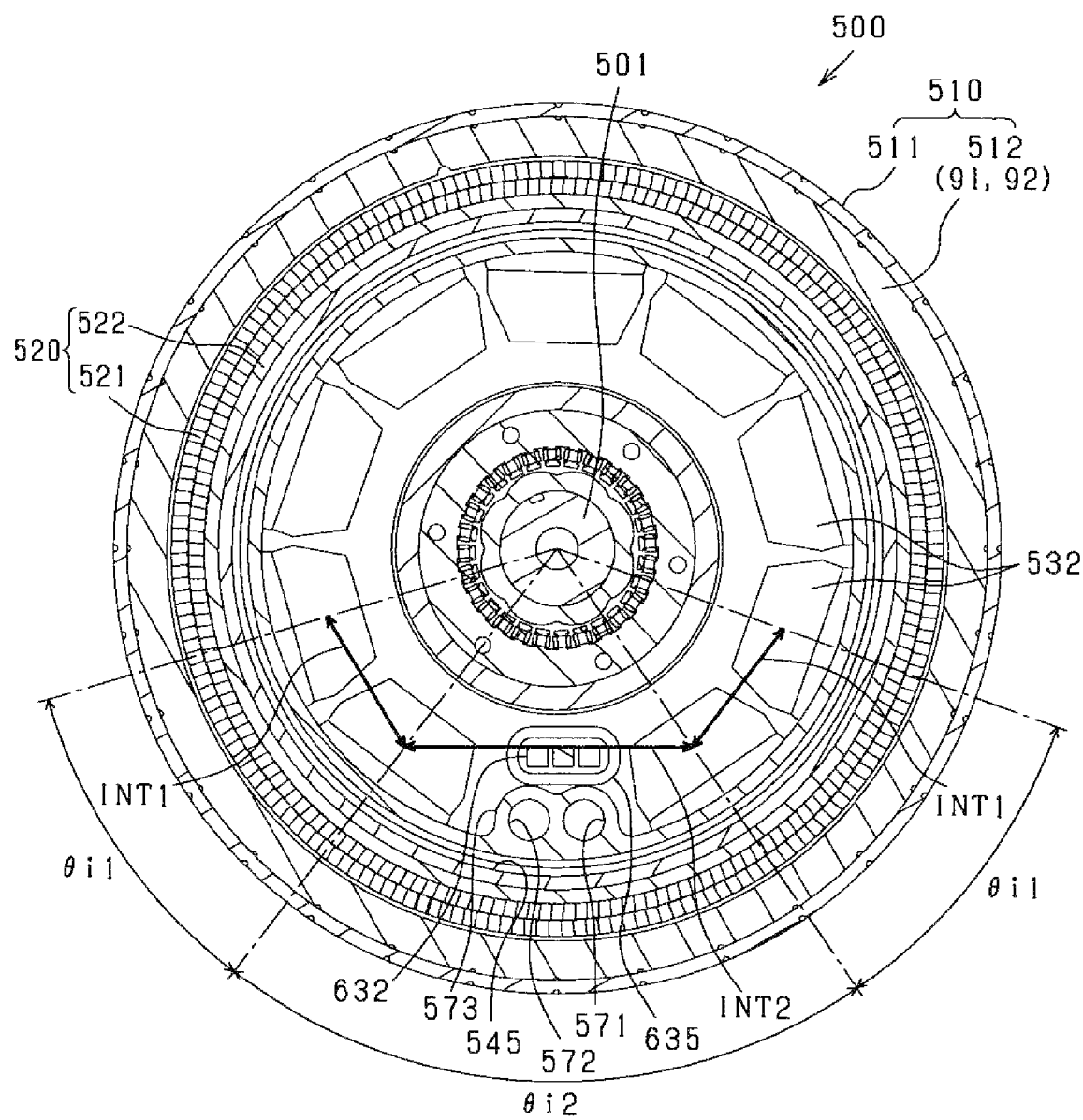
FIG. 58 is a diagram of a state of arrangement of electrical modules in an inverter housing.

A state of the arrangement of the electrical modules 532 in the inverter housing 531 is shown in FIG. 58. Here, FIG. 58 is the same longitudinal cross-sectional view as FIG. 50.

As shown in FIG. 58, the electrical modules 532 are arranged so as to be arrayed in the circumferential direction with an interval between the electrical modules in the circumferential direction being a first interval INT1 or a second interval INT2. The second interval INT2 is an interval that is wider than the first interval INT1. For example, each of the intervals INT1 and INT2 is a distance between center positions of two electrical modules 532 that are adjacent in the circumferential direction.

In this case, the interval between the electrical modules that are adjacent in the circumferential direction without the protruding portion 573 therebetween is the first interval INT1. The interval between the electrical modules that are adjacent in the circumferential direction with the protruding portion 573 therebetween is the second interval INT2. That is, the interval between the electrical modules that are adjacent in the circumferential direction is widened in a portion thereof. The protruding portion 573 is provided, for example, in a portion that is a center of the widened interval (second interval INT2).

The intervals INT1 and INT2 may be a circular arc distance between the center positions of the two electrical modules 532 that are adjacent in the circumferential direction, on the same circle around the rotation shaft 51. Alternatively, the interval between the electrical modules in the circumferential direction may be defined by angle intervals $\theta i1$ and $\theta i2$ with the rotation shaft 501 as a center ($\theta i1 < \theta i2$).

Here, in FIG. 58, the electrical modules 532 that are arrayed at the first interval INT1 are arranged in a state in which the electrical modules 532 are separated from each other in the circumferential direction (state of non-contact). However, instead of this configuration, the electrical modules 532 may be arranged in a state in which the electrical modules 532 are in contact with each other in the circumferential direction.

As shown in FIG. 48, a water-flow port 574 in which passage end portions of the inlet passage 571 and the outlet passage 572 are formed is provided in the end plate 547 of the boss formation member 543. A circulation path 575 that circulates the cooling water is connected to the inlet passage 571 and the outlet passage 572. The circulation path 575 is made of a cooling water pipe. A pump 576 and a heat releasing apparatus 577 are provided on the circulation path 575. The cooling water circulates through the cooling water passage 545 and the circulation path 575 in accompaniment with driving of the pump 576. The pump 576 is an electric pump. For example, the heat releasing apparatus 577 is a radiator that releases heat from the cooling water into the atmosphere.

As shown in FIG. 50, the stator 520 is arranged on the outer side of the outer peripheral wall WA1 and the electrical modules 532 are arranged on the inner side. Therefore, heat from the stator 520 is transmitted to the outer peripheral wall WA1 from the outer side. In addition, heat from the electrical modules 532 is transmitted to the outer peripheral wall WA1 from the inner side.

In this case, the stator 50 and the electrical modules 532 can be simultaneously cooled by the cooling water that flows through the cooling water passage 545. Heat from heat generating components of the rotating electric machine 500 can be efficiently released.

Here, an electrical configuration of the power converter will be described with reference to FIG. 59.

Figure 59:
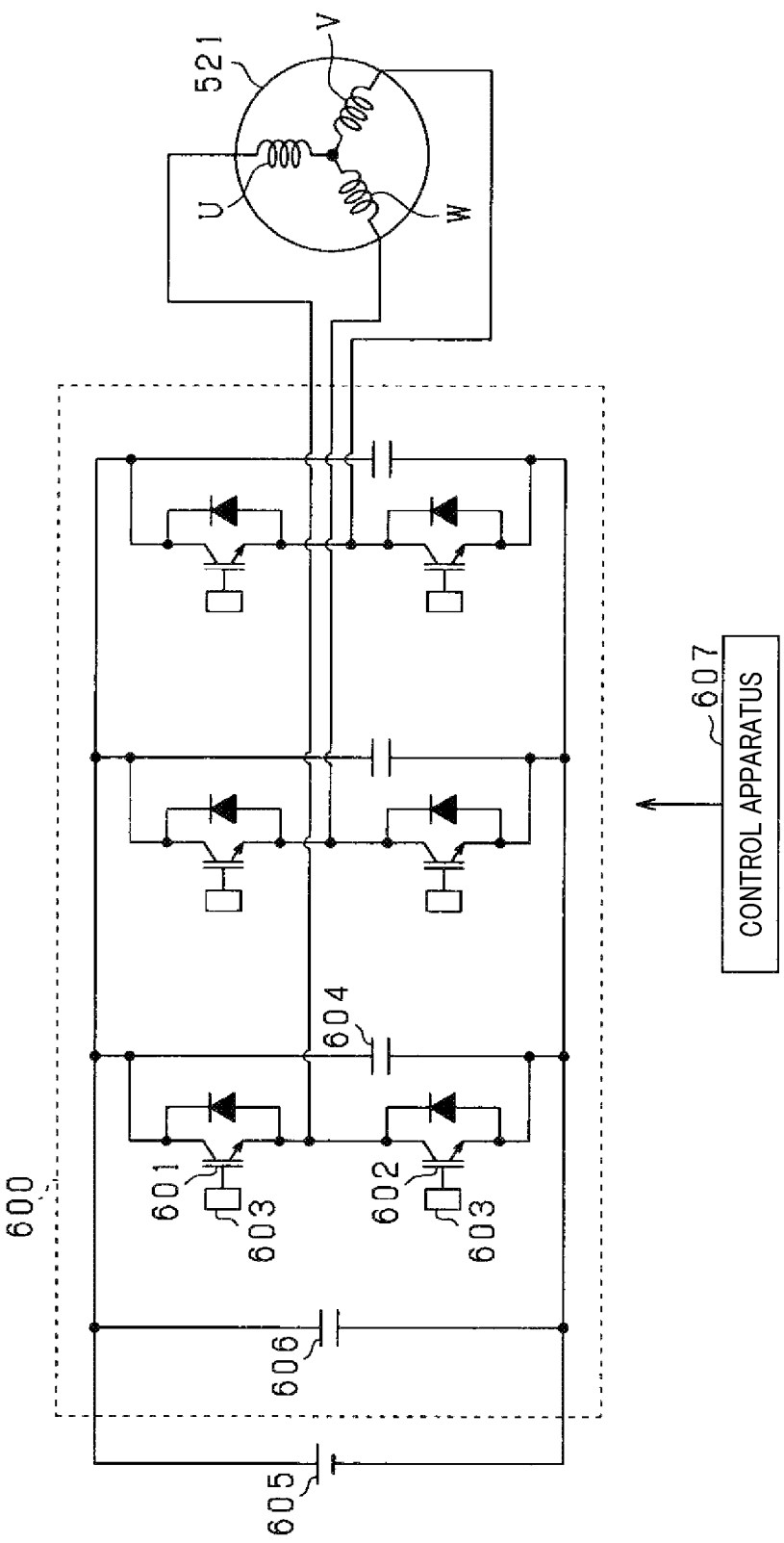
FIG. 59 is a circuit diagram of an electrical configuration of a power converter.

As shown in FIG. 59, the stator winding 521 is made of the U-phase winding, the V-phase winding, and the W-phase winding. An inverter 600 is connected to the stator winding 521. The inverter 600 is configured by a full-bridge circuit that includes the same number of upper and lower arms as the number of phases. The inverter 600 is provided with a serial-connection body that is made of an upper arm switch 601 and a lower arm switch 602, for each phase. The switches 601 and 602 are each turned on/off by a drive circuit 603. The winding of each phase is energized based on the on/off of the switches 601 and 602.

For example, each of the switches 601 and 602 is made of a semiconductor switching element, such as a MOSFET or an IGBT. In addition, a charge-supplying capacitor 604 that supplies the switches 601 and 602 with electric charge that is required during switching is connected in parallel to the serial-connection body of the switches 601 and 602 in the upper and lower arms of each phase.

A control apparatus 607 includes a microcomputer that includes a CPU and various memories. The control apparatus 607 performs energization control through switching on/off of the switches 601 and 602 based on various types of detection information of the rotating electric machine 500, and requests for power-running drive and power generation.

For example, the control apparatus 607 performs on/off control of the switches 601 and 602 by PWM control at a predetermined switching frequency (carrier frequency) or rectangular wave control. The control apparatus 607 may be an internal control apparatus that is provided inside the rotating electric machine 500 or may be an external control apparatus that is provided outside the rotating electric machine 500.

Here, in the rotating electric machine 500 according to the present embodiment, the electrical time constant decreases as a result of decrease in the inductance in the stator 520. Under such circumstances in which the electrical time constant is small, the switching frequency (carrier frequency) is preferably increased and switching speed is preferably increased. In this regard, wiring inductance decreases as a result of the charge-supplying capacitor 604 being connected in parallel to the serial-connection body of the switches 601 and 602 of each phase. Appropriate surge measures can be taken even when the switching speed is increased.

A high-potential-side terminal of the inverter 600 is connected to a positive electrode terminal of a direct-current power supply 605, and a low-potential-side terminal is connected to a negative electrode terminal (ground) of the direct-current power supply 605. In addition, a smoothing capacitor 606 is connected to the high-potential-side terminal and the low-potential-side terminal of the inverter 600, in parallel with the direct-current power supply 605.

The switch module 532A includes the switches 601 and 602 (semiconductor switching elements), the drive circuit 603 (specifically, an electrical element that configures the drive circuit 603), and the charge-supplying capacitor 604 as heat generating components. In addition, the capacitor module 532B includes the smoothing capacitor 606 as the heat generating component. A specific configuration example of the switch module 532A is shown in FIG. 60.

Figure 60:
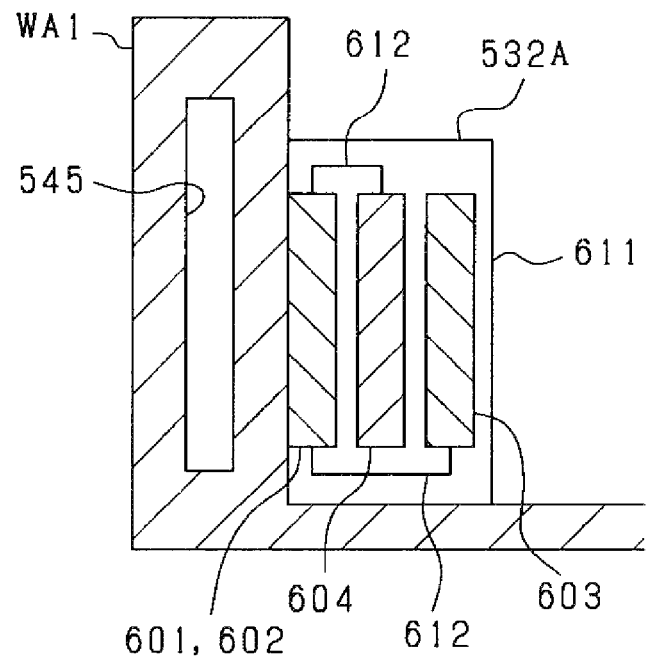
FIG. 60 is a diagram of an example of a cooling structure of a switch module.

As shown in FIG. 60, the switch module 532A includes a module case 611 that serves as a housing case. In addition, the switch module 532A includes the switches 601 and 602 that amount to a single phase, the drive circuit 603, and the charge-supplying capacitor 604 that are housed inside the module case 611. Here, the drive circuit 603 is configured as a dedicated IC or a circuit board, and is provided in the switch module 532A.

For example, the module case 611 is made of an insulation material such as resin. The module case 611 is fixed to the outer peripheral wall WA1 in a state in which a side surface thereof is in contact with the inner circumferential surface of the inner wall member 542 of the inverter unit 530.

An interior of the module case 611 is filled with a molding material such as resin. Inside the module case 611, the switches 601 and 602 and the drive circuit 603, and the switches 601 and 602 and the capacitor 604 are each electrically connected by wiring 612. Here, specifically, the switch module 532A is attached to the outer peripheral wall WA1 with the spacer 549 therebetween. However, illustration of the spacer 549 is omitted.

In a state in which the switch module 532A is fixed to the outer peripheral wall WA1, cooling performance is higher toward a side closer to the outer peripheral wall WA1 in the switch module 532A, that is, toward a side closer to the cooling water passage 545. Therefore, an order of array of the switches 601 and 602, the drive circuit 603, and the capacitor 604 is prescribed based on the cooling performance.

Specifically, when amounts of heat generation are compared, the order from the greatest is the switches 601 and 602, the capacitor 604, and the drive circuit 603. Therefore, the switches 601 and 602, the capacitor 604, and the drive circuit 603 are arranged in this order from the side closer to the outer peripheral wall WA1 to match the order of magnitude of the amounts of heat generation. Here, a contact surface of the switch module 532A may be smaller than a contactable surface of the inner circumferential surface of the inner wall member 542.

Here, a detailed illustration of the capacitor module 532B is omitted. However, the capacitor module 532B is configured such that the capacitor 606 is housed inside a module case that has the same shape and size as the switch module 532A. In a manner similar to the switch module 532A, the capacitor module 532B is fixed to the outer peripheral wall WA1 in a state in which the side surface of the module case 611 is in contact with the inner circumferential surface of the inner wall member 542 of the inverter housing 531.

The switch module 532A and the capacitor module 532B are not necessarily required to be concentrically arrayed on the radially inner side of the outer peripheral wall WA1 of the inverter housing 531. For example, the switch module 532A may be arranged further toward the radially inner side than the capacitor module 532B is. Alternatively, the switch module 532A and the capacitor module 532B may be arranged in reverse of the foregoing configuration.

During driving of the rotating electric machine 500, heat exchange is performed between the switch module 532A and the capacitor module 532B, and the cooling water passage 545 via the inner wall member 542 of the outer peripheral wall WA1. As a result, cooling of the switch module 532A and the capacitor module 532B is performed.

Figure 61:
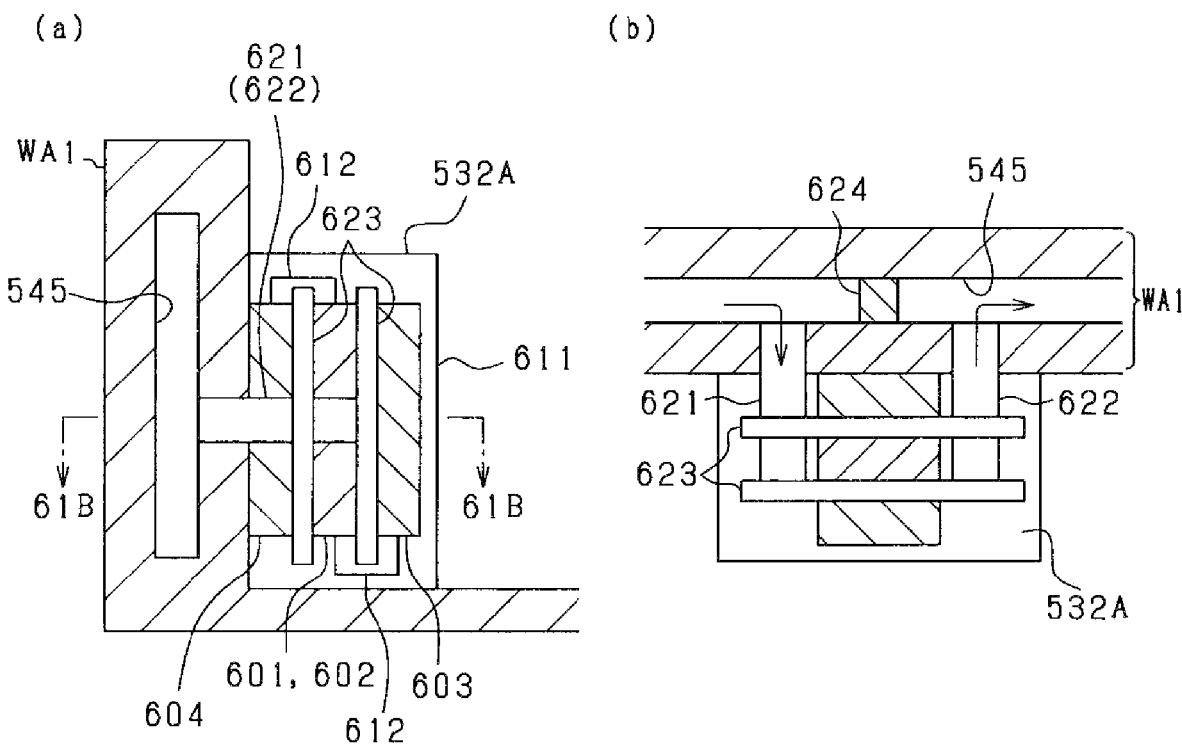
FIG. 61 illustrates, by (a) and (b), diagrams of an example of the cooling structure of the switch module.

The electrical module 532 may each be configured such that the cooling water is drawn into the interior thereof, and cooling by the cooling water is performed in the module interior. Here, a water-cooled structure of the switch module 532A will be described with reference to FIG. 61 by (a) and (b). FIG. 61 shows, by (a), a longitudinal cross-sectional view of a cross-sectional structure of the switch module 532A in a direction crossing the outer peripheral wall WA1. FIG. 61 shows, by (b), a cross-sectional view taken along line 61B-61B in FIG. 61 by (a).

As shown in FIG. 61 by (a) and (b), in addition to including the module case 611, the switches 601 and 602 corresponding to a single phase, the drive circuit 603, and the capacitor 604 in a manner similar to that in FIG. 60, the switch module 532A includes a cooling apparatus that includes a pair of pipe portions 621 and 622, and a cooler 623.

In the cooling apparatus, the pair of pipe portions 621 and 622 are made of an inflow-side pipe portion 621 through which the cooling water flows into the cooler 623 from the cooling water passage 545 of the outer peripheral wall WA1, and an outflow-side pipe portion 622 from which the cooling water flows into the cooling water passage 545 from the cooler 623. The cooler 623 is provided based on a cooling target.

In the cooling apparatus, a single stage or a plurality of stages of coolers 623 is used. In FIG. 61 by (a) and (b), two stages of coolers 623 are provided so as to be separated from each other in a direction away from the cooling water passage 545, that is, the radial direction of the inverter unit 530. The cooling water is supplied to each of the coolers 623 via the pair of pipe portions 621 and 622. For example, the cooler 623 has an interior that is a hollow cavity. However, the interior of the cooler 623 may be provided with an inner fin.

In the configuration that includes the two stages of coolers 623, each of (1) the outer peripheral wall WA1 side of the first-stage cooler 623, (2) between the first-stage and second-stage coolers 623, and (3) the counter-outer peripheral wall side of the second-stage cooler 623 is a location in which an electrical component to be cooled is arranged.

These locations are (2), (1), (3) in order from that with the highest cooling performance. That is, the location that is sandwiched between the two coolers 623 has the highest cooling performance. In the locations that are adjacent to either one of the coolers 623, the location closer to the outer peripheral wall WA1 (cooling water passage 545) has a higher cooling performance.

Taking this into consideration, as shown in FIG. 61 by (a) and (b), the switches 601 and 602 are arranged (2) between the first-stage and second-stage coolers 623, the capacitor 604 is arranged on (1) the outer peripheral wall WA1 side of the first-stage cooler 623, and the drive circuit 603 is arranged on (3) the counter-outer peripheral wall side of the second-stage cooler 623. Here, although not shown, the drive circuit 603 and the capacitor 604 may be arranged in reverse.

In any case, the switches 601 and 602 and the drive circuit 603, and the switches 601 and 602 and the capacitor 604 are respectively connected by the wirings 612 inside the module case 611. In addition, because the switches 601 and 602 are positioned between the drive circuit 603 and the capacitor 604, the wiring 612 that extends toward the drive circuit 603 from the switches 601 and 602 and the wiring 612 that extends toward the capacitor 604 from the switches 601 and 602 have a relationship in which the wirings 612 extend in directions that are opposite each other.

As shown in FIG. 61 by (b), the pair of pipe portions 621 and 622 are arranged so as to be arrayed in the circumferential direction, that is, on an upstream side and a downstream side of the cooling water passage 545. The cooling water flows from the inflow-side pipe portion 621 that is positioned on the upstream side into the cooler 623 and subsequently, the cooling water flows from the outflow-side pipe portion 622 that is positioned on the downstream side.

Here, to promote inflow of the cooling water into the cooling apparatus, the cooling water passage 545 may be provided with a regulating unit 624 that regulates the flow of cooling water, in a position between the inflow-side pipe portion 621 and the outflow-side pipe portion 622 when viewed in the circumferential direction. The restricting portion 624 may be a blocking portion that blocks the cooling water passage 545 or a narrowing portion that reduces a passage area of the cooling water passage 545.

FIG. 62 shows, by (a) to (c), another cooling structure of the switch module 532A. FIG. 62 shows, by (a), a longitudinal cross-sectional view of the cross-sectional structure of the switch module 532A in a direction crossing the outer peripheral wall WA1. FIG. 62 shows, by (b), a cross-sectional view taken along line 62B-62B in FIG. 62 by (a).

In FIG. 62 by (a) and (b), as a difference with the configuration in FIG. 61 by (a) and (b), described above, the arrangement of the pair of pipe portions 621 and 622 in the cooling apparatus differs. The pair of pipe portions 621 and 622 are arranged so as to be arrayed in the axial direction.

In addition, as shown in FIG. 62 by (c), in the cooling water passage 545, a passage portion that communicates with the inflow-side pipe portion 621 and a passage portion that communicates with the outflow-side pipe portion 622 are provided so as to be separated in the axial direction. These passage portions communicate through the pipe portions 621 and 622 and the coolers 623.

In addition, the following configuration can also be used as the switch module 532A.

In a configuration shown in FIG. 63 by (a), compared to the configuration in FIG. 61 by (a), the cooler 623 is changed from two stages to one stage. In this case, the location that has the highest cooling performance inside the module case 611 differs from that in FIG. 61 by (a). The location on the outer peripheral wall WA1 side, of both sides in the radial direction of the cooler 623 (both sides in the left/right direction in the drawing), has the highest cooling performance.

Next, the cooling performance decreases in the order of a location on the counter-outer peripheral wall side of the cooler 623 and a location away from the cooler 623. Taking this into consideration, as shown in FIG. 63 by (a), the switches 601 and 602 are arranged in the location on the outer peripheral wall WA1 side, of both sides in the radial direction of the cooler 623 (both sides in the left/right direction in the drawing). The capacitor 604 is arranged in the location on the counter-outer peripheral wall side of the cooler 623. The drive circuit 603 is arranged in a location away from the cooler 623.

In addition, in the switch module 532A, the configuration in which the switches 601 and 602 corresponding to a single phase, the drive circuit 603, and the capacitor 604 are housed inside the module case 611 can be modified. For example, the switches 601 and 602 corresponding to a single phase and either of the drive circuit 603 and the capacitor 604 may be housed inside the module case 611.

In FIG. 63 by (b), inside the module case 611, in addition to the pair of pipe portions 621 and 622 and the two stages of coolers 623 being provided, the switches 601 and 602 are arranged between the first-stage and second-stage coolers 623, and the capacitor 604 or the drive circuit 603 is arranged on the outer peripheral wall WA1 side of the first-stage cooler 623. In addition, the switches 601 and 602 and the drive circuit 603 may be integrated into a semiconductor module, and the semiconductor module and the capacitor 604 may be housed inside the module case 611.

Here, in FIG. 63 by (b), in the switch module 532A, a capacitor may be arranged on a side opposite the switches 601 and 602 in at least either of the coolers 623 that are arranged on both sides sandwiching the switches 601 and 602. That is, the capacitor 604 may be arranged on only either of the outer peripheral wall WA1 side of the first-stage cooler 623 and the counter-peripheral wall side of the second-stage cooler 623. Alternatively, the capacitor 604 may be arranged on both sides.

According to the present embodiment, the cooling water is drawn into the module interior from the cooling water passage 545 for only the switch module 532A, of the switch module 532A and the capacitor module 532B. However, the configuration may be modified. The cooling water may be drawn into both modules 532A and 532B from the cooling water passage 545.

Figure 64:
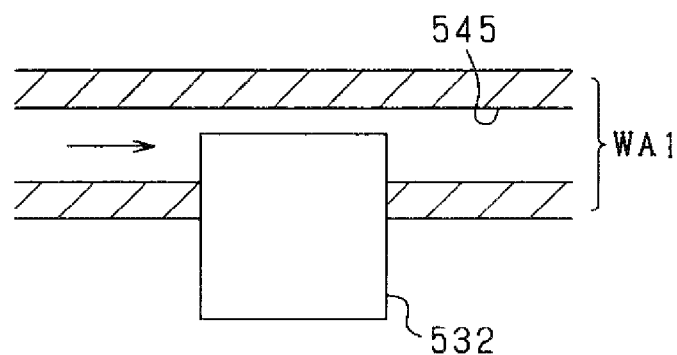
FIG. 64 is a diagram of an example of the cooling structure of the switch module.

In addition, the cooling water may come into direct contact with the outer surface of each electrical module 532 and may cool each electrical module 532. For example, as shown in FIG. 64, the cooling water is in contact with the outer surface of the electrical module 532 due to the electrical module 532 being embedded in the outer peripheral wall WA1.

In this case, a configuration in which a portion of the electrical module 532 is immersed inside the cooling water passage 545, or a configuration in which the cooling water passage 545 is further expanded in the radial direction than that in the configuration in FIG. 58 and the like, and the overall electrical module 532 is immersed inside the cooling water passage 545 can be considered. When the electrical module 532 is immersed inside the cooling water passage 545, if a fin is provided in the immersed module case 611 (an immersed portion of the module case 611), cooling performance can be further improved.

In addition, the electrical modules 532 include the switch module 532A and the capacitor module 532B. When both are compared, there is a difference in the amount of heat generation. Taking this into consideration, the arrangement of the electrical modules 532 in the inverter housing 531 can be modified as well.

Figure 65:
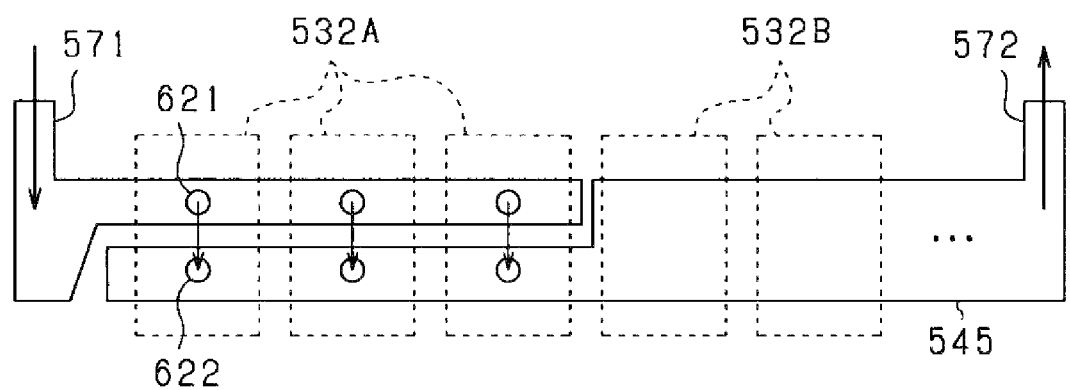
FIG. 65 is a diagram of an order of array of the electrical modules in relation to a cooling water passage.

For example, as shown in FIG. 65, a plurality of switch modules 532A are arrayed in the circumferential direction without being dispersed and are arranged on the upstream side of the cooling water passage 545, that is, the side close to the inlet passage 571. In this case, the cooling water that flows in from the inlet passage 571 is first used to cool the three switch modules 532A and subsequently used to cool the capacitor modules 532B.

Here, in FIG. 65, the pair of pipe portions 621 and 622 are arranged so as to be arrayed in the axial direction as in FIG. 62 by (a) and (b), above. However, the arrangement is not limited thereto. The pair of pipe portions 621 and 622 may be arranged so as to be arrayed in the circumferential direction as in FIG. 61 by (a) and (b), above.

Figure 66:
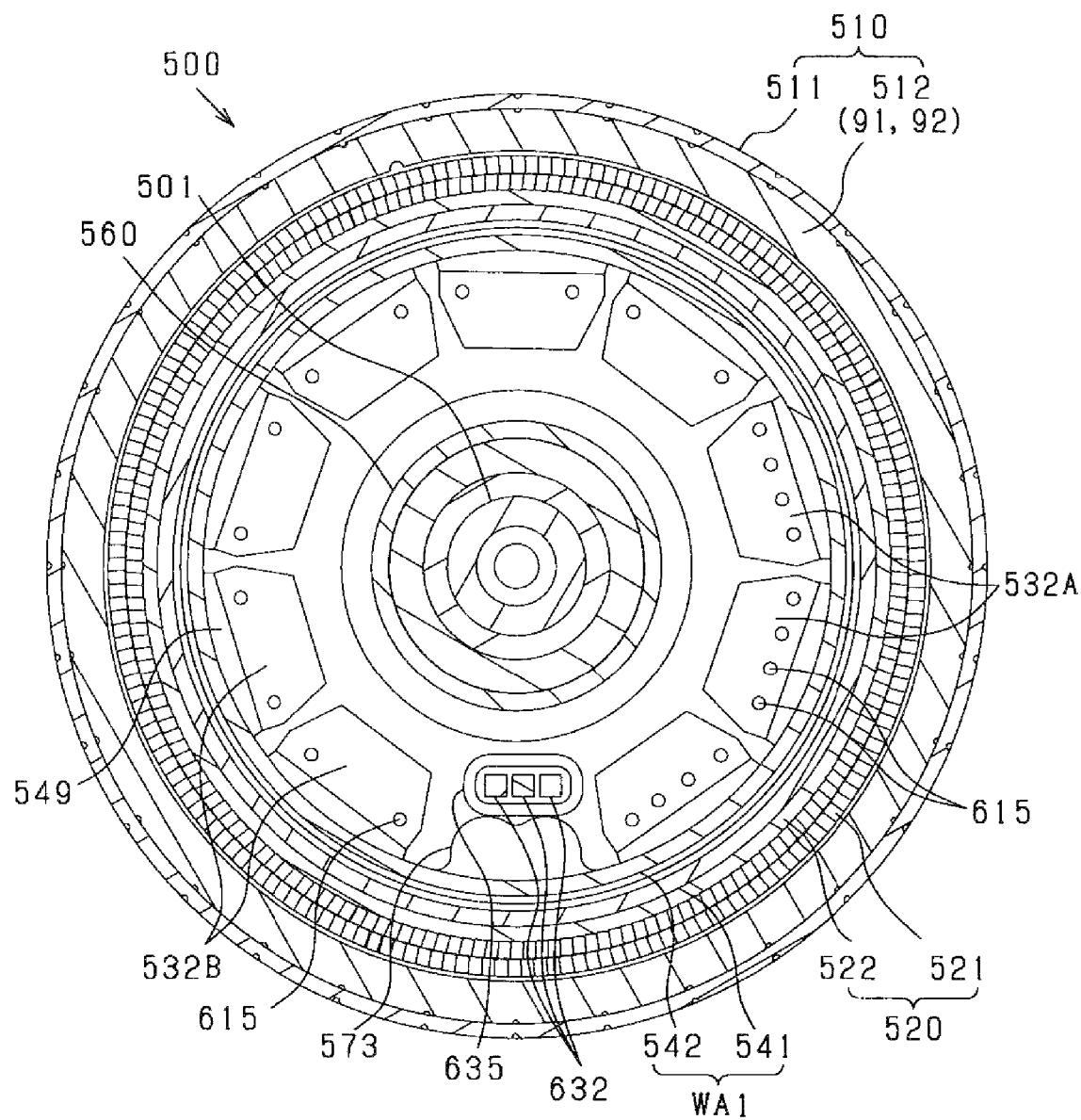
FIG. 66 is a cross-sectional view taken along line 66-66 in FIG. 49.
Figure 67:
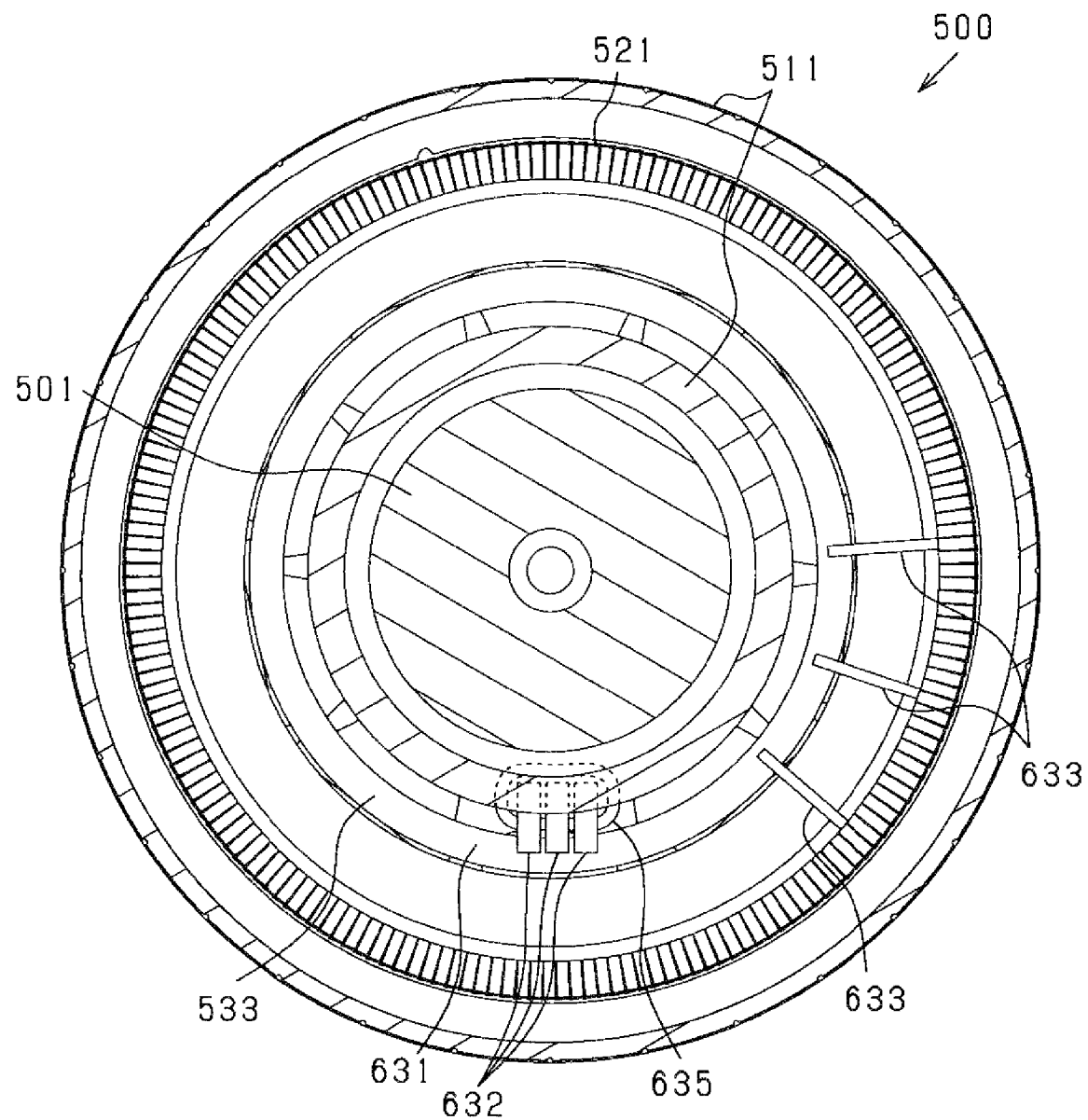
FIG. 67 is a cross-sectional view taken along line 67-67 in FIG. 49.
Figure 68:
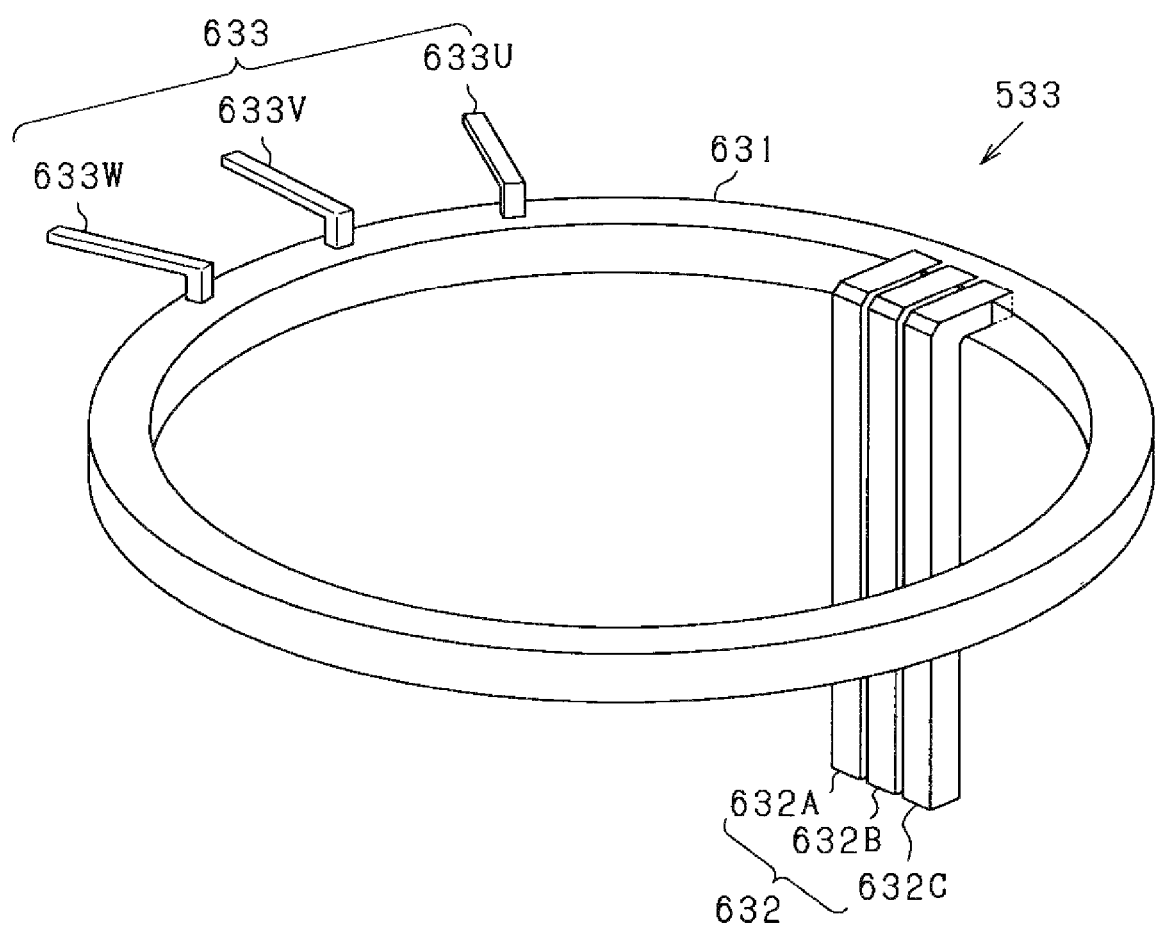
FIG. 68 is a perspective view of a bus bar module alone.

Next, a configuration related to the electrical connection of the electrical modules 532 and the bus bar module 533 will be described. FIG. 66 is a cross-sectional view taken along line 66-66 in FIG. 49. FIG. 67 is a cross-sectional view taken along line 67-67 in FIG. 49. FIG. 68 is a perspective view showing a bus bar module 533 alone. Here, the configuration related to the electrical connection between the electrical modules 532 and the bus bar module 533 will be described with reference to these drawings.

As shown in FIG. 66, in the inverter housing 531, three switch modules 532A are arranged so as to be arrayed in the circumferential direction in a position adjacent in the circumferential direction to the protruding portion 573 that is provided in the inner wall member 542 (that is, the protruding portion 573 in which the inlet passage 571 and the outlet passage 572 that communicate with the cooling water passage 545 are provided), and six capacitor modules 532B are arranged so as to be arrayed in the circumferential direction, further adjacent thereto.

As an overview of the foregoing, in the inverter housing 531, the inner side of the outer peripheral wall WA1 is evenly divided into ten areas (that is, the number of modules+1) in the circumferential direction. Of the ten areas, the electrical modules 532 are arranged one each in nine areas. The protruding portion 573 is provided in the remaining one area. The three switch modules 532A are a U-phase module, a V-phase module, and a W-phase module.

As shown in FIG. 66, and above-described FIG. 56, FIG. 57, and the like, each electrical module 532 (switch module 532A and capacitor module 532B) includes a plurality of module terminals 615 that extend from the module case 611. The module terminal 615 is a module input/output terminal that enables electrical input and output to be performed in the electrical module 532. The module terminal 615 is provided so as to be oriented to extend in the axial direction. More specifically, the module terminal 615 is provided so as to extend from the module case 611 toward a rear side (vehicle outer side) of the rotor carrier 511 (see FIG. 51).

Each module terminal 615 of the electrical module 532 is connected to the bus bar module 533. The number of module terminals 615 differs between the switch module 532A and the capacitor module 532B. Four module terminals 615 are provided in the switch module 532A and two module terminals 615 are provided in the capacitor module 532B.

In addition, as shown in FIG. 68, the bus bar module 533 includes an annular portion 631 that forms a circular annular shape, three external connection terminals 632 that extend from the annular portion 631 and enable connection to an external apparatus, such as a power supply apparatus or an ECU, and a winding connection terminal 633 that is connected to a winding end portion of each phase in the stator winding 521. The bus bar module 533 corresponds to a "terminal module".

The annular portion 631 is arranged in a position that is on the radially inner side of the outer peripheral wall WA1 in the inverter housing 531 and on one side in the axial direction of the electrical modules 532.

For example, the annular portion 631 has a circular annular main body portion that is formed by an insulation member that is made of resin or the like, and a plurality of bus bars that are embedded inside main body portion. The plurality of bus bars are connected to the module terminals 615 of each electrical module 532, each external connection terminal 632, and each phase winding of the stator winding 521. Details thereof are described hereafter.

The external connection terminal 632 is made of a high-potential-side power terminal 632A and a low-potential-side power terminal 632B that are connected to the power supply apparatus, and a single signal terminal 632C that is connected to an external ECU. These external connection terminals 632 (632A to 632C) are provided so as to be arrayed in a single row in the circumferential direction and extend in the axial direction on the radially inner side of the annular portion 631.

As shown in FIG. 51, in a state in which the bus bar module 533 is assembled to the inverter housing 531 together with the electrical modules 532, one end of the external connection terminal 632 protrudes from the end plate 547 of the boss formation member 543.

Specifically, as shown in FIGS. 56 and 57, an insertion hole 547a is provided in the end plate 547 of the boss formation member 543. A circular cylindrical grommet 635 is attached to the insertion hole 547a, and the external connection terminal 632 is provided so as to be inserted through the grommet 635. The grommet 635 also functions as a connector seal.

The winding connection terminal 633 is a terminal that is connected to the winding end portion of each phase of the stator winding 521 and is provided so as to extend from the annular portion 631 toward the radially outer side. The winding connection terminal 633 includes a winding connection terminal 633U that is connected to the end portion of the U-phase winding of the stator winding 521, a winding connection terminal 633V that is connected to the end portion of the V-phase winding, and a winding connection terminal 633W that is connected to the end portion of the W-phase winding.

Figure 70:
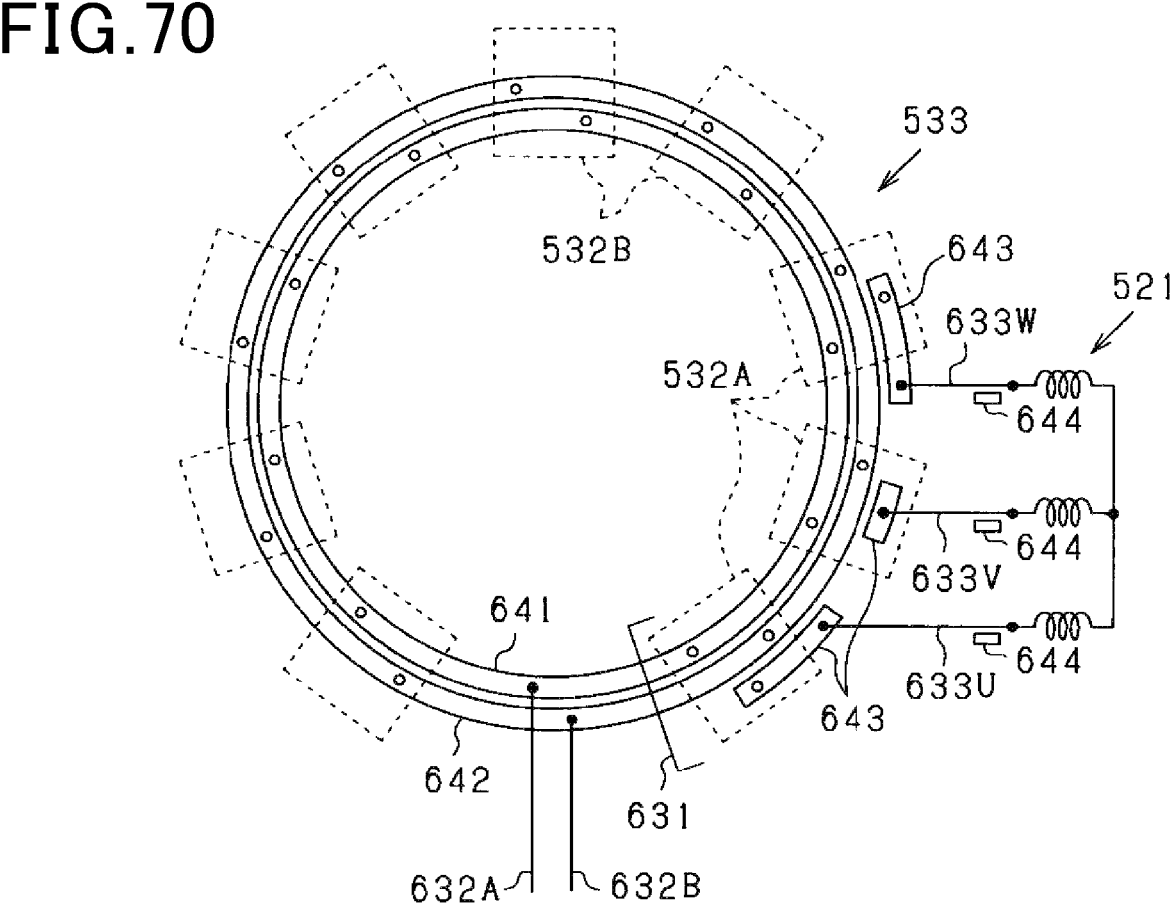
FIG. 70 is a diagram of a state of electrical connection between the electrical modules and the bus bar module.

A current sensor 634 that detects a current (U-phase current, V-phase current, and W-phase current) that flows to each of these winding connection terminals 633 and each phase winding may be provided (see FIG. 70).

Here, the current sensor 634 may be arranged outside the electrical module 532 in the periphery of each winding connection terminal 633. Alternatively, the current sensor 634 may be arranged inside the electrical module 532.

Here, the connection between the electrical modules 532 and the bus bar module 533 will be described in detail with reference to FIGS. 69 and 70.

Figure 69:
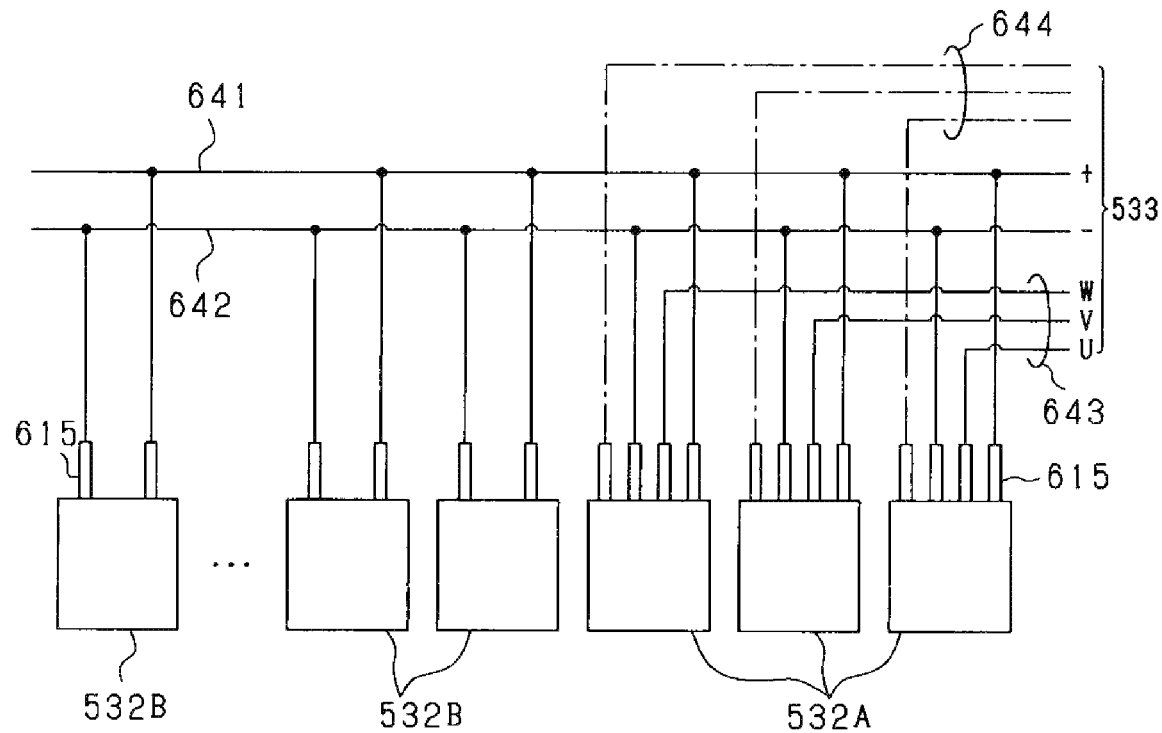
FIG. 69 is a diagram of a state of electrical connection between the electrical modules and the bus bar module.

FIG. 69 shows the electrical modules 532 expanded in plan view, and schematically shows a state of electrical connection between the electrical modules 532 and the bus bar module 533. FIG. 70 is a diagram that schematically shows the connection between the electrical modules 532 and the bus bar modules 533 in a state in which the electrical modules 532 are arranged in a circular annular shape. Here, in FIG. 69, a path for power transmission is indicated by a solid line and a path for signal transmission is indicated by a single-dot chain line. Only the path for power transmission is shown in FIG. 70.

The bus bar module 533 includes a first bus bar 41, a second bus bar 42, and a third bus bar 43 as bus bars for power transmission. Of the bus bars, the first bus bar 641 is connected to the power terminal 632A on the high potential side and the second bus bar 642 is connected to the power terminal 632B on the low potential side. In addition, three third bus bars 643 are respectively connected to the U-phase winding connection terminal 633U, the V-phase winding connection terminal 633V, and the W-phase winding connection terminal 633W.

Moreover, the winding connection terminals 633 and the third bus bars 643 are sections that tend to generate heat as a result of operation of the rotating electric machine 10. Therefore, a terminal block (not shown) may be interposed between the winding connection terminals 633 and the third bus bars 643.

In addition, the terminal block may be placed in contact with the inverter housing 531 that includes the cooling water passage 545. Alternatively, as a result of the winding connection terminals 633 and the third bus bars 643 being bent into a crank-like shape, the winding connection terminals 633 and the third bus bars 643 may be placed in contact with the inverter housing 531 that includes the cooling water passage 545.

As a result of a configuration such as this, the heat that is generated in the winding connection terminals 633 and the third bus bars 643 can be released to the cooling water inside the cooling water passage 545.

Here, in FIG. 70, the first bus bar 641 and the second bus bar 642 are shown as bus bars that form a circular annular shape. However, these bus bars 641 and 642 are not necessarily required to be connected in a circular annular shape and may form an approximately C-like shape in which a portion in the circumferential direction is discontinuous.

In addition, because the winding connection terminals 633U, 633V, and 633W are merely required to be individually connected to the switching modules 532A that correspond to the respective phases, the winding connection terminals 633U, 633V, and 633W may be directly connected to the switch modules 532A (in actuality, the module terminals 615) without the bus bar modules 533 therebetween.

Meanwhile, each switch module 532A includes four module terminals 615 that are made of a positive-electrode-side terminal, a negative-electrode-side terminal, a winding terminal, and a signal terminal. Of the module terminals 615, the positive-electrode-side terminal is connected to the first bus bar 641, the negative-electrode-side terminal is connected to the second bus bar 642, and the winding terminal is connected to the third bus bar 643.

In addition, the bus bar module 533 includes a fourth bus bar 644 that serves as a bus bar for the signal transmission system. The signal terminal of each switch module 532A is connected to the fourth bus bar 644, and the fourth bus bar 644 is connected to the signal terminal 632C.

According to the present embodiment, a control signal for each switch module 532A is inputted from the external ECU via the signal terminal 632C. That is, the switches 601 and 602 in the switch module 532A are turned on/off by the control signal that is inputted via the signal terminal 632C.

Therefore, the switch module 632A is configured to be connected to the signal terminal 632C without going through a control apparatus that is provided inside the rotating electric machine. However, this configuration may be modified. A control apparatus may be provided inside the rotating electric machine and a control signal from the control apparatus may be inputted to the switch module 532A. This configuration is shown in FIG. 71.

Figure 71:
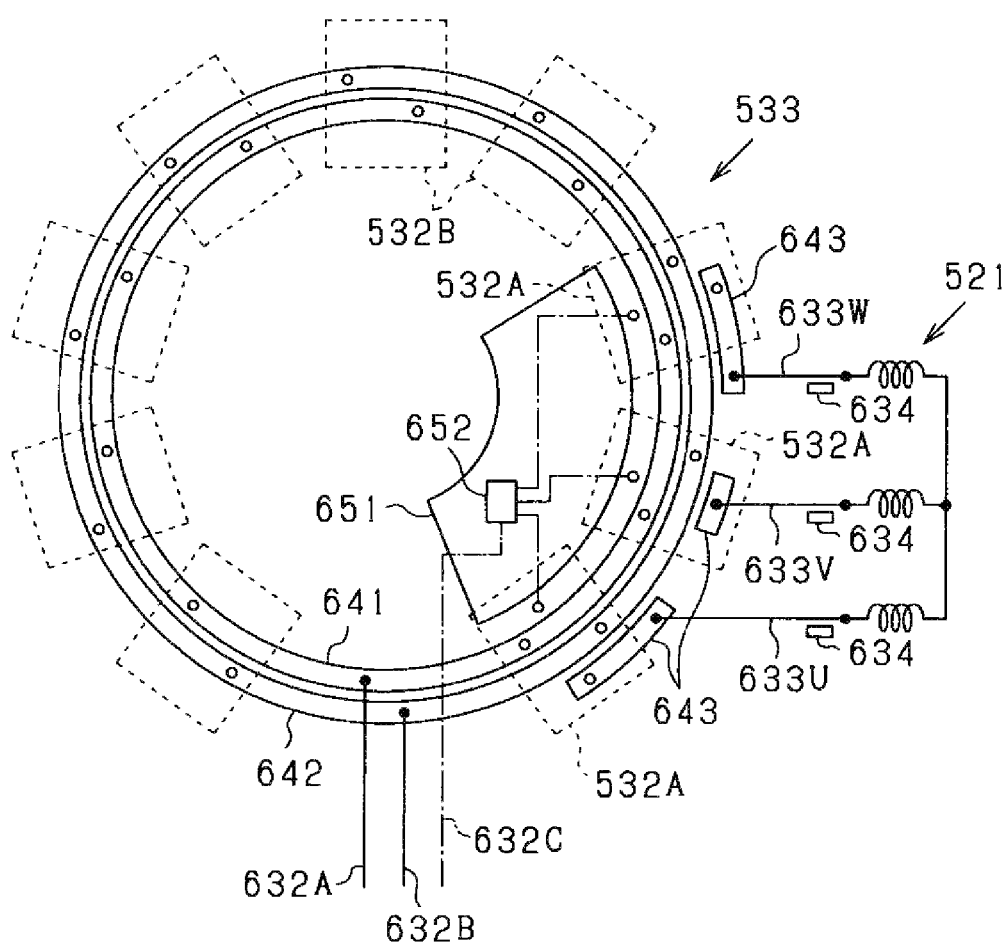
FIG. 71 is a diagram of a state of electrical connection between the electrical modules and the bus bar module.

The configuration in FIG. 71 includes a control board 651 on which a control apparatus 652 is mounted. The control apparatus 652 is connected to each switch module 532A. In addition, the signal terminal 632C is connected to the control apparatus 652. In this case, for example, the control apparatus 652 receives input of a command signal that is related to power-running or power generation from the external ECU that is a higher-order control apparatus, and turns on/off the switches 601 and 602 of each switch module 532A as appropriate, based on the command signal.

In the inverter unit 530, the control board 651 may be arranged further toward the vehicle outer side (rear side of the rotor carrier 511) than the bus bar module 533 is. Alternatively, the control board 651 may be arranged between the electrical modules 532 and the end plate 547 of the boss formation member 543. The control board 651 may be arranged such that at least a portion thereof overlaps the electrical modules 532 in the axial direction.

In addition, the capacitor module 532B includes two module terminals 615 that are made of a positive-electrode-side terminal and a negative-electrode-side terminal. The positive-electrode-side terminal is connected to the first bus bar 641 and the negative-electrode-side terminal is connected to the second bus bar 642.

As shown in FIGS. 49 and 50, inside the inverter housing 531, the protruding portion 573 that includes the inlet passage 571 and the outlet passage 572 for the cooling water is provided inside the inverter housing 531 in a position that is arrayed with the electrical modules 532 in the circumferential direction. In addition, the external connection terminal 632 is provided so as to be adjacent in the radial direction to the protruding portion 573. In other words, the protruding portion 573 and the external connection terminal 632 are provided in the same angular position in the circumferential direction.

According to the present embodiment, the external connection terminal 632 is provided in a position on the radially inner side of the protruding portion 573. In addition, when viewed from the vehicle inner side of the inverter housing 531, the water-flow port 574 and the external connection terminal 632 are provided so as to be arrayed in the radial direction on the end plate 547 of the boss formation member 543 (see FIG. 48).

In this case, as a result of the protruding portion 573 and the external connection terminal 632 being arranged so as to be arrayed in the circumferential direction together with the plurality of electrical modules 532, size reduction as the inverter unit 530, and further, size reduction as the rotating electric machine 500 can be implemented.

With reference to FIGS. 45 and 47 that show the structure of the vehicle wheel 400, the cooling pipe H2 is connected to the water-flow port 574 and the electrical wiring H1 is connected to the external connection terminal 632. In this state, the electrical wiring H1 and the cooling pipe H2 are housed in the housing duct 440.

Here, in the above-described configuration, three switch modules 532A are arranged in an array in the circumferential direction adjacent to the external connection terminal 632 inside the inverter housing 631, and the six capacitor modules 532B are arranged in an array in the circumferential direction further adjacent thereto. However, the configuration may be modified.

For example, the three switch modules 532A may be arranged so as to be arrayed in a position farthest from the external connection terminal 632, that is, a position on a side opposite the external connection terminal 632 with the rotation shaft 501 therebetween. In addition, the switch modules 532A can be distributively arranged such that the capacitor modules 532B are arranged on both sides of the switch modules 532A.

As a result of the configuration in which the switch modules 532A are arranged in the position farthest from the external connection terminal 632, that is, in the position on the side opposite the external connection terminal 632 with the rotation shaft 501 therebetween, malfunction attributed to mutual inductance between the external connection terminal 632 and the switch modules 532A, and the like can be suppressed.

Next, a configuration related to a resolver 660 that is provided as a rotation angle sensor will be described.

As shown in FIGS. 49 to 51, the resolver 660 that detects the electrical angle $\theta$ of the rotating electric machine 500 is provided in the inverter housing 531. The resolver 660 is an electromagnetic-induction-type sensor. The resolver 660 includes a resolver rotor 661 that is fixed to the rotation shaft 501 and a resolver stator 662 that is arranged in an opposing manner on the radially outer side of the resolver 661.

The resolver rotor 661 has a circular-disk ring shape and is provided coaxially with the rotation shaft 501 in a state in which the rotation shaft 501 is inserted into the resolver rotor 661. The resolver stator 662 includes a stator core 663 that has a circular annular shape and a stator coil 664 that is wound around a plurality of teeth that are formed in the stator core 663. An excitation coil of a single phase and output coils of two phases are included in the stator coil 664.

The excitation coil of the stator coil 664 is excited by a sine-wave excitation signal. A magnetic flux that is generated in the excitation coil by the excitation signal interlinks the pair of output coils. At this time, a relative arrangement relationship between the excitation coil and the pair of output coils periodically changes based on a rotation angle of the resolver rotor 661 (that is, a rotation angle of the rotation shaft 501). Therefore, the number of magnetic fluxes (number of flux interlinkage) that interlink the pair of output coils periodically changes.

According to the present embodiment, the pair of output coils and the excitation coil are arranged such that phases of voltages that are respectively generated in the pair of output coils are offset from each other by $\pi/2$. As a result, respective output voltages of the pair of output coils are modulated waves obtained by the excitation signal being respectively modulated by modulation waves $\sin\theta$ and $\cos\theta$. More specifically, when the excitation signal is $\sin\Omega t$, the modulation waves are respectively $\sin\theta \times \sin\Omega t$ and $\cos\theta \times \sin\Omega t$.

The resolver 660 includes a resolver digital converter. The resolver digital converter calculates the electrical angle θ by detection based on the generated modulated waves and the excitation signal.

For example, the resolver 660 is connected to the signal terminal 632C and the calculation result of the resolver digital converter is outputted to an external apparatus via the signal terminal 632C. In addition, when the control apparatus is provided inside the rotating electric machine 500, the calculation result of the resolver digital converter is inputted to the control apparatus.

Here, an assembly structure of the resolver 660 in the inverter housing 531 will be described.

As shown in FIGS. 49 and 51, the boss portion 548 of the boss formation member 543 that configures the inverter housing 531 has a hollow cylindrical shape. A protruding portion 548a that extends in a direction that is orthogonal to the axial direction is formed on an inner circumferential side of the boss portion 548.

In addition, the resolver stator 662 is fixed by a screw or the like in a state in which the resolver stator 662 is in contact with the protruding portion 548a in the axial direction. Inside the boss portion 548, the bearing 560 is provided on one side in the axial direction with the protruding portion 548a therebetween. In addition, the resolver 660 is coaxially provided on the other side.

Furthermore, in the hollow portion of the boss portion 548, the protruding portion 548a is provided on one side of the resolver 660 in the axial direction and a circular-disk ring-shaped housing cover 666 that closes a housing space of the resolver 660 is attached on the other side.

The housing cover 666 is made of a conductive material such as a CFRP. A hole 666a into which the rotation shaft 501 is inserted is formed in a center portion of the housing cover 666. A sealing member 667 that seals a space between the housing cover 666 and the outer circumferential surface of the rotation shaft 501 is provided in the hole 666a. A resolver housing space is sealed by the sealing material 667. For example, the sealing material 667 may be a sliding seal that is made of a resin material.

The space in which the resolver 660 is housed is a space that is surrounded by the boss portion 548 that has a circular annular shape in the boss formation member 543, and sandwiched between the bearing 560 and the housing cover 666 in the axial direction. The surrounding of the resolver 660 is surrounded by a conductive material. As a result, the effects of electromagnetic noise on the resolver 660 can be suppressed.

In addition, as described above, the inverter housing 531 includes the outer peripheral wall WA1 and the inner peripheral wall WA2 that form two layers (see FIG. 57). The stator 520 is arranged on the outer side of the peripheral walls that form the two layers (the outer side of the outer peripheral wall WA1), the electrical modules 532 are arranged between the two layers of peripheral walls (between WA1 and WA2), and the resolver 660 is arranged on the inner side of the two layers of peripheral walls (the inner side of the inner peripheral wall WA2). The inverter housing 531 is a conductive member.

Therefore, the stator 520 and the resolver 660 are arranged so as to be separated by a conductive partition wall (in particular, two layers of conductive partition walls according to the present embodiment). Occurrence of mutual magnetic interference on the stator 520 side (magnetic circuit side) and the resolver 660 can be suitably suppressed.

Next, a rotor cover 670 that is provided on a side of an open end portion of the rotor carrier 511 will be described.

As shown in FIGS. 49 and 51, one side of the rotor carrier 511 in the axial direction is open. An approximately circular-disk ring-shaped rotor cover 670 is attached to the open end portion. The rotor cover 670 may be fixed to the rotor carrier 511 by an arbitrary joining method such as welding, bonding, or screw fastening. The rotor cover 670 preferably has a portion in which a dimension is set so as to be smaller than an inner circumference of the rotor carrier 511 such that movement in the axial direction of the magnet unit 512 can be suppressed.

An outer diameter dimension of the rotor cover 670 coincides with an outer diameter dimension of the rotor carrier 511 and an inner diameter dimension is a dimension that is slightly larger than an outer diameter dimension of the inverter housing 531. Here, the outer diameter dimension of the inverter housing 531 and the inner diameter dimension of the stator 520 are the same.

As described above, the stator 520 is fixed on the radially outer side of the inverter housing 531. In a joining portion in which the stator 520 and the inverter housing 531 are joined to each other, the inverter housing 531 protrudes in the axial direction in relation to the stator 520. In addition, the rotor cover 670 is attached so as to surround the protruding portion of the inverter housing 531.

In this case, a sealing member 671 that seals a space between an end surface on the inner circumferential side of the rotor cover 670 and an outer circumferential surface of the inverter housing 531 is provided therebetween. A housing space of the magnet unit 512 and the stator 520 is sealed by the sealing member 671. For example, the sealing member 671 may be a sliding seal that is made of a resin material.

According to the present embodiment described in detail above, the following excellent effects are achieved.

In the rotating electric machine 500, the outer peripheral wall WA1 of the inverter housing 531 is arranged on the radially inner side of the magnetic circuit portion that is made of the magnet unit 512 and the stator winding 521. The cooling water passage 545 is formed in the outer peripheral wall WA1. In addition, the plurality of electrical modules 532 are arranged on the radially inner side of the outer peripheral wall WA1 in the circumferential direction along the outer peripheral wall WA1.

As a result, the magnetic circuit portion, the cooling water passage 545, and the power converter can be arranged so as to be laminated in the radial direction of the rotating electric machine 500. Efficient component arrangement can be achieved while reduction in dimension in the axial direction is achieved. In addition, efficient cooling can be performed in the plurality of electrical modules 532 that configure the power converter. As a result, in the rotating electric machine 500, high efficiency and size reduction can be implemented.

The electrical modules 532 (switch module 532A and capacitor module 532B) that have heat generating components such as the semiconductor switching element and the capacitor are provided so as to be in contact with the inner circumferential surface of the outer peripheral wall WA1. As a result, the heat from the electrical module 532 is transmitted to the outer peripheral wall WA1 and the electrical module 532 is suitably cooled as a result of heat exchange in the outer peripheral wall WA1.

In the switch module 532A, the coolers 623 are arranged on both sides sandwiching the switches 601 and 602, and the capacitor 604 is arranged on a side opposite the switches 601 and 602 in at least either of the coolers 623 on both sides of the switches 601 and 602. As a result, cooling performance regarding the switches 601 and 602 can be improved. In addition, cooling performance regarding the capacitor 604 can be improved.

In the switch module 532A, the coolers 623 are arranged on both sides sandwiching the switches 601 and 602, the drive circuit 603 is arranged on a side opposite the switches 601 and 602 in at least either of the coolers 623 on both sides of the switches 601 and 602, and the capacitor 604 is arranged on the side opposite the switches 601 and 602 in the other cooler 623. As a result, the cooling performance regarding the switches 601 and 602 can be improved. In addition, cooling performance regarding the drive circuit 603 and the capacitor 604 can also be improved.

For example, in the switch module 532A, the cooling water is supplied from the cooling water passage 545 into the module interior, and the semiconductor switching elements and the like are cooled by the cooling water. In this case, the switch module 532A is cooled by heat exchange by the cooling water in the module interior in addition to heat exchange by the cooling water in the outer peripheral wall WA1. As a result, the cooling effect of the switch module 532A can be improved.

In the cooling system in which the cooling water is supplied into the cooling water passage 545 from the external circulation path 575, the switch module 532A is arranged on an upstream side close to the inlet passage 571 of the cooling water passage 545 and the capacitor module 532B is arranged further toward the downstream side than the switch module 532A is. In this case, under an assumption that the cooling water that flows through the cooling water passage 545 is at a lower temperature toward the upstream side, a configuration that preferentially cools the switch module 532A can be implemented.

A portion of the gaps between electrical modules that are adjacent to each other in the circumferential direction is widened, and the protruding portion 573 that includes the inlet passage 571 and the outlet passage 572 is provided in the portion that is the widened gap (second interval INT2). As a result, the inlet passage 571 and the outlet passage 572 of the cooling water passage 545 can be suitably formed in a portion that is on the radially inner side of the outer peripheral wall WA1.

That is, a flow amount of coolant is required to be ensured to improve cooling performance. Therefore, increasing opening areas of the inlet passage 571 and the outlet passage 572 can be considered. In this regard, as a result of a portion of the gaps between the electrical modules being widened and the protruding portion 573 being provided as described above, the inlet passage 571 and the outlet passage 572 that are of the desired size can be suitably formed.

The external connection terminal 632 of the bus bar module 533 is arranged in a position that is arrayed with the protruding portion 573 in the radial direction on the radially inner side of the outer peripheral wall WA1. That is, the external connection terminal 632 is arranged together with the protruding portion 573 in the portion in which the gap between electrical modules that are adjacent to each other in the circumferential direction is widened (the portion corresponding to the second interval INT2). As a result, the external connection terminal 632 can be suitably arranged while interference with the electrical modules 532 is avoided.

In the outer-rotor-type rotating electric machine 500, the stator 520 is fixed on the radially outer side of the outer peripheral wall WA1 and the plurality of electrical modules 532 are arranged on the radially inner side thereof.

As a result, the heat from the stator 520 is transmitted to the outer peripheral wall WA1 from the radially outer side thereof and the heat from the electrical modules 532 is transmitted from the radially inner side. In this case, the stator 520 and the electrical modules 532 can be simultaneously cooled by the cooling water that flows through the cooling water passage 545. Heat from the heat generating components of the rotating electric machine 500 can be efficiently released.

The electrical module 532 on the radially inner side and the stator winding 521 on the radially outer side with the outer peripheral wall WA1 therebetween are electrically connected by the winding connection terminal 633 of the bus bar module 533. In addition, in this case, the winding connection terminal 633 is provided in a position away from the cooling water passage 545 in the axial direction.

As a result, even when the cooling water passage 545 is formed in an annular shape in the outer peripheral wall WA1, that is, a configuration in which the inner side and the outer side of the outer peripheral wall WA1 are divided by the cooling water passage 545, the electrical module 532 and the stator winding 521 can be suitably connected.

In the rotating electric machine 500 according to the present embodiment, as a result of the teeth (core) between the conductors 523 that are arrayed in the circumferential direction in the stator 520 being made smaller or eliminated, torque restrictions attributed to magnetic saturation that occurs between the conductors 523 are suppressed and torque decrease is suppressed by the conductor 523 being a thin, flat type.

In this case, even if outer diameter dimensions of the rotating electric machine 500 are the same, as a result of the stator 520 being made thinner, the area on the radially inner side of the magnetic circuit portion can be expanded. The outer peripheral wall WA1 that includes the cooling water passage 454 and the plurality of electrical modules 532 that are provided on the radially inner side of the outer peripheral wall WA1 can be suitably arranged using the inner area.

In the rotating electric machine 500 according to the present embodiment, the magnet magnetic flux on the d-axis is reinforced by the magnet magnetic flux being concentrated on the d-axis side in the magnet unit 512. Torque enhancement that accompanies the reinforcement of the magnetic flux can be achieved.

In this case, in accompaniment with a thickness dimension in the radial direction of the magnet unit 512 being able to be made smaller (thinner), the area on the radially inner side of the magnetic circuit portion can be expanded. The outer peripheral wall WA1 that includes the cooling water passage 454 and the plurality of electrical modules 532 that are provided on the radially inner side of the outer peripheral wall WA1 can be suitably arranged using the inner area.

In addition, the bearing 560 and the resolver 660 can also be similarly suitably arranged in the radial direction, in addition to the magnetic circuit portion, the outer peripheral wall WA1, and the plurality of electrical modules 532.

The vehicle wheel 400 in which the rotating electric machine 500 is used as the in-wheel motor is mounted in the vehicle body by the base plate 405 that is fixed to the inverter housing 531 and a mounting mechanism such as a suspension apparatus. Here, because size reduction is implemented in the rotating electric machine 500, space saving can be achieved even when assembly to a vehicle body is assumed. Therefore, a configuration that is advantageous in terms of expansion of an installation area for a power supply apparatus, such as a battery, or expansion of a vehicle cabin space in the vehicle can be implemented.

Modifications related to the in-wheel motor will be described below.

First Modification of the In-Wheel Motor

In the rotating electric machine 500, the electrical module 532 and the bus bar module 533 are arranged on the radially inner side of the outer peripheral wall WA1 of the inverter unit 530. In addition, the electrical module 532 and the bus bar module 533, and the stator 520 are respectively arranged on the inner side and the radially outer side with the outer peripheral wall WA1 therebetween.

In this configuration, the position of the bus bar module 533 in relation to the electrical module 532 can be arbitrarily set. In addition, in a case in which the phase windings of the stator winding 521 and the bus bar module 533 are connected so as to cross the outer peripheral wall WA1 in the radial direction, a position in which a winding connection line (such as the winding connection terminal 633) used for the connection is guided can be arbitrarily set.

That is, as the position of the bus bar module 533 in relation to the electrical module 532, (α1) a configuration in which the bus bar module 533 is further toward the vehicle outer side than the electrical module 532 in the axial direction, that is, toward the rear side on the rotor carrier 511 side, and (α2) a configuration in which the bus bar module 533 is further toward the vehicle inner side than to the electrical module 533 in the axial direction, that is, toward the front side on the rotor carrier 511 side, can be considered.

In addition, as the position in which the winding connection line is guided, (β1) a configuration in which the winding connection line is guided on the vehicle outer side in the axial direction, that is, on the rear side on the rotor carrier 511 side, and (β2) a configuration in which the winding connection line is guided on the vehicle inner side in the axial direction, that is, on the front side on the rotor carrier 511 side, can be considered.

Hereafter, four configuration examples related to an arrangement of the electrical modules 532, the bus bar module 533, and the winding connection line will be described with reference to FIG. 72 by (a) to (d).

FIG. 72 shows, by (a) to (d), longitudinal cross-sectional views showing the configuration of the rotating electric machine 500 in a simplified manner. In FIG. 72 by (a) to (d), configurations that are already described are given the same reference numbers. A winding connection line 637 is electrical wiring that connects the phase windings of the stator winding 521 and the bus bar module 533. For example, the above-described winding connection terminal 633 corresponds to the winding connection line 637.

In the configuration in FIG. 72 by (a), the above-described (α1) is used as the position of the bus bar module 533 in relation to the electrical module 532, and the above-described (β1) is used as the position for guiding the winding connection line 637. That is, the electrical module 532 and the bus bar module 533, and the stator winding 521 and the bus bar module 533 are both connected on the vehicle outer side (rear side of the rotor carrier 511). Here, this configuration corresponds to the configuration shown in FIG. 49.

As a result of the present configuration, the cooling water passage 545 can be provided in the outer peripheral wall WA1 without concern regarding interference with the winding connection line 637. In addition, the winding connection line 637 that connects the stator winding 521 and the bus bar module 533 can be easily implemented.

In FIG. 72 by (b), the above-described (α1) is used as the position of the bus bar module 533 in relation to the electrical module 532, and the above-described (β2) is used as the position for guiding the winding connection line 637. That is, the electrical module 532 and the bus bar module 533 are connected on the vehicle outer side (rear side of the rotor carrier 511), and the stator winding 521 and the bus bar module 533 are connected on the vehicle inner side (front side of the rotor carrier 511).

As a result of the present configuration, the cooling water passage 545 can be provided in the outer peripheral wall WA1 without concern regarding interference with the winding connection line 637.

In FIG. 72 by (c), the above-described (α2) is used as the position of the bus bar module 533 in relation to the electrical module 532, and the above-described (β) is used as the position for guiding the winding connection line 637. That is, the electrical module 532 and the bus bar module 533 are connected on the vehicle inner side (front side of the rotor carrier 511), and the stator winding 521 and the bus bar module 533 are connected on the vehicle outer side (rear side of the rotor carrier 511).

In FIG. 72 by (d), the above-described (α2) is used as the position of the bus bar module 533 in relation to the electrical module 532, and the above-described (β2) is used as the position for guiding the winding connection line 637. That is, the electrical module 532 and the bus bar module 533, and the stator winding 521 and the bus bar module 533 are both connected on the vehicle inner side (front side of the rotor carrier 511).

According to the configurations in FIG. 72 by (c) and (d), because the bus bar module 533 is arranged on the vehicle inner side (front side of the rotor carrier 511), if an electrical component such as a fan motor is added, wiring thereof is thought to be facilitated. In addition, the bus bar module 533 can be brought closer to the resolver 660 that is arranged further toward the vehicle inner side than the bearing is. Wiring of the resolver 660 is thought to be facilitated.

Second Modification of the In-Wheel Motor

Modifications of an attachment structure of the resolver rotor 661 will be described below. That is, the rotation shaft 501, the rotor carrier 511, and the inner ring 561 of the bearing 560 are a rotating body that integrally rotates. Modifications of an attachment structure of the resolver rotor 661 in relation to the rotation body will be described below.

FIG. 73 shows, by (a) to (c), configuration diagrams of examples of the attachment structure of the resolver rotor 611 in relation to the above-described rotation body. In all of the configurations, the resolver 660 is surrounded by the rotor carrier 511, the inverter housing 531, and the like, and is provided in a sealed space that is protected from exposure to moisture, dirt, and the like from outside. In FIG. 73 by (a) among (a) to (c), the bearing 560 has the same configuration as that in FIG. 49.

In addition, in FIG. 73 by (b) and (c), the bearing 560 has a configuration differing from that in FIG. 49, and is arranged in a position away from the end plate 514 of the rotor carrier 511. Two locations are shown as examples of an attachment location of the resolver 611 in the drawings. Here, the resolver stator 662 is not shown. However, the boss portion 548 of the boss formation member 543 may be extended to the outer circumferential side of the resolver rotor 661 or the vicinity thereof, and the resolver stator 662 may be fixed to the boss portion 548.

In the configuration in FIG. 73 by (a), the resolver rotor 661 is attached to the inner ring 561 of the bearing 560.

Specifically, the resolver rotor 661 is provided on the end surface in the axial direction of the flange 561b of the inner ring 561. Alternatively, the resolver rotor 661 is provided on the end surface in the axial direction of the cylindrical portion 561a of the inner ring 561.

In FIG. 73 by (b), the resolver rotor 611 is attached to the rotor carrier 511. Specifically, the resolver rotor 661 is provided on the inner surface of the end plate 514 of the rotor carrier 511. Alternatively, the rotor carrier 511 includes a cylindrical portion 515 that extends from an inner circumferential edge portion of the end plate 514 along the rotation shaft 501. In this configuration, the resolver rotor 661 is provided on an outer circumferential surface of the cylindrical portion 515 of the rotor carrier 511. In the latter case, the resolver rotor 661 is arranged between the end plate 514 of the rotor carrier 511 and the bearing 560.

In FIG. 73 by (c), the resolver rotor 661 is attached to the rotation shaft 501. Specifically, the resolver rotor 661 is provided between the end plate 514 of the rotor carrier 511 and the bearing 560 in the rotation shaft 501. Alternatively, the resolver rotor 661 may be arranged in the rotation shaft 501 on the side opposite the rotor carrier 511 with the bearing 560 therebetween.

Third Modification of the In-Wheel Motor

Modifications of the inverter housing 531 and the rotor cover 670 will be described with reference to FIG. 74 by (a) and (b). FIG. 74 shows, by (a) and (b), longitudinal cross-sectional views showing the configuration of the rotating electric machine 500 in a simplified manner. In FIG. 74 by (a) and (b), configurations that are already described are given the same reference numbers. Here, a configuration shown in FIG. 74 by (a) essentially corresponds to the configuration described with reference to FIG. 49 and the like. A configuration shown in FIG. 74 by (b) corresponds to a configuration in which a portion of the configuration in FIG. 74 by (a) is modified.

As shown in FIG. 74 by (a), the rotor cover 670 that is fixed to the open end portion of the rotor carrier 511 is provided so as to surround the outer peripheral wall WA1 of the inverter housing 531. That is, the end surface on the inner diameter side of the rotor cover 670 opposes the outer circumferential surface of the outer peripheral wall WA1, and the sealing member 671 is provided therebetween.

In addition, the housing cover 666 is attached in the hollow portion of the boss portion 548 of the inverter housing 531, and the sealing member 667 is provided between the housing cover 666 and the rotation shaft 501. The external connection terminal 632 that configures the bus bar module 533 passes through the inverter housing 531 and extends toward the vehicle inner side (lower side in the drawings).

In addition, in the inverter housing 531, the inlet passage 571 and the outlet passage 572 that communicate with the cooling water passage 545 are formed, and the water-flow port 574 that includes the passage end portions of the inlet passage 571 and the outlet passage 572 is formed.

In contrast, as shown in FIG. 74 by (b), an annular protruding portion 81 that extends toward the protruding side (vehicle inner side) of the rotation shaft 501 is formed in the inverter housing 531 (specifically, the boss formation member 543). The rotor cover 670 is provided so as to surround the protruding portion 681 of the inverter housing 531. That is, the end surface on the inner diameter side of the rotor cover 670 opposes an outer circumferential surface of the protruding portion 681, and the sealing member 671 is provided therebetween.

In addition, the external connection terminal 632 that configures the bus bar module 533 passes through the boss portion 548 of the inverter housing 531 and extends to the hollow area of the boss portion 548. In addition, the external connection terminal 632 passes through the housing cover 666 and extends toward the vehicle inner side (lower side in the drawing).

Furthermore, in the inverter housing 531, the inlet passage 571 and the outlet passage 572 that communicate with the cooling water passage 545 are formed. The inlet passage 571 and the outlet passage 572 extend to the hollow area of the boss portion 548 and extend further toward the vehicle inner side (lower side in the drawing) than the housing cover 666 by a relay pipe 682. In the present configuration, the pipe portion that extends from the housing cover 666 toward the vehicle inner side is the water-flow port 574.

According to the configurations in FIG. 74 by (a) and (b), the rotor carrier 511 and the rotor cover 670 can be suitably rotated in relation to the inverter housing 531 while sealability of the interior space of the rotor carrier 511 and the rotor cover 60 is maintained.

In addition, in particular, according to the configuration in FIG. 74 by (b), the inner diameter of the rotor cover 670 is smaller compared to that in the configuration in FIG. 74 by (a). Therefore, the inverter housing 531 and the rotor cover 670 can be provided in two layers in the axial direction in a position that is further toward the vehicle inner side than the electrical module 532 is. Issues caused by electromagnetic noise that are a concern in the electrical module 532 can be suppressed. In addition, a sliding diameter of the sealing member 671 is decreased as a result of the decrease in the inner diameter of the rotor cover 670. Mechanical loss in a rotation sliding portion can be suppressed.

Fourth Modification of the In-Wheel Motor

Figure 75:
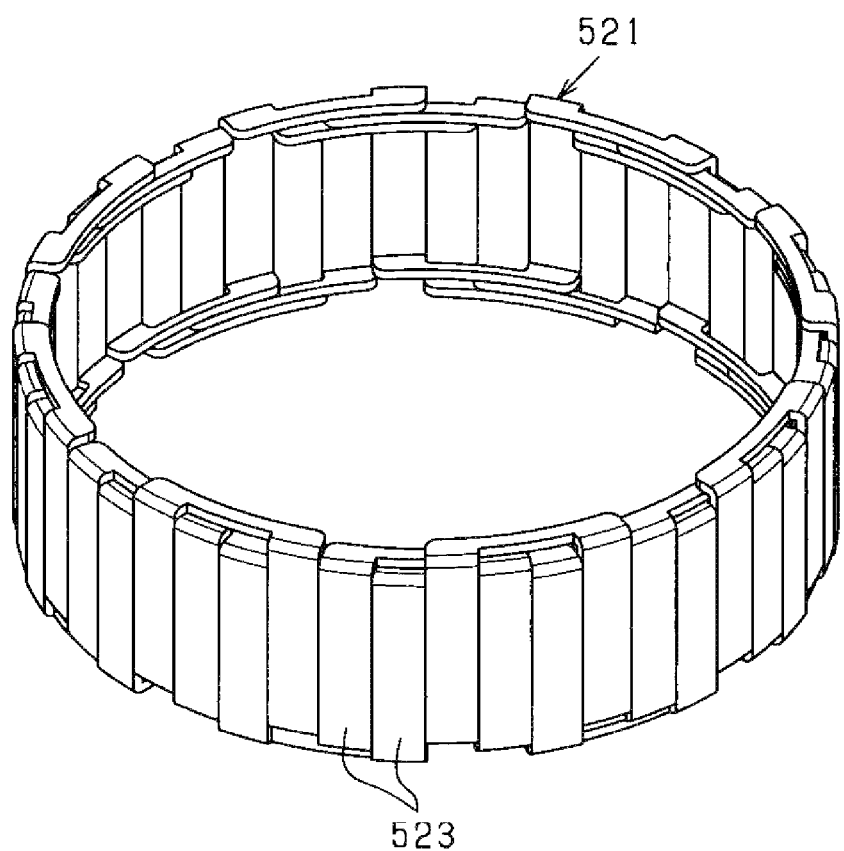
FIG. 75 is a configuration diagram for explaining a fourth modification of the in-wheel motor.

A modification of the stator winding 521 will be described below. FIG. 75 shows a modification related to the stator winding 521.

As shown in FIG. 75, the stator winding 521 is wound by wave winding using a conductor material of which the lateral cross-section forms a rectangular shape, such that a long side of the conductor material is oriented to extend in the circumferential direction.

In this case, the conductors 523 of each phase that serve as the coil side in the stator winding 521 are arranged at predetermined pitch intervals for each phase and are connected to each other at the coil end. The conductors 523 that are adjacent to each other in the circumferential direction in the coil side are in contact with each other at the end surfaces in the circumferential direction or are closely arranged with a minute gap therebetween.

In addition, in the stator winding 521, the conductor material is bent in the radial direction for each phase at the coil end. More specifically, the stator winding 521 (conductor material) is bent toward the radially inner side in a position that differs for each phase in the axial direction. As a result, interference among the phase windings of the U-phase, V-phase, and W-phase is prevented.

In the configuration in the drawing, the phase windings are made to differ only by an amount corresponding to the thickness of the conductor material, and the conductor material is bent at a right angle toward the radially inner side for each phase. The length dimensions between both ends in the axial direction of the conductors 523 that are arrayed in the circumferential direction may be the same.

Here, when the stator core 522 is assembled to the stator winding 521 and the stator 520 is fabricated, a portion of the circular annular shape of the stator winding 521 may be detached so as to be disconnected (that is, the stator winding 521 becomes approximately C-shaped), and after the stator core 522 is assembled to the inner circumferential side of the stator winding 521, the detached portions may be connected to each other and the stator winding 521 may be formed into the circular annular shape.

In addition to the foregoing, the stator core 522 can be divided into a plurality of pieces (such as three or more pieces) in the circumferential direction. The core pieces that are divided into a plurality of pieces can be assembled to the inner circumferential side of the stator winding 521 that is formed into the circular annular shape.

Other Modifications

For example, as shown in FIG. 50, the inlet passage 571 and the outlet passage 572 of the cooling water passage 545 are provided so as to be collected in a single location in the rotating electric machine 500. However, this configuration may be modified such that the inlet passage 571 and the outlet passage 572 are each provided in positions that differ in the circumferential direction.

For example, the inlet passage 571 and the outlet passage 572 may be provided in positions that differ by 180 degrees in the circumferential direction. Alternatively, a plurality of at least either of the inlet passage 571 and the outlet passage 572 may be provided.

In the vehicle wheel 400 according to the above-described embodiment, the rotation shaft 501 protrudes toward one side in the axial direction of the rotating electric machine 500. However, the configuration may be modified. The rotation shaft 501 may protrude toward both sides in the axial direction. As a result, for example, a suitable configuration can be implemented in a vehicle in which at least either of the front and the rear of the vehicle has a single wheel.

An inner-rotor-type rotating electric machine can also be used as the rotating electric machine 500 that is used in the vehicle wheel 400.

Fifteenth Modification

Figure 76:
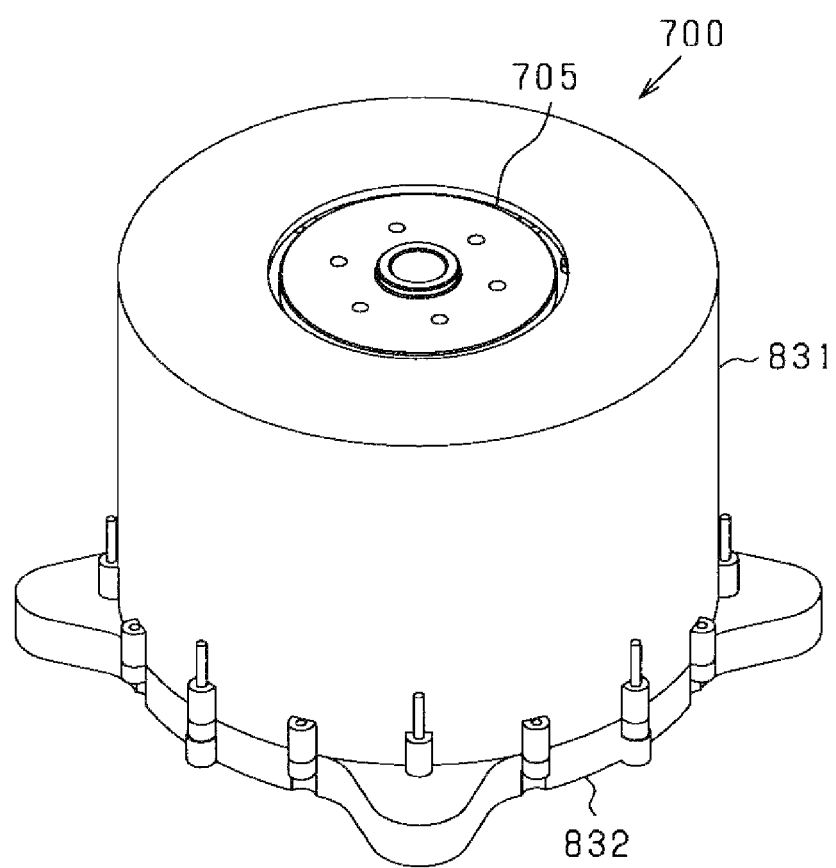
FIG. 76 is an overall perspective view of a rotating electric machine in a fifteenth modification.
Figure 77:
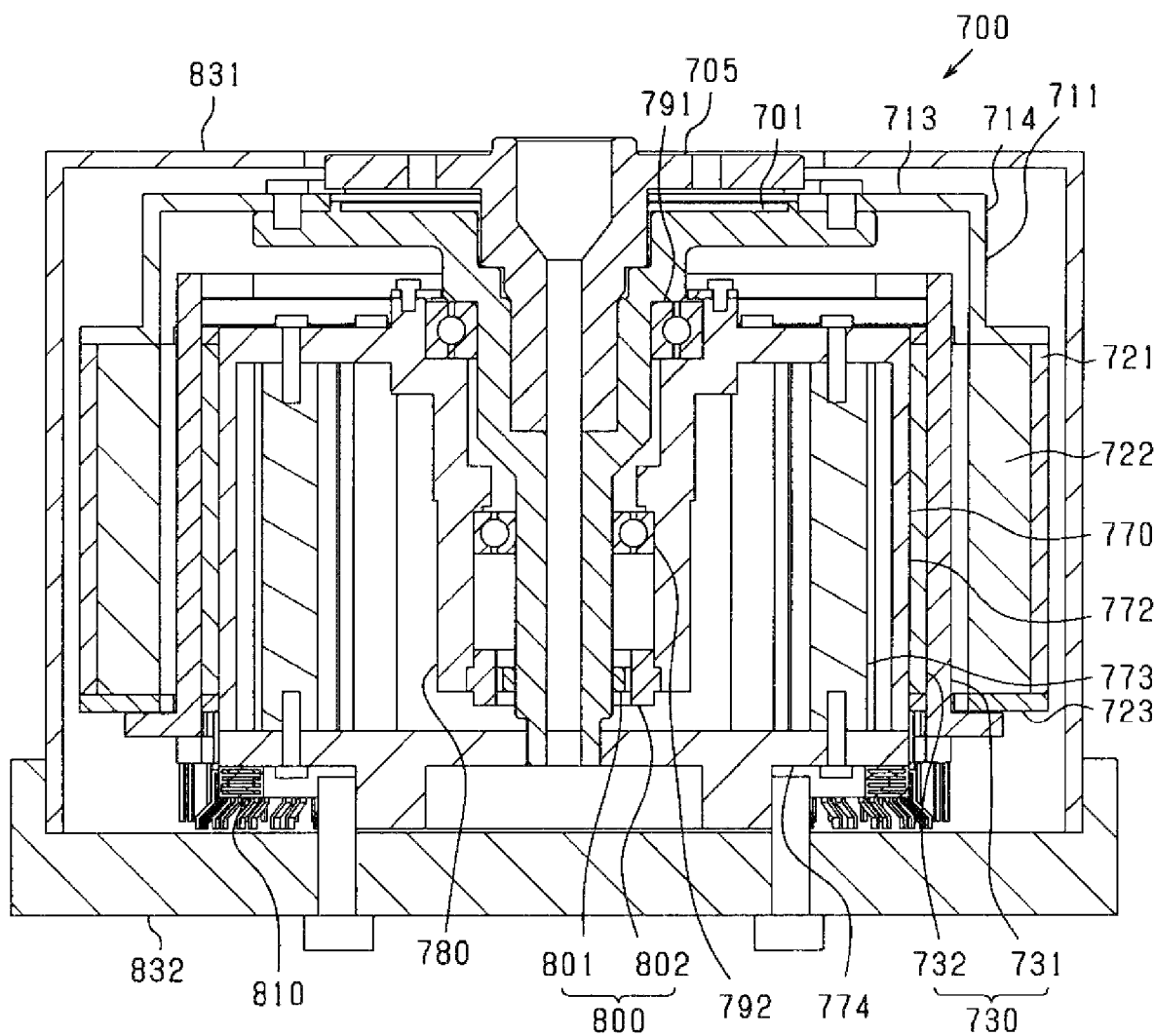
FIG. 77 is a vertical cross-sectional view of the rotating electric machine.
Figure 78:
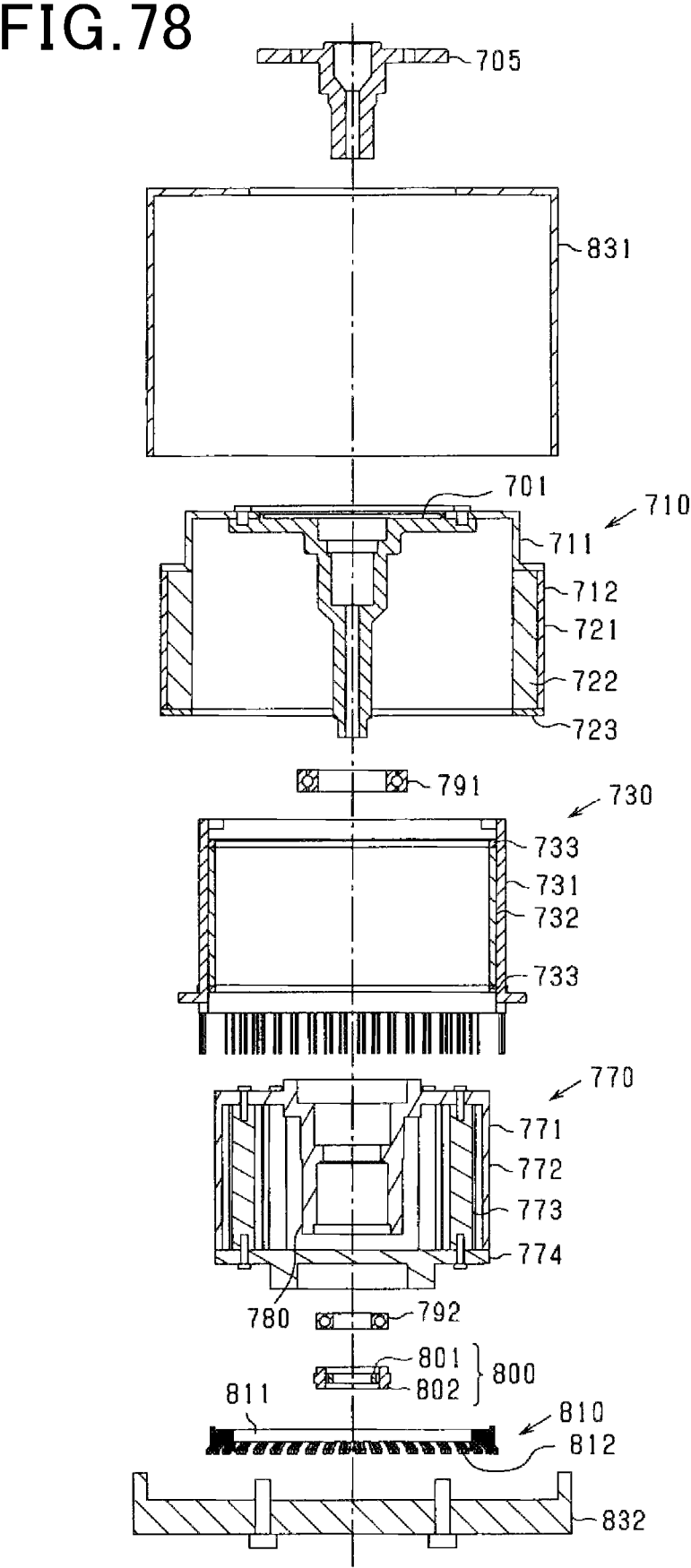
FIG. 78 is an exploded cross-sectional view of the rotating electric machine.

Next, a rotating electric machine 700 of a present modification will be described. The rotating electric machine 700 is used as a driving unit of the vehicle. An overview of the rotating electric machine 700 is shown in FIG. 76 to FIG. 78. FIG. 76 is a perspective view of the overall rotating electric machine 700. FIG. 77 is a vertical cross-sectional view of the rotating electric machine 700. FIG. 78 is an exploded cross-sectional view in which constituent elements of the rotating electric machine 700 are exploded.

The rotating electric machine 700 is a outer-rotor-type, surface-magnet-type rotating electric machine. The rotating electric machine 700 generally includes a rotating-electric-machine main body that has a rotor 710, a stator 730, an inner unit 770, and a bus bar module 810, and a housing 831 and a cover 832 that are provided so as to surround the rotating-electric-machine main body. The rotating electric machine 700 is configured by all of these components being arranged coaxially with a rotation shaft 701 that is provided integrally with the rotor 710, and assembled in the axial direction in a predetermined order. The rotor 710 is supported in a cantilevered manner by a pair of bearings 791 and 792 that are provided on the inner side in the radial direction of the inner unit 770. The rotor 710 is capable of rotating in this state. A connection shaft 705 that is fixed to an axle, a wheel, or the like of the vehicle is integrally provided in the rotation shaft 701.

In the rotating electric machine 700, the rotor 710 and the stator 730 each have a circular cylindrical shape and are arranged so as to oppose each other with an airgap therebetween. As a result of the rotor 710 integrally rotating with the rotation shaft 701, the rotor 710 rotates on the outer side in the radial direction of the stator 730. The rotor 710 corresponds to a "field element". The stator 730 corresponds to an "armature".

Figure 79:
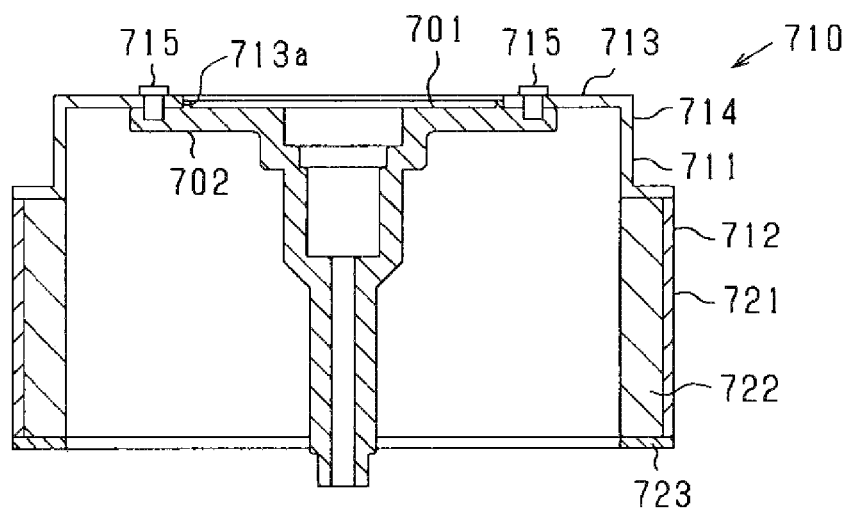
FIG. 79 is a cross-sectional view of a rotor.

As shown in FIG. 79, the rotor 710 includes a substantially circular cylindrical rotor carrier 711 and an annular magnet unit 712 that is fixed to the rotor carrier 711. The rotor carrier 711 includes an end plate portion 713 and a cylindrical portion 714 that extends in the axial direction from an outer circumferential portion of the end plate portion 713. A through hole 713a is formed in the end plate portion 713. The rotation shaft 701 is fixed to the end plate portion 713 by a fastener 715, such as a bolt, in a state in which the rotation shaft 701 is inserted into the through hole 713a. The rotation shaft 710 has a flange 702 that extends so as to be oriented to intersect (be orthogonal to) the axial direction in a portion in which the rotor carrier 711 is fixed. The rotor carrier 711 is fixed to the rotation shaft 701 in a state in which the flange 702 and the end plate portion 713 are surface-joined.

The magnet unit 712 includes a circular cylindrical magnet holder 721, a magnet 722 that is fixed to an inner circumferential surface of the magnet holder 721, and an end plate 723 that is fixed on a side opposite the rotor carrier 711 of both sides in the axial direction of the magnet 722. The magnet holder 721 has a length dimension that is the same as that of the magnet 722 in the axial direction. The magnet 722 is provided so as to be surrounded by the magnet holder 721 from the outer side in the radial direction. In addition, the magnet holder 721 and the magnet 722 are fixed in a state in which one end side of both ends in the axial direction is in contact with the rotor carrier 711, and fixed in a state in which the other end side is in contact with the end plate 723.

The rotor carrier 711, the magnet holder 721, and the end plate 723 are all made of aluminum that is a non-magnetic body or a non-magnetic stainless steel (such as SUS304). These components are preferably made of a light metal such as aluminum. However, these components can be made of a synthetic resin instead. These components may be joined by bonding or by welding.

Figure 80:
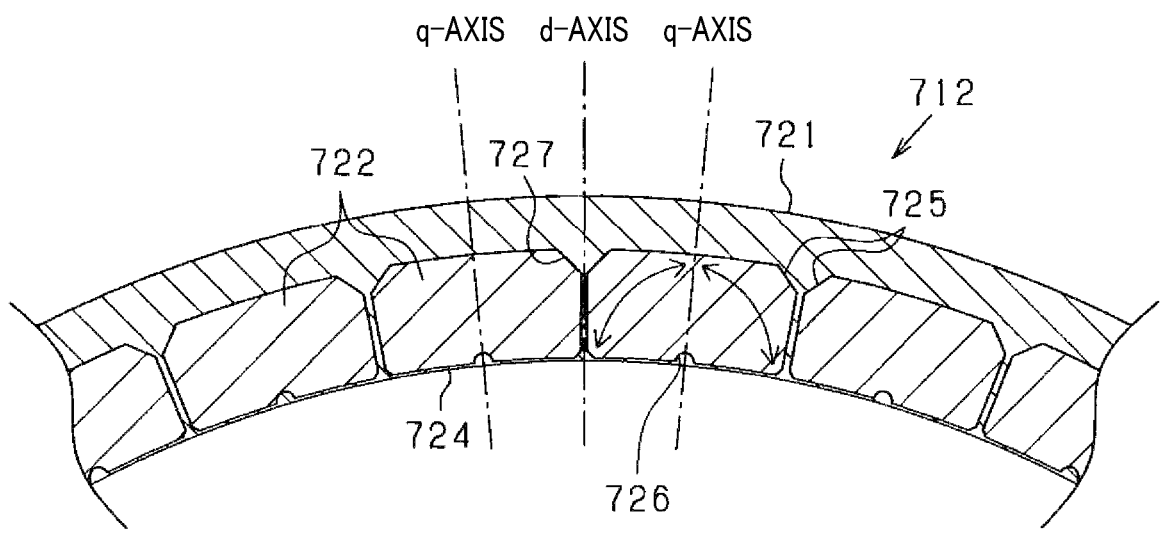
FIG. 80 is a partial cross-sectional view of a cross-sectional structure of a magnet unit.

FIG. 80 is a partial cross-sectional view of a cross-sectional structure of the magnet unit 712. In FIG. 80, an easy axis of magnetization of the magnet 722 is indicated by an arrow.

In the magnet unit 712, the magnets 722 are provided so as to be arrayed such that the polarities alternately change along the circumferential direction of the rotor 710. As a result, the magnets 722 have a plurality of magnetic poles in the circumferential direction. The magnet 722 is a polar anisotropic permanent magnet, and is configured using a sintered neodymium magnet of which the intrinsic coercive force is equal to or greater than 400 [kA/m], and the remnant flux density Br is equal to or greater than 1.0 [T].

The magnets 722 are provided such that, in two magnetic poles that are adjacent to each other in the circumferential direction, a portion between d-axes that are each a center of a magnetic pole is a single magnet. That is, the magnet 722 that amounts to a single magnetic pole is a single magnet, and a center in the circumferential direction thereof is a q-axis. A circumferential surface on the inner side in the radial direction of the magnet 722 is a magnetic flux transfer surface 724 via which transfer of magnetic flux is performed. In the magnet 722, the orientation of the easy axis of magnetization differs between the d-axis side (the portion closer to the d-axis) and the q-axis side (the portion closer to the q-axis). On the d-axis side, the orientation of the easy axis of magnetization is an orientation that is parallel to the d-axis. On the q-axis side, the orientation of the easy axis of magnetization is an orientation that is orthogonal to the q-axis.

In this case, a magnet magnetic path that has a circular arc shape is formed along the orientation of the easy axis of magnetization. In short, the magnet 722 is configured to be oriented such that, on the side of the d-axis that is a magnetic pole center, the orientation of the easy axis of magnetization is parallel to the d-axis compared to the side of the q-axis that is the magnetic pole boundary.

As a result of the magnets 722 that are arrayed in the circumferential direction, the magnet magnetic flux on the d-axis is strengthened and changes in the magnetic flux near the q-axis are suppressed. As a result, the magnets 722 of which changes in surface magnetic flux from the q-axis to the d-axis are gradual at each magnetic pole can be suitably actualized. Instead of the configuration in which the center in the circumferential direction is the q-axis, the magnet 722 may have a configuration in which the center in the circumferential direction is the d-axis. In addition, instead of a configuration in which the same number of magnets as a number of magnetic poles is used as the magnets 722, a configuration in which magnets that are connected in a circular annular shape are used as the magnets 722 is also possible.

Figure 81:
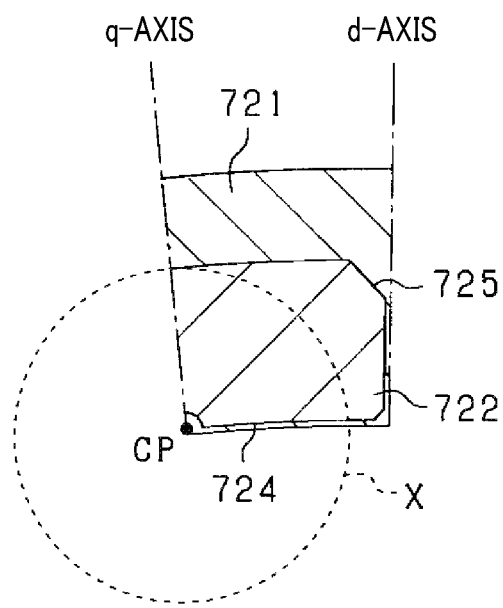
FIG. 81 is a partial cross-sectional view in which a portion of the magnet unit is enlarged.

The magnet 722 preferably has the following configuration. In the magnet 722, a circular arc length of the magnetic flux transfer surface 724 between the d-q axes is longer than a thickness in the radial direction of the magnet 722. In addition, as shown in FIG. 81, when a circle of which an intersection point between the q-axis and the magnetic flux transfer surface 724 in the magnet 722 is a center point CP and a thickness dimension in the radial direction of the magnet 722 is a radius is an orientation circle X that prescribes the easy axis of magnetization of the magnet 722, the magnet 722 is configured to encompass a quarter of the orientation circle X.

That is, in the magnet 722, the easy axis of magnetization that has a circular arc shape is provided so as to cross the q-axis. A strongest magnet magnetic flux is generated by the easy axis of magnetization that passes through an intersection point between a circumferential surface on a side opposite the magnetic flux transfer surface 724 in the radial direction and the q-axis, that is, the easy axis of magnetization that passes through the orientation circle X, of the easy axes of magnetization of the magnet 722. In this case, as a result of the magnet 722 being configured to encompass a quarter of the orientation circle X, the magnetic flux can be generated upon a length of the magnet magnetic path that passes through the d-axis being ensured as a length that is prescribed by the orientation circle X.

Here, when the circular arc length of the magnetic flux transfer surface 724 between the d-q axes in the magnet 722 is longer than the thickness in the radial direction of the magnet 722, magnetic flux leakage further towards the outer side in the radial direction than the magnet 722, that is, towards the counter-stator side becomes a concern. However, in the configuration of the present example, effects of magnetic flux leakage can be reduced as a result of the magnet holder 721 being made of a non-magnetic body.

In addition, in the magnet 722, a recessing portion 725 is formed on an outer circumferential surface on the outer side in the radial direction over a predetermined area that includes the d-axis, and a recessing portion 726 is formed on an inner circumferential surface on the inner side in the radial direction over a predetermined area that includes the q-axis. In this case, based on the orientation of the easy axis of magnetization of the magnet 722, the magnet magnetic path becomes shorter near the d-axis on the outer circumferential surface of the magnet 722, and the magnet magnetic path becomes shorter near the q-axis on the inner circumferential surface of the magnet 722. Here, taking into consideration the difficulty in generating sufficient magnet magnetic flux in the magnet 722 in a location in which the length of the magnet magnetic path is short, the magnet is eliminated in the location at which the magnet magnetic flux is weak.

The magnet holder 721 is provided on the outer side in the radial direction of the magnets 722 that are arrayed in the circumferential direction. In addition, the magnet holder 721 may be provided over an area that includes portions between the magnets 722 in the circumferential direction and the inner side in the radial direction of the magnets 722. That is, the magnet holder 721 may be provided so as to surround the magnets 722. When the magnet holder 721 has a portion on the outer side in the radial direction and a portion on the inner side in the radial direction of the magnets 722, the portion on the outer side in the radial direction may have higher strength than the portion on the inner side in the radial direction.

The magnet holder 721 has a protruding portion 727 that enters the recessing portion 725 of the magnet 722. In this case, as a result of engagement between the recessing portion 725 of the magnet 722 and the protruding portion 727 of the magnet holder 721, positional shifting in the circumferential direction of the magnet 722 is suppressed. That is, the protruding portion 727 of the magnet holder 721 functions as a rotation stopping portion of the magnet 722. In addition, when the magnet holder 721 has a portion that is further on the inner side in the radial direction (the stator 730 side) than the magnet 722, a protruding portion that enters the recessing portion 726 of the magnet 722 may be provided in this portion.

Next, a configuration of the stator 730 will be described.

Figure 82:
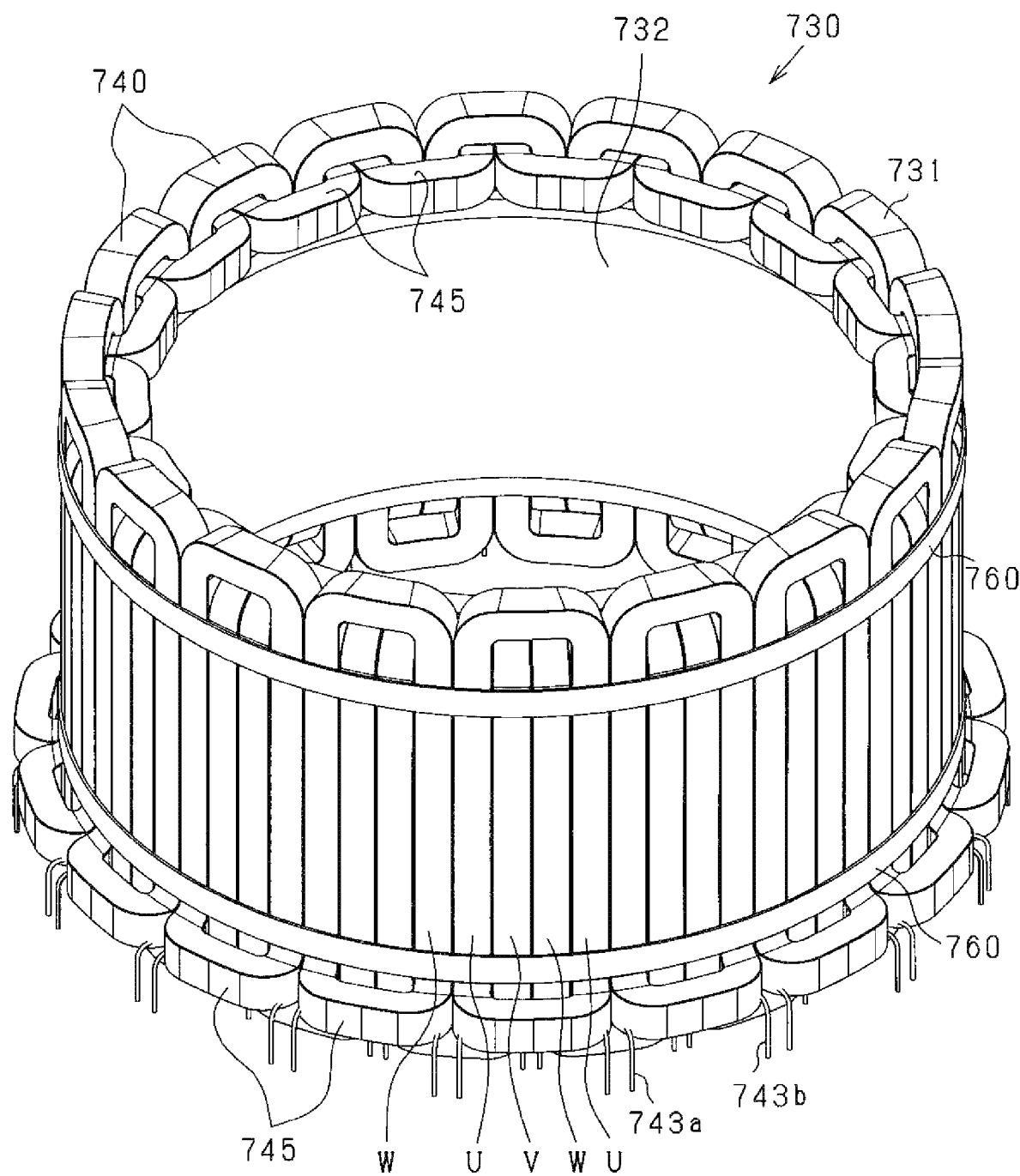
FIG. 82 is a perspective view of a configuration of a stator.
Figure 83:
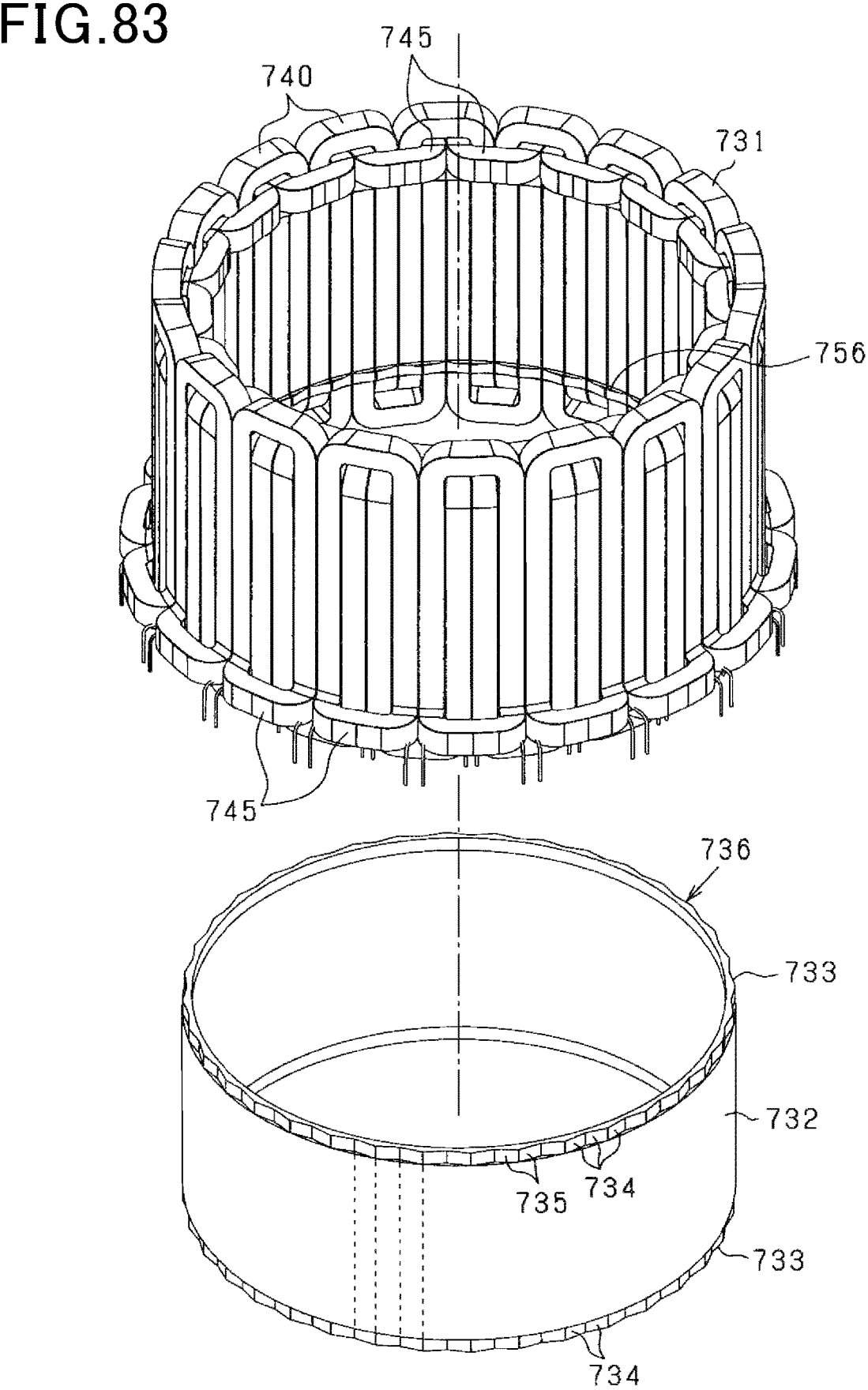
FIG. 83 is a perspective view in which a stator winding and a stator core are exploded.
Figure 84:
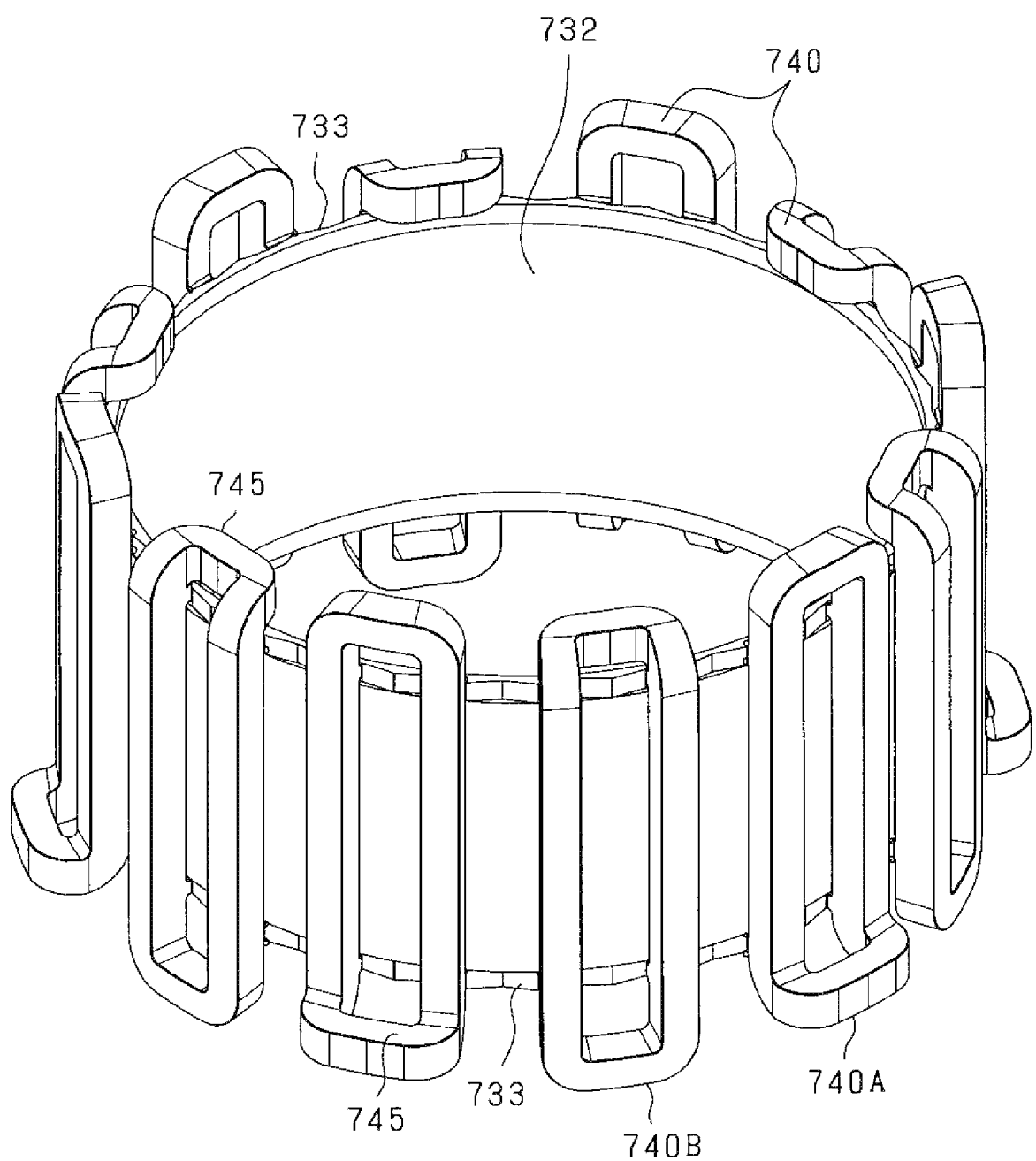
FIG. 84 is a perspective view of only a configuration that corresponds to a U-phase winding among phase windings of phases.
Figure 85:
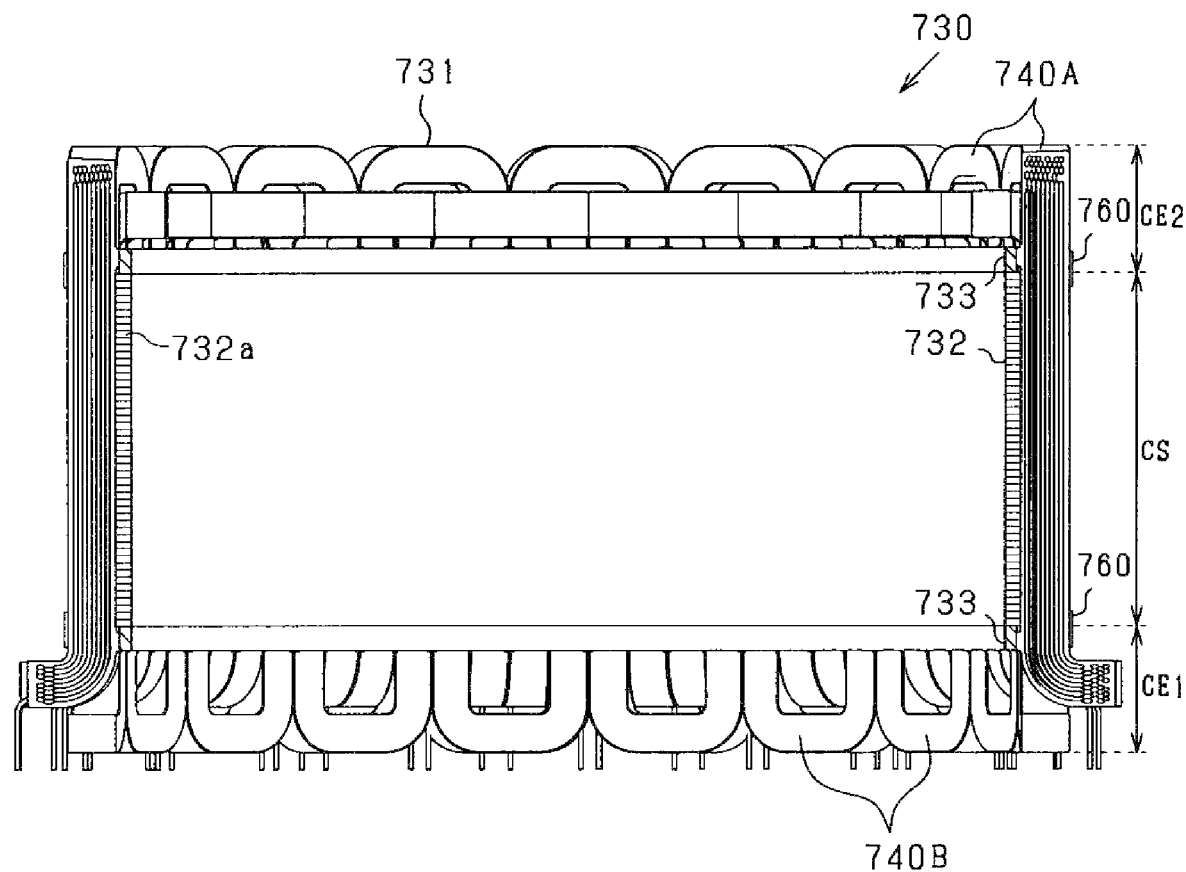
FIG. 85 is a vertical cross-sectional view of the stator.

The stator 730 includes a stator winding 731 and a stator core 732. FIG. 82 is a perspective view of the configuration of the stator 730. FIG. 83 is a perspective view in which the stator winding 731 and the stator core 732 are exploded. FIG. 84 is a perspective view of only a configuration that corresponds to a U-phase winding among phase windings of phases. FIG. 85 is a vertical cross-sectional view of the stator 730.

The stator core 732 is configured as a core-sheet lamination body in which a plurality of core sheets 732a are laminated in the axial direction, using the plurality of core sheets 732a that are made of electromagnetic steel sheets that are magnetic bodies. The stator core 732 is formed into a circular cylindrical shape that has a predetermined thickness in the radial direction. The stator winding 731 is assembled on the outer side in the radial direction that is the rotor 710 side of the stator core 732. An outer circumferential surface of the stator core 732 is formed into a curved surface with substantially no unevenness. The stator core 732 functions as a back yoke. For example, the stator core 732 is configured by the plurality of core sheets 732*a* that are formed into a circular annular plate shape by punching being laminated in the axial direction. However, a stator core that has a helical core structure may also be used as the stator core 732. In the stator core 732 that has the helical core structure, a band-shaped core sheet is used. As a result of the core sheets being formed into an annular shape by winding and being laminated in the axial direction, the stator core 732 that has an overall circular cylindrical shape is configured.

In the stator core 732, end rings 733 are fixed to end surfaces on both sides in the axial direction. The end ring 733 is a positioning member that provides a function for holding the stator winding 731 in a predetermined position in the circumferential direction in a state in which the stator winding 731 is assembled to the stator core 732. The stator core 732 and the end rings 733 are a base member 736.

An engaging surface 734 is formed on an outer circumferential surface of the end ring 733 at an orientation that is oblique to a tangent line on a concentric circle that is concentric with the stator core 732 and the end ring 733. The engaging surface 734 is provided such that the outer circumferential surface of the end ring 733 is evenly divided into a plurality of portions. In the present example, the same number of engaging surfaces 734 as conductor portions (linear portions 744 of a coil module 740, described hereafter) in a coil side that are arrayed in the circumferential direction in the stator winding 731 is provided in the circumferential direction. In addition, in the present example, as a result of the oblique direction relative to the tangent line being inverted between the engaging surfaces 734 that are adjacent to each other in the circumferential direction, tapered engaging portion are formed on the outer circumferential surface of the end ring 733. In this case, recessing portions 735 are formed between the tapered protruding portions.

In the end rings 733 on both sides in the axial direction, positions of the recesses and protrusions in the circumferential direction coincide between one end side and the other end side in the axial direction. That is, the end ring 733 on one end side in the axial direction and the end ring 733 on the other end side in the axial direction are fixed to the stator core 732 such that positions of protruding peak portions formed by the engaging surfaces 734 coincide in the circumferential direction.

An inner diameter of the end ring 733 is the same as an inner diameter of the stator core 732. In addition, an outer diameter of the end ring 733 is the same as an outer diameter of the stator core 732 in a portion at which the diameter is the largest, and is smaller than the outer diameter of the stator core 732 in a portion at which the diameter is the smallest.

For example, the end ring 733 is formed by a non-magnetic material such as aluminum or copper. The end ring 733 is fixed to the stator core 732 by welding. Aside from welding, the end ring 733 may be mechanically fixed by pin insertion, key press-fitting, or bolt fastening. As a result of such mechanical fixing, positional shifting in the circumferential direction of the end ring 733 in relation to the stator core 732 is suppressed.

As shown in FIG. 85, the stator 730 has, in the axial direction, a portion that corresponds to a coil side CS that opposes the magnets 722 in the rotor 710 in the radial direction, and portions that correspond to coil ends CE1 and CE2 that are on the outer sides in the axial direction of the coil side CS. In this case, the stator core 732 is provided over an area that corresponds to the coil side CS in the axial direction. The end rings 733 are respectively provided in the coil end CE1 on one end side in the axial direction and the coil end CE2 on the other end side. The coil end CE1 corresponds to a first coil end. The coil end CE2 corresponds to a second coil end. Here, a configuration of a state in which the end rings 733 are engaged with the stator winding 731 will be described hereafter.

The stator winding 731 has a plurality of phase windings and is formed into a circular cylindrical shape (annular shape) by phase windings of phases being arranged in a predetermined order in the circumferential direction. The stator core 732 is assembled on the inner side in the radial direction of the stator winding 731. In the present example, as a result of phase windings of a U-phase, a V-phase, and a W-phase being used, the stator winding 731 is configured to have phase windings of three phases.

Figure 86:
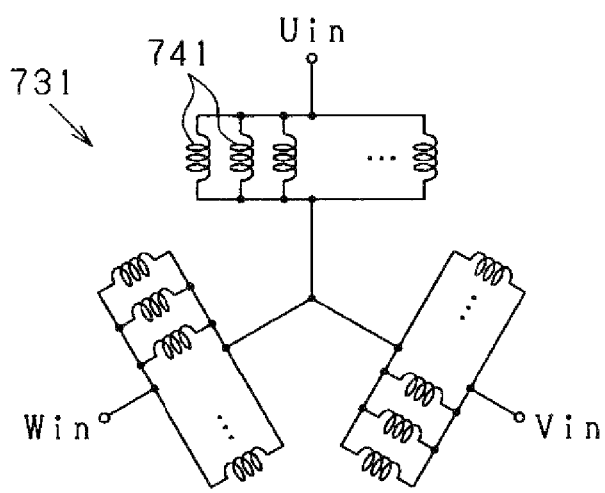
FIG. 86 is a circuit diagram of a connection state of partial windings of the phase windings of three phases.

The phase windings of the phases in the stator winding 731 have a plurality of partial windings 741 (see FIG. 86). The partial windings 741 are individually provided as the coil modules 740. That is, the coil module 740 is that in which the partial winding 741 of the phase winding of each phase is integrally provided. As a result of the coil modules 740 of each phase being arranged so as to be arrayed in a predetermined order in the circumferential direction, the conductor portions of each phase are arranged in an array in a predetermined order in the coil side of the stator winding 731. FIG. 82 shows the order of array of the conductor portions of the U-phase, the V-phase, and the W-phase in the coil side. In addition, in FIG. 84, only the coil modules 740 that configure the U-phase winding among the phase windings of the three phases is extracted and shown. In the present example, the number of magnetic poles is 24. However, the number of magnetic poles is arbitrary.

In the stator winding 731, the phase winding of each phase is configured by the partial windings 741 of the coil modules 740 being connected in parallel or in series for each phase. FIG. 86 is a circuit diagram of a connection state of the partial windings 741 of the phase windings of the three phases. FIG. 86 shows a state in which the partial windings 741 of the phase winding of each phase are connected in parallel.

As shown in FIG. 85, the coil modules 740 are assembled on the outer side in the radial direction of the stator core 732. The stator winding 731 has a portion that corresponds to the coil side CS and portions that correspond to the coil ends CE1 and CE2. In this case, the coil modules 740 are assembled in a state in which both end portions in the axial direction thereof protrude further towards the outer sides in the axial direction (that is, the coil end sides) than the stator core 732.

The coil module 740 is formed into a substantially L-like shape by one of both ends in the axial direction being bent in the radial direction. As a result of this bend, interference between coil modules 740 that are adjacent to each other in the circumferential direction is suppressed. In the present example, the configuration is such that, as the coil modules 740, coil modules 740A that are arranged such that a portion on one end side in the axial direction faces the outer side in the radial direction and coil modules 740B that are arranged such that a portion on the other end side in the axial direction faces the inner side in the radial direction are used. That is, the stator winding 731 is configured using two types of coil modules 740A and 740B. These coil modules 740A and 740B are assembled to the stator core 732 such that orientations in the axial direction are opposite each other.

As shown in FIG. 82, in the state in which the plurality of coil modules 740 are assembled to the stator core 732, restraining rings 760 are attached in two locations in the axial direction on the outer side in the radial direction of the coil modules 740. The restraining ring 760 is a restraining member that restrains the coil modules 740 (stator winding 731) in the radial direction. For example, the restraining ring 760 is an annular ring that is made of metal. The configuration may be such that a C ring in which both ends are free ends or a multiple-layer ring is used as the restraining ring 760, and end portions of the restraining ring 760 are connected to each other by welding, bonding, or the like. In this case, the restraining ring 760 may have elasticity and be smaller in diameter than the stator winding 731 in a natural state.

The configuration may also be such that a linear member, such as a thread, a string, or a wire, is used as the restraining member, and the restraining member is wound in a spiraling manner around the outer circumferential side of the stator winding 731. In this case, for example, the configuration may be such that a string that is soaked with varnish is used, and strengthening of string-fixing is achieved by the varnish.

Next, the configuration of the coil module 740 will be described in detail.

Here, first, the coil module 740A, of the coil module 740A and the coil module 740B, will be described. Here, the coil module 740 is a sub-assembly that includes the partial winding 741 and a winding holder 742. In the description below, the partial winding 741 of the coil module 740A is also referred to as a "partial winding 741A", and the winding holder 742 is also referred to as a "winding holder 742A". The partial winding 741 of the coil module 740B is also referred to as a "partial winding 741B", and the winding holder 742 is also referred to as a "winding holder 742B". The partial winding 741A corresponds to a first partial winding and the partial winding 741B corresponds to a second partial winding.

Figure 87:
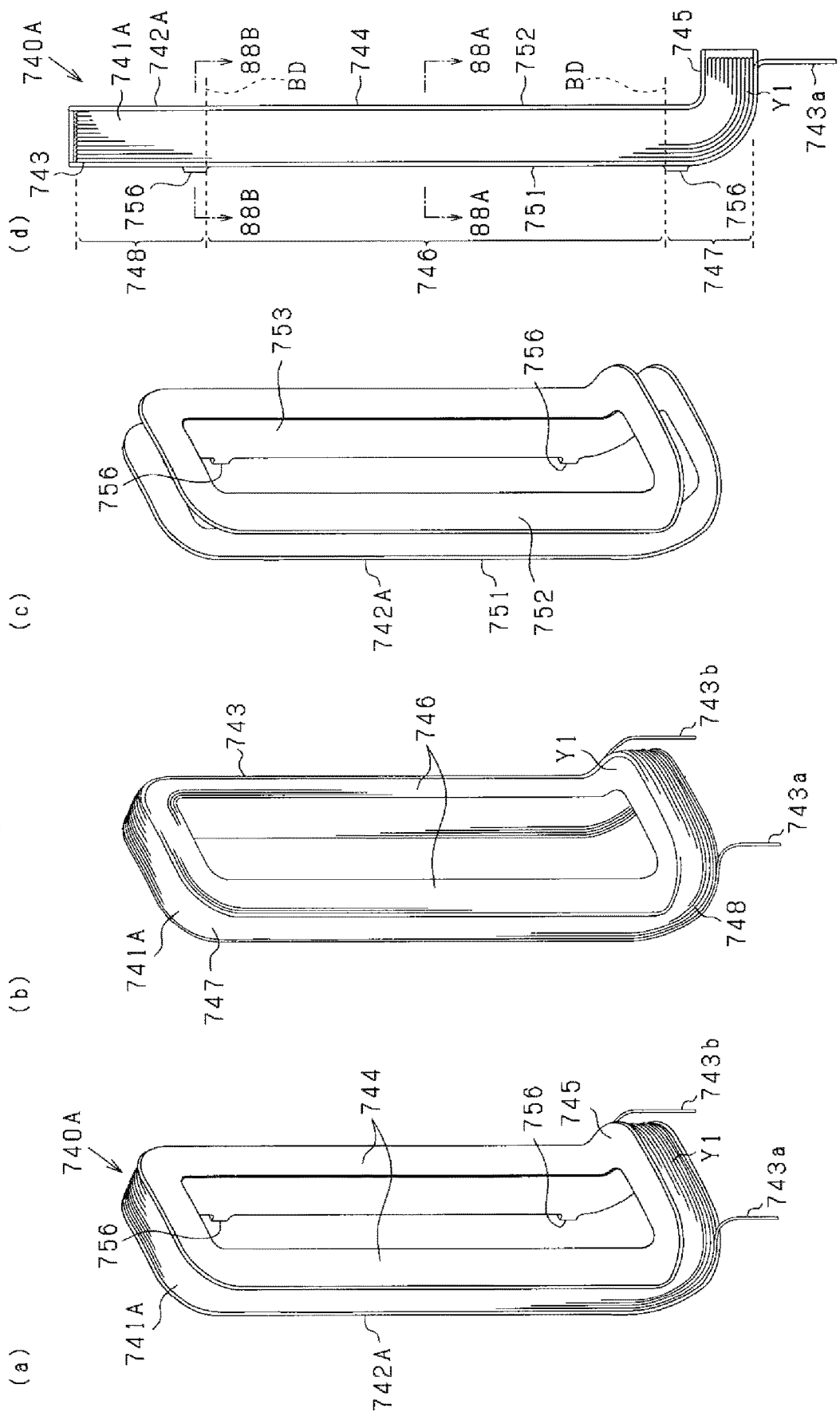
FIG. 87 illustrates, by (a) to (d), diagrams of a configuration of a coil module.

FIG. 87 shows, by (a), a perspective view of the coil module 740A. FIG. 87 shows, by (b), a perspective view of only the partial winding 741A of the coil module 740A. FIG. 87 shows, by (c), a perspective view of only the winding holder 742A of the coil module 740A. FIG. 87 shows, by (d), a side view of the coil module 740A. FIG. 88 shows, by (a) and (b), cross-sectional views of a lateral cross-section of the coil module 740A. FIG. 88 shows, by (a), a cross-sectional view taken along line 88A-88A in FIG. 87 by (d). FIG. 88 shows, by (b), a cross-sectional view taken along line 88B-88B in FIG. 87 by (d). Here, in FIG. 87 by (d), a left side of the coil module 740A is the stator core 732 side. In FIG. 88 by (a) and (b), a lower side of the coil module 740A is the stator core 732 side.

The coil module 740A includes the partial winding 741A that is configured by a conductor 743 being wound in multiple layers, and the insulating winding holder 742A that is provided integrally with the partial winding 741A. The winding holder 742A is provided to insulate the partial winding 741A from the surroundings thereof, and is particularly provided to insulate between the partial winding 741A and the stator core 732. The coil module 740A is formed into an elongated annular shape in which the axial direction is long. The coil module 740A has a pair of linear portions 744 that extend in parallel with each other in the axial direction. In addition, the coil module 740A has a curved portion 745 that extends in a direction that is orthogonal to the axial direction, on one end side of both sides in the axial direction. As a result, the coil module 740A is configured to be formed into an overall substantially L-like shape.

The partial winding 741A includes a pair of intermediate conductor portions 746 that are provided in a linear manner and in parallel with each other, a first crossover portion 747 that connects the pair of intermediate conductor portions 746 on one end side in the axial direction, and a second crossover portion 748 that connects the pair of intermediate conductor portions 746 on the other end side in the axial direction. The partial winding 741A is formed into an annular shape by the pair of intermediate conductor portions 746, the first crossover portion 747, and the second crossover portion 748. The pair of intermediate conductor portions 746 is provided so as to be separated by a predetermined coil pitch. The intermediate conductor portion 746 of the partial winding 741 of another phase can be arranged between the pair of intermediate conductor portions 746 in the circumferential direction. In the present example, the configuration is such that the pair of intermediate conductor portions 746 are provided so as to be separated by two coil pitches, and one intermediate conductor portion 746 each of the partial windings 741 of the other two phases is arranged between the pair of intermediate conductor portions 746.

The first crossover portion 747 and the second crossover portion 748 are respectively provided as portions that correspond to the coil ends CE1 and CE2 (see FIG. 85). That is, these crossover portions 747 and 748 are provided as coil-end conductor portions that connect the intermediate conductor portions 746 of the same phase in two positions that differ in the circumferential direction to each other, in the coil ends CE1 and CE2. In the partial winding 741A, the first crossover portion 747 is a portion that corresponds to the curved portion 745 of the coil module 740A, and is provided so as to be bent in a direction that is orthogonal to the intermediate conductor portion 746, that is, a direction that is orthogonal to the axial direction.

In contrast, the second crossover portion 748 is provided so as to linearly extend in the same direction as the intermediate conductor portion 746 that is further on the inner side in the radial direction than the second crossover portion 748, that is, in the axial direction. As a result, the partial winding 741A is configured to be formed into an overall substantially L-like shape. Here, in FIG. 87 by (d), boundary portions BD between the coil side CS, and the coil ends CE1 and CE2 are indicated by broken lines.

In the partial winding 741A, an outward curved portion Y1 that curves towards the outer side in the radial direction is provided in the first crossover portion 747 (the first crossover portion 747 on the coil end CE1 side of the partial winding 741A). The partial winding 741A is configured such that the outward curved portion Y1 is provided on the coil end CE1 side and the partial winding 741A is not curved in the radial direction on the coil end CE2 side.

As shown in FIG. 88 by (a), the partial winding 741A is formed by the conductor 743 being wound in multiple layers such that a lateral cross-section is a quadrangle. FIG. 88 shows, by (a), a lateral cross-section of the coil module 740A, in the intermediate conductor portions 746. The conductor 743 is wound in multiple layers so as to be arrayed in the circumferential direction and the radial direction in the intermediate conductor portions 746. In the partial winding 741A, a circumferential-direction length on an outer diameter side and a circumferential-direction length on an inner diameter side are the same on the lateral cross-section thereof.

Here, in portions of the crossover portions 747 and 748 in which the partial winding 741A is oriented along the circumferential direction, the conductor 743 is wound in multiple layers so as to be arrayed in the axial direction and the radial direction. In the present example, the partial winding 741A is configured by the conductor 743 being wound by concentric winding. However, a manner in which the conductor 743 is wound is arbitrary. The conductor 743 may be wound in multiple layers by alpha winding instead of concentric winding.

The lateral cross-section of the partial winding 741A may have a substantially trapezoidal shape in which the circumferential-direction length on the outer diameter side is longer than the circumferential-direction length on the inner diameter side. As a result, separation distances between the intermediate conductor portions 746 that are arrayed in the circumferential direction can be made equal, while taking into consideration circumferential lengths differing between the outer diameter side and the inner diameter side.

As shown in FIG. 87 by (a), in the partial winding 741A, end portions of the conductor 743 are drawn out in the axial direction from the side of the first crossover portion 747, or more specifically, a tip end of the curved portion 745, and the end portions are the winding end portions 743a and 743b. The end portions 743a and 743b are respectively a winding start and a winding end of the conductor 743. Of the winding end portions 743a and 743b, the winding end portion 743a is connected to a current input/output terminal. The winding end portion 743b is connected to a neutral point.

Figure 99:
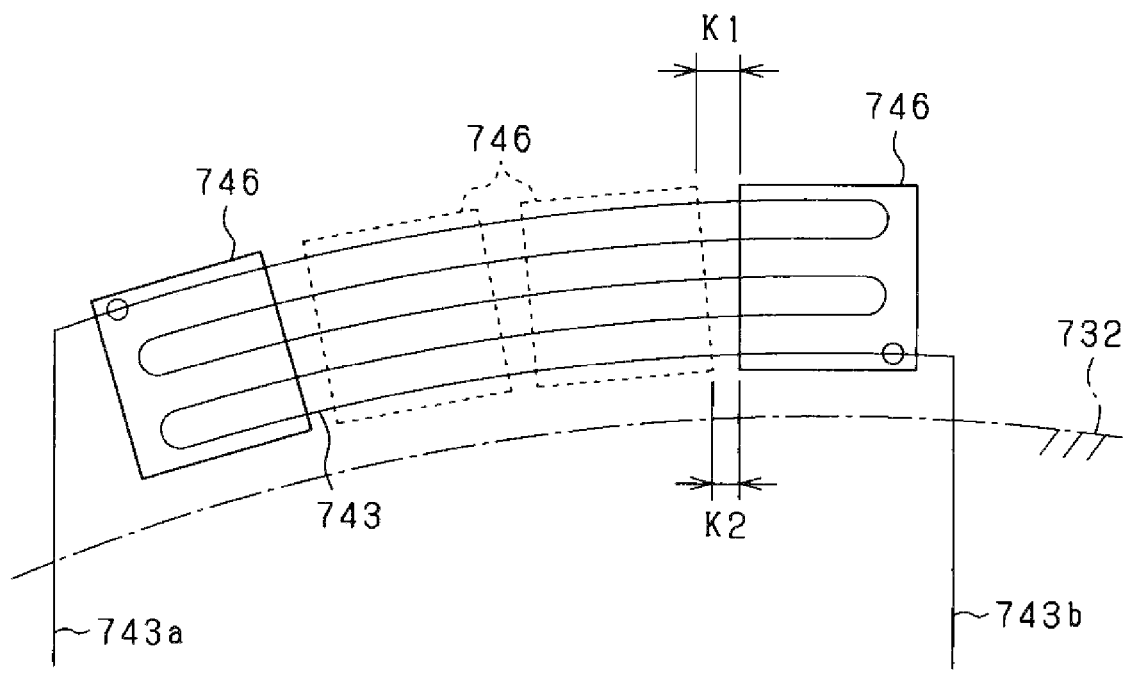
FIG. 99 is a diagram of a winding order of a conductor in the partial winding.

The partial winding 741A may be configured such that a higher potential is applied towards the outer side in the radial direction. That is, in the partial winding 741A, when the outer side in the radial direction and the inner side in the radial direction are compared, the distance between the pair of intermediate conductor portions 746 increases towards the outer side in the radial direction. Therefore, taking this point into consideration, a configuration in which a higher potential is applied towards the outer side in the radial direction is preferable. FIG. 99 shows a winding order of the conductor 743 in the partial winding 741A. Here, in FIG. 99, the intermediate conductor portions 746 in the same partial winding 741A are indicated by a solid line. The intermediate conductor portion 746 in a differing partial winding 741B (that is, the partial winding 741B of a differing phase) is indicated by a broken line.

In the partial winding 741A, the conductor 743 is wound so as to move from the outer side in the radial direction to the inner side in the radial direction. The winding start on the outer side in the radial direction is the winding end portion 743a. In addition, the winding end on the inner side in the radial direction is the winding end portion 743b. In this case, the winding end portion 743a is connected to the current input/output terminal. The winding end portion 743b is connected to the neutral point. As a result, a higher potential is applied towards the outer side in the radial direction. Here, the winding order of the conductor 743 itself may be that in which the winding start and the winding end are reversed on the outer side in the radial direction and the inner side in the radial direction.

In addition, in FIG. 99, the separation distance between the intermediate conductor portions 746 of differing phases that are adjacent to each other differs between the outer side in the radial direction and the inner side in the radial direction. In this case, when the separation distance on the outer side in the radial direction is K1 and the separation distance on the inner side in the radial direction is K2, K1>K2.

That is, the separation distance between the intermediate conductor portions 746 of differing phases that are adjacent to each other in the circumferential direction increases towards the outer side in the radial direction. As a result, regarding the separation distances between intermediate conductor portions 746 that are adjacent to each other in the circumferential direction, appropriate separation distances based on potential difference are each ensured.

The winding holder 742A has a bobbin-like shape and is configured by an insulating material such as a synthetic resin. In a manner similar to the partial winding 741A, the winding holder 742A is configured to be formed into an overall substantially L-like shape. The winding holder 742A includes portions that are provided along the intermediate conductor portions 746 of the partial winding 741A and portions that are provided along the crossover portions 747 and 748.

As shown in FIG. 88 by (a), the winding holder 742A is provided so as to surround the partial winding 741A on three sides on the lateral cross-section of the partial winding 741A. The winding holder 742A includes a first wall portion 751 that is on the stator core 732 side, a second wall portion 752 that is on the counter-stator core side, and a third wall portion 753 that connects the first wall portion 751 and the second wall portion 752. The first wall portion 751 corresponds to a back-yoke-side insulation wall. The second wall portion 752 corresponds to a counter-back-yoke-side insulation wall. The third wall portion 753 corresponds to a circumferential-direction insulation wall. The third wall portion 753 is provided on the inner side in the circumferential direction of the pair of linear portions 744 that are arrayed in the circumferential direction. The third wall portion 753 is provided so as to be oriented to extend towards a circle center of the stator core 732.

The winding holder 742A has a housing portion 754 that is formed by the first to third wall portions 751 to 753. The partial winding 741A is provided so as to be housed in the housing portion 754. In this case, the partial winding 741A is insulated by the wall portions 751 to 753 on three sides that are the stator core 732 side, the counter-stator core side, and one side in the circumferential direction. That is, insulation from the stator core 732 in the intermediate conductor portion 746 is achieved by the first wall portion 751. The intermediate conductor portion 746 is covered so as not to be exposed on the rotor 710 side (air gap side) by the second wall portion 752. Insulation between the intermediate conductor portions 746 in the circumferential direction is achieved by the third wall portion 753.

In the winding holder 742A, when a thickness dimension in a wall thickness direction (radial direction) of the first wall portion 751 is T11, a thickness dimension in a wall thickness direction (radial direction) of the second wall portion 752 is T12, and a thickness dimension in a wall thickness direction (circumferential direction) of the third wall portion 753 is T13, the thickness dimension T12 of the second wall portion 752 is preferably smaller than the thickness dimension T11 of the first wall portion 751 (T11>T12). That is, the second wall portion 752 is an insulation wall on the magnet 722 side (air gap side). As a result of this insulation wall being thin, a distance between the magnet 722 and the partial winding 741, or more specifically, a distance on a magnetic circuit can be shortened. Performance improvement can be expected.

In addition, when those in which the distance between the magnet 722 and the partial winding 741 is the same are compared, the air gap (distance of the gap) between the coil module 740 (holder surface) and the magnet 722 can be increased by an amount amounting to an amount by which the thickness dimension T12 of the second wall portion 752 is smaller. Contact during rotation of the rotor 710 can be suppressed. Here, in FIG. 100, a configuration in which T11>T12 is achieved by the thickness dimension T11 of the first wall portion 751 being made thicker and the thickness dimension T12 of the second wall portion 752 being made thinner than that in the configuration in FIG. 88 by (a) is shown.

Furthermore, as a result of the thickness dimension T11 of the first wall portion 751 being greater than the thickness dimension T12 of the second wall portion 752, an insulation distance to the stator core 732 can be ensured, and insulation performance thereof can be enhanced. However, T11=T12 is also possible.

For example, the thickness dimension T13 of the third wall portion 753 may be the same as the thickness dimension T11 of the first wall portion 751. However, T13>T11 or T13<T11 is also possible.

Figure 100:
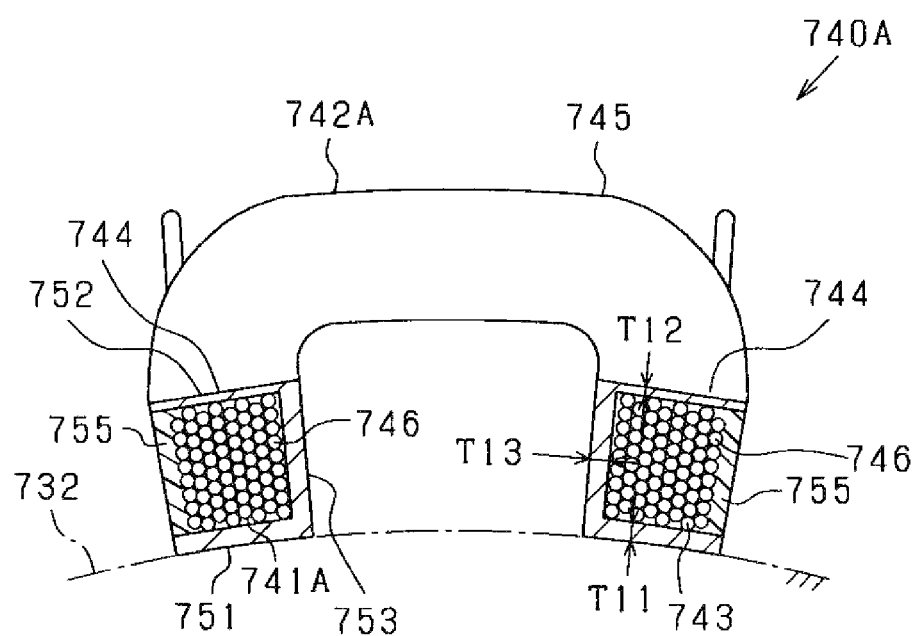
FIG. 100 is a diagram of a configuration of the coil module.

As shown in FIG. 100, the third wall portion 753 may be configured such that the thickness dimension T13 differs between respective positions on the inner side in the radial direction and the outer side in the radial direction, and the thickness dimension T13 is larger on the outer side in the radial direction. That is, the third wall portion 753 has a tapered cross-section that has a wider width towards the outer side in the radial direction. In this case, as a result of the thickness dimension T13 of the third wall portion 753 being larger on the outer side in the radial direction than the inner side in the radial direction, the intermediate conductor portions 746 that are arrayed in the circumferential direction can be appropriately arranged while taking into consideration the circumferential length differing between the inner side in the radial direction and the outer side in the radial direction.

That is, when the thickness dimension T13 of the third wall portion 753 is uniform in the radial direction, in a case in which the lateral cross-section of the partial winding 741A is a quadrangle, the two intermediate conductor portions 746 that are adjacent to each other in the circumferential direction become too close on the side of the third wall portion 753 and too far apart on the side opposite thereof. Therefore, the rotating magnetic flux becoming uneven in the circumferential direction becomes a concern. In this regard, in the configuration of the present example, equalization of the rotating magnetic flux in the circumferential direction becomes possible.

In addition, uniformity of insulation performance in the circumferential direction is also possible. Furthermore, because an excessive gap being formed between the intermediate conductor portion 746 and the third wall portion 753 on the outer side in the radial direction (outer circumferential side) is suppressed, this is also suitable in terms of positioning and fixing the intermediate conductor portions 746 (partial winding 741A).

In terms of a relationship with the curved portion 745 of the coil module 740A, in the pair of linear portions 744, the first wall portion 751 is a wall portion on a side opposite the curved portion 745 (a wall portion on the inner side in the axial direction). The second wall portion 752 is a wall portion on the curved portion 745 side (a wall portion on the outer side in the axial direction).

The partial winding 741A is provided so as to be in contact with or close to the wall portions 751 to 753 on three sides in the housing portion 754, and is arranged in an area that is on a side opposite the third wall portion 753 in the circumferential direction and further on the inner side than the end portions of the first wall portion 751 and the second wall portion 752. That is, in the winding holder 742A, the third wall portion 753 is provided on one side of both sides in the circumferential direction of the intermediate conductor portion 746 in the first wall portion 751 and the second wall portion 752, and run-over portions 751*a* and 752*a* that run over further in the circumferential direction than the intermediate conductor portion 746 are provided on the other side. The run-over portions 751*a* and 752*a* are excess portions that are present in excess in the circumferential direction in relation to the partial winding 741A. As a result, in the housing portion 754, a free space SZ in which the partial winding 741A is not housed is provided on one side in the circumferential direction. In this case, as a result of the free space SZ, the partial winding 741A inside the housing portion 754 running further towards the outer side than the winding holder 742 is suppressed.

In short, the first wall portion 751 and the second wall portion 752 have extending portions that extend further in the circumferential direction than the intermediate conductor portion 746, on both sides in the circumferential direction of the intermediate conductor portion 746 of the partial winding 741A. The third wall portion 753 that extends in the radial direction from the first wall portion 751 and the second wall portion 752 is provided on one side of the extending portions on both sides in the circumferential direction thereof. In addition, the run-over portions 751*a* and 752*a* are provided on one side of the extending portions on both sides in the circumferential direction.

The housing portion 754 is filled with a resin material that serves as an insulating material. The partial winding 741A is housed so as to be molded by the resin material. As a result, a resin layer 755 is formed on a side opposite the third wall portion 753 with the intermediate conductor portion 746 therebetween, in the housing portion 754. In this case, as a result of the resin material entering gaps between the conductors 743 in the partial winding 741A as well, in the partial winding 741A, the conductors 743 that are close in the conductor 743 that is wound in multiple layers are joined to each other with the molding resin as a joining material.

In the present configuration, as a result of the conductors 743 that are close in the conductor 743 that is wound in multiple layers in the partial winding 741A being joined to each other by a joining material, the conductors 743 in the partial winding 741A can be kept in a desired state of proximity to each other. That is, the state of multiple-layer winding in the partial winding 741A can be kept in a desired state. In a manner similar to the third wall portion 753, the resin layer 755 may be configured such that a thickness dimension (circumferential-direction thickness) differs between respective positions on the inner side in the radial direction and the outer side in the radial direction, and the circumferential-direction dimension is larger on the outer side in the radial direction (see FIG. 100).

That is, the configuration may be such that the separation distance between the intermediate conductor portions 746 of differing phases that are adjacent to each other in the circumferential direction differs between the outer side in the radial direction and the inner side in the radial direction. As a result, the intermediate conductor portions 746 that are arrayed in the circumferential direction can be appropriately arranged while taking into consideration the circumferential length differing between the inner side in the radial direction and the outer side in the radial direction. Here, in FIG. 100, the third wall portion 753 and the resin layer 755 correspond to an insulating portion in the circumferential direction.

Instead of the resin molding, the partial winding 741A may be hardened by an interior of the housing portion 754 being impregnated with an adhesive that contains varnish. In addition, resin molding and impregnation with varnish may both be performed. Furthermore, when the conductor 743 is a coated conductor in which a conductor body is covered by an insulating film, the configuration may be such that the conductors 743 are adhered (joined) together by self-welding of the insulating film. However, a configuration in which the interior of the housing portion 754 is not filled with a resin material or the like, that is, a configuration in which the free space SZ is provided as a space area is also possible.

The coil module 740A is assembled to the cylindrical stator core 732 from the outer side in the radial direction. The first wall portion 751 on the stator core 732 side is formed into a circular arc surface at the same curvature as the outer circumferential surface of the stator core 732. As a result, adhesion of the coil module 740A to the stator core 732 is improved. The second wall portion 752 on the counter-stator core side may arbitrarily be either of a linear shape and a circular arc shape. However, in the present example, the second wall portion 752 is formed into a circular arc shape that is concentric with the first wall portion 751.

In addition, the coil module 740A is assembled to the stator core 732 with the curved portion 745 on the outer side in the radial direction. The curved portion 745 is provided on the side of the second wall portion 752 (that is, the side opposite the first wall portion 751). In addition, in this case, a circumferential-direction distance of the pair of linear portions 744 that includes the two second wall portions 752 is longer than a circumferential-direction distance that includes the two first wall portions 751. The curved portion 745 that is on the outer side in the radial direction is provided so as to have the same dimension as the longer circumferential-direction distance.

Furthermore, as shown in FIG. 87 by (d), protruding portions 756 that protrude towards the side opposite the curved portion 745, that is, the inner side in the radial direction (stator core 732 side) are provided in two upper and lower locations in the pair of linear portions 744 of the coil module 740A, near the boundary portions BD between the coil side CS, and the coil ends CE1 and CE2. In the winding holder 742A, the protruding portion 756 is provided in a position that is in the coil end CE1 on the first crossover side 747 and on the outer side in the axial direction of the boundary portion BD, and the protruding portion 756 is provided in a position that is in the coil end CE2 on the second crossover portion 748 side and on the outer side in the axial direction of the boundary portion BD.

In other words, in the coil module 740A, the first wall portion 751 has a portion (yoke outer portion) that extends further towards the outer side in the axial direction than the axial-direction end surface in the axial direction of the stator core 732. The protruding portion 756 that protrudes further towards the stator core 732 side than a surface that opposes the stator core 732 in the circumferential direction is integrally molded in this portion. For example, the protruding portion 756 is simultaneously molded with the first wall portion 751 by injection molding of a resin material.

In terms of the lateral cross-section of the coil module 740A, as shown in FIG. 88 by (b), the protruding portion 756 is provided so as to protrude from the first wall portion 751 that is on the stator core 732 side. The protruding portion 756 is configured to have an oblique surface 756a that is oblique toward one side in an area from one end in the circumferential direction to the other end in the circumferential direction of the first wall portion 751. In the present example, the protruding portion 756 is formed such that an end portion on the inner side (inner side in the circumferential direction) of the first wall portion 751 is high in the left and right pair of linear portions 744. However, unlike the configuration shown in FIG. 88 by (b), the protruding portion 756 may be formed such that an end portion on the outer side (outer side in the circumferential direction) of the first wall portion 751 is high in the left and right pair of linear portions 744.

Next, the coil module 740B will be described.

In the coil module 740B, an orientation of the radial direction in which the curved portion 745 extends differs from that of the coil module 740A. Although there are differences in the configuration as a result, a basic configuration is identical to that of the coil module 740A. Therefore, differences with the coil module 740A will mainly be described herein.

Figure 89:
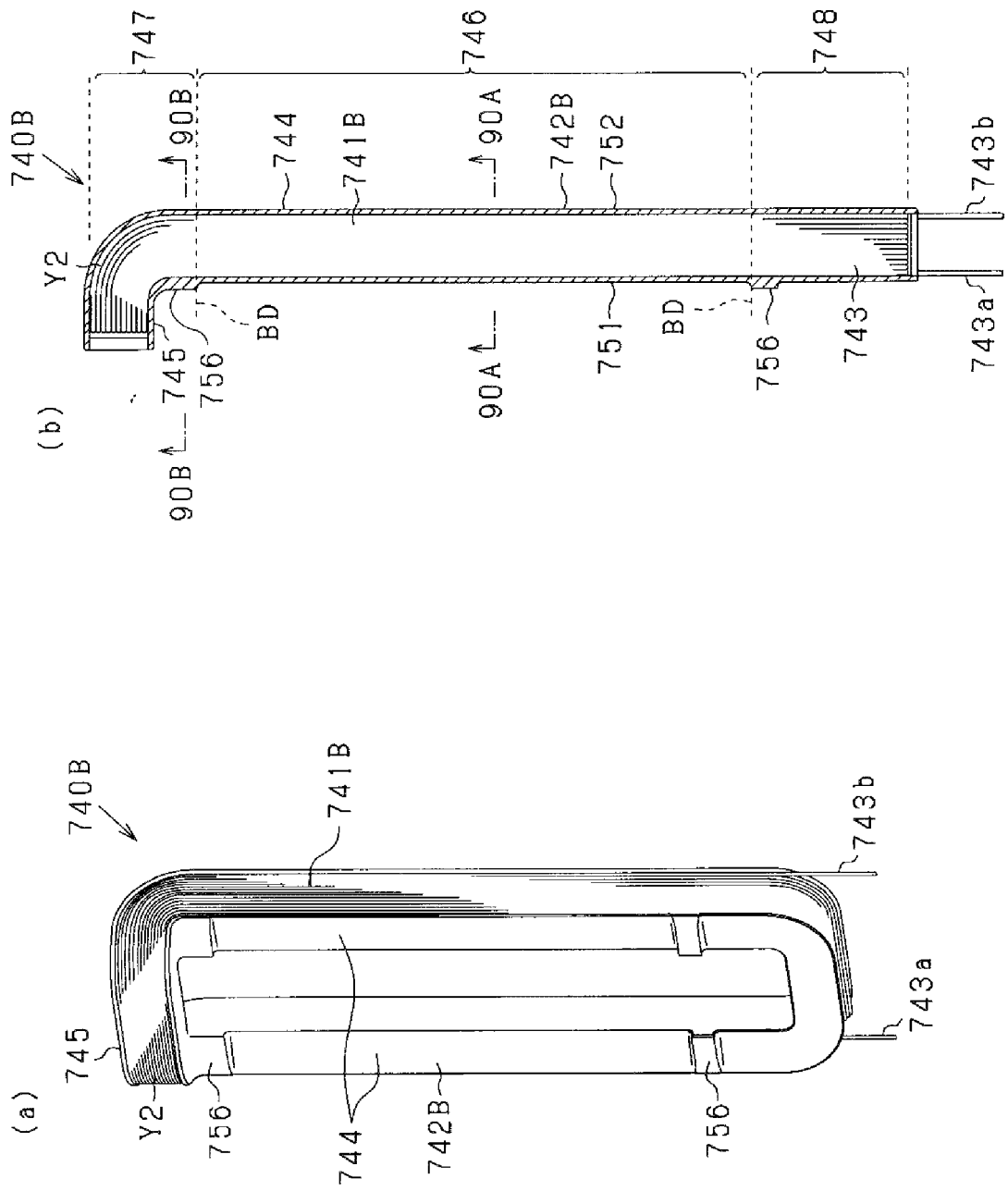
FIG. 89 illustrates, by (a) and (b), diagrams of a configuration of the coil module.

FIG. 89 shows, by (a), a perspective view of the coil module 740B. FIG. 89 shows, by (b), a side view of the coil module 740B. In addition, FIG. 90 shows, by (a) and (b), cross-sectional views of a lateral cross-section of the coil module 740B. FIG. 90 shows, by (a), a cross-sectional view taken along line 90A-90A in FIG. 89 by (b). FIG. 90 shows, by (b), a cross-sectional view taken along line 90B-90B in FIG. 89 by (b). Here, in FIG. 89 by (b), a left side of the coil module 740B is the stator core 732 side. In FIG. 90 by (a) and (b), a lower side of the coil module 740B is the stator core 732 side.

The coil module 740B includes the partial winding 741B that is configured by the conductor 743 being wound in multiple layers, and the insulating winding holder 742B that is provided integrally with the partial winding 741B. In addition, the coil module 740B has a pair of linear portions 744 that extend in parallel with each other in the axial. In addition, the coil module 740B has a curved portion 745 that extends in a direction that is orthogonal to the axial direction, on one end side of both sides in the axial direction. The coil module 740B is configured to be formed into an overall substantially L-like shape.

A configuration of the partial winding 741B is basically identical to that of the partial winding 741A. That is, in a manner similar to the partial winding 741A, the partial winding 741B includes the pair of intermediate conductor portions 746 that are provided in a linear manner and in parallel with each other, the first crossover portion 747 that connects the pair of intermediate conductor portions 746 on one end side in the axial direction, and the second crossover portion 748 that connects the pair of intermediate conductor portions 746 on the other end side in the axial direction. The partial winding 741B is formed into an annular shape by the pair of intermediate conductor portions 746, the first crossover portion 747, and the second crossover portion 748.

However, between the coil module 740A and the coil module 740B, the directions in which the curved portions 745 extend in a state in which the coil module 740A and the coil module 740B are assembled to the stator core 732 differ, and orientations in the axial direction are opposite each other. As a result, differences in the configuration occur between the coil modules 740A and 740B.

In the partial winding 741B, an inward curved portion Y2 that curves towards the inner side in the radial direction is provided in the first crossover portion 747 (the first crossover portion 747 on the coil end CE1 side of the partial winding 741B). The partial winding 741B is configured such that the inward curved portion Y2 is provided on the coil end CE2 side and the partial winding 741B is not curved in the radial direction on the coil end CE1 side.

In the partial winding 741B, the winding end portions 743a and 743b are drawn out from the side of the second crossover portion 748, or more specifically, a tip end on a side opposite the curved portion 745. As a result, in a state in which the coil modules 740A and 740B are assembled to the stator core 732, the winding end portions 743*a* and 743*b* are drawn out on the same side in the axial direction (coil end CE1 side).

In addition, as shown in FIG. 90 by (a), in a manner similar to the configuration of the winding holder 742A, the winding holder 742B has the first wall portion 751 that is on the stator core 732 side, the second wall portion 752 that is on the counter-stator core side, and the third wall portion 753 that connects the first wall portion 751 and the second wall portion 752. Furthermore, in the winding holder 742B, unlike the configuration of the winding holder 742A, in the pair of linear portions 744, the first wall portion 751 is the wall portion on the curved portion 745 side (the wall portion on the inner side in the radial direction). The the second wall portion 752 is the wall portion on the side opposite the curved portion 745 (the wall portion on the outer side in the radial direction).

The coil module 740B is assembled to the stator core 732 with the curved portion 745 on the inner side in the radial direction. The curved portion 745 is provided on the side of the first wall portion 751. In this case, the circumferential-direction distance of the pair of linear portions 744 that includes the two first wall portions 751 is shorter than the circumferential-direction distance that includes the two second wall portions 752. The curved portion 745 that is on the inner side in the radial direction is provide so as to have the same dimension as the shorter circumferential-direction distance.

In addition, as shown in FIG. 89 by (b), protruding portions 756 that protrude towards the curved portion 745 side, that is, the inner side in the radial direction (stator core 732 side) are provided in two upper and lower locations in the pair of linear portions 744 of the coil module 740B, near the boundary portions BD between the coil side CS, and the coil ends CE1 and CE2. In the winding holder 742, the protruding portion 756 is provided in a position that is in the coil end CE2 on the first crossover side 747 and on the outer side in the axial direction of the boundary portion BD, and the protruding portion 756 is provided in a position that is in the coil end CE1 on the second crossover portion 748 side and on the outer side in the axial direction of the boundary portion BD. The configuration of the protruding portion 756 is also similar to that in the winding holder 742A (see FIG. 19B).

A manufacturing method for the coil module 740 will be described. Here, the manufacturing method for the coil module 740A will be described. However, the manufacturing method similarly applies to the coil module 740B as well. First, the partial winding 741A is fabricated as an air-core wound coil. Specifically, the conductor 743 is wound in multiple layers using a jig and the partial winding 741A that has a shape shown in FIG. 87 by (b) is fabricated as the air-core wound coil. Then, after fabrication of the partial winding 741A, the winding holder 742A is assembled to the partial winding 741A. At this time, the winding holder 742A may be individually assembled to the partial winding 741, in a state in which the winding holder 742A is divided into a plurality of pieces. The winding holder 742A may be able to be divided into two or three pieces in the radial direction or the axial direction.

Here, the coil module 740A can also be fabricated by the conductor 743 being wound in multiple layers around the winding holder 742A. In the winding holder 742A, a protrusion or a groove that guides the conductor 743 may be provided on an inner circumferential surface of the housing portion 754 that houses the partial winding 741A. The configuration may be such that the partial winding 741A is bound by the winding 743 on the outer side so as not to unravel.

Then, the interior of the housing portion 754 is filled with resin in the winding holder 742A that is integrated with the partial winding 741A. As a result, the resin layer 755 is formed inside the housing portion 754.

Next, a state in which the coil modules 740A and 740B are assembled to the stator core 732 will be described.

Figure 91:
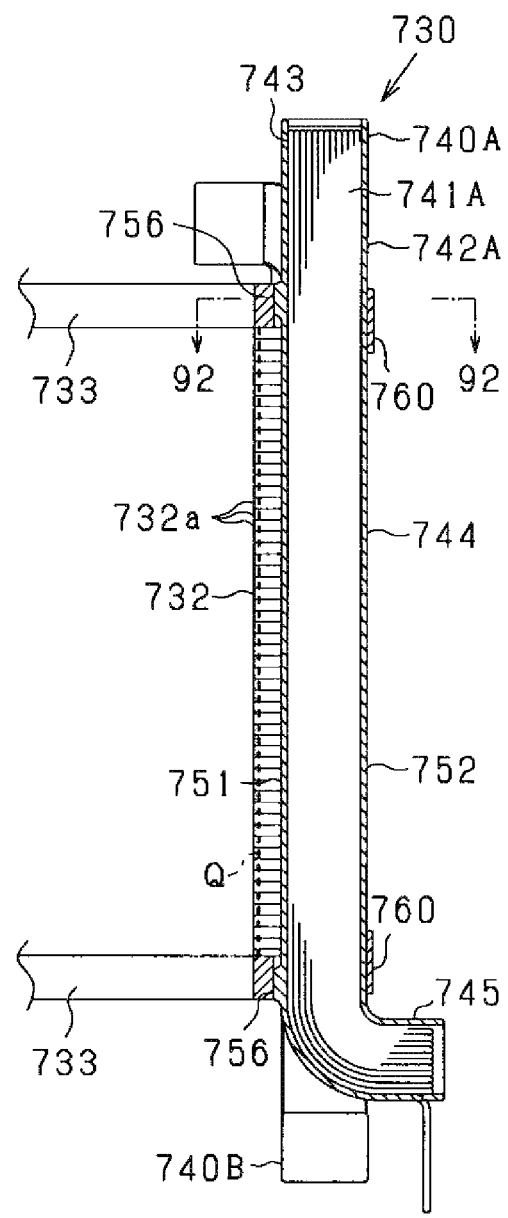
FIG. 91 is a cross-sectional view of a vertical cross-section of the stator.
Figure 92:
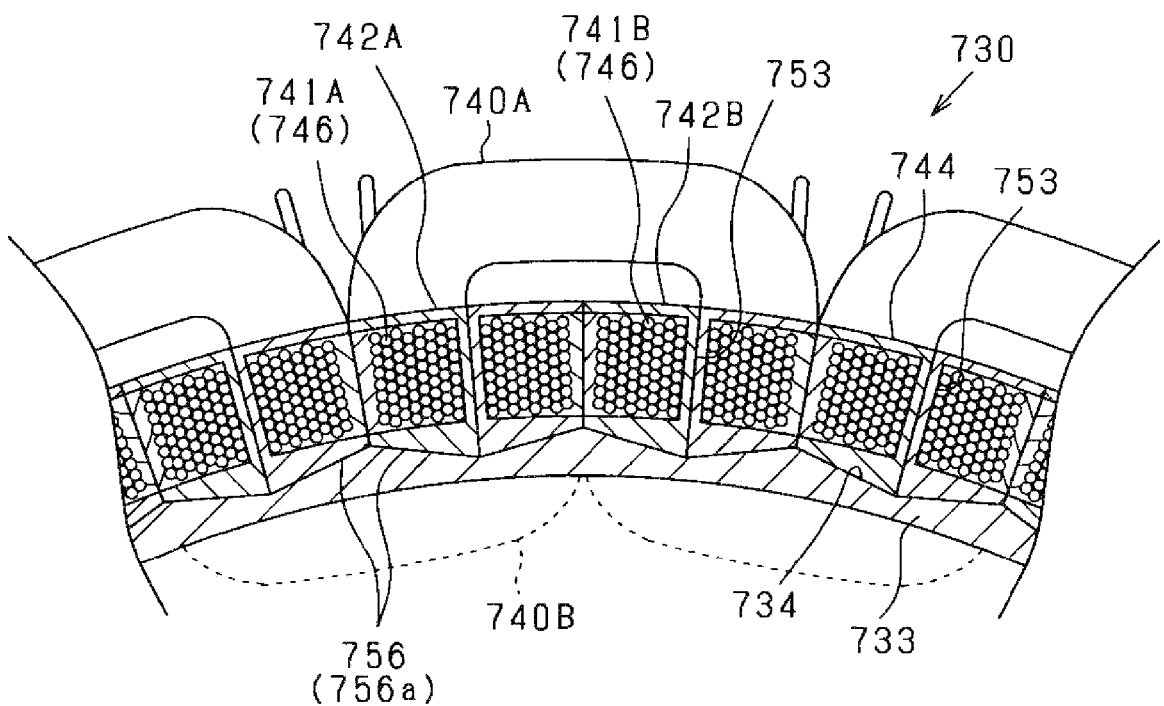
FIG. 92 is a cross-sectional view of a lateral cross-section of the stator.
Figure 93:
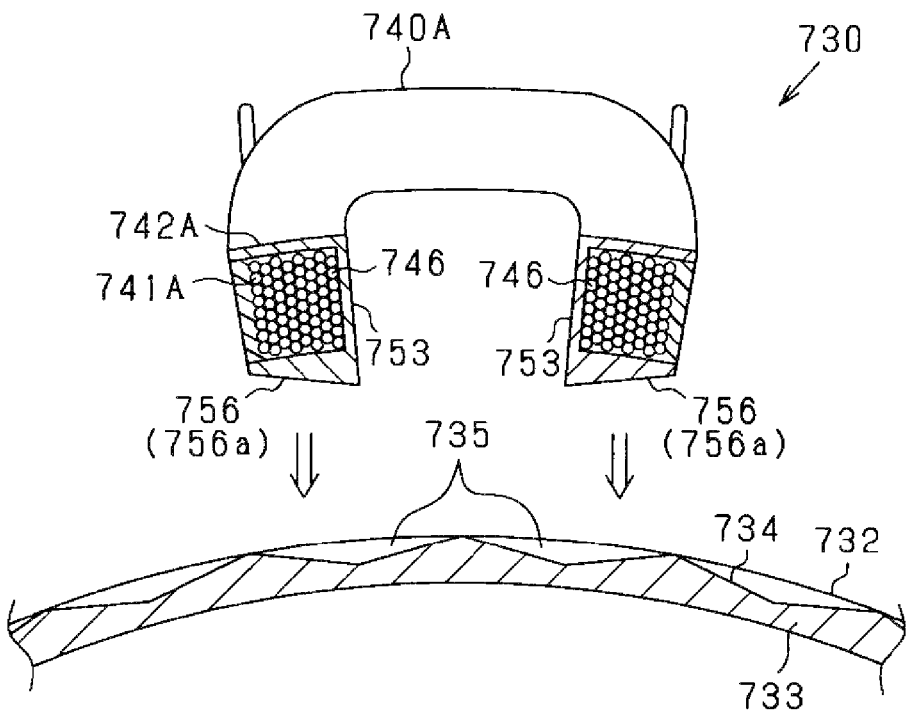
FIG. 93 is a cross-sectional view in which the stator core and an end ring, and a coil module are separated from each other.

FIG. 91 is a cross-sectional view of a vertical cross-section of the stator 730. FIG. 92 is a cross-sectional view of a lateral cross-section of the stator 730. FIG. 93 is a cross-sectional view in which the stator core 732 and the end ring 733, and the coil module 740A are separated from each another. Here, FIG. 92 is a cross-sectional view taken along line 92-92 in FIG. 91.

As shown in FIG. 91, the coil modules 740A and 740B are assembled to the stator core 732 such that respective curved portions 745 are opposite each other in the axial direction, and orientations of the curve are opposite each other in the radial direction. In this case, as a result of the positions and orientations of the curved portions 745 of the coil modules 740A and 740B, interference between the coil modules 740A and 740B that are adjacent to each other in the circumferential direction is prevented. In terms of the partial windings 741A and 741B, as a result of the outward curved portion Y1 being provided in the partial winding 741A and the inward curved portion Y2 being provided in the partial winding 741B, interference between the partial windings 741A and 741B that are adjacent to each other in the circumferential direction is prevented. The outward curved portion Y1 and the inward curved portion Y2 correspond to an interference prevention portion.

To supplement with reference to FIG. 85 as well, on the coil end CE1 side, the coil module 740B (the second crossover portion 748 of the partial winding 741B) is positioned on the outer side in the axial direction of the coil module 740A (the first crossover portion 747 of the partial winding 741A). In addition, on the coil CE2 side, the partial windings 741A and 741B are arranged in an array in the circumferential direction, while the coil module 740A (the second crossover portion 748 of the partial winding 741A) is positioned on the outer side in the axial direction of the coil module 740B (the first crossover portion 747 of the partial winding 741B). As a result, the partial windings 741A and 741B are appropriately arranged in the circumferential direction while interference therebetween is prevented. Reduction in body size can be achieved.

In addition, as shown in FIG. 91, the end rings 733 are provided on both ends in the axial direction of the stator core 732. The coil modules 740A and 740B are assembled to the stator core 732 in a state in which the protruding portions 756 in the two upper and lower locations are respectively engaged with the end rings 733. Here, the protruding portions 756 of the coil modules 740A and 740B protrude so as to overlap the axial-direction end surfaces of the stator core 732 (an upper-side end surface and a lower-side end surface in FIG. 91) in the axial direction.

As a result, the stator core 732 is in a state of being sandwiched between the pair of protruding portions 756 of the coil modules 740A and 740B in the axial direction (that is, a state of being pressed in the axial direction). In this case, the stator core 732 is configured such that the plurality of core sheets 732*a* are laminated in the axial direction. The stator core 732 is sandwiched between the pair of protruding portions 756 in the lamination direction of the core sheets 732a. As a result, an issue in which gaps between the core sheets 732a widen and an axial-length dimension of the stator core 732 unintentionally increases is suppressed. The pair of protruding portions 756 function as a pressing portion that presses the axial-direction end surfaces of the stator core 732 in the axial direction from the outer side in the axial direction.

Here, in addition to the protruding portions 756, a lamination holding structure for holding the lamination state of the plurality of core sheets 732a may be provided on the inner side in the radial direction (that is, the side opposite the coil modules 740A and 740B, of the inner and outer sides in the radial direction) in the stator core 732. In FIG. 91, the lamination holding structure is provided in a Q position that is indicated by a thick broken line.

As the lamination holding structure, joining by welding of the core sheets 732a, joining by crimping of the core sheets 732a, joining by an adhesive (containing varnish), lamination holding by frictional force of an outer cylindrical member 772 (cylindrical member) that is assembled on the inner side in the radial direction of the stator core 732 by press-fitting, and the like can be considered. As a result of the lamination holding structure being provided on the inner side in the radial direction, reduction of the axial-length dimension of the stator core 732 can be more appropriately actualized.

The restraining ring 760 is attached on the outer circumferential side of the coil modules 740A and 740B. As a result of restraint by the restraining ring 760, the coil modules 740A and 740B are in a state of being pressed in a direction in which the protruding portions 756 engage with the end rings 733. In particular, as a result of the restraining ring 760 being provided in a position that overlaps an engaging portion of the end ring 733 and the protruding portion 756 in the axial direction, the engaged state between the end ring 733 and the protruding portion 756 can be more reliably held.

The restraining ring 760 is provided on the outer side in the radial direction of the coil modules 740A and 740B, that is, the side of the surface that opposes the magnets 722 of the rotor 710. Therefore, to prevent interference with the rotor 710 side, a thickness of the restraining ring 760 in the radial direction is preferably as thin as possible. In addition, the configuration may be such the restraining rings 760 are not provided that the area that serves as the coil side CS in the axial direction and are provided in the areas that serve as the coil ends CE1 and CE2. In this case, the restraining rings 760 may be provided in positions that are in the areas that serve as the coil ends CE1 and CE2, and on the outer side in the radial direction of the coil modules 740A and 740B. However, the position in which the restraining ring 760 is provided and the number of restraining rings 760 are arbitrary.

The restraining ring 760 is attached to the outer side of the second wall portion 752 of the winding holder 742. That is, the restraining ring 760 is configured to be in contact with the winding holder 742 but not in contact with the partial winding 741. As a result, for example, even in a configuration in which a metal restraining ring 760 is used to improve fixing strength, decrease in insulation of the partial winding 741 can be suppressed.

In addition, as shown in FIGS. 92 and 93, the oblique surface 756a of the protruding portion 756 is in contact with the engaging surface 734 of the end ring 733. Here, the engaging surface 734 of the end ring 733 corresponds to a first engaging portion. The protruding portion 756 of the coil modules 740A and 740B corresponds to a second engaging portion. In addition, the oblique surface 756a corresponds to an engaged surface.

In this case, in the end ring 733, a plurality of engaging surfaces 734 are continuously provided in the circumferential direction such that the slope directions alternate, and the recessing portion 735 is formed by two engaging surfaces 735 that are adjacent to each other in the circumferential direction (see FIG. 93). In addition, one protruding portion 756 each of the two coil modules 740A and 740B enter the recessing portion 735. In the two protruding portions 756 that enter the single recessing portion 735, a peak portion of each protruding portion 756 reaches a bottom of the recessing portion 735.

As a result, a state in which the third wall portions 753 of the coil modules 740A and 740B are in contact with each other in the circumferential direction is achieved. In addition, in a peak portion that is formed by two engaging surfaces 734 that are adjacent to each other in the circumferential direction, the first wall portions 751, as well as the second wall portions 752, of the coil modules 740A and 740B, are in contact with or close to each other in the circumferential direction.

In the above-described configuration, the protruding portions 756 of the two coil modules 740A and 740B are guided in a direction in which the protruding portions 756 become closer in the circumferential direction by the two engaging surfaces 734 that form the recessing portion 735. As a result, rattling is suppressed in the two partial windings 741 that are adjacent to each other in the circumferential direction. Furthermore, positional shifting of the stator winding 731 caused by vibrations and electromagnetic force can be suitably suppressed. In addition, because a gap between the intermediate conductor portions 746 can be reduced, improvement in space factor can be expected.

In addition, the coil modules 740A and 740B have the protruding portion 756 in each of the first wall portions 751 that are in two locations that are separated in the circumferential direction. The protruding portions 756 in the two locations are respectively in contact with the two engaging surfaces 734 of which the directions of the slope are opposite each other in the end ring 733. In this case, in the coil modules 740A and 740B, as a result of the respective two protruding portions 756 engaging on the engaging surface 734 side of the end ring 733, positional shifting in the circumferential direction of the coil modules 740A and 740B can be suppressed.

Furthermore, in the configuration in which the restraining ring 760 is attached on the outer side in the radial direction of the coil modules 740A and 740B, the oblique surface 756a of the protruding portion 756 is in contact with the engaging surface 734 of the end ring 733 in a pressing state. As a result, the coil modules 740A and 740B can be more firmly fixed to the stator core 732.

In the state in which the coil modules 740A and 740B are arranged in an array in the circumferential direction, in the linear portions 744 of the coil modules 740A an 740B, the partial windings 741 that is housed in the housing portions 754 are arranged in positions that are separated from each other by predetermined intervals in the circumferential direction. More specifically, the partial windings 741 that are adjacent to each other in the circumferential direction are separated from each other by the third wall portion 753 of the winding holder 742 or separated from each other by the free space SZ in the housing portion 754 of the winding holder 742. As a result, insulation between partial windings 741 of differing phases that are adjacent to each other in the circumferential direction can be ensured.

Two third wall portions 753 are interposed between the partial windings 741 of differing phases that are adjacent to each other in the circumferential direction. In this case, as a result of two third wall portions 753 being overlapped, insulation in the stator winding 731 is further improved. Alternatively, two free spaces SZ are interposed between the partial windings 741 of differing phases that are adjacent to each other in the circumferential direction.

In this case, as a result of the free spaces SZ in the housing portions 754 being continuous in the circumferential direction, and further, the free spaces SZ being resin-molded, insulation in the stator winding 731 is further improved. That is, in the configuration in the drawing, the third wall portions 753 of differing winding holders 742 are continuously provided in the circumferential direction or the run-over portions 751a and 752a of differing winding holders 742 are continuously provided in the circumferential direction, between the intermediate conductor portions 746 that are adjacent to each other in the circumferential direction.

Regarding the thickness dimension T13 of the third wall portion 753 (see FIG. 88 by (a)), the thickness dimension T13 amounting to two third wall portions 753 (that is, 2×T13) may be greater than the thickness dimension T11 of the first wall portion 751. That is, 2×T13>T11. In this case, even should a potential difference that is greater than that between the stator core 732 and the intermediate conductor portion 746 be generated between the intermediate conductor portions 746 that are arrayed in the circumferential direction, appropriate interphase insulation is performed.

An insulation structure in the radial direction and the circumferential direction of the coil modules 740A and 740B will be additionally described. In the coil modules 740A and 740B, the first wall portion 751 and the second wall portion 752 have the third wall portion 753 on one side of both sides in the circumferential direction of the intermediate conductor portion 746 of the partial windings 741A and 741B.

In addition, the first wall portion 751 and the second wall portion 752 have the run-over portions 751a and 752a on the other side. Furthermore, in the first wall portion 751 and the second wall portion 752, a portion that is connected to the third wall portion 753, and the run-over portions 751a and 752a each correspond to an extending portion that extends further towards the circumferential direction side than the intermediate conductor portion 746. The extending portions of differing coil modules 740A and 740B are provided so as to oppose each other the circumferential direction between the intermediate conductor portions 746 that are adjacent to each other in the circumferential direction.

In this case, as a result of the intermediate conductor portions 746 that are adjacent to each other in the circumferential direction being separated from each other by the extending portion of the first wall portion 751 in the coil modules 740A and 740B, mutual insulation is ensured. As a result, in addition to insulation from the stator core 732 in the radial direction in the intermediate conductor portions 746, interphase insulation in the circumferential direction can also be suitably actualized.

In the present example, in particular, the third wall portions 753 of the differing coil modules 740A and 740B are provided so as to oppose each other in the circumferential direction on one side in the circumferential direction of the intermediate conductor portions 746 that are arrayed in the circumferential direction. In addition, on the other side in the circumferential direction of the intermediate conductor portions 746 that are arrayed in the circumferential direction, the third wall portion 753 is not present and separation by the run-over portions 751a and 752a is achieved.

In this case, while a single first wall portion 751 is provided between the stator core 732 and the intermediate conductor portion 746 that are arrayed in the radial direction, two third wall portions 753 are provided between the intermediate conductor portions 746 that are arrayed in the circumferential direction. Therefore, appropriate interphase insulation can be performed while taking into consideration a potential difference that is greater than that between the stator core 732 and the intermediate conductor portion 746 being generated between the intermediate conductor portions 746 that are arrayed in the circumferential direction.

Here, in the state in which the coil modules 740A and 740B are assembled to the stator core 732, the protruding portions 756 of the coil modules 740A and 740B and the end rings 733 may be fixed to each other by an adhesive such as varnish. In addition, rattling may be suppressed by portions between the protruding portions 756 of the coil modules 740A and 740B and the end rings 733 being filled with a synthetic resin or varnish.

The plurality of partial windings 741A and 741B may have the same conductor-body cross-sectional area in the multiple-layer winding state and the same number of rounds of the multiple-layer winding. In this case, in the phase winding of each phase, interlinkage fluxes in the partial windings 741A and 741B that configure a parallel circuit can be made uniform. As a result, mutual potential difference in the partial windings 741A and 741B can be eliminated, and generation of a circulating current inside the parallel circuit can be suppressed. In addition, decrease in motor efficiency and decrease in thermal rating performance accompanying the generation of the circulating current can be suppressed.

Furthermore, the plurality of partial windings 741A and 741B have the same shape including the crossover portions 747 and 748. Therefore, the interlinkage fluxes can be made uniform, including leakage fluxes in the coil ends CE1 and CE2. As a result, the potential difference in the partial windings 741A and 741B can again be eliminated, and the circulating current in the parallel circuit can be suppressed.

The stator 730 may be that which uses any of (A) to (C), below.

(A) In the stator 730, a conductor-to-conductor member is provided between the conductor portions (intermediate conductor portions 746) in the circumferential direction, and when the width dimension in the circumferential direction of the conductor-to-conductor member in a single magnetic pole is Wt, the saturation magnetic density of the conductor-to-conductor member is Bs, the width dimension in the circumferential direction of the magnet 722 in a single magnetic pole is Wm, and the residual magnetic flux density of the magnet 722 is Br, a magnetic material in which a relationship Wt×Bs≤Wm×Br is satisfied is used as the conductor-to-conductor member.

(B) In the stator 730, the conductor-to-conductor member is provided between the conductor portions (intermediate conductor portions 746) in the circumferential direction, and a non-magnetic material is used as the conductor-to-conductor member.

(C) In the stator 730, the configuration is such that the conductor-to-conductor member is not provided between the conductor portions (intermediate conductor portions 746) in the circumferential direction.

Next, the inner unit 770 will be described.

Figure 94:
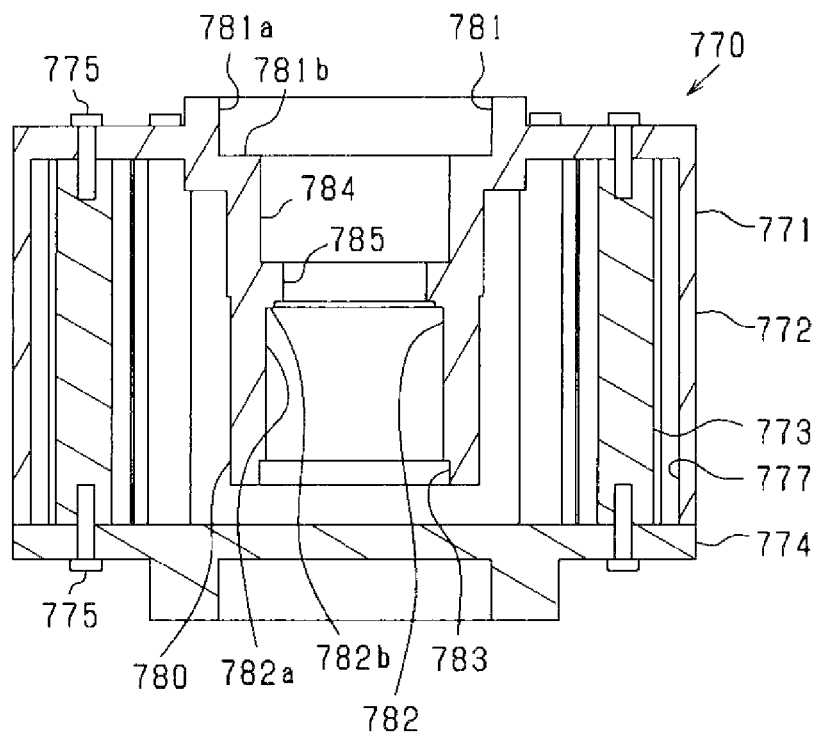
FIG. 94 is a vertical cross-sectional view of an inner unit.
Figure 95:
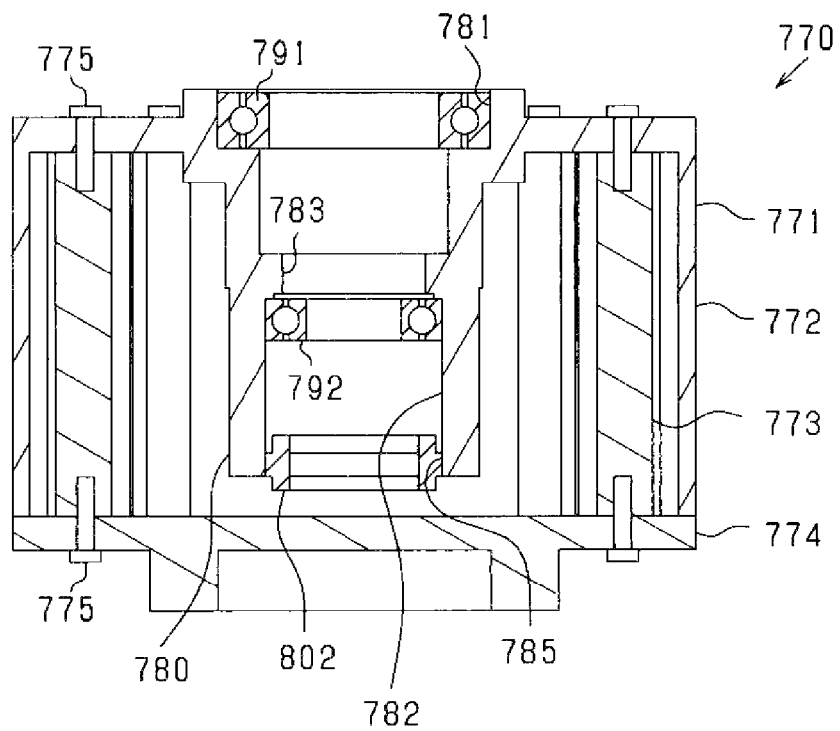
FIG. 95 is a vertical cross-sectional view of the inner unit.

FIGS. 94 and 95 are vertical cross-sectional views of the inner unit 770. Here, FIG. 95 shows a state in which the bearings 791 and 792 that support the rotation shaft 701 are assembled to the inner unit 770. For convenience, in the description below, the bearing 791 is also referred to as a first bearing 791, and the bearing 792 is also referred to as a second bearing 792. The first bearing 791 is a bearing that is provided on a base end side in the axial direction of the rotation shaft 701, that is, the connection shaft 705 side. The second bearing 792 is a bearing that is provided on a tip end side of the rotation shaft 701.

The inner unit 770 includes an inner housing 771. The inner housing 771 includes the outer cylindrical member 772, an inner cylindrical member 773, and an end plate 774. The outer cylindrical member 772 has a circular cylindrical shape. The inner cylindrical member 773 has a circular cylindrical shape of which an outer circumference diameter is smaller than a diameter of the outer cylindrical member 772, and is arranged on the inner side in the radial direction of the outer cylindrical member 772. The end plate 774 has substantially circular disk shaped and fixed to one end side in the axial direction of the outer cylindrical member 772 and the inner cylindrical member 773.

The members 772 to 774 are preferably made of a conductive material, and for example, is made of a CFRP. The outer cylindrical member 772 and the end plate 774 have the same outer dimension. The inner cylindrical member 773 is provided in a space that is formed by the outer cylindrical member 772 and the end plate 774. The inner cylindrical member 773 is fixed to each of the outer cylindrical member 772 and the end plate 774 by a fastener 775 such as a bolt.

The stator core 732 is fixed to the outer side in the radial direction of the outer cylindrical member 772 of the inner housing 771. As a result, the stator 730 and the inner unit 770 are integrated.

A coolant passage 777 through which a coolant, such as cooling water, flows is formed between the outer cylindrical member 772 and the inner cylindrical member 773. The coolant passage 777 is provided in an annular shape in the circumferential direction of the inner housing 771. Although not shown, a coolant pipe is connected to the coolant passage 777. The coolant that flows in from the coolant pipe flows out into the coolant pipe again after undergoing heat exchange in the coolant passage 777.

An annular space is formed on the inner side in the radial direction of the inner cylindrical member 773. For example, an electrical component that configures an inverter that serves as a power converter may be arranged in the annular space. For example, the electrical component is an electrical module in which a semiconductor switching element and a capacitor are packaged. As a result of the electrical module being arranged in a state of being in contact with the inner cylindrical member 773, the electric module is cooled by the coolant that flows through the coolant passage 777.

The outer cylindrical member 772 includes a circular cylindrical boss portion 780 further on the inner side in the radial direction than the inner cylindrical member 773. The boss portion 780 is provided so as to have a hollow cylindrical shape. The rotation shaft 701 is inserted into the hollow portion thereof. The boss portion 780 is a bearing holding portion that holds the bearings 791 and 792. The bearings 791 and 792 are fixed in the hollow portion thereof (see FIG. 95).

For example, the bearings 791 and 792 are radial ball bearings that include a cylindrical inner ring, a cylindrical outer ring that is arranged on the outer side in the radial direction of the inner ring, and a plurality of balls that are arranged between the inner ring and the outer ring. The bearings 791 and 792 are assembled to the inner unit 770 by the outer ring being fixed to the boss portion 780.

In the hollow portion of the boss portion 780, a first fixing portion 781 that fixes the first bearing 791 and a second fixing portion 782 that fixes the second bearing 792 are provided. The first bearing 791 and the second bearing 792 have differing body sizes based on support positions in the rotation shaft 701, taking into consideration vibrations in the rotor 710 and centrifugal load. The first bearing 791 that supports the base end side of the rotation shaft 701 is the bearing of the larger size, that is, the bearing that has a larger support load. Therefore, the first fixing portion 781 is formed to have a larger diameter than the second fixing portion 782.

In addition, when the first bearing 791 and the second bearing 792 are compared, the first bearing 791 is that in which an internal gap in the radial direction, that is, a radial gap is larger compared to that in the second bearing 792. Here, the radial gap is an amount of play in the axial direction between the inner ring and the outer ring of the bearing. Here, compared to the second bearing 791, the first bearing 791 is a bearing that more easily receives the vibrations in the rotor 710 and centrifugal load. As a result of the radial gap of the first bearing 791 being increased, an effect of load absorption is enhanced. Consequently, a load that acts on the boss portion 780 on the base end portion side of the rotation shaft 701 is reduced. Shaking on the tip end side of the rotation shaft 701 is suppressed.

The first fixing portion 781 is formed by a parallel surface 781a that is parallel to the axial direction in the boss portion 780 and an orthogonal surface 781b that is orthogonal to the axial direction. The first bearing 791 is fixed so as to be in contact with these surfaces. In addition, the second fixing portion 782 is formed by a parallel surface 782a that is parallel to the axial direction in the boss portion 780 and an orthogonal surface 782b that is orthogonal to the axial direction. The second bearing 792 is fixed so as to be in contact with these surfaces.

In addition, in the hollow portion of the boss portion 780, a third fixing portion 783 that fixes a resolver 800 that serves as a rotation sensor is provided on the side of the second fixing portion 782, of the first fixing portion 781 and the second fixing portion 782. The third fixing portion 783 is formed by the second fixing portion 782 being increased in diameter in a stepped manner.

As shown in FIG. 77, the resolver 800 includes a resolver rotor 801 that is fixed to the rotation shaft 701 and a resolver stator 802 that is arranged in an opposing manner on the outer side in the radial direction of the resolver rotor 801. The resolver rotor 801 is formed into a circular-disk ring shape and is provided coaxially with the rotation shaft 701 in a state in which the rotation shaft 701 is inserted. The resolver stator 802 has a stator core and a stator coil (not shown), and is fixed to the third fixing portion 783 of the boss portion 780.

As shown in FIG. 94, in the hollow portion of the boss portion 780, small diameter portions 784 and 785 that have smaller diameters than the fixing portions 781 and 782 are provided in positions that are between the first fixing portion 781 and the second fixing portion 782 in the axial direction. The small diameter portion 784 is a hole that has a smaller diameter than the first fixing portion 781, and the small diameter portion 785 is a hole that has a smaller diameter than the second fixing portion 782.

In addition, the third fixing portion 783 that fixes the resolver 800 is provided as a portion that has a larger diameter than the second fixing portion 782, in a position further towards the outer side in the axial direction than the second fixing portion 782, or in other words, a position on the tip end side of the rotation shaft 701. The second fixing portion 782 and the third fixing portion 783 are provided in positions that are adjacent to each other in the axial direction.

In this case, when hole machining is performed by boring or the like in the outer cylindrical member 722, continuous machining of the second fixing portion 782 and the third fixing portion 783 can be performed from the same direction and on the same axis. Therefore, coaxiality between the second bearing 792 that is fixed to the second fixing portion 782 and the resolver stator 802 that is fixed to the third fixing portion 783 is improved. Furthermore, coaxiality between the resolver rotor 801 and the resolver stator 802 is improved. In this case, shaking of the resolver stator 802 in relation to the resolver rotor 801 is reduced. Furthermore, an angle detection error in the resolver 800 is reduced.

Figure 96:
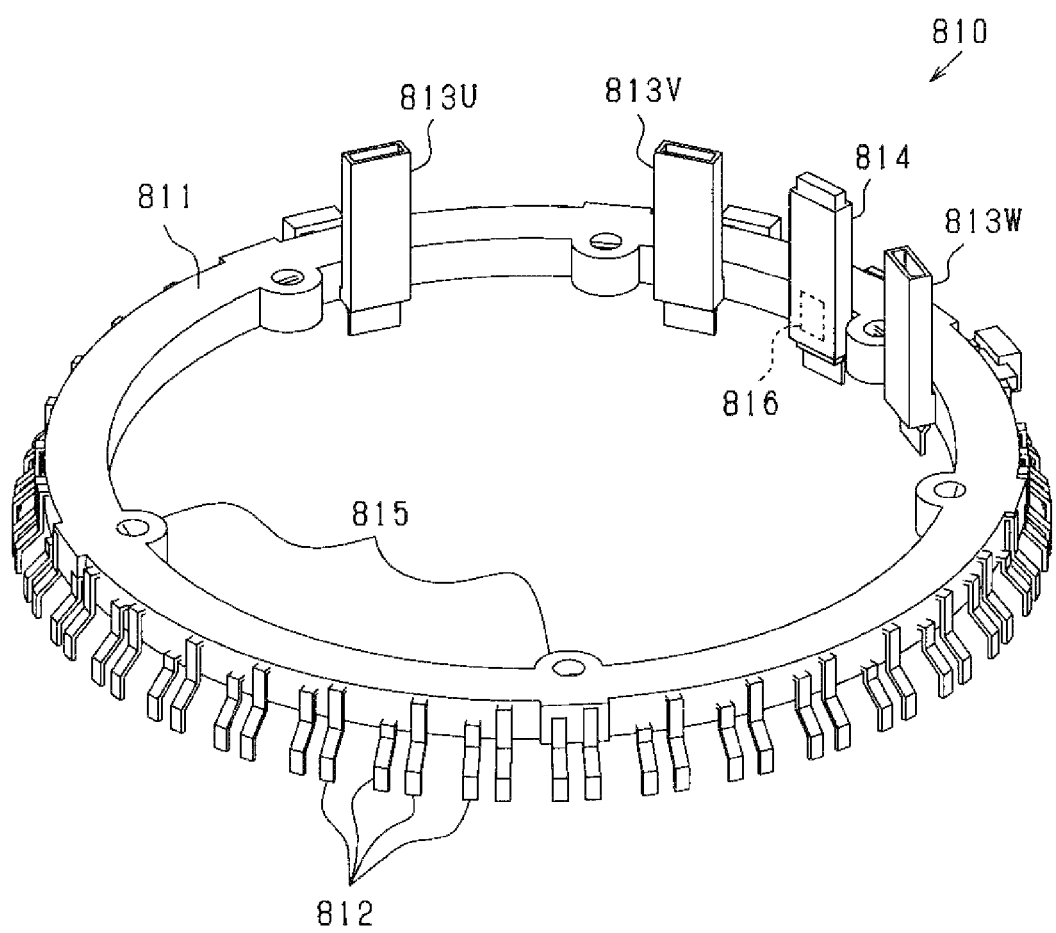
FIG. 96 is a perspective view of a bus bar module.
Figure 97:
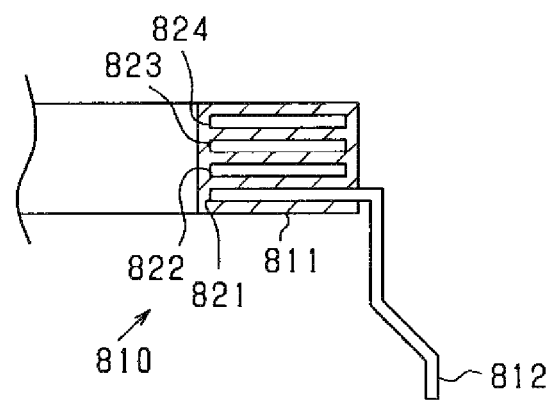
FIG. 97 is a cross-sectional view of a portion of a vertical cross-section of the bus bar module.

Next, the bus bar module 810 will be described. The bus bar module 810 is a winding connection member that is electrically connected to the partial windings 741 of the coil modules 740 in the stator winding 731, connects one ends of the partial windings 741 of each phase in parallel for each phase, and connects the other ends of the partial winding 741 to a neutral point. FIG. 96 is a perspective view of the bus bar module 810. FIG. 97 is a cross-sectional view of a portion of a vertical cross-section of the bus bar module 810.

The bus bar module 810 includes an annular portion 811 that that forms a circular annular shape, a plurality of connection terminals 812 that extend from the annular portion 811, three input/output terminals 813 that are provided for each phase winding, and a current detection terminal 814 that is connected to a current sensor of each phase.

As shown in FIG. 97, for example, the annular portion 811 is formed into a circular annular shape by an insulation member that is made of resin or the like, and is provided with a plurality of bus bars 821 to 824 that are embedded inside the annular portion 811. The bus bars 821 to 824 are made of the bus bar 821 for the U-phase, the bus bar 822 for the V-phase, the bus bar 823 for the W-phase, and the bus bar 824 for the neutral point. The bus bars 821 to 824 are arranged in an array in the axial direction such that plate surfaces oppose each other.

In addition, the connection terminals 812 are connected to the bus bars 821 to 824 so as to protrude from the annular portion 811 towards the outer side in the radial direction. As shown in FIG. 96, the connection terminals 812 are provided so as to be arrayed in the circumferential direction of the annular portion 811 and extend in the axial direction on the outer side in the radial direction.

Figure 98:
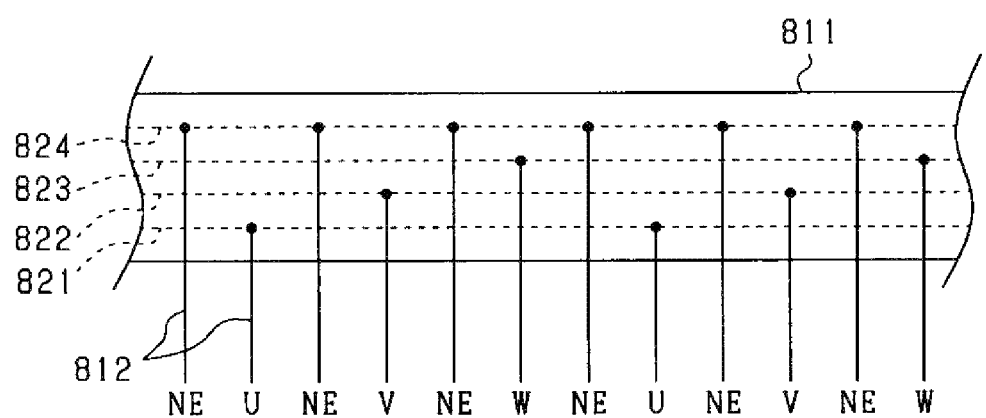
FIG. 98 is a schematic diagram of a connection position of a connection terminal to each bus bar.

In FIG. 98, connection positions of the connection terminals 812 to the bus bars 821 to 824 are shown as a schematic diagram. In FIG. 98, a left/right direction corresponds to the circumferential direction of the annular portion 811. In addition, in FIG. 98, U denotes the connection terminal 812 that is connected to the U-phase winding. V denotes the connection terminal 812 that is connected to the V-phase winding. W denotes the connection terminal 812 that is connected to the W-phase winding. NE denotes the connection terminal 812 that is connected to the neutral point.

As shown in FIG. 98, the connection terminals 812(NE) that are connected to the neutral point are arranged in every other position. The connection terminal 812(U) that is connected to the U-phase winding, the connection terminal 812(V) that is connected to the V-phase winding, and the connection terminal 812(W) that is connected to the W-phase winding are arranged one at a time between the connection terminals 812(NE). The same number of connection terminals 812 as a number of winding end portions 743a and 743b of the partial windings 741 in the coil module 740 is provided. One each of the connection terminal 812 and the winding end portions 743a and 743b are connected. Here, the connection terminal 812 and the winding end portion 743a and 743b may be placed in contact with one another by any of the connection terminal 812 and the winding end portion 743a and 743b being bent or curved in the radial direction as required. Joining by welding, bonding, or the like may be performed in this state of contact.

In addition, the annular portion 811 has a plurality of fixed portions 815 on the inner circumferential side. As a result of a fastener such as a bolt being assembled to the fixed portion 815, the bus bar module 810 is fixed to the end plate 774 of the inner housing 771.

The input/output terminals 813 are an input/output terminal 813U for the U-phase, an input/output terminal 813V for the V-phase, and an input/output terminal 813W for the W-phase. The input/output terminal 813U, the input/output terminal 813V, and the input/output terminal 813W are respectively connected to the bus bars 821 to 823 for each phase inside the annular portion 811. Through the input/output terminals 813, input and output of electric power from an inverter (not shown) is performed for the phase winding of each phase in the stator winding 731.

In addition, in the annular portion 811, the current sensor 816 is provided for each phase. Through the current detection terminal 814, a detection result of the current sensor 816 is outputted to a control apparatus (not shown).

In the rotating electric machine 700 configured as described above, in the stator 730, conductor-to-conductor members (so-called teeth) are not provided between the conductor portions (intermediate conductor portions 746) that are arranged at predetermined intervals in the circumferential direction or, even should the conductor-to-conductor members be provided, the configuration is magnetically weak. Therefore, the magnet magnetic flux that is generated in the rotor 710 directly interlinking with the conductor portions of the stator winding 731, and motor efficiency decreasing and thermal rating performance decreasing in accompaniment with increase in copper eddy loss is a concern. In particular, in a configuration in which strengthening of magnetic flux density by orientation as described above is achieved, effects of copper eddy loss becoming more noticeable is a concern.

In this regard, in the above-described configuration, in the stator winding 731, the partial winding 741 is configured such that the conductor 743 is wound in multiple layers between the conductor portions of the same phase that are provided so as to be separated in the circumferential direction. In addition, the phase winding of each phase is configured by the plurality of partial windings 741 being connected to each other in parallel. As a result, in the stator winding 731, fragmentation of the cross-sectional area per single conductor can be performed in the stator winding 731, and the occurrence of copper eddy loss can be suppressed. Furthermore, improvement in motor efficiency and improvement in thermal rating performance can be achieved.

In addition, when the number of poles of the magnetic poles is P, and the number of partial windings 741A and the number of partial windings 741B per phase are each N, the number of poles P is 4×N. In the phase windings, for each phase, the N-number of partial windings 741A and the N-number of partial windings 741B are all connected in parallel. Specifically, in the present example, the numbers (N) of partial windings 741A and 741B per phase are each 6, and the number of poles P is 24.

For example, FIG. 84 shows the coil module 740 of a single phase among the three phases. Six coil modules 740A are shown as the coil modules 740 that include the partial windings 741A, and six coil modules 740B are shown as the coil modules 740 that include the partial windings 741B. In the phase windings, the six partial windings 741A and the six partial windings 741B are all connected in parallel for each phase.

With reference to FIG. 86, in the phase windings of the U-phase, the V-phase, and the W-phase, the number of parallels of the partial windings 741 is 12 in all of the phase windings. In this case, as a result of all of the partial windings 741A and 741B being connected in parallel for each phase, minimization of the cross-sectional area of each conductor in the stator winding 731 can be performed. Copper eddy loss can be further reduced.

Sixteenth Modification

Figure 101:
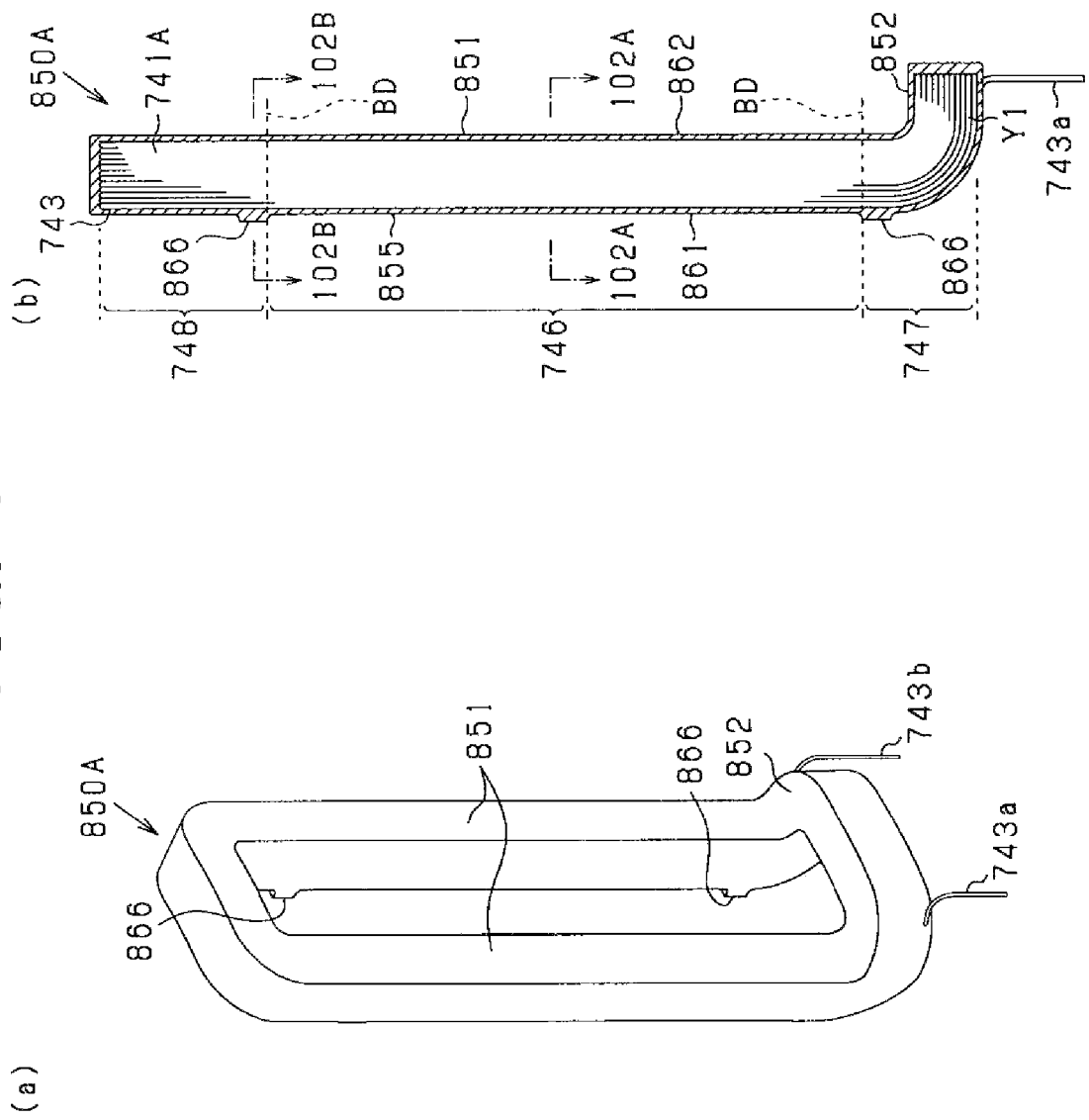
FIG. 101 illustrates, by (a) and (b), diagrams of a configuration of the coil module.
Figure 103:
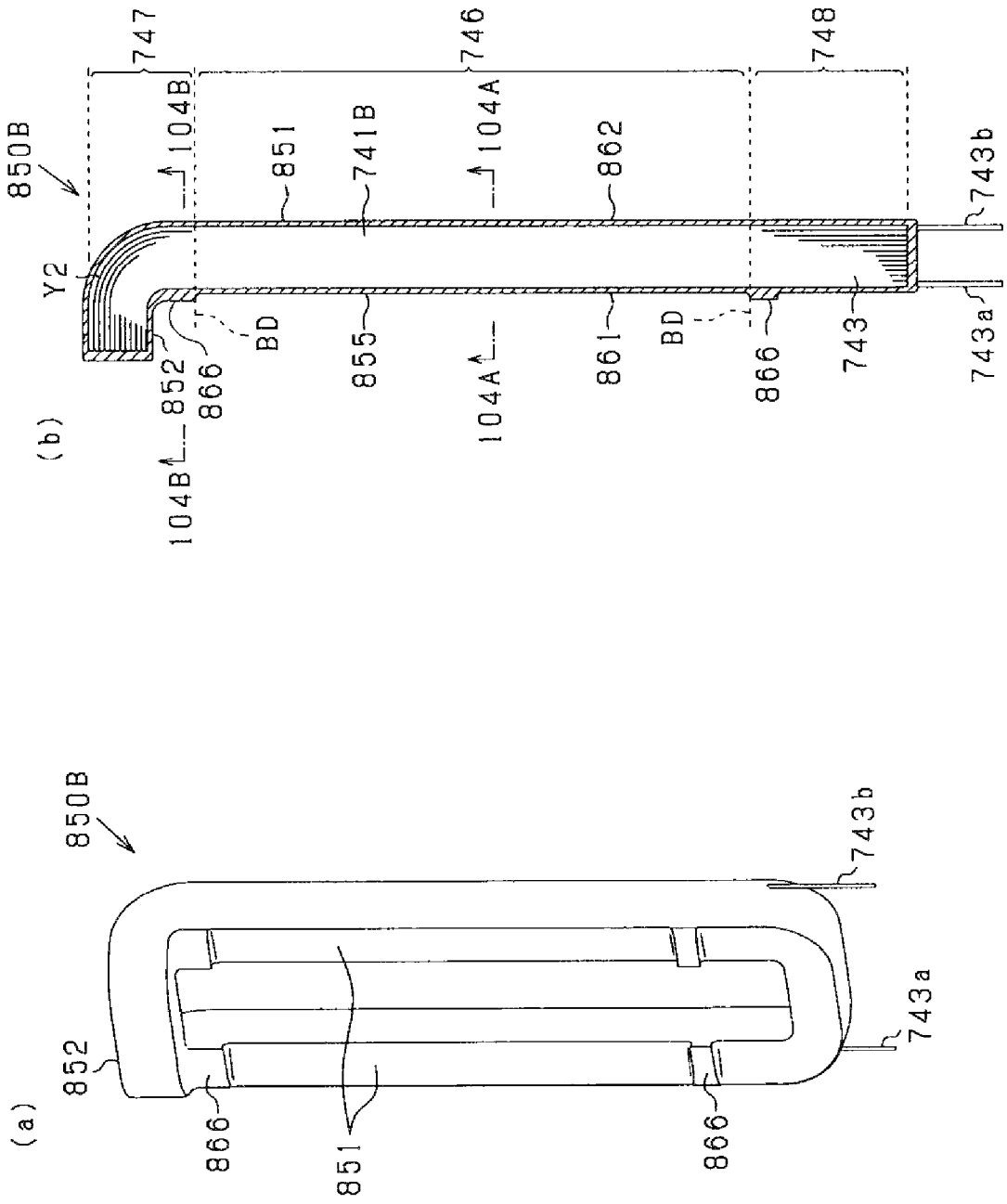
FIG. 103 illustrates, by (a) and (b), diagrams of a configuration of the coil module.

In a present modification, the configuration of the stator winding 731 in the rotating electric machine 700 is modified. That is, in the present example, in the stator winding 731, the configuration is such that a coil module 850 shown in FIG. 101 and FIG. 103 is used instead of the above-described coil module 740. Hereafter, differences with the fifteenth modification will mainly be described. Here, configurations that are shared with the fifteenth modification are given the same component numbers. Descriptions thereof are omitted.

The coil module 850 of the present example is configured such that the partial winding 741 is covered by a synthetic resin that is an insulating material, instead of being configured such that the partial winding 741 is integrated with the winding holder 742. That is, the coil module 850 is formed by the partial winding 741 that is an air-core wound coil being resin-molded. In a manner similar to the coil modules 740, the coil modules 850 are assembled to the stator core 732 so as to be arrayed in the circumferential direction on the outer side in the radial direction of the stator core 732. For example, in FIG. 82, a configuration in which the coil module 740 in the drawing is replaced by the coil module 850 corresponds to a configuration of the stator 730 in which the coil module 850 is used.

In the coil module 850 of the present example as well, in a manner similar to the coil module 740, two types of coil modules 850A and 850B are provided. Here, first, the coil module 850A, of the coil module 850A and the coil module 850B, will be described. Here, in the coil modules 850A and 850B, the partial winding 741A that is used in the coil module 740A and the partial winding 741B that is used in the coil module 740B are respectively used as the partial winding 741. Here, the partial windings are given the same reference numbers and descriptions are omitted as appropriate.

FIG. 101 shows, by (a), a perspective view of the coil module 850A. FIG. 101 shows, by (b), a vertical cross-sectional view of the interior of the coil module 850A. In addition, FIG. 102 shows, by (a) and (b), cross-sectional views of a lateral cross-section of the coil module 850A. FIG. 102 shows, by (a), a cross-sectional view taken along line 102A-102A. FIG. 102 shows, by (b), a cross-sectional view taken along line 102B-102B. Here, in FIG. 101 by (b), a left side of the coil module 850A is the stator core 732 side. In FIG. 102 by (a) and (b), a lower side of the coil module 850A is the stator core 732 side.

The coil module 850A has substantially the same shape as the coil module 740A and is formed into an elongated annular shape in which the axial direction is long. The coil module 850A has a pair of linear portions 851 that extend in parallel with each other in the axial direction. In addition, the coil module 850A has a curved portion 852 that extends in the direction that is orthogonal to the axial direction, on one end side of both sides in the axial direction.

As a result, the coil module 850A is configured to be formed into an overall substantially L-like shape. The partial winding 741A is embedded in the pair of linear portions 851 and the curved portion 852 of the coil module 850A. In the first crossover portion 747, of the first crossover portion 747 and the second crossover portion 748 of the partial winding 741A, the outward curved portion Y1 that curves towards the outer side in the radial direction is provided as a portion that corresponds to the curved portion 852 of the coil module 850A.

As shown in FIG. 102 by (a), the coil module 850A is provided so as to surround the partial winding 741A on four sides on the lateral cross-section of the partial winding 741A. The coil module 850A includes a first wall portion 861 that is on the stator core 732 side, a second wall portion 862 that is on the counter-stator core side, and a third wall portion 863 that connects the first wall portion 861 and the second wall portion 862. The third wall portion 863 includes two wall portions that sandwich the partial winding 741A from both sides in the circumferential direction.

The first wall portion 861 is a back-yoke-side insulation wall. The second wall portion 862 is a counter-back-yoke-side insulation wall. The third wall portion 863 is a circumferential-direction insulation wall. The third wall portion 863 is provided so as to be oriented to extend towards the circle center of the stator core 732. Here, the first wall portion 861 and the second wall portion 862 have a portion (corresponding to an extending portion) that extends further in the circumferential direction that the intermediate conductor portion 746 of the partial winding 741A. The third wall portion 863 is formed so as to extend in the radial direction from this portion.

The periphery of the partial winding 741A in the coil module 850A covered by a covering portion 855 that is made of an insulating material. An insulation layer on the stator core 732 side of the covering portion 855 is the first wall portion 861 (back-yoke-side insulation wall).

In the coil module 850A, when a thickness dimension in a wall thickness direction (radial direction) of the first wall portion 861 is T11, a thickness dimension in a wall thickness direction (radial direction) of the second wall portion 862 is T12, and a thickness dimension in a wall thickness direction (circumferential direction) of the third wall portion 863 is T13, the thickness dimension T12 of the second wall portion 862 is preferably smaller than the thickness dimension T11 of the first wall portion 861 (T11>T12). Here, in the present example, the thickness dimensions T11 to T13 may be average thicknesses of resin layers from an outer surface of the partial winding 741A to a module outer surface. That is, the second wall portion 862 is an insulation wall on the magnet 722 side (air gap side).

As a result of the insulation wall being thin, the distance between the magnet 722 and the partial winding 741, or more specifically, the distance on the magnetic circuit can be shortened. Performance improvement can be expected. In addition, when those in which the distance between the magnet 722 and the partial winding 741 is the same are compared, the air gap (distance of the gap) between the coil module 850 and the magnet 722 can be increased by an amount amounting to an amount by which the thickness dimension T12 of the second wall portion 862 is smaller. Contact during rotation of the rotor 710 can be suppressed.

Furthermore, as a result of the thickness dimension T11 of the first wall portion 861 being larger than the thickness dimension T12 of the second wall portion 862, the insulation distance to the stator core 732 can be ensured, and insulation performance thereof can be enhanced. However, T11=T12 is also possible.

For example, the thickness dimension T13 of the third wall portion 863 may be the same as the thickness dimension T11 of the first wall portion 861. However, T13>T11 or T13<T11 is also possible.

The third wall portion 863 may be configured such that the thickness dimension T13 differs between the inner side in the radial direction and the outer side in the radial direction, and the thickness dimension T13 is larger on the outer side in the radial direction. That is, the third wall portion 863 has a tapered cross-section that has a wider width towards the outer side in the radial direction. The sizes of the two third wall portions 753 that sandwich the intermediate conductor portion 746 in the circumferential direction may be the same.

In this case, as a result of the thickness dimension T13 of the third wall portion 863 being larger on the outer side in the radial direction than the inner side in the radial direction, the intermediate conductor portions 746 that are arrayed in the circumferential direction can be appropriately arranged while taking into consideration the circumferential length differing between the inner side in the radial direction and the outer side in the radial direction.

That is, when the thickness dimension T13 of the third wall portion 863 is uniform in the radial direction, in a case in which the lateral cross-section of the partial winding 741A is a quadrangle, the two intermediate conductor portions 746 that are adjacent to each other in the circumferential direction become too close on the side of the third wall portion 863 and too far apart on the side opposite thereof. Therefore, the rotating magnetic flux becoming uneven in the circumferential direction becomes a concern. In this regard, in the configuration of the present example, equalization of the rotating magnetic flux in the circumferential direction becomes possible. In addition, uniformity of insulation performance in the circumferential direction is also possible.

In terms of a relationship with the curved portion 852 of the coil module 850A, in the pair of linear portions 851, the first wall portion 861 is a wall portion on a side opposite the curved portion 852 (a wall portion on the inner side in the axial direction). The second wall portion 862 is a wall portion on the curved portion 852 side (a wall portion on the outer side in the axial direction).

The coil module 850A is assembled to the cylindrical stator core 732 from the outer side in the radial direction. The first wall portion 861 that is on the stator core 732 side is formed into a circular arc surface at the same curvature as the outer circumferential surface of the stator core 732. As a result, close contact of the coil module 850A to the stator core 732 can be improved. The second wall portion 862 that is the counter-stator core side may arbitrarily be either of a linear shape and a circular arc shape. However, in the present example, the second wall portion 862 is formed into a circular arc shape that is concentric with the first wall portion 861.

In addition, the coil module 850A is assembled to the stator core 732 with the curved portion 852 on the outer side in the radial direction. The curved portion 852 is provided on the side of the second wall portion 862 (that is, the side opposite the first wall portion 861). In addition, in this case, a circumferential-direction distance of the pair of linear portions 851 that includes the two second wall portions 862 is longer than a circumferential-direction distance that includes the two first wall portions 861. The curved portion 852 that is on the outer side in the radial direction is provided so as to have the same dimension as the longer circumferential-direction distance.

Furthermore, as shown in FIG. 101 by (b), protruding portions 866 that protrude towards the side opposite the curved portion 852, that is, the inner side in the radial direction (stator core 732 side) are provided in two upper and lower locations in the pair of linear portions 851 of the coil module 850A, near the boundary portions BD between the coil side CS, and the coil ends CE1 and CE2.

In terms of the lateral cross-section of the coil module 850A, as shown in FIG. 102 by (b), the protruding portion 866 is provided so as to protrude from the first wall portion 861 that is on the stator core 732 side. The protruding portion 866 is configured to have an oblique surface 866a that is oblique to one side in an area from one end in the circumferential direction to the other end in the circumferential direction of the first wall portion 861. In the present example, the protruding portion 866 is formed such that an end portion on the inner side (inner side in the circumferential direction) of the first wall portion 861 is high in the left and right pair of linear portions 851. However, unlike the configuration shown in FIG. 102 by (b), the protruding portion 866 may be formed such that an end portion on the outer side (outer side in the circumferential direction) of the first wall portion 861 is high in the left and right pair of linear portions 851.

Next, the coil module 850B will be described.

In the coil module 850B, an orientation of the radial direction in which the curved portion 852 extends differs from that of the coil module 850A. Although there are differences in the configuration as a result, the basic configuration is identical to that of the coil module 850A. Therefore, differences with the coil module 850A will mainly be described.

FIG. 103 shows, by (a), a perspective view of the coil module 850B. FIG. 103 shows, by (b), a vertical cross-sectional view of an interior of the coil module 850B. In addition, FIG. 104 shows, by (a) and (b), cross-sectional views of a lateral cross-section of the coil module 850B. FIG. 104 shows, by (a), a cross-sectional view taken along line 104A-104A in FIG. 103 by (b). FIG. 104 shows, by (b), a cross-sectional view taken along line 104B-104B in FIG. 103 by (b). Here, in FIG. 103 by (b), a left side of the coil module 850B is the stator core 732 side. In FIG. 104 by (a) and (b), a lower side of the coil module 850B is the stator core 732 side.

The coil module 850B has substantially the same shape as the coil module 740B and is formed into an elongated annular shape in which the axial direction is long. The coil module 850B has a pair of linear portions 851 that extend in parallel with each other in the axial direction. In addition, the coil module 850B has a curved portion 852 that extends in the direction that is orthogonal to the axial direction, on one end side of both sides in the axial direction. As a result, the coil module 850B is configured to be formed into an overall substantially L-like shape. The partial winding 741B is embedded in the pair of linear portions 851 and the curved portion 852 of the coil module 850B. In the first crossover portion 747, of the first crossover portion 747 and the second crossover portion 748 of the partial winding 741B, an inward curved portion Y2 that curves towards the inner side in the radial direction is provided as a portion that corresponds to the curved portion 852 of the coil module 850B.

In addition, as shown in FIG. 104 by (a), the coil module 850B is provided so as to surround the partial winding 741B on four sides on the lateral cross-section of the partial winding 741B. In a manner similar to the coil module 850A, the coil module 850B includes the first wall portion 861 that is on the stator core 732 side, the second wall portion 862 that is on the counter-stator core side, and the third wall portion 863 that connects the first wall portion 861 and the second wall portion 862. The third wall portion 863 includes two wall portions that sandwich the partial winding 741B from both sides in the circumferential direction.

The coil module 850B is assembled to the stator core 732 with the curved portion 852 on the inner side in the radial direction. The curved portion 852 is provided on the side of the first wall portion 861. In this case, a circumferential-direction distance of the pair of linear portions 851 that includes the two first wall portions 861 is shorter than a circumferential-direction distance that includes the two second wall portions 862. The curved portion 852 that is on the inner side in the radial direction is provided so as to have the same dimension as the shorter circumferential-direction distance.

In addition, as shown in FIG. 103 by (b), the protruding portions 866 that protrude towards the curved portion 852 side, that is, the inner side in the radial direction (stator core 732 side) are provided in two upper and lower locations in the pair of linear portions 851 of the coil module 850B, near the boundary portions BD between the coil side CS, and the coil ends CE1 and CE2. The configuration of the protruding portion 866 is also similar to that in the coil module 850A (see FIG. 104 by (b)).

Next, a state in which the coil modules 850A and 850B are assembled to the stator core 732 will be described. Here, in the assembled state thereof, a configuration on the vertical cross-section of the stator 730 corresponds to the configuration in which the coil modules 740A and 740B are used. Therefore, FIG. 91 should be referenced for details. In the configuration of the present example as well, in a manner similar to that in FIG. 91, the coil modules 850A and 850B are assembled to the stator core 732 in a state in which the protruding portions 866 in the two upper and lower locations are respectively engaged with the end rings 733. In addition, the stator core 732 is in a state of being sandwiched in the axial direction by the pair of protruding portions 866 in the coil modules 850A and 850B. A configuration on the lateral cross-section of the stator 730 will be described below with reference to FIG. 105.

Figure 105:
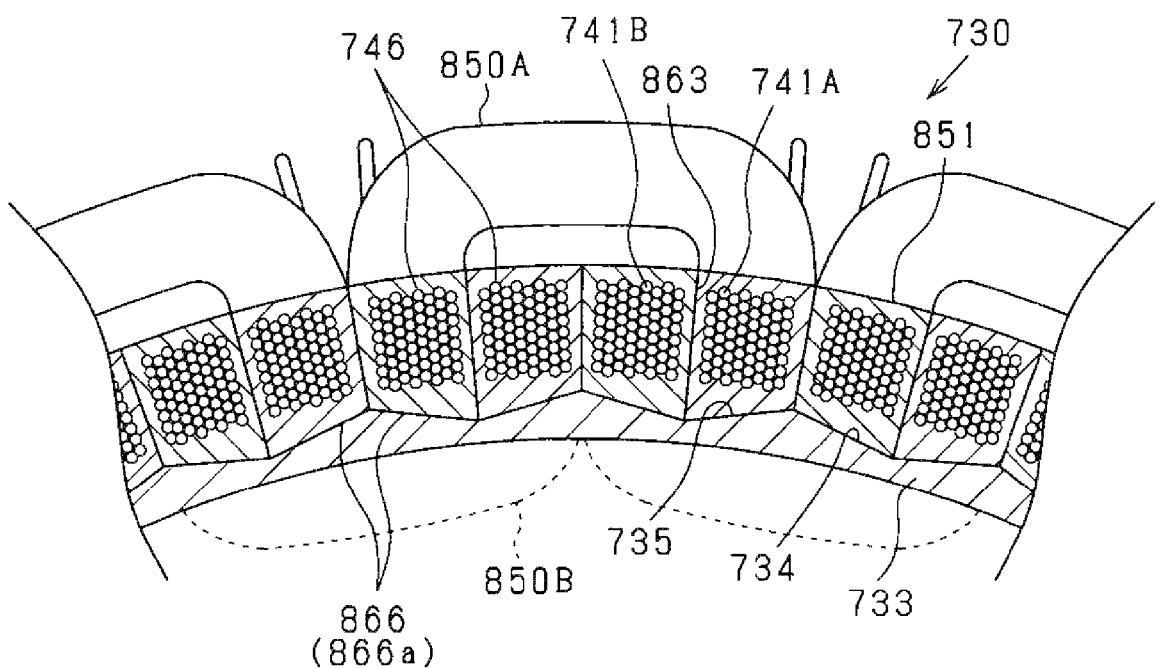
FIG. 105 is a cross-sectional view of the lateral cross-section of the stator.

As shown in FIG. 105, the oblique surfaces 866a of the protruding portions 866 of the coil modules 850A and 850B are in contact with the engaging surfaces 734 of the end ring 733. Here, the oblique surface 866a corresponds to an engaged surface. In addition, as a result of the two engaging surfaces 734 that are adjacent to each other in the circumferential direction in the end ring 733, one protruding portion 866 each of the two coil modules 850A and 850B enter the recessing portion 735. As a result, a state in which the third wall portions 863 of the coil modules 850A and 850B are in contact with each other in the circumferential direction is achieved.

In the state in which the coil modules 850A and 850B are arranged in an array in the circumferential direction, the partial windings 741 are arranged in positions that are separated from each other by predetermined intervals in the linear portions 854 of the coil modules 850A and 850B. More specifically, the partial windings 741 that are adjacent to each other in the circumferential direction are separated from each other by the third wall portions 863 of the coil modules 850A and 850B.

As a result, insulation between the partial windings 741 of differing phases that are adjacent to each other in the circumferential direction is ensured. In this case in particular, as a result of two third wall portions 753 being overlapped between the partial windings 741 of differing phases that are adjacent to each other in the circumferential direction, insulation in the stator winding 731 is further improved.

Other Examples of the Fifteenth Modification and the Sixteenth Modification

Configurations in which a portion of the rotating electric machine 700 shown in the fifteenth modification and the sixteenth modification is modified will be described below.

In the coil module 740, the shape of the protruding portion 756 may be modified. Here, differences with the configuration in FIG. 92 will be described. For example, as shown in FIG. 106 by (a), the configuration may be such that, in each first wall portion 751, the protruding portion 756 has one oblique surface each that is oblique at the same orientation in the circumferential direction. In addition, as shown in FIG. 106 by (b), the configuration may be such that the protruding portion 756 of the first wall portion 751 has two oblique surfaces that are oblique to the circumferential direction. Furthermore, as shown in FIG. 106 by (c), the protruding portion 756 may be formed into a trapezoidal shape.

In FIG. 106 by (a) to (c), the engaging surface 734 of the end ring 733 is formed to match the shape of the protruding portion 756 to enable fitting of the protruding portion 756. Here, holding strength is improved as the surfaces of the protruding portion 756 and the end ring 733 that engage with each other in the circumferential direction are provided at angles that are more parallel with the radial direction.

As shown in FIG. 107 by (a) and (b), the configuration may be such that the coil module 740 and the end ring 733 are indirectly engaged, rather than directly engaged. FIG. 107 shows, by (a), a lateral cross-sectional view of the stator 730 in a state in which the coil modules 740A and 740B are assembled to the stator core 732. FIG. 107 shows, by (b), a cross-sectional view in which the stator core 732 and the end ring 733, and the coil module 740A are separated from each another. In this case, recessing portions 841 and 842 are respectively formed in the end ring 733 and the first wall portions 751 of the coil modules 740A and 740B. Surfaces in which these recessing portions 841 and 842 are formed oppose each other.

In addition, between these opposing surfaces, an insulation layer 843 that is made of an insulation material such as a synthetic resin is provided. The recessing portion 841 on the end ring 733 side corresponds to a first engaging portion. The recessing portion 842 on the coil modules 740A and 740B side corresponds to a second engaging portion. The insulation layer 843 corresponds to an intermediate portion. Here, the recessing portion 841 in the first wall portion 751 and the recessing portion 842 on the end ring 733 side may be formed in positions and shapes that differ from each other.

In short, the recessing portion 841 on the end ring 733 side and the recessing portion 842 on the coil modules 740A and 740B side are provided so as to oppose each other in a state of separation in the radial direction. The insulation layer 843 is provided between these recessing portions 841 and 842. In addition, in a state in which the recessing portions 841 and 842 are engaged with the insulation layer 843 in the circumferential direction, the coil modules 740A and 740B are fixed to the stator core 732.

Figure 108:
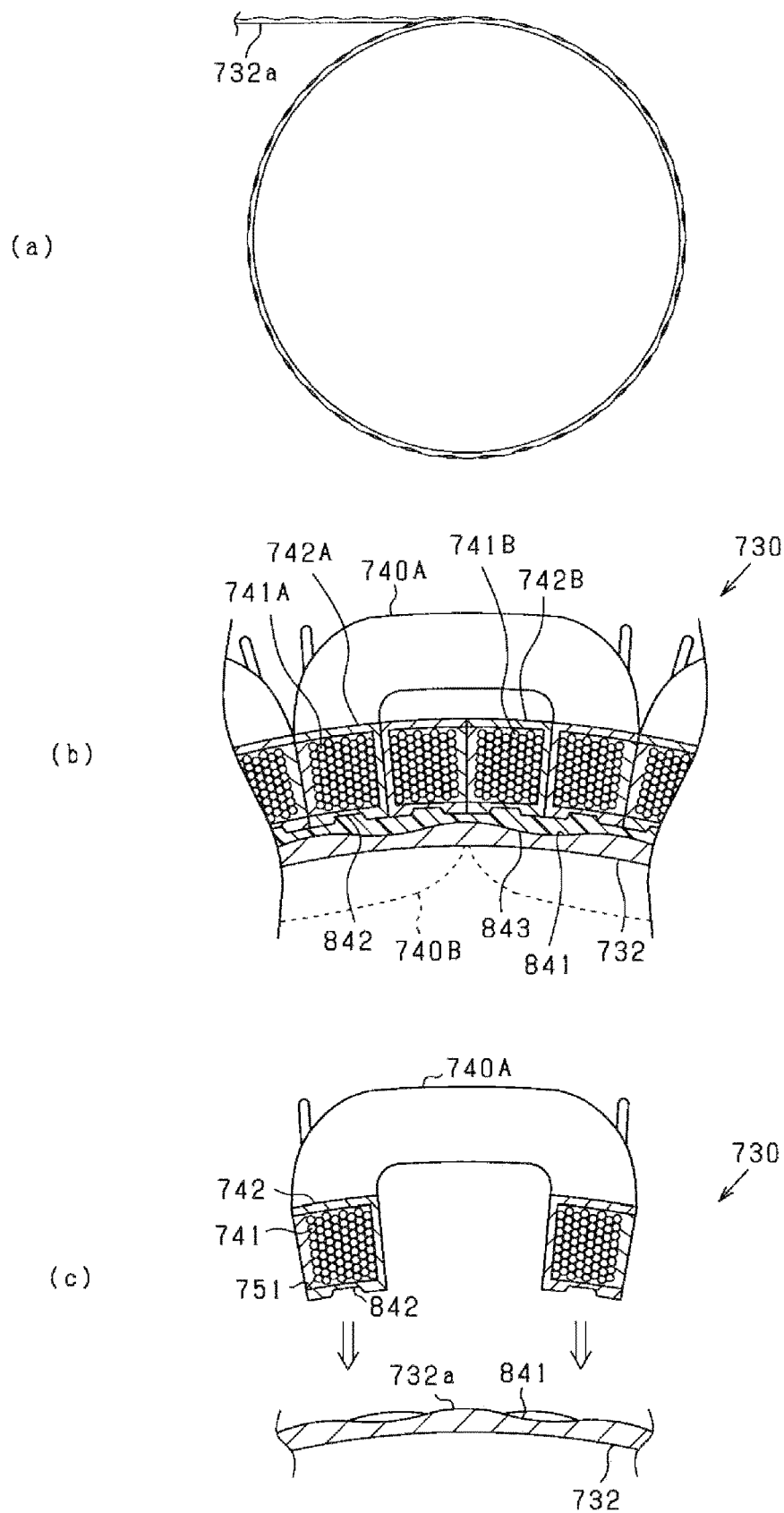
FIG. 108 illustrates, by (a) to (c), diagrams of the lateral cross-section of the stator and a core sheet of the stator core.

In the stator core 732, the configuration may be such that an engaging portion (first engaging portion) that is capable of engaging with the coil module 740 is formed by an uneven shape that is formed on a sheet outer edge of the core sheet 732a. Specifically, as shown in FIG. 108 by (a), in the core sheet 732a, one side in a width direction has a wavy shape (uneven shape) and the other side is linearly shaped. The core sheets 732a are laminated in the axial direction while being formed into an annular shape by winding, with the side of the wavy shape on the outer side in the radial direction.

As a result, the stator core 732 that has an overall circular cylindrical shape is formed. In this case, in the stator core 732, the outer side (that is, the side for assembly to the stator winding 731) in the radial direction of the core sheet 732a has an uneven shape in which recesses and protrusions are repeated at predetermined intervals in the circumferential direction. The core sheets 732a are laminated such that the positions of the recesses and protrusions are slightly shifted from each other in the axial direction. In the axial direction, the positions of the recesses and the protrusions in the core sheets 732a may be shifted by a predetermined amount in the circumferential direction. As a result, occurrence of cogging torque is suppressed.

In addition, as shown in FIG. 108 by (b) and (c), in the stator core 732, the recessing portions 841 is formed as the first engaging portion by the recesses and protrusions of the core sheets 732a. In addition, the recessing portion 842 is formed as the second engaging portion in the first wall portion 751 of the coil module 740. Furthermore, the coil modules 740A and 740B are assembled to the stator core 732 in a state in which the insulation layer 843 that serves as the intermediate portion is interposed between the recessing portions 841 on the stator core 732 side and the recessing portions 842 on the coil modules 740A and 740B side.

In this case, because the configuration is such that the recesses and protrusions in the core sheet lamination body of the stator core 732 are used as the first engaging portion and engaged with the second engaging portion on the coil module 740 side, in addition to suppression of cogging torque, positioning of the coil module 740 in the circumferential direction can be suitably performed.

Here, in the configurations in FIG. 108 by (a) to (c), the stator core 732 may not be that which has a helical core structure. The stator core 732 may be configured such that a plurality of core sheets 732a that are formed into a circular annular plate shape by punching are laminated in the axial direction. In this case, the core sheets 732a have an uneven shape in which recesses and protrusions are repeated at predetermined intervals in the circumferential direction on the outer circumferential side thereof, and may be laminated such that the positions of the recesses and protrusions in the axial direction are shifted from each other by a predetermined amount in the circumferential direction.

The winding holder 742 of the coil module 740 may be configured such that only a part of the first wall portion 751, the second wall portion 752, and the third wall portion 753 is provided. Specifically, as shown in FIG. 109 by (a), the winding holder 742A of the coil module 740A may be configured such that, among the first wall portion 751, the second wall portion 752, and the third wall portion 753, the second wall portion 752 is eliminated, and only the first wall portion 751 and the third wall portion 753 are provided.

That is, the configuration may be such that the wall portion (second wall portion 752) on the counter-stator core side is eliminated in the winding holder 742A. Here, in the configuration in which only the first wall portion 751 and the third wall portion 753 are provided, the third wall portions 753 may each be provided on the same side in the circumferential direction.

As shown in FIG. 109 by (b), the winding holder 742A of the coil module 740A may be configured such that, among the first wall portion 751, the second wall portion 752, and the third wall portion 753, the second wall portion 752 is eliminated, and the third wall portion 753 is provided on both sides in the circumferential direction of the intermediate conductor portion 746.

In addition, as shown in FIG. 109 by (c), the winding holder 742A of the coil module 740A may be configured such that, among the first wall portion 751, the second wall portion 752, and the third wall portion 753, the second wall portion 752 and the third wall portion 753 are eliminated, and only the first wall portion 751 is provided. That is, the configuration may be such that the wall portion (second wall portion 752) on the counter-stator side and the partitioning wall (third wall portion 753) in the circumferential direction are eliminated in the winding holder 742A.

In this case, the configuration is such that, in the state in which the coil modules 740A and 740B are assembled to the stator core 732, the width dimension in the circumferential direction of the first wall portion 751 is larger than the width dimension in the circumferential direction of the partial winding 741, and the extending portions in the circumferential direction of the first wall portion 751 are provided on both sides in the circumferential direction of the partial winding 741, to achieve an insulation state between the partial windings 741 that are adjacent to each other in the circumferential direction.

In the configurations in FIG. 109 by (a) to (c), the partial winding 741A may be molded by a resin material that serves as an insulating material. The wall portions that are provided in the winding holder 742A and the partial winding 741A may be integrated by resin-molding. When the configurations in FIG. 109 by (a) to (c) are used, the coil module 740A and the coil module 740B may have the same configuration. However, the coil module 740A and the coil module 740B that have differing configurations may also be combined and used.

Figure 110:
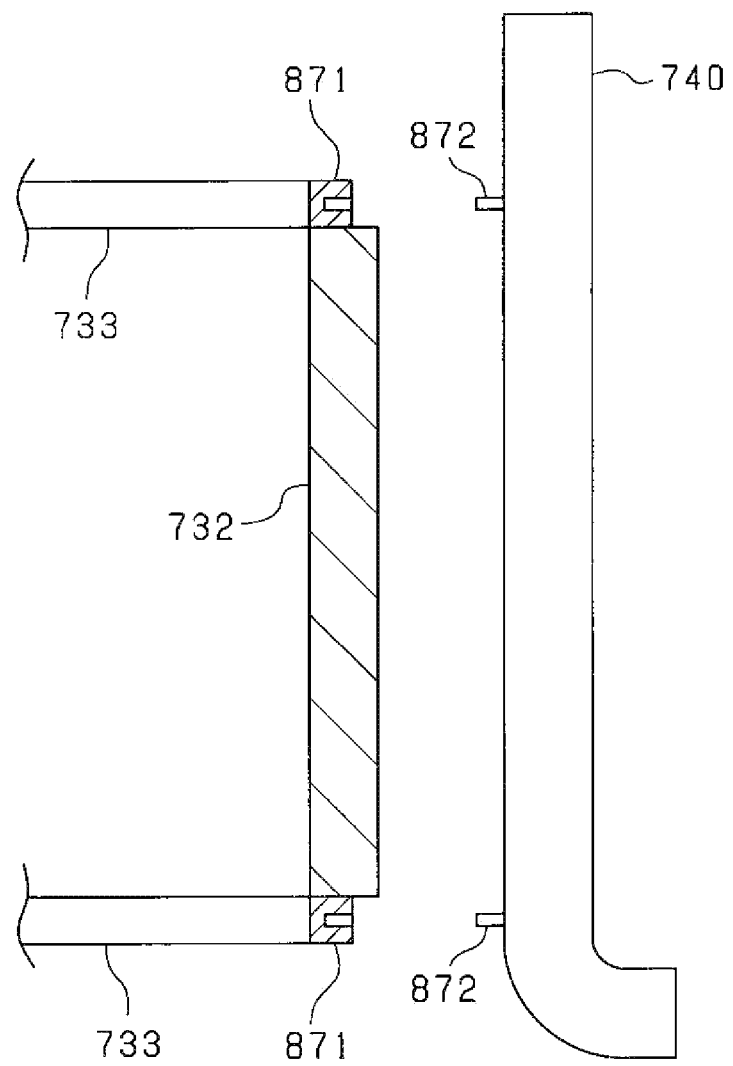
FIG. 110 is a diagram of assembly of the coil module to the stator core.

The following configuration may be used as a configuration in which the coil module 740 is engaged with the end ring 733. In a configuration shown in FIG. 110, a plurality of engaging holes 871 are provided as the first engaging portion in the end rings 733 on both sides in the axial direction. Meanwhile, engaging pins 872 are provided as the second engaging portion in two locations in the axial direction in the wall portion (first wall portion 751) on the stator core 732 side of the coil module 740. The engaging holes 871 are provided at predetermined intervals that are for each coil module 740, so as to be oriented to be open on the outer side in the radial direction. The engaging pin 872 is an insert member that is insert-molded in the coil module 740 such that a portion thereof is embedded in the coil module 740 (winding holder 742).

In the present configuration, the coil modules 740 are assembled to the stator core 732 in a state in which the engaging pins 872 of the coil modules 740 are inserted into the engaging holes 871 in the end rings 733. In this state, positional accuracy in the circumferential direction of the coil modules 740 in relation to the stator core 732 can be improved by engagement of the engaging pins 872 to the engaging holes 871 in the end rings 733. Here, this configuration can also be applied to the coil module 850.

In a configuration shown in FIG. 111 by (a), a plurality of recessing portions 873 are provided as the first engaging portion in sections on the outer side in the radial direction on both ends in the axial direction of the stator core 732. FIG. 111 shows, by (b), the plurality of recessing portions 873 that are provided at even intervals in the circumferential direction, in a front view of the stator core 732. The recessing portions 873 are provided for each coil module 740.

In addition, in the wall portion (first wall portion 751) on the stator core 732 side of the coil module 740, engaging keys 874 are provided as the second engaging portion in two locations in the axial direction. The engaging key 874 is an insert member that is insert-molded in the coil module 740 such that a portion thereof is embedded in the coil module 740 (winding holder 742).

In the present configuration, the coil modules 740 are assembled to the stator core 732 in a state in which the engaging keys 874 of the coil module 740 are engaged with the recessing portion 873 of the stator core 732. In this state, positional accuracy in the circumferential direction of the coil modules 740 in relation to the stator core 732 can be improved by engagement of the engaging keys 874 to the recessing portions 873 of the stator core 732.

The engaging key 874 may be a magnetic body. As a result of the engaging key 874 being a magnetic body, the recessing portion 873 of the stator core 732 is filled by a magnetic body in a state in which the coil modules 740 are assembled to the stator core 732. In this case, even in the configuration in which the recessing portions 873 are formed in the stator core 732, occurrence of cogging torque that is attributed to formation of the recessing portions can be suppressed. Here, the present configuration can also be applied to the coil module 850.

In a configuration shown in FIG. 112 by (a), a plurality of recessing portions 875 that extend in the axial direction are provided as the first engaging portion on the outer circumferential surface on the outer side in the radial direction of the stator core 732. In FIG. 113 by (a), the plurality of recessing portions 875 that are provided at even intervals in the circumferential direction are shown in a front view of the stator core 732. The recessing portions 875 are provided in a linear state at an orientation that is parallel to the axial direction for each coil module 740.

In addition, in the wall portion (first wall portion 751) on the stator core 732 side of the coil module 740, a protrusion-like engaging protruding portion 876 that extends in the axial direction is provided as the second engaging portion. For example, the engaging protruding portion 876 is formed such that a portion of the first wall portion 751 extends towards the inner side in the radial direction.

In the present configuration, as shown in FIG. 112 by (b), the coil modules 740 are assembled to the stator core 732 in a state in which the engaging protruding portion 876 of the coil module 740 is engaged with the recessing portion 875 of the stator core 732. In this state, positional accuracy in the circumferential direction of the coil modules 740 in relation to the stator core 732 can be improved by engagement of the engaging protruding portions 876 to the recessing portions 875 of the stator core 732.

As shown in FIG. 113 by (b), the recessing portions 875 of the stator core 732 may be provided at an orientation that is oblique to the axial direction. That is, the configuration is such that the recessing portions 875 are provided in a skewed manner. The engagement protruding portions 876 on the coil module 740 side are also similarly oriented. In this case, even in the configuration in which the recessing portions 875 are formed in the stator core 732, occurrence of cogging torque that is attributed to formation of the recessing portions can be suppressed. Here, the present configuration can also be applied to the coil module 850.

Figure 114:
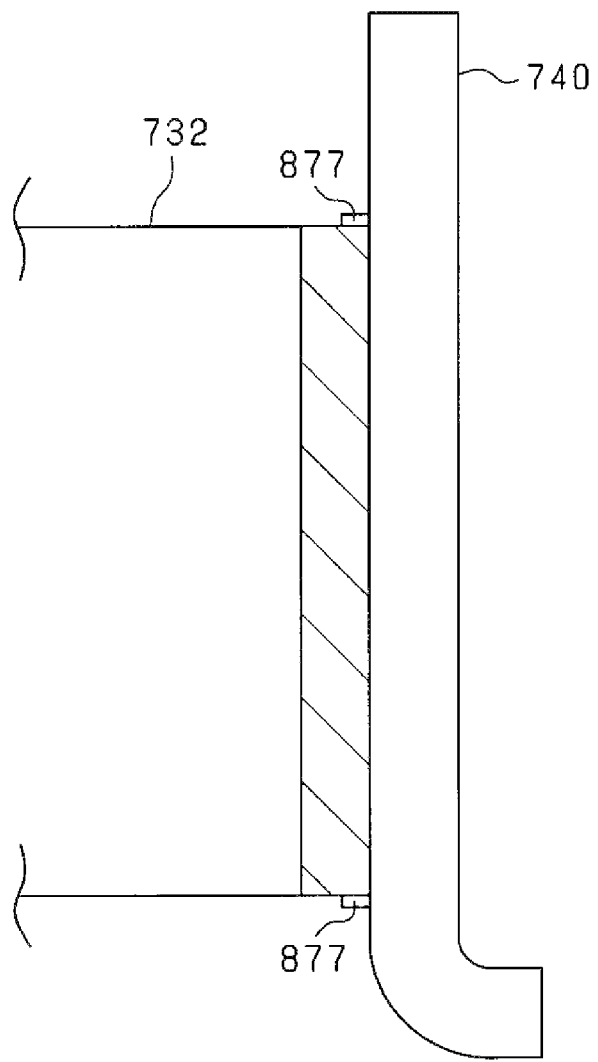
FIG. 114 is a diagram of assembly of the coil module to the stator core.

In a configuration shown in FIG. 114, a plate-like pressing plate 877 is provided as a pressing portion in two locations in the axial direction in the wall portion (first wall portion 751) on the stator core 732 side of the coil module 740. The pressing plate 877 is insert-molded in the coil module 740 such that a portion thereof is embedded in the coil module 740 (winding holder 742).

In the present configuration, as a result of the pressing plate 877 of the coil module 740 coming into contact with the end surface in the axial direction of the stator core 732 in a state in which the coil modules 740 are assembled to the stator core 732, minute gaps between the core sheets in the stator core 732 can be minimized. Furthermore, reduction of the axial-length dimension of the back yoke can be achieved. Here, the present configuration can also be applied to the coil module 850.

In a configuration shown in FIG. 115 by (a), a spacer 881 that has a circular annular plate shape is fixed in a state of being in contact with the end surface in the axial direction of the stator core 732. In addition, in the coil module 740, the protruding portion 756 that serves as the pressing portion is provided in a portion (yoke outer portion) that extends further towards the outer side in the axial direction than the end surface in the axial direction of the stator core 732 in the wall portion (first wall portion 751) on the stator core 732 side.

Whereas the protruding portion 756 has a protrusion dimension that is smaller than a radial-direction width of the stator core 732 (a radial-direction width of the core sheet), the spacer 881 has the same radial-direction width as the stator core 732. That is, the spacer 881 is configured such that an amount of overlap in the radial direction with the end surface in the axial direction of the stator core 732 is greater than that with the protruding portion 756. The spacer 881 may have a plate thickness that is greater than a thickness of the core sheet. Here, although not shown, the configuration is the same on both ends in the axial direction of the stator core 732.

As shown in FIG. 115 by (b), the spacer 881 is pressed in the axial direction by the protruding portion 756 in a state in which the coil modules 740 are assembled to the stator core 732. In this state, the overall end surface in the axial direction of the stator core 732 is uniformly pressed in the axial direction by the spacer 881.

As a result, even in a configuration in which an amount of protrusion of the protruding portion 756 is relatively small, warping of edge portions of the core sheets in the stator core 732 can be suppressed. The spacer 881 is not necessarily required to have the same width in the radial direction as the stator core 732. The spacer 881 is merely required to be configured such that the amount of overlap in the radial direction with the end surface in the axial direction of the stator core 732 is greater than that with the protruding portion 756. Here, the present configuration can also be applied to the coil module 850.

A portion of the configuration in FIG. 115 by (a) may be modified and a configuration in FIG. 116 by (a) may be provided. In this case, a recessing portion 881a that extends in the axial direction is formed on the end surface in the axial direction of the spacer 881, that is, a surface that opposes the protruding portion 756. In addition, an oblique surface 881*b* is formed in a corner portion on the outer side in the radial direction (coil module 740 side). The oblique surface 881*b* is formed into a linear shape or a circular arc shape that protrudes towards the outer side.

In contrast, the protruding portion 756 of the coil module 740 is hook-shaped, and an engaging portion 757*a* that is capable of engaging with the recessing portion 881*a* of the spacer 881 is formed in a tip end portion thereof. Furthermore, an opposing oblique surface 757*b* that opposes the oblique surface 881*b* of the spacer 881 is formed in the protruding portion 756.

As shown in FIG. 115 by (b), the engaging portion 757*a* of the protruding portion 756 enters the recessing portion 881*a* of the spacer 881 and is in an engaged state in a state in which the coil modules 740 are assembled to the stator 732. As a result, movement in the radial direction of the coil module 740 in relation to the stator core 732 is restricted. An axial-direction pressing function regarding the stator core 732 by the coil module 740 can be favorably maintained.

In addition, during assembly of the coil modules 740, the pressing force against the spacer 881 can be appropriately exerted by the oblique surface 881*b* of the spacer 881 being pressed by the opposing oblique surface 757*b* of the protruding portion 756.

The following configuration may be used as an assembly structure of the coil modules 740A and 740B or the coil modules 850A and 850B to the stator core 732. Here, the configuration is such that, on one side in the axial direction and the other side in the axial direction of the stator core 732, the end surfaces in the axial direction of the stator core 732 are pressed by the protruding portions 756 (pressing portions) of the differing coil modules 740A and 740B.

Specifically, as shown in FIG. 117 by (a), in the coil module 740A, the protruding portion 756 is provided only on an upper side in the drawing, of both sides in the axial direction of the stator core 732, in the wall portion (first wall portion 751) on the stator core 732 side. In addition, as shown in FIG. 117 by (b), in the coil module 740B, the protruding portion 756 is provided only on a lower side in the drawing, of both sides in the axial direction of the stator core 732, in the wall portion (first wall portion 751) on the stator core 732 side. As shown in FIG. 117 by (a) and (b), the protruding portions 756 are provided on a side opposite the curved portion 745 in the coil modules 740A and 740B.

In addition, as shown in FIG. 117 by (a) and (b), the coil modules 740A and 740B are assembled to the stator core 732 such that the orientations in the axial direction of the coil modules 740A and 740B (orientations of the curved portions 745) alternate, such that the positions of the protruding portions 756 are opposite. In this configuration as well, the end surface in the axial direction of the stator core 732 is pressed by the protruding portions 756 of the coil modules 740A and 740B.

In this case, the pressing force in the axial direction against the stator core 732 can be adjusted as appropriate by relative positions in the axial direction of the coil module 740A that presses the end surface in the axial direction from one side in the axial direction of the stator core 732 and the coil module 740B that presses the end surface in the axial direction from the other side in the axial direction of the stator core 732 being adjusted. For example, even should a thickness tolerance that is attributed to errors in thickness dimension, variations in quantity, the like of the core sheets in the stator core 732 occur, a fixed pressing force can be applied to the stator core 732.

Here, as the configuration in which the end surfaces in the axial direction on both sides of the stator core 732 are pressed by the protruding portions 756 of differing coil modules 740A and 740B as described above, the coil modules 740A and 740B that has two protruding portions 756 in the axial direction can be used. In this case, the configuration may be such that one of the two protruding portions 756 is placed in contact in the axial direction with the end surface in the axial direction of the stator core 732, and the other is not placed in contact with the end surface in the axial direction of the stator core 732.

Figure 118:
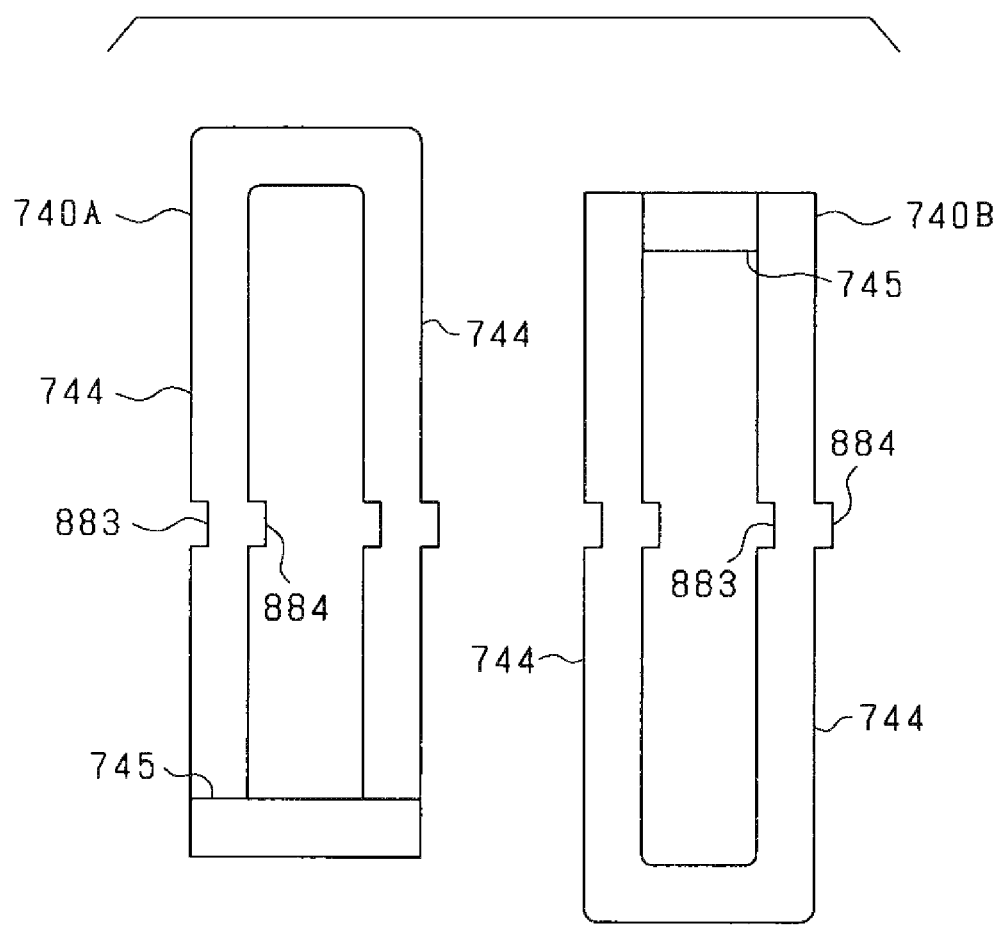
FIG. 118 is a front view of the coil module.

The configuration may be such that the coil modules 740A and 740B or the coil modules 850A and 850B are fixed together such that the coil modules 740A and 740B or the coil modules 850A and 850B that are adjacent to each other in the circumferential direction are incapable of relative movement in the axial direction. Specifically, as shown in FIG. 118 that is a front view of the coil modules 740A and 740B, in the linear portion 744 of the coil module 740A, a recessing portion 883 is formed on one side surface in the circumferential direction and a protruding portion 884 is formed on the other side surface in the circumferential direction.

These recessing portions 883 and protruding portions 884 may be provided in the third wall portions 753 of the coil modules 740A and 740B (or the third wall portions 863 of the coil modules 850A and 850B). In addition, in a state in which the coil modules 740A and 740B are assembled to the stator core 732, relative movement in the axial direction is restricted by engagement of the recessing portions 883 and the protruding portions 884 between adjacent coil modules.

In the above-described configuration, decrease in the pressing force in the axial direction against the core sheets that occurs when the positions of the coil modules 740 or 850 shift in the axial direction can be suppressed. As a result, reduction in the axial-length dimension of the stator core 732 can be more appropriately actualized.

Figure 119:
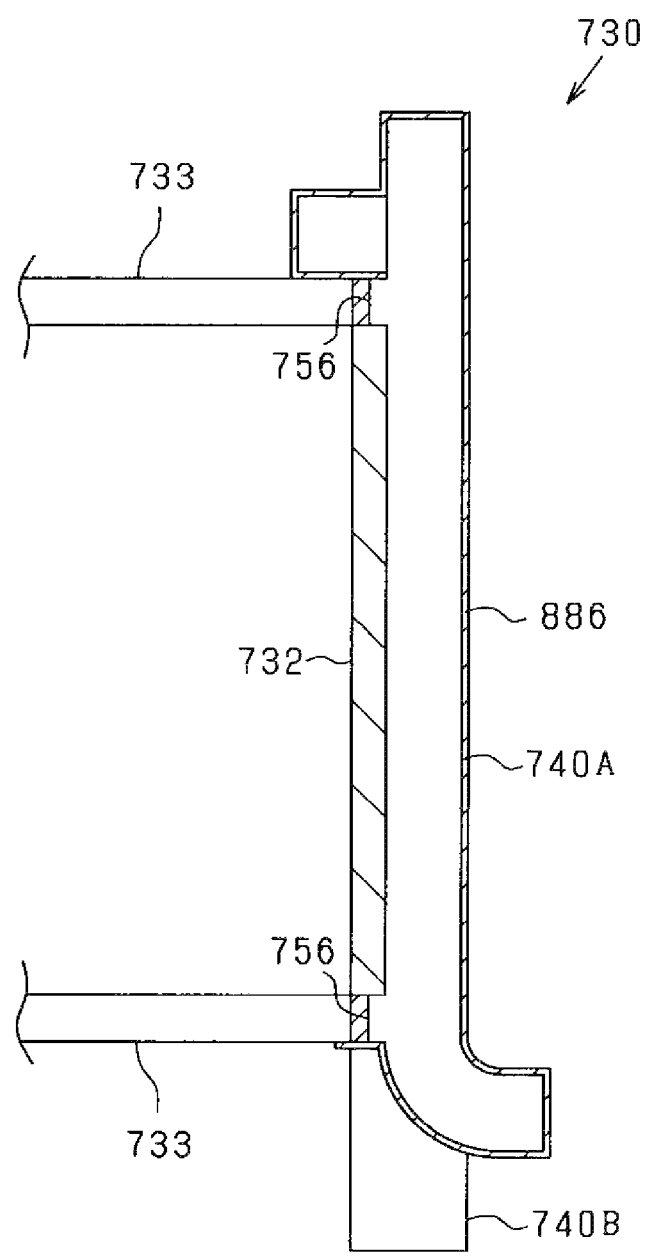

In a configuration shown in FIG. 119, in the state in which the coil modules 740A and 740B are assembled to the stator core 732, the coil modules 740A and 740B are integrally molded together with the stator core 732 by an insulating material. That is, the stator core 732, and the coil module 740A and 740B are integrally covered by a covering layer 886.

In this case, the plurality of coil modules 740A and 740B can be suitably assembled to the stator core 732. In addition, the coil modules 740A and 740B can be arranged such that the partial windings 741A and 741B are interposed between the first wall portion 751 (back-yoke-side insulation wall) and the covering layer 886. Insulation in the radial direction of the partial winding 741 can be suitably actualized.

Furthermore, in the configuration in FIG. 119, as a result of the covering layer 886 being provided so as to cover the outer circumferential side of the coil modules 740A and 740B, pressing in the radial direction of the coil modules 740A and 740B by the covering layer 886 can be performed. As a result, the state in which the plurality of coil modules 740A and 740B are assembled to the stator core 732 can be suitably maintained.

In addition, in the configuration in FIG. 119, a resin that serves as a filling material may fill a section between the end surface in the axial direction (an opposing surface in the axial direction that opposes the second engaging portion in the base member) of the stator core 732 and the protruding portion 756 (second engaging portion) of the first wall portion 756.

In this case, even should a gap be formed between the end surface in the axial direction of the stator core 732 and the protruding portion 756 of the first wall portion 751, the gap is filled as a result of filling by the filling material. Relative displacement in the axial direction of the coil modules 740A and 740B in relation to the stator core 732 is suppressed. As a result, rattling of the coil modules 740A and 740B can be suppressed, and the coil modules 740A and 740B can be suitably fixed to the stator core 732.

The configuration may be such that the stator core 732 and the coil modules 740 (partial windings 741) are integrally resin-molded over an area that includes both end portions in the axial direction thereof and side surface portion on the counter-stator core side of the coil modules 740, and among coverings portions that are formed by resin-molding, end-surface covering portions that cover the end surfaces in the axial direction of the stator core 732 on both sides in the axial direction are the pressing portion that presses the end surface in the axial direction of the stator core 732 in the axial direction from the outer side in the axial direction.

Specifically, as shown in FIG. 120 by (a), both end surfaces in the axial direction of the stator core 732 that is a core-sheet laminated body are compressed by a compressing jig J. The plurality of coil modules 740 are assembled to the outer side in the radial direction of the stator core 732 in the compressed state. Then, as shown in FIG. 120 by (b), while the stator core 732 remains in the compressed state, the stator core 732 and the coil module 740 are integrally resin molded. A covering layer 888 is formed over an area that includes both end portions in the axial direction of the stator core 732 and the side surface portion on the outer circumferential side (counter-stator core side) of the coil modules 740.

After the molding resin is hardened, the compression jig J is removed and compression by the compression jig J is released. In this case, of the covering layer 888, the end-surface covering portions 889 that covers the end surfaces in the axial direction of the stator core 732 on both sides in the axial direction function as the pressing portion.

In the present configuration, the covering layer 888 that is formed by resin molding is formed so as to connect the end-surface covering portions 889 that are both end portions in the axial direction thereof. A distance between the end-surface covering portions 889 is maintained without widening. As a result, the pressing function in the axial direction regarding the stator core 732 can be achieved in the end-surface covering portions 889.

Figure 121:
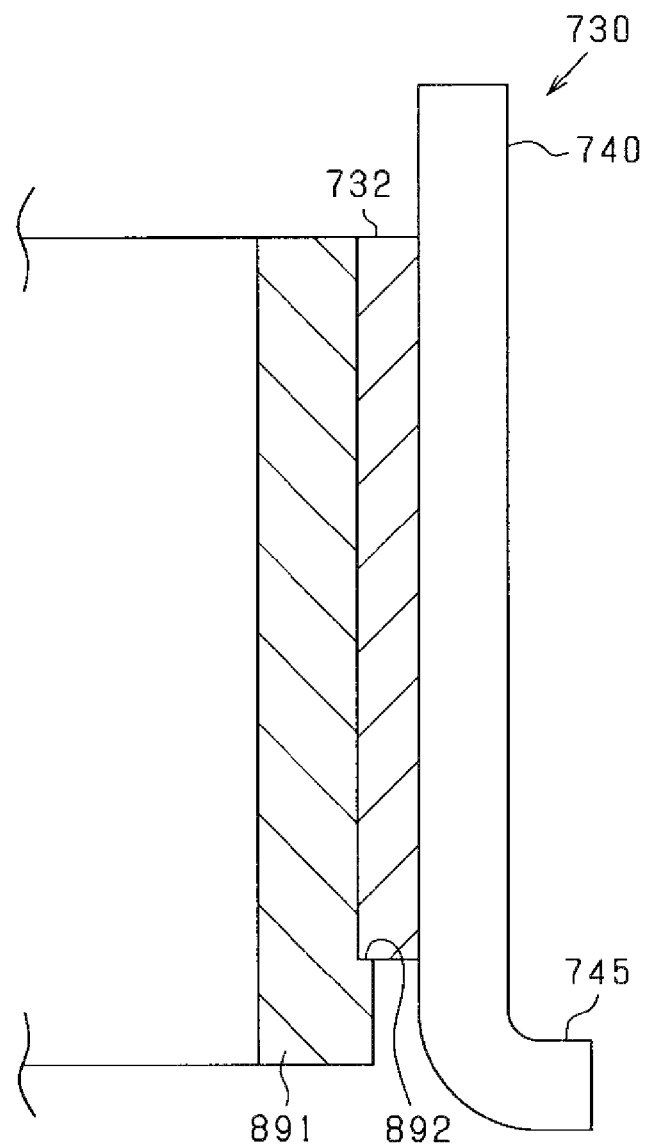

In the stator 730 shown in FIG. 121, a cylindrical member 891 is fixed on the inner side (the side opposite the coil module 740) in the radial direction of the stator core 732, from one side in the axial direction of the stator core 732. For example, the cylindrical member 891 corresponds to the outer cylindrical member 772 of the inner housing 771, described above. In the cylindrical member 891, a stepped contacting portion 892 that comes into contact with the end surface in the axial direction of the stator core 732 is provide so as to protrude towards the side of the stator core 732 on a circumferential surface (outer circumferential surface) on a side on which the stator core 732 is assembled.

In this case, on a side on which the contact portion 892 of the cylindrical member 891 is provided in the axial direction, the curved portion 745 of the coil module 740 (the outward curved portion Y1 of the partial winding 741) is curved towards the side opposite the cylindrical member 891, of the inner and outer sides in the radial direction.

In the above-described configuration, because the end surface in the axial direction of the stator core 732 is in contact with the contacting portion 892 of the cylindrical member 891, the stator core 732 can be suitably fixed to the cylindrical member 891 in a state in which the positioning in the axial direction in relation to the cylindrical member 891 is performed.

In this case, because the curved portion 745 of the coil module 740 is curved towards the side opposite the cylindrical member 891 in the radial direction on the side of the contacting portion 892 of the cylindrical member 891, of both sides in the axial direction, an issue in which the curved portion 745 comes into contact with the cylindrical member 891, and interferes with the contact between the end surface in the axial direction of the stator core 732 and the cylindrical member 891 can be prevented.

Figure 122:
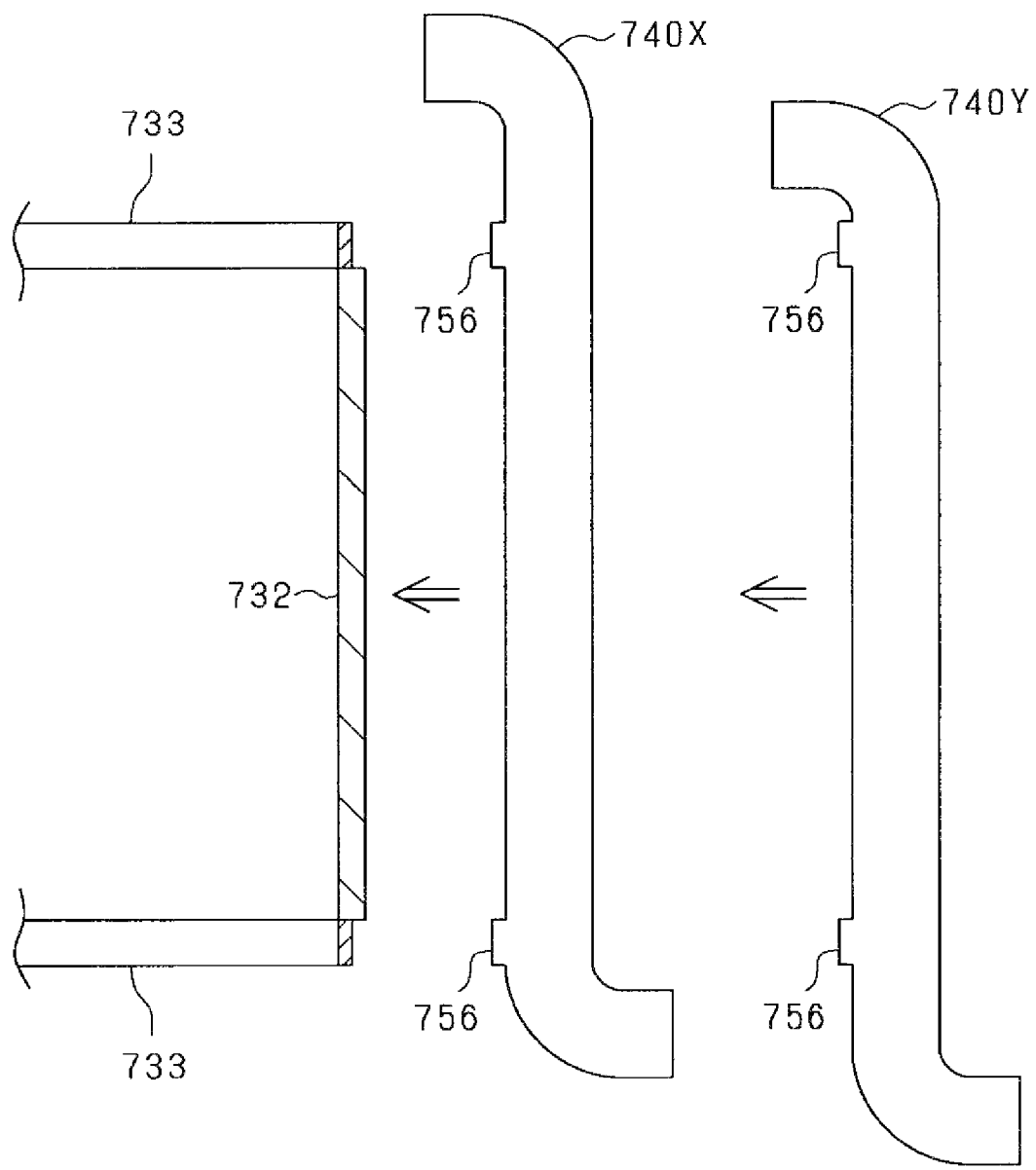

The coil modules 740 and 850 may have a configuration other than that in which the coil modules 740 and 850 are formed into a substantially L-like shape as a result of one of both ends in the axial direction being bent in the radial direction. Specifically, as shown in FIG. 122, both of two types of coil modules 740X and 740Y may be formed into a substantially Z-like shape as a result of both ends in the axial direction being bent in the radial direction. In this case, both ends in the axial direction of the coil modules 740X and 740Y are formed so as to be bent in opposite directions.

In addition, the coil modules 740X and 740Y are arranged in an array in the circumferential direction in a state in which relative positions are shifted in the axial direction. The state of array in the circumferential direction of the coil modules 740X and 740Y is as described earlier. In the coil modules 740X and 740Y, partial windings that have the same configuration can be used. However, the positions in the axial direction of the protruding portions 756 differ from each other.

In the stator winding 731, the configuration may be such that the coil modules 740 and the coil modules 850 are not used. For example, the configuration may be such that, in a state in which the plurality of partial windings 741A and 741B are arrayed in the circumferential direction on the outer side in the radial direction of the stator core 732, the plurality of partial windings 741A and 741B are resin-molded.

Figure 123:
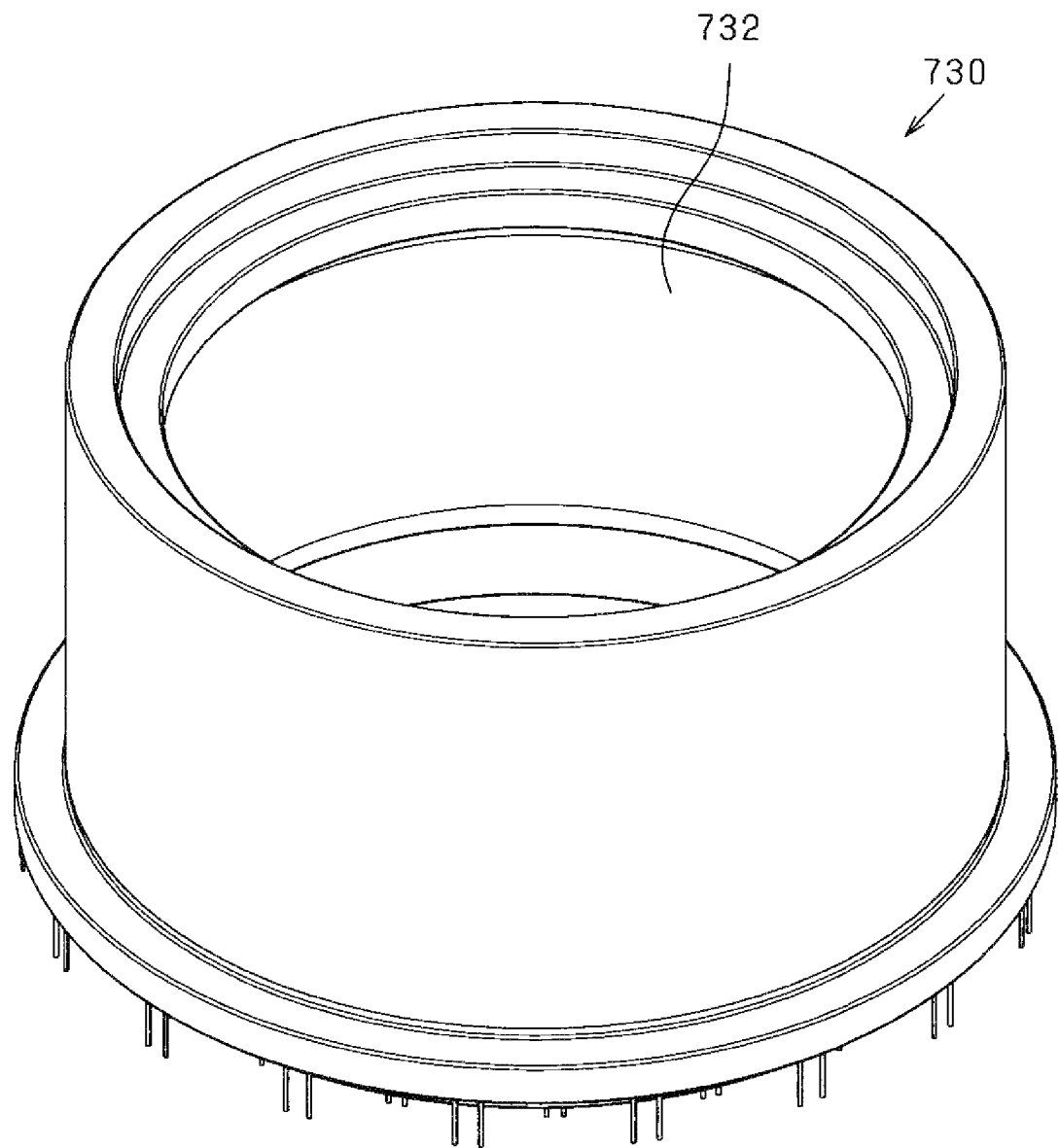

In this case, as shown in FIG. 123, the stator 730 is configured to form a circular cylindrical shape that is entirely covered by a resin layer. Inside the resin layer, in a manner similar to the configuration in which the coil modules 740 and coil modules 850 are used, the plurality of partial windings 741 are arranged in an array in the circumferential direction in a state in which insulation between the stator core 732 and the partial windings 741 is provided and interphase insulation of the partial windings 741A and 741B is provided.

In this case, as a result of the resin covering layer that covers the plurality of partial windings 741A and 741B, radial-direction insulation walls that are adjacent in the radial direction of the partial windings 741A and 741B are formed, and circumferential-direction insulation walls that are adjacent in the circumferential direction of the partial windings 741A and 741B are formed.

Here, the configuration may be such that insulating insulation plates that have a predetermined thickness are each arranged between the partial windings 741A and 741B that are adjacent to each other in the circumferential direction. In this case, in a state in which the plurality of partial windings 741A and 741B and the insulation plates are alternately arrayed in the circumferential direction on the outer side in the radial direction of the stator core 732, the partial windings 741A and 741B and the insulation plates are resin-molded, and the stator 730 is molded.

In the present configuration, even should the partial windings 741A and 741B be unintentionally moved as a result of injection pressure during a resin molding step, because an insulation distance that amounts to the thickness of the insulation plate remains, required insulation distances to the ground and between phases can be ensured.

In the configuration described above, a configuration in which all of the partial windings 741 are connected in parallel for each phase winding in the stator winding 731 is described. However, this may be modified. For example, the configuration may be such that all of the partial windings 741 for each phase winding are divided into a plurality of parallel-connection groups, and the plurality of parallel-connection groups are connected in series.

That is, a total of twelve partial windings 741 of each phase winding is divided into parallel-connection groups that are two sets of six partial windings 741, and the parallel-connection groups are connected in series. Alternatively, the configuration may be such that all of the plurality of partial windings 741 are connected in series for each phase winding in the stator winding 731.

Seventeenth Modification

Figure 124:
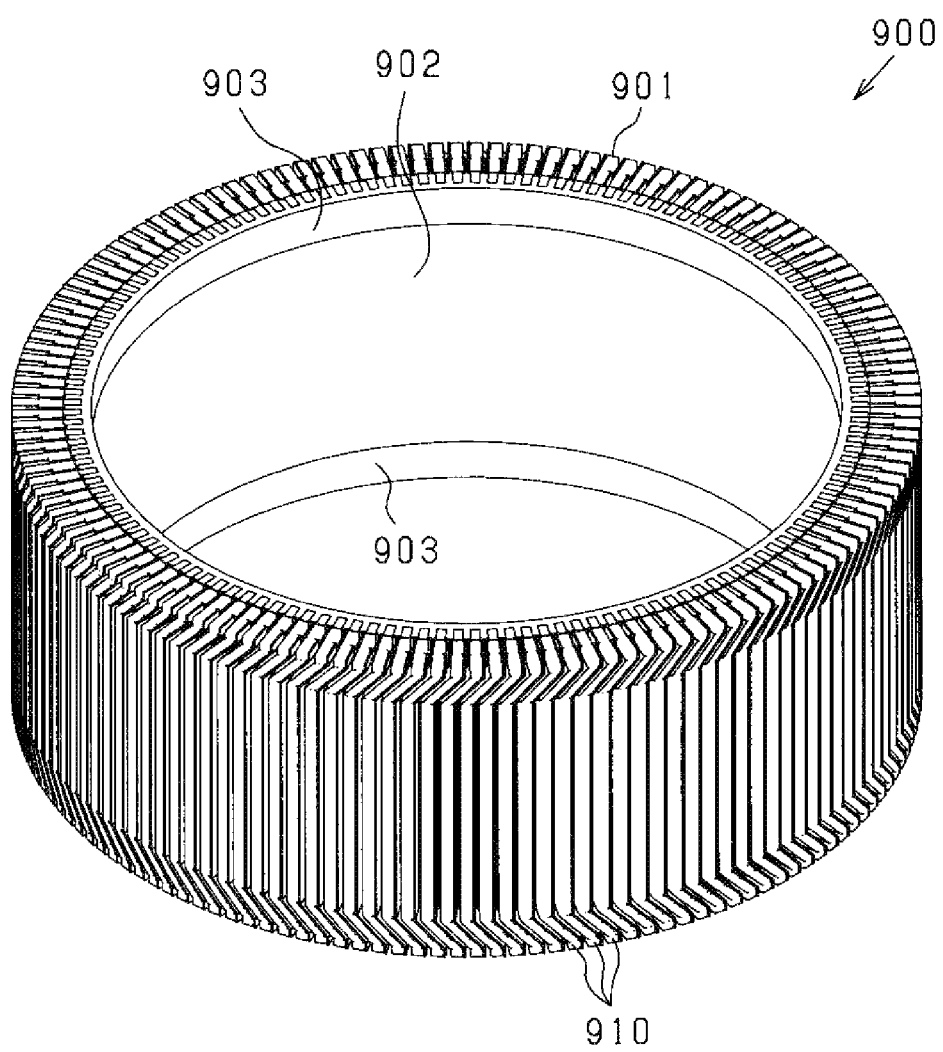

In a present modification, the rotating electric machine 700 is configured such that a stator 900 shown in FIG. 124 is used instead of the stator 730. In the present example as well, the rotor 710, the inner unit 770, and the bus bar module 810, described earlier, are provided as the configuration of the rotating electric machine 700. However, descriptions are omitted herein.

Figure 125:
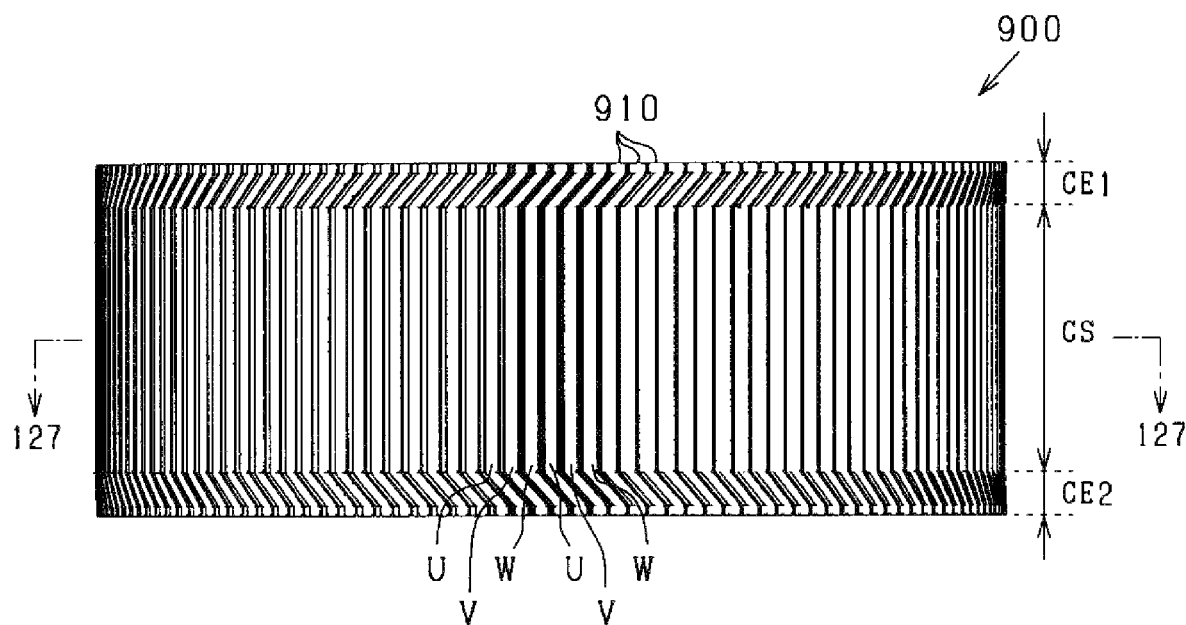
Figure 126:
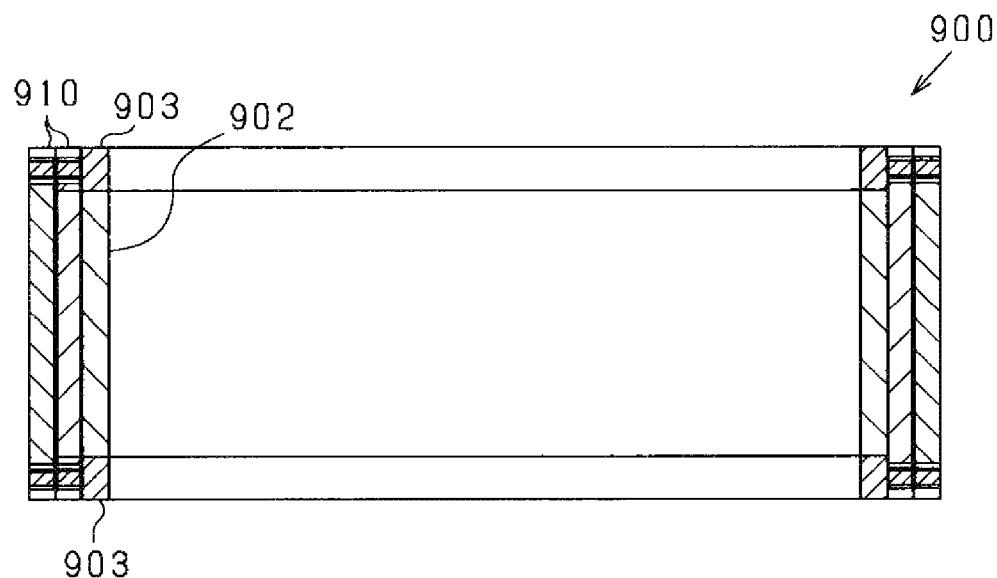
Figure 127:
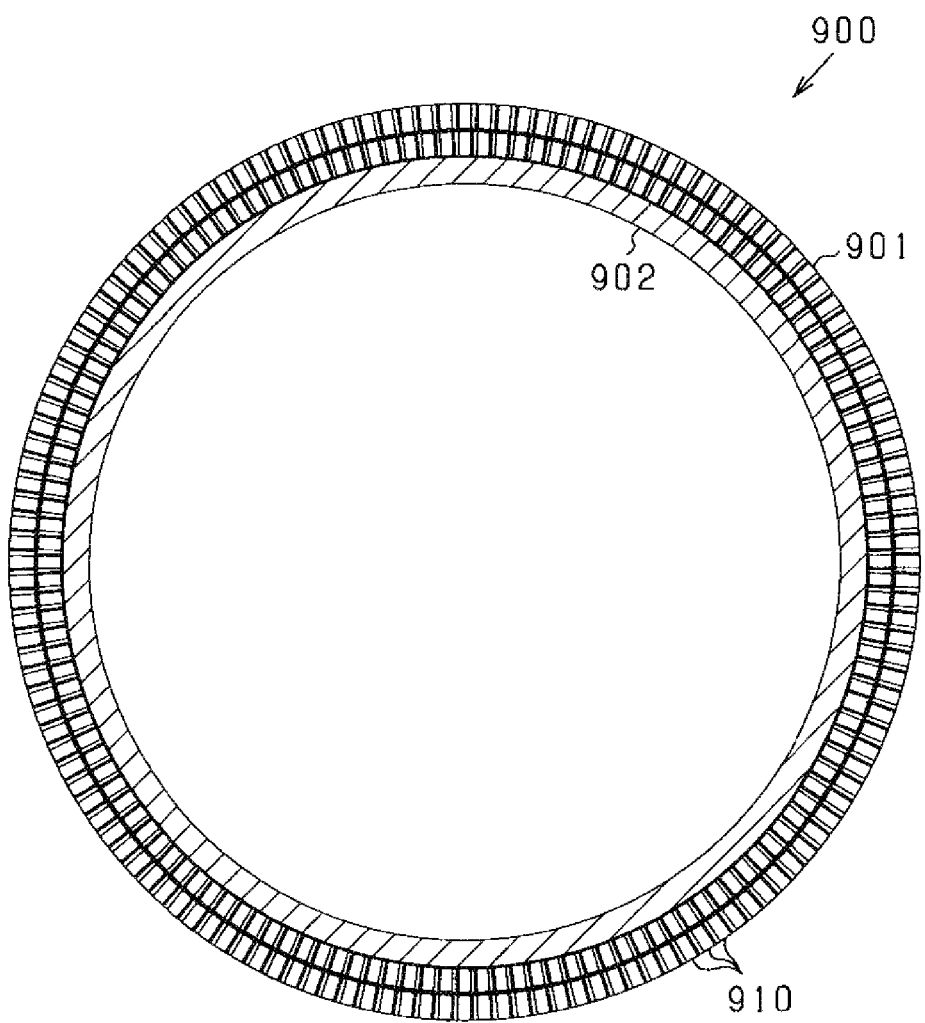
Figure 128:
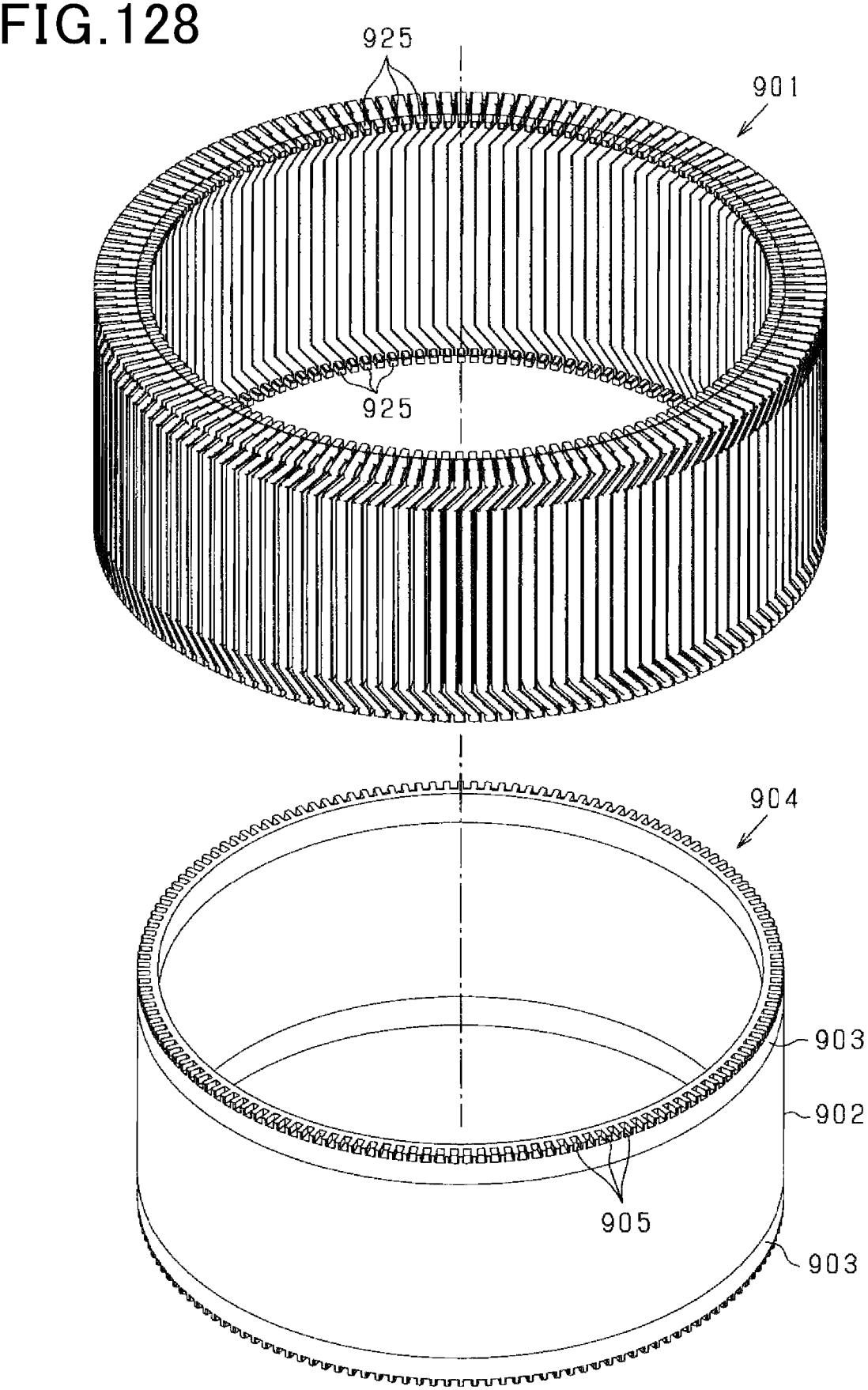

The stator 900 includes a stator winding 901 and a stator core 902. FIG. 124 is a perspective view of a configuration of the stator 900. FIG. 125 is a front view of the stator 900. FIG. 126 is a vertical cross-sectional view of the stator 900. FIG. 127 is a lateral cross-sectional view of the stator 900 (cross-sectional view taken along line 127-127 in FIG. 125). FIG. 128 is a perspective view in which the stator winding 901 and the stator core 902 are exploded.

The stator core 902 is that in which a plurality of core sheets that are made of electromagnetic steel sheets that are magnetic bodies are laminated in the axial direction, and is formed into a circular cylindrical shape that has a predetermined thickness in the radial direction. The stator winding 901 is assembled on the outer side in the radial direction that is the rotor 710 side of the stator core 902. An outer circumferential surface of the stator core 902 is formed into a curved surface with substantially no unevenness. The stator core 902 functions as a back yoke. For example, the stator core 902 is configured by the plurality of core sheets that are formed into a circular annular plate shape by punching being laminated in the axial direction. However, a stator core that has a helical core structure may also be used as the stator core 902.

In the stator core 902, end rings 903 are fixed to end surfaces on both sides in the axial direction. The end ring 903 is a positioning member that provides a function for holding the stator winding 901 in a predetermined position in the circumferential direction in a state in which the stator winding 901 is assembled to the stator core 902. The stator core 902 and the end rings 903 are a base member 904.

A plurality of recessing portions 905 are formed in the circumferential direction on an outer circumferential surface of the end ring 903. In the present example, the same number of recessing portions 905 as coil modules 910 that are arrayed in the circumferential direction in the stator winding 901 is provided in the circumferential direction. In the end rings 903 on both sides in the axial direction, positions of the recessing portions 905 in the circumferential direction coincide between one end side and the other end side in the axial direction.

For example, the end ring 903 is formed by a non-magnetic material such as aluminum or copper. The end ring 903 is fixed to the stator core 732 by welding. Aside from welding, the end ring 903 may be mechanically fixed by pin insertion, key press-fitting, or bolt fastening. As a result of such mechanical fixing, positional shifting in the circumferential direction of the end ring 903 in relation to the stator core 902 is suppressed.

As shown in FIG. 125, the stator 900 has, in the axial direction, a portion that corresponds to the coil side CS that opposes the magnets 722 in the rotor 710 in the radial direction, and portions that correspond to the coil ends CE1 and CE2 that are on the outer sides in the axial direction of the coil side CS. In this case, the stator core 902 is provided over an area that corresponds to the coil side CS in the axial direction. The end rings 903 are respectively provided in the coil end CE1 on one end side in the axial direction and the coil end CE2 on the other end side.

The stator winding 901 has a plurality of phase windings and is formed into a circular cylindrical shape (annular shape) by phase windings of phases being arranged in a predetermined order in the circumferential direction. In the present example, as a result of phase windings of a U-phase, a V-phase, and a W-phase being used, the stator winding 901 is configured to have phase windings of three phases. In addition, as shown in FIG. 127, in the stator winding 901, conductor portions that are arrayed in the circumferential direction are arranged so as to be arrayed in two layers in the radial direction. The stator winding 901 is a winding that has two layers on the inner and outer sides in the radial direction.

The phase windings of the phases in the stator winding 901 have a plurality of partial windings 911. The partial windings 911 are individually provided as the coil modules 910. That is, the coil module 910 is that in which the partial winding 911 of the phase winding of each phase is integrally provided. As a result of the coil modules 740 of each phase being arranged so as to be arrayed in a predetermined order in the circumferential direction, the conductor portions of each phase are arranged in an array in a predetermined order in the coil side of the stator winding 731. FIG. 125 shows the order of array of the conductor portions of the U-phase, the V-phase, and the W-phase in the coil side.

Figure 129:
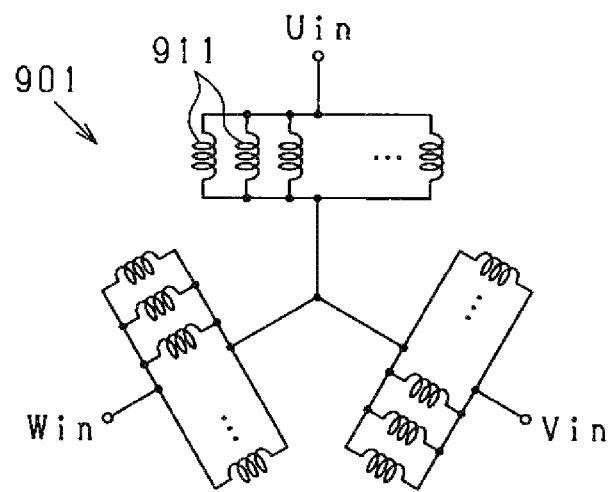

In the stator winding 901, the phase winding of each phase is configured by the partial windings 911 of the coil modules 910 being connected in parallel for each phase. FIG. 129 is a circuit diagram of a connection state of the partial windings 911 of the phase windings of the three phases. FIG. 129 shows a state in which the plurality of partial windings 911 of the phase winding of each phase are connected in parallel.

Figure 130:
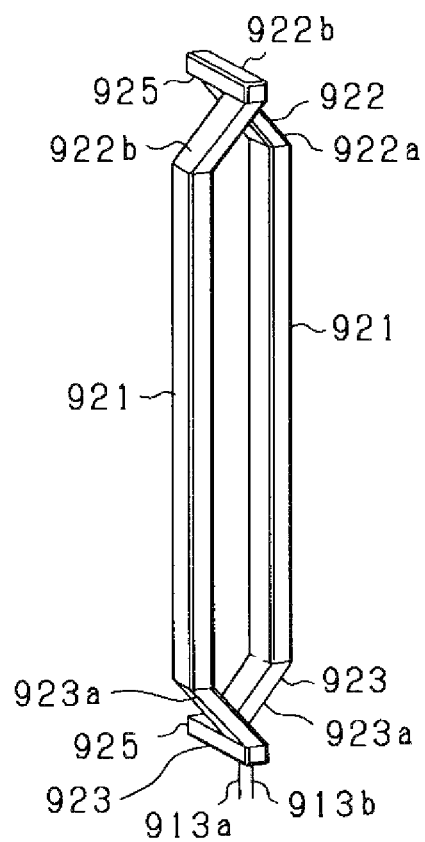

The stator winding 901 is configured by the plurality of coil modules 910 that are arranged so as to be arrayed in the circumferential direction. FIG. 130 shows, by (a) and (b) perspective views of the coil module 910. FIG. 131 shows, by (a), a vertical cross-sectional view of the coil module 910, viewed from the front. FIG. 131 shows, by (b), a side view of the coil module 910. Here, in FIG. 131 by (b), a left side of the coil module 910 is the stator core 902 side (inner side in the radial direction).

The coil module 910 includes the partial winding 911 that is an air-core wound coil and a covering layer 912 that covers the partial winding 911. In this case, the overall partial winding 911 is covered by the covering layer 912. As a result of the covering layer 912, insulation between the partial winding 911 and the stator core 902, and insulation between the partial windings 911 that are close to each other are provided. The partial winding 911 is configured by a conductor 913 being wound in multiple layers. For example, the covering layer 912 is formed by a synthetic resin that is an insulating material.

The plurality of partial windings 911 may have the same conductor-body cross-sectional area in the multiple-layer winding state and the same number of rounds of the multiple-layer winding. In this case, in the phase winding of each phase, interlinkage fluxes in the partial windings 911 that configure a parallel circuit can be made uniform. As a result, mutual potential difference in the partial windings 911 can be eliminated, and generation of a circulating current inside the parallel circuit can be suppressed. In addition, decrease in motor efficiency and decrease in thermal rating performance accompanying the generation of the circulating current can be suppressed.

The coil module 910 includes a pair of linear portions 921 that extend in parallel and in a linear manner, and crossover portions 922 and 923 that connect the pair of linear portions 921 on one end side in the axial direction and the other end side in the axial direction. The coil module 910 is formed into an annular shape by the pair of linear portions 921 and the crossover portions 911 and 923 on both sides in the axial direction. The pair of linear portions 921 are provided so as to be separated by a predetermined coil pitch. The linear portion 921 of the coil module 910 of another phase can be arranged between the pair of linear portions 921 in the circumferential direction.

In the present example, the configuration is such that the pair of linear portions 921 are provided so as to be separated by two coil pitches, and one intermediate conductor portion 746 each of the coil modules 910 of the other two phases is arranged between the pair of linear portions 921.

In addition, in the present example, the pair of linear portions 921 are provided so as to be offset by an amount amounting to a single layer in the radial direction. One linear portion 921 of the pair of linear portions 921 is arranged on the inner layer side of the stator winding 901 that has two layers in the radial direction, and the other linear portion 921 is arranged on the outer layer side of the stator winding 910 that has two layers in the radial direction.

Furthermore, the pair of linear portions 921 that are respectively provided in differing layers on the inner and outer sides in the radial direction are connected in an annular shape by the crossover portions 922 and 923. Specifically, one crossover portion 922 includes a pair of oblique portions 922a that extend so as to be oblique to the axial direction and towards sides on which the pair of oblique portions 922a become closer to each other, and a connecting portion 922b that connects the pair of oblique portions 922a in the radial direction.

In addition, the other crossover portion 923 includes a pair of oblique portions 923a that extend so as to be oblique to the axial direction and towards sides on which the pair of oblique portions 923a become closer to each other, and a connecting portion 923b that connects the pair of oblique portions 923a in the radial direction. The crossover portions 922 and 923 are switching portions that perform switching between inner and outer layers.

The crossover portions 922 and 923 are respectively provided as portions that correspond to the coil ends CE1 and CE2 (see FIG. 125). That is, these crossover portions 922 and 923 are provided as coil-end connecting portions that connect the conductor portions of the same phase that are in two differing positions in the circumferential direction in the coil ends CE1 and CE2.

In the state in which the stator winding 901 is assembled to the stator core 902, one linear portion 921 of the pair of linear portions 921 and the oblique portions 922a and 923a on both sides in the axial direction thereof are arranged on the outer layer side of the two layers in the radial direction. The other linear portion 921 and the oblique portions 922a and 923a on both sides in the axial direction are arranged on the inner layer side of the two layers in the radial direction.

As shown in FIG. 131 by (b), in the linear portion 921 on the inner layer side (the linear portion 921 on the left side in the drawing) of the pair of linear portions 921 of the coil module 910, the covering layer 912 further towards the stator core 902 side than the partial winding 911 is an insulation layer 912a between the partial winding 911 and the stator core 902. This insulation layer 912a corresponds to the back-yoke-side insulation wall.

In addition, in the coil module 910, protruding portions 925 that engage with the recessing portions 905 of the end rings 903 are provided on one end side and the other end side in the axial direction. The protruding portions 925 are provided so as to extend toward the inner side in the radial direction from the connection portions 922b and 923a of the crossover portions 922 and 923.

As shown in FIG. 131 by (a), in the coil module 910, the partial winding 911 is provided so as to be entirely covered by the covering layer 912. The partial winding 911 includes a pair of intermediate conductor portions 915 as portions that run along the pair of linear portions 921 of the coil module 910, and includes crossover portions 916 and 917 as portions that run along the crossover portions 922 and 923 of the coil module 910.

To explain further regarding the partial winding, the partial winding 911 includes the pair of intermediate conductor portions 915 that are provided in a linear manner and in parallel with each other, and the crossover portions 916 and 917 that connect the pair of intermediate conductor portions 915 on one end side in the axial direction and the other end side in the axial direction. The partial winding 911 is formed into an annular shape by the pair of intermediate conductor portions 915, and the crossover portions 916 and 917. The intermediate conductor portion 914 of the partial winding 911 of another phase can be arranged between the pair of intermediate conductor portions 914 in the circumferential direction.

In the present example, the pair of intermediate conductor portions 914 are provided so as to be separated by two coil pitches. The configuration is such that one intermediate conductor portion 915 each of the partial windings 911 of the other two phases is arranged between the pair of intermediate conductor portions 915.

The partial winding 911 is formed by the conductor 913 being wound in multiple layers such that a lateral cross-section is a quadrangle. Four sides on the lateral cross-section thereof are covered by insulation walls that are made of the covering layer 912. In the present example, the partial winding 911 is configured by the conductor 913 being wound by concentric winding. However, the manner in which the conductor 913 is wound is arbitrary. The conductor 913 maybe wound in multiple layers by alpha winding instead of concentric winding.

As shown in FIG. 130, in the coil module 910, end portions of the conductor 913 of the partial winding 911 are drawn out in the axial direction, and the end portions serve as winding end portions 913a and 913b. The winding end portions 913a and 913b are respectively the winding end and the winding start of the conductor 913. Of the winding end portions 913a and 913b, the winding end portion 913a is connected to the current input/output terminal and the winding end portion 913b is connected to the neutral point.

Next, a state in which the coil modules 910 are assembled to the stator core 902 will be described.

FIG. 132 is a perspective view of a state in which the plurality of coil modules 910 are arrayed in the circumferential direction. FIG. 133 is a diagram of a lateral cross-section in a state in which the plurality of coil modules 910 are arrayed in the circumferential direction. Here, in FIG. 133, the coil modules 910 of the same phase (such as the U-phase) are dotted.

As shown in FIG. 132, all of the plurality of coil modules 910 have the same shape and are arranged in an array in the circumferential direction so as to be oriented such that the connecting portions 922b and 923b of the crossover portions 922 and 923 extend in the radial direction. In this case, interference between the coil modules 910 that are adjacent to each other in the circumferential direction is prevented by the crossover portions 922 and 923 that extend in the radial direction. The crossover portions 922 and 923 of the coil module 910 (the crossover portions 916 and 917 of the partial winding 911) correspond to the interference preventing unit.

In the state in which the coil modules 910 are assembled to the stator core 902, the protruding portions 925 of the coil modules 910 are engaged with the recessing portions 905 (see FIG. 128) that are provided in the end rings 903 on both ends in the axial direction of the stator core 902. As a result, the coil modules 910 can be assembled to the stator core 902 while positional accuracy in the circumferential direction is improved.

The recessing portion 905 of the end ring 903 and the protruding portion 925 of the coil module 910 may be such that respective engaging surfaces that oppose each other are oblique surfaces (oblique surfaces that are oblique to a tangent line on a concentric circle that is concentric with the stator core 902). Here, the recessing portion 905 of the end ring 903 corresponds to the first engaging portion. The protruding portion 925 of the coil module 910 corresponds to the second engaging portion.

The configuration may be such that, on both ends in the axial direction, the protruding portions 925 of the coil modules 910 oppose the recessing portions 905 of the end rings 903, and the end rings 903 are pressed in the axial direction by the protruding portions 925. In this case, as a result of the end rings 902 being pressed in the axial direction by the protruding portions 925, a pressing force in the axial direction against the core sheets, or in other words, an urging force that acts against the core sheets attempting to separate from each other in the axial direction can be applied in the stator core 902. As a result, minute gaps between the core sheets can be minimized. Furthermore, reduction in the axial-length dimension of the stator core 902 can be achieved. The protruding portion 925 corresponds to the pressing portion.

The plurality of coil modules 910 are arranged so as to be separated from each other without being in contact in the circumferential direction. In this state, resin molding may be performed so as to cover the overall coil module 910. As a result, issues such as detachment and the like of the coil module 910 can be suppressed. Here, the configuration may be such that a restraining member such as a restraining ring is provided on the outer circumferential side of the coil modules 910, and a pressing force in the radial direction is applied as a result of restraint by the restraining ring.

As shown in FIG. 133, the coil modules 910 of each phase are arranged in an array in the circumferential direction in a predetermined order. In the coil modules 910, the pair of linear portions 921 are provided so as to be separated by two coil pitches. Because one linear portion 931 each of the coil modules 910 of the other two phases is arranged between the pair of linear portions 921, the linear portions 921 of the same phase are arrayed on the inner and outer side in the radial direction.

In short, the partial winding 911 is configured in the following manner. The partial winding 911 includes, as the pair of intermediate conductor portions 915, an inner conductor portion that is positioned on the inner side of the two layers in the radial direction and an outer conductor portion that is positioned on the outer side of the two layers in the radial direction. The inner conductor portion and the outer conductor portion are connected by the crossover portions 916 and 917 on one end side and the other end side in the axial direction. In addition, the phase winding of each phase has the partial windings 911 that have the same shape.

The partial windings 911 are arranged in an array in the circumferential direction in a state in which the crossover portions 916 and 917 are arrayed at the same orientation in the circumferential direction on one end side and the other end side in the axial direction. In this case, the partial windings 911 adjacent to each other in the circumferential direction are appropriately arrayed in the circumferential direction while interference therebetween is prevented. In addition, productivity is improved as a result of the partial windings 911 that have the same shape being used.

The stator 900 may be that which uses any of (A) to (C), below.

(A) In the stator 900, a conductor-to-conductor member is provided between the conductor portions (intermediate conductor portions 915) in the circumferential direction, and when the width dimension in the circumferential direction of the conductor-to-conductor member in a single magnetic pole is Wt, the saturation magnetic density of the conductor-to-conductor member is Bs, the width dimension in the circumferential direction of the magnet 722 in a single magnetic pole is Wm, and the residual magnetic flux density of the magnet 722 is Br, a magnetic material in which a relationship Wt×Bs≤Wm×Br is satisfied is used as the conductor-to-conductor member.

(B) In the stator 900, the conductor-to-conductor member is provided between the conductor portions (intermediate conductor portions 915) in the circumferential direction, and a non-magnetic material is used as the conductor-to-conductor member.

(C) In the stator 900, the configuration is such that the conductor-to-conductor member is not provided between the conductor portions (intermediate conductor portions 915) in the circumferential direction.

In the rotating electric machine 700 of the present example, in the stator 900, conductor-to-conductor members (so-called teeth) are not provided between the conductor portions (intermediate conductor portions 915) that are arranged at predetermined intervals in the circumferential direction or, even should the conductor-to-conductor members be provided, the configuration is magnetically weak. Therefore, the magnet magnetic flux that is generated in the rotor 710 directly interlinking with the conductor portions of the stator winding 901, and motor efficiency decreasing and thermal rating performance decreasing in accompaniment with increase in copper eddy loss is a concern. In particular, in a configuration in which strengthening of magnetic flux density as a result of orientation is achieved as described above, the effects of copper eddy loss becoming more noticeable is a concern.

In this regard, in the above-described configuration, in the stator winding 901, the partial winding 911 is configured such that the conductor 913 is wound in multiple layers between the conductor portions of the same phase that are provided so as to be separated in the circumferential direction. In addition, the phase winding of each phase is configured by the plurality of partial windings 911 being connected to each other in parallel. As a result, fragmentation of the cross-sectional area per single conductor can be performed in the stator winding 901, and the occurrence of copper eddy loss can be suppressed. Furthermore, improvement in motor efficiency and improvement in thermal rating performance can be achieved.

Moreover, when the number of poles of the magnetic poles is P, and the number of partial windings 911 per phase is N, the number of poles P is N. In the phase windings, for each phase, the N-number of partial windings 911 is all connected in parallel. Specifically, in the present example, the number (N) of partial windings 911 per phase is 48, and the number of poles P is 48. With reference to FIG. 129, in the phase windings of the U-phase, the V-phase, and the W-phase, the numbers of parallels of the partial windings 911 are all 48. In this case, as a result of all of the partial windings 911 for each phase being connected in parallel, the cross-sectional area of each conductor in the stator winding can be minimized. Further reduction of copper eddy loss can be achieved.

The following configuration can also be used as the partial winding 911. As shown in FIG. 134, the partial winding 911 uses a composite conductor 930 in which a plurality strands of fine wires 931 are connected in parallel, and is configured by the composite conductor 930 being wound in multiple layers. In FIG. 134, for example, the composite conductor 930 is configured as a bundle wire that has three fine wires 931*a*, 931*b*, and 931*c*. For convenience of description, in FIG. 134, the same cross-sectional denotation is used for the same fine wires 931. A differing cross-sectional denotation is used for a different fine wire 931. Here, the number of fine wires 931 in the composite conductor 930 is merely required to be two or more and is arbitrary.

In addition, in the intermediate conductor portion 915 of the partial winding 911, the composite conductor 930 is arranged such that an array of the fine wires 931*a* to 931*c* is the same in the circumferential direction. Specifically, as shown in FIG. 134, in the intermediate conductor portion 915, the composite conductor 930 is wound in four rows in the circumferential direction and in two layers in the radial direction. In this case, when viewed from the circumferential direction, the array of the fine wires 931 is the same in all rows.

In the above-described configuration, as a result of the composite wire 930 being wound in multiple layers using the composite wire 930 in which the plurality of fine wires 931 are connected in parallel, or in other words, as a result of further fragmentation of the conductor body being performed in a single conductor, further reduction of the conductor-body cross-sectional area in the stator winding 901 can be achieved, and the effect of reducing copper eddy loss is improved.

Furthermore, in the conductor portion of the partial winding 911, as a result of the composite conductor 930 being arranged such that the array of the plurality of fine wires 931 is the same in the circumferential direction (that is, uniformly arranged in the circumferential direction), generation of a circulating current in the composite conductor 930 can be suppressed, and reduction in copper eddy loss and circulating current loss can be achieved.

In the fine wires 931 that are connected in parallel, a length or a cross-sectional area of the conductor is set such that electrical resistance is substantially equal among the fine wires 931. As a result, imbalance in a current inside the parallel circuit and worsening of loss in accompaniment with the imbalance can be suppressed.

Here, in the conductor portion of the partial winding 911, the configuration in which the composite conductor 930 is arranged such that the array of the plurality of fine wires 931 is the same in the circumferential direction may be a configuration other than that in which the fine wires 931 are arrayed in a single row in the radial direction. In short, all that is required is that the configuration be such that imbalance in the current does not occur in the circumferential direction, compared to the radial direction.

The composite conductor 930 may be configured such that the plurality of fine wires 931 are twisted together. As a result, potential difference between the plurality of fine wires 931 in the composite conductor 930 can be eliminated, and suppression of a circulating current in the composite conductor 930 can be achieved.

Specifically, as shown in FIG. 135 by (a), the composite conductor 930 may be a stranded wire that is formed by the plurality of fine wires 931 being twisted in the circumferential direction. Alternatively, as shown in FIG. 135 by (b), the composite conductor 930 may be a stranded wire that is formed by the plurality of fine wires 931 being braided. Here, the configuration may be such that all of the fine wires 931 are braided together. In this case, potential difference between the plurality of fine wires 931 that are in parallel can be eliminated, and suppression of a circulating current in the composite conductor 930 can be achieved.

Other Examples of the Seventeenth Modification

As the configuration of the coil module 910, a configuration in which the partial winding 911 is integrally provided with a bobbin-like winding holder may be used. In this case, the winding holder may be that which includes at least an insulation wall on the stator core 902 side, or that which includes an insulation wall on the stator core 902 side and an insulation wall on the counter-stator core side, among four sides surrounding the partial winding 911. In this case, not all four sides surrounding the partial winding 911 may be surrounded by the insulation walls, and a portion thereof may be exposed.

Instead of the configuration in which the protruding portions 925 of the coil modules 910 engage with the recessing portions 903 of the end rings 903 that are fixed to the stator core, the configuration may be such that the protruding portions 925 of the coil modules 910 engage with recessing portions that are formed in the stator core 902.

The pair of linear portions 921 of the coil module 910 (the pair of intermediate conductor portions 915 of the partial winding 911) may not be parallel with the axial direction and maybe oblique to the axial direction. In this case, a skewed structure of the stator winding 901 is actualized.

Other Examples of the Fifteenth to Seventeenth Modifications

The stator winding 731 and the stator winding 901 of the rotating electric machine 700 may be configured to have two phase windings (the U-phase winding and the V-phase winding). In this case, for example, in the partial winding 741, the configuration may be such that the pair of intermediate conductor portions 746 are provided so as to be separated by a single coil pitch, and one intermediate conductor portion 746 of the phase winding 741 of the other one phase is arranged between the pair of intermediate conductor portions 746.

The outer-rotor-type, surface-magnet-type rotating electric machine has been described up to this point as the rotating electric machine 700 of the fifteenth to seventeenth modifications. However, instead, the rotating electric machine 700 of the fifteenth to seventeenth modifications can be actualized as an inner-rotor-type, surface-magnet-type rotating electric machine. When the rotating electric machine 700 is the inner rotor type, in the stator 730, the plurality of coil modules 740 or coil modules 850 may be arranged in an array on the inner side in the radial direction of the stator core 732. Alternatively, the plurality of coil modules 910 may be arranged in an array on the inner side in the radial direction of the stator core 902.

The stators 730 and 900 that are used in the rotating electric machine 700 may include protruding portions (such as teeth) that extend from the back yoke. In this case as well, assembly of the coil modules 740 and the like to the stator core may be performed on the back yoke.

The rotating electric machine is not limited to that which has a star connection and may be that which has a Δ connection.

Instead of a rotating-field-type rotating electric machine in which the field element is the rotor, a rotating-armature-type rotating electric machine in which an armature is the rotor can be used as the rotating electric machine 700.

The disclosure of the present specification is not limited to the embodiments given as examples. The disclosure includes the embodiments given as examples, as well as modifications by a person skilled in the art based on the embodiments. For example, the disclosure is not limited to the combinations of components and/or elements described according to the embodiments. The disclosure can be carried out using various combinations. The disclosure may have additional sections that can be added to the embodiments. The disclosure includes that in which a component and/or element according to an embodiment has been omitted. The disclosure includes replacements and combinations of components and/or elements between one embodiment and another embodiment. The technical scope that is disclosed is not limited to the descriptions according to the embodiments. Several technical scopes that are disclosed are cited in the scope of claims. Furthermore, the technical scopes should be understood to include all modifications within the meaning and scope of equivalency of the scope of claims.

What is claimed is:

1. An armature having a toothless structure, the armature comprising:
   an armature winding of multiple phases that has phase windings, for each phase, that each include a plurality of partial windings; and
   a base member that includes a circular cylindrical back yoke, wherein
   the partial winding includes
      a pair of intermediate conductor portions that are provided so as to be separated at a predetermined interval in a circumferential direction,
      crossover portions that are provided on a first end side and a second end side in an axial direction and connect the pair of intermediate conductor portions in an annular shape,
      a conductor that is wound in multiple layers in the pair of intermediate conductor portions and the crossover portions, and
      an interference prevention portion that extends in a radial direction and prevents interference between the partial windings that are adjacent to each other in the circumferential direction, in at least either of the crossover portions on both sides in the axial direction,
   the intermediate conductor portions of the phases are arrayed in a predetermined order in the circumferential direction, by one intermediate conductor portion of the pair of intermediate conductor portions of the partial winding of a first phase being arranged between the pair of intermediate conductor portions of the partial winding of a second phase,
   the partial windings are assembled to the back yoke in a state in which a first insulation layer is interposed between the intermediate conductor portion and the back yoke, and in which a second insulation layer is provided on a side opposite the back yoke in the intermediate conductor portion, and
   a thickness dimension of the first insulation layer is larger than a thickness dimension of the second insulation layer.

2. The armature according to claim 1, wherein:
   the armature winding includes a plurality of coil modules that include the partial windings, a back-yoke-side insulation wall that is provided on the back yoke side of the intermediate conductor portion in the partial winding, and a counter-back-yoke-side insulation wall on a side opposite the back-yoke-side insulation wall with the intermediate conductor portion therebetween in the radial direction;
   the plurality of coil modules are arranged in an array in the circumferential direction on an inner side in the radial direction or an outer side in the radial direction of the back yoke; and
   the back-yoke-side insulation wall is provided as the insulation layer, and the counter-back-yoke-side insulation wall is provided as the second insulation layer.

3. The armature according to claim 2, wherein:
   in the coil module, the back-yoke-side insulation wall includes extending portions that extend further in the circumferential direction than the intermediate conductor portion on both sides in the circumferential direction of the intermediate conductor portion; and
   in a state in which the plurality of coil modules are arranged in an array in the circumferential direction, the extending portions of differing coil modules are provided so as to oppose each other in the circumferential direction, between the intermediate conductor portions that are adjacent to each other in the circumferential direction.

4. The armature according to claim 3, wherein:
   a circumferential-direction insulation wall that extends in the radial direction towards a portion between the intermediate conductor portions that are arrayed in the circumferential direction from the back-yoke-side insulation wall is provided on a side of at least either of the extending portions on both sides in the circumferential direction of the intermediate conductor portions in the back-yoke-side insulation wall.

5. The armature according to claim 4, wherein:
the circumferential-direction insulation walls of differing coil modules are provided so as to oppose each other in the circumferential direction, between the intermediate conductor portions that are arrayed in the circumferential direction.

6. The armature according to claim 4, wherein:
the circumferential-direction insulation wall has a thickness dimension in the circumferential direction that differs between positions on the inner side in the radial direction and the outer side in the radial direction, and the thickness dimension on the outer side in the radial direction is larger.

7. The armature according to claim 2, wherein:
the coil module includes an insulating winding holder that has at least the back-yoke-side insulation wall and the counter-back-yoke-side insulation wall, and the partial winding is integrated with the winding holder.

8. The armature according to claim 2, wherein:
the plurality of coil modules are integrally molded with the back yoke by an insulating material.

9. The armature according to claim 2, wherein:
the coil module includes a covering portion that covers a periphery of the partial winding by an insulating material, and in the covering portion, the first insulation layer serves as the back-yoke-side insulation wall, and the second insulation layer serves as the counter-back-yoke-side insulation wall.

10. The armature according to claim 2, comprising:
a restraining member that restrains the plurality of coil modules in a state in which the plurality of coil modules are urged toward the base member in the radial direction.

11. The armature according to claim 10, wherein:
the armature is provided so as to oppose a magnet portion that configures a field element in the radial direction; and
the restraining member is provided, in the axial direction of the coil module, in a position that does not oppose the magnet portion in the radial direction.

12. The armature according to claim 1, wherein:
the armature winding has phase windings of three phases that are connected to one another; and
in the partial winding, the pair of intermediate conductor portions are provided so as to be separated by two coil pitches, and one intermediate portion each of the partial windings of the other two phases are arranged between the pair of intermediate conductor portions.

13. The armature according to claim 1, wherein:
the partial winding includes a radial-direction curved portion that extends in the radial direction in at least either of the crossover portions on both sides in the axial direction, as the interference prevention portion.

14. The armature according to claim 13, wherein:
the partial winding includes
  a first partial winding in which an outward curved portion that is curved towards the outer side in the radial direction is provided in the crossover portion in a first coil end on a first side of coil ends on both sides in the axial direction, as the radial-direction curved portion, and
  a second partial winding in which an inward curved portion that is curved towards the inner side in the radial direction is provided in the crossover portion in a second coil end on a second side of coil ends on both sides in the axial direction, as the radial-direction curved portion, and the first partial winding and the second partial winding are assembled to the back yoke such that the crossover portion of the second partial winding is positioned on the outer side in the axial direction of the crossover portion of the first partial winding on the first coil end side, and the crossover portion of the first partial winding is positioned on the outer side in the axial direction of the crossover portion of the second partial winding on the second coil end side.

15. The armature according to claim 14, wherein:
the first partial winding is provided with the outward curved portion on the first coil end side and is not curved in the radial direction on the second coil end side; and
the second partial winding is provided with the inward curved portion on the second coil end side and is not curved in the radial direction on the first coil end side.

16. The armature according to claim 13, wherein:
the armature is provided with a circular cylindrical member that is fixed from one side in the axial direction of the base member, on a side opposite the partial windings, of the inner side in the radial direction and the outer side in the radial direction of the back yoke;
the cylindrical member is provided with a stepped contact portion that protrudes towards the side of the base member and comes into contact with an axial-direction end surface of the base member, on a circumferential surface on a side on which the base member is provided; and
the radial-direction curved portion is curved towards a side opposite the cylindrical member, of the inner and outer sides in the radial direction, on a side on which the contact portion of the cylindrical member is provided in the axial direction.

17. The armature according to claim 1, wherein:
in the partial winding, the conductors that are close to each other in the conductor that is wound in multiple layers are joined together by a joining material.

18. A rotating electric machine comprising:
an armature having a toothless structure; and
a field element that has a plurality of magnetic poles of which polarities alternate in a circumferential direction, wherein
either of the field element and the armature rotates together with a rotation shaft, and
the armature comprises:
  an armature winding of multiple phases that has phase windings, for each phase, that each include a plurality of partial windings; and
  a base member that includes a circular cylindrical back yoke, wherein
the partial winding includes
  a pair of intermediate conductor portions that are provided so as to be separated at a predetermined interval in a circumferential direction,
  crossover portions that are provided on a first end side and a second end side in an axial direction and connect the pair of intermediate conductor portions in an annular shape,
  a conductor that is wound in multiple layers in the pair of intermediate conductor portions and the crossover portions, and
  an interference prevention portion that extends in a radial direction and prevents interference between the partial windings that are adjacent to each other in the circumferential direction, in at least either of the crossover portions on both sides in the axial direction, the intermediate conductor portions of the phases are arrayed in a predetermined order in the circumferential direction, by one intermediate conductor portion of the pair of intermediate conductor portions of the partial winding of a first phase being arranged between the pair of intermediate conductor portions of the partial winding of a second phase, the partial windings are assembled to the back yoke in a state in which a first insulation layer is interposed between the intermediate conductor portion and the back yoke, and in which a second insulation layer is provided on a side opposite the back yoke in the intermediate conductor portion, and a thickness dimension of the first insulation layer is larger than a thickness dimension of the second insulation layer.

* * * * *